United States Patent
Yoshioka et al.

(10) Patent No.: US 10,534,162 B2
(45) Date of Patent: Jan. 14, 2020

(54) LENS ATTACHED SUBSTRATE, LAYERED LENS STRUCTURE, MANUFACTURING METHOD THEREOF, AND ELECTRONIC DEVICE

(71) Applicant: SONY SEMICONDUCTOR SOLUTIONS CORPORATION, Kanagawa (JP)

(72) Inventors: Hirotaka Yoshioka, Kanagawa (JP); Hiroyasu Matsugai, Kanagawa (JP); Hiroyuki Itou, Tokyo (JP); Suguru Saito, Kanagawa (JP); Keiji Ohshima, Tokyo (JP); Nobutoshi Fujii, Kanagawa (JP); Hiroshi Tazawa, Kanagawa (JP); Toshiaki Shiraiwa, Kanagawa (JP); Minoru Ishida, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/741,549

(22) PCT Filed: Jul. 19, 2016

(86) PCT No.: PCT/JP2016/003373
§ 371 (c)(1),
(2) Date: Jan. 3, 2018

(87) PCT Pub. No.: WO2017/022194
PCT Pub. Date: Feb. 9, 2017

(65) Prior Publication Data
US 2018/0217361 A1    Aug. 2, 2018

(30) Foreign Application Priority Data
Jul. 31, 2015   (JP) ................ 2015-152923

(51) Int. Cl.
*G02B 27/10*   (2006.01)
*G02B 13/00*   (2006.01)
(Continued)

(52) U.S. Cl.
CPC ....... *G02B 13/0085* (2013.01); *G02B 3/0031* (2013.01); *G02B 3/0075* (2013.01);
(Continued)

(58) Field of Classification Search
CPC ............. G02B 13/0085; G02B 3/0031; G02B 3/0075; G02B 7/021; H04N 5/2254; H04N 5/2257
(Continued)

(56) References Cited

U.S. PATENT DOCUMENTS

| 5,302,778 A | 4/1994 | Maurinus |
| 8,482,926 B2 | 7/2013 | Yano et al. |
| 2012/0154923 A1 | 7/2012 | Lee |

FOREIGN PATENT DOCUMENTS

| JP | 2009-279790 | 12/2009 |
| JP | 2010-102313 | 5/2010 |
| JP | 2011-138089 | 7/2011 |

OTHER PUBLICATIONS

International Search Report and Written Opinion prepared by the European Patent Office dated Oct. 19, 2016, for International Application No. PCT/JP2016/003373.
(Continued)

*Primary Examiner* — William Choi
(74) *Attorney, Agent, or Firm* — Sheridan Ross P.C.

(57) ABSTRACT

Substrates with lenses having lenses disposed therein are aligned with high accuracy. A stacked lens structure has a configuration in which substrates with lenses having a lens disposed on an inner side of a through-hole formed in the substrate are direct-bonded and stacked. In particular, one or more air grooves formed in surfaces of the substrates
(Continued)

reduces an influence of air inside a void portion between adjacent lenses of a layered lens structure.

18 Claims, 80 Drawing Sheets

(51) Int. Cl.
*G02B 7/02* (2006.01)
*G02B 3/00* (2006.01)
*H04N 5/225* (2006.01)

(52) U.S. Cl.
CPC ........... *G02B 7/021* (2013.01); *H04N 5/2254* (2013.01); *H04N 5/2257* (2013.01)

(58) Field of Classification Search
USPC ................................. 359/619, 921, 622, 754
See application file for complete search history.

(56) References Cited

OTHER PUBLICATIONS

Official Action (no English translation available) for Japanese Patent Application No. 2015-152923, dated Jul. 25, 2019, 4 pages.
Official Action (no English translation available) for Japanese Patent Application No. 2015-152923, dated Oct. 15, 2019, 3 pages.

FIG. 1
A
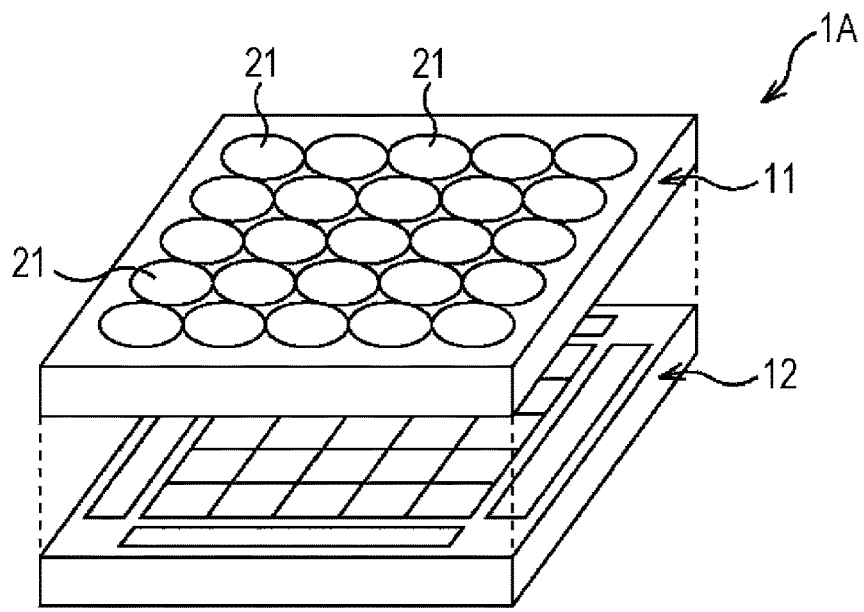
B
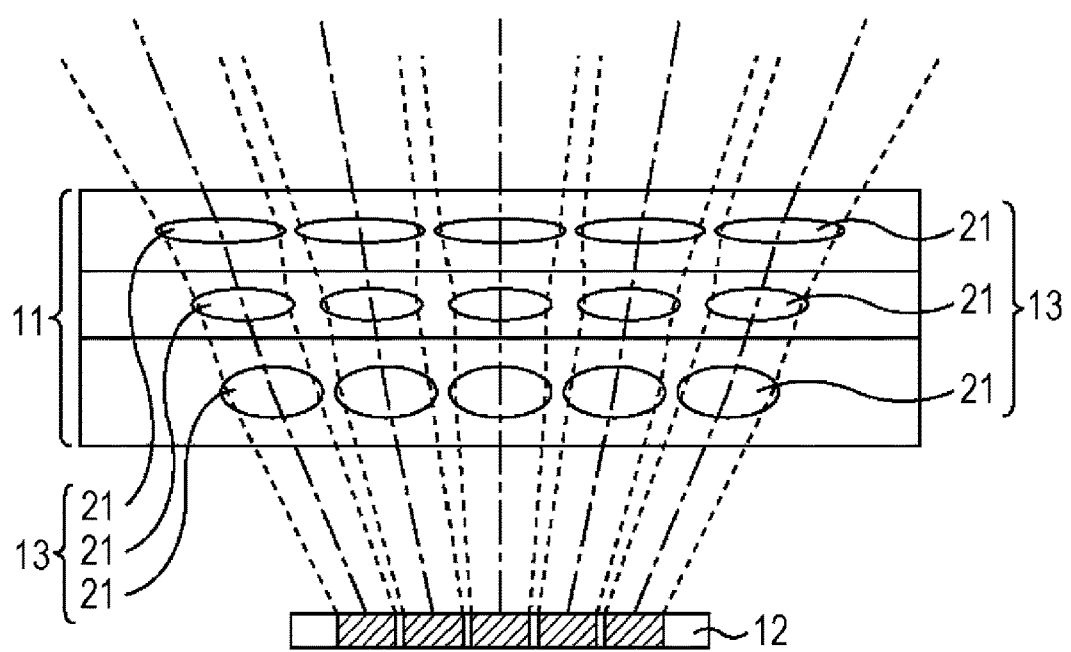

FIG. 20
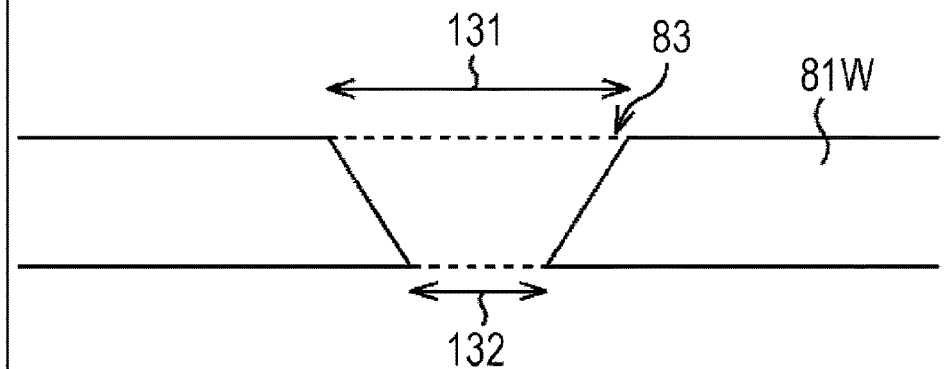
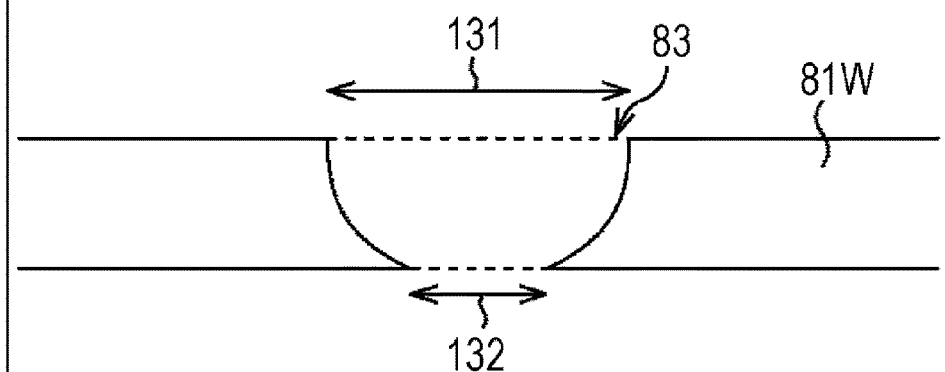
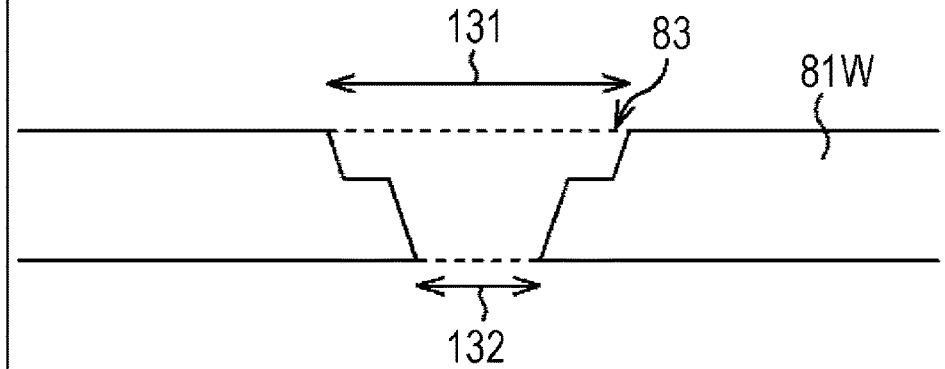

FIG. 31
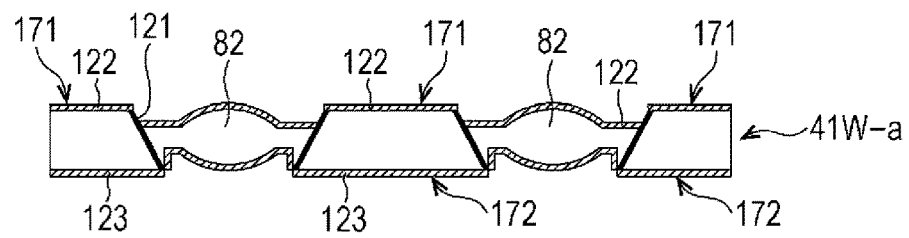
A
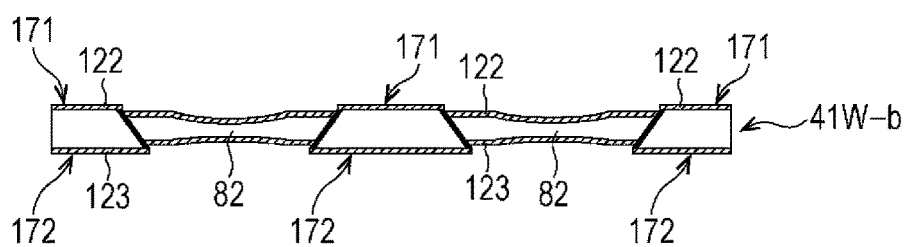
PLASMA ACTIVATION PROCESS
B
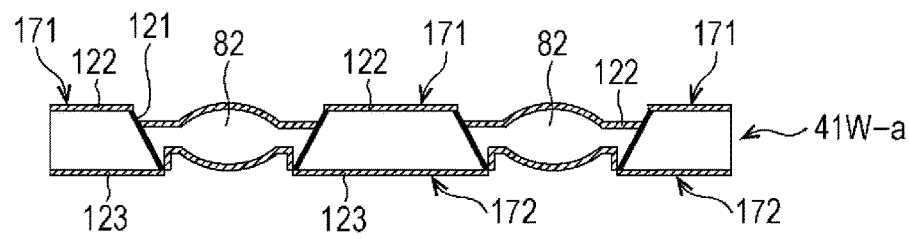
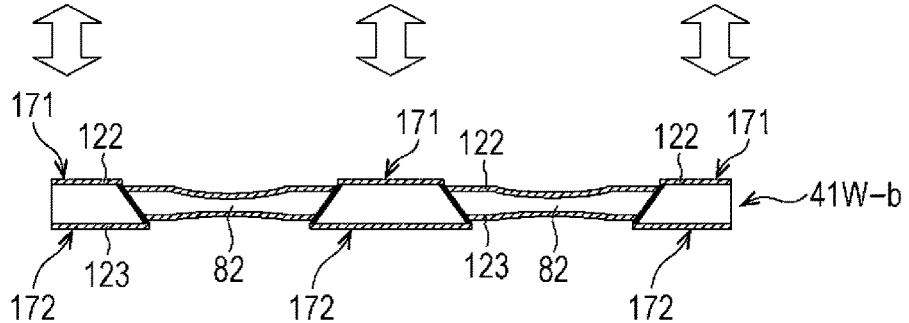

FIG. 40
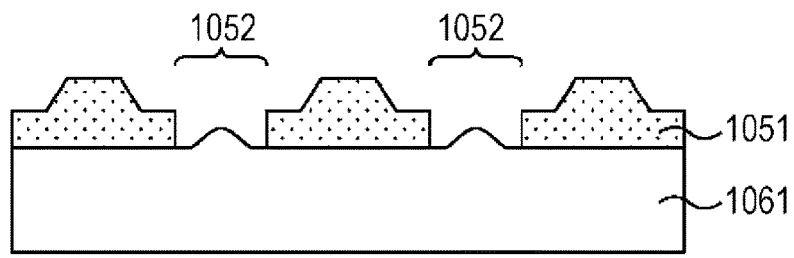
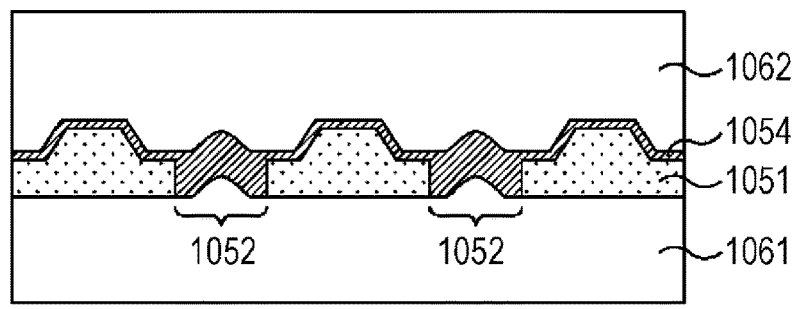
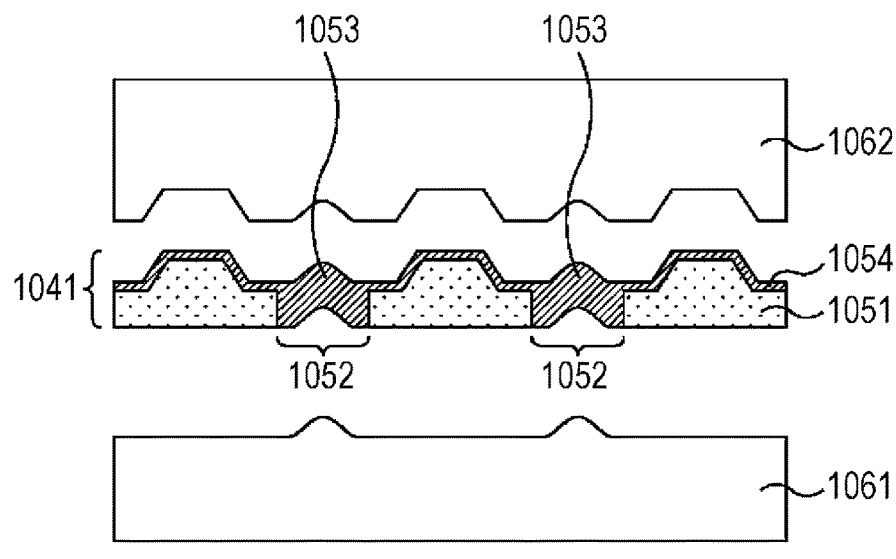

FIG. 42
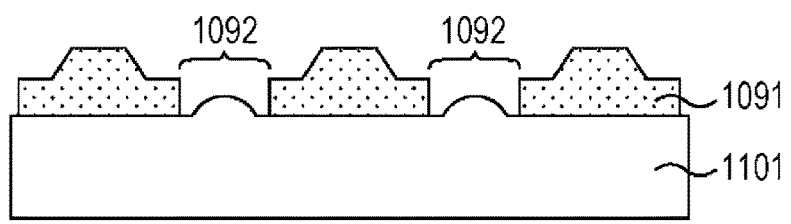
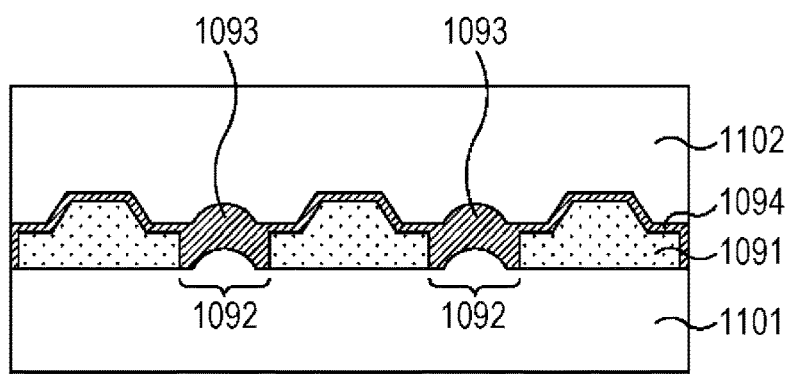
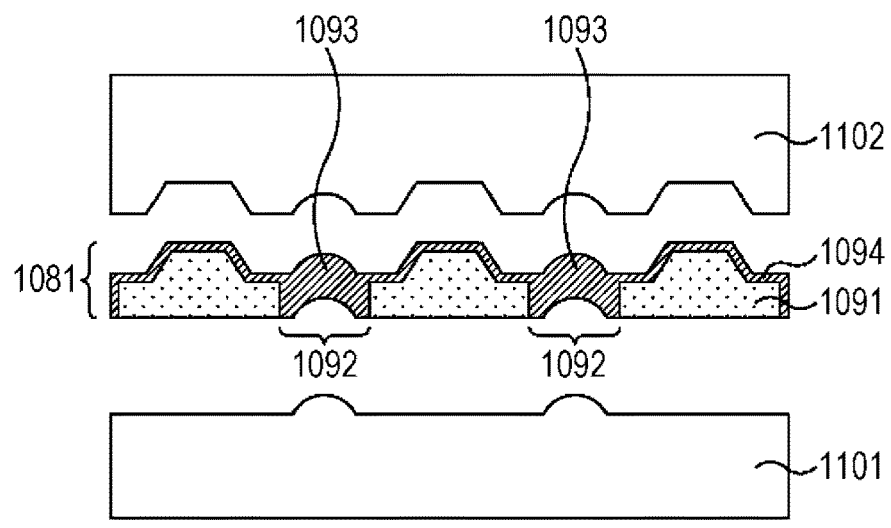

FIG. 46
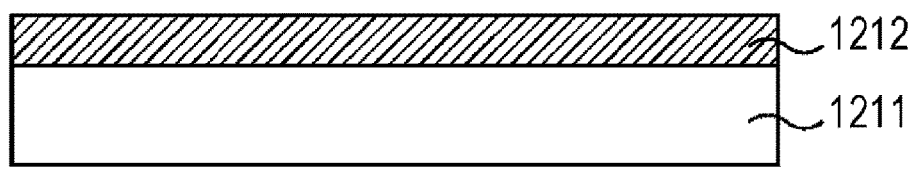
A
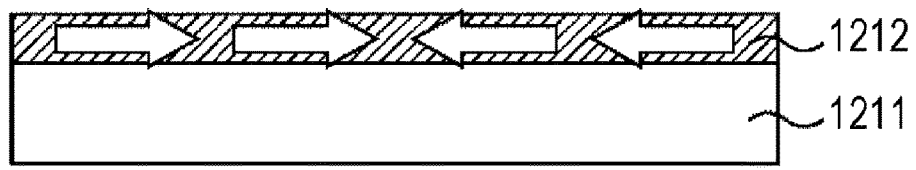
B
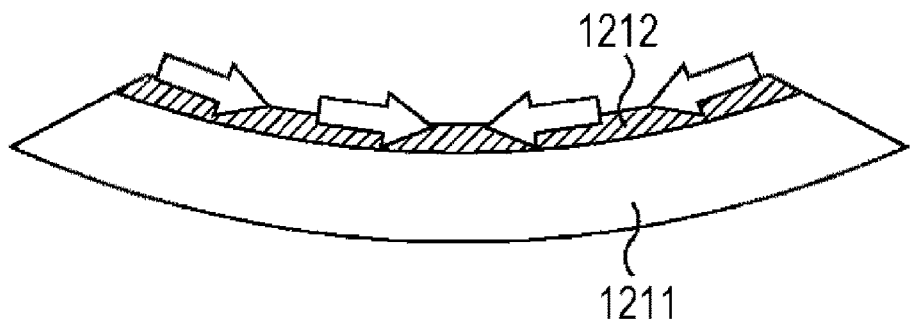
C

FIG. 47
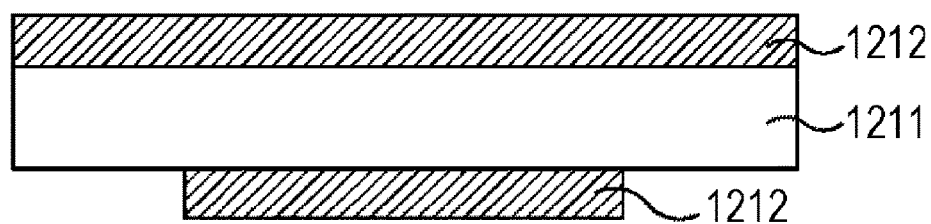
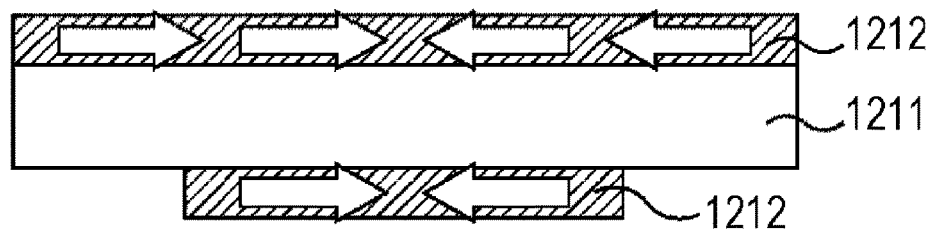
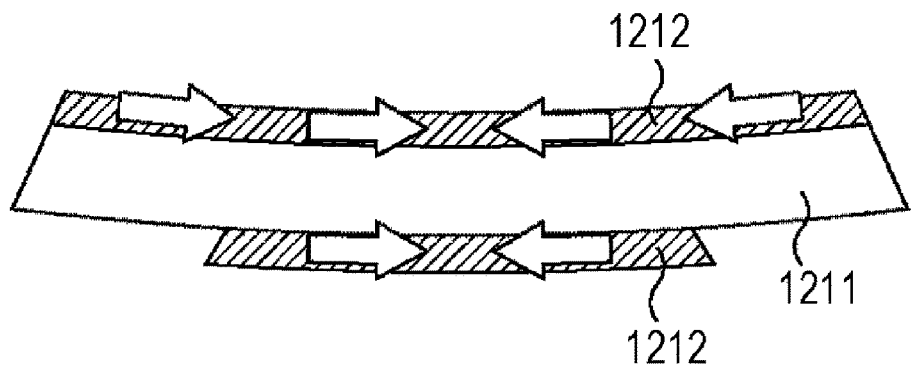

FIG. 48
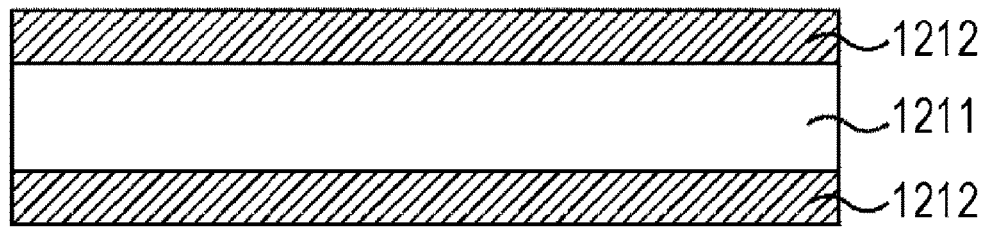
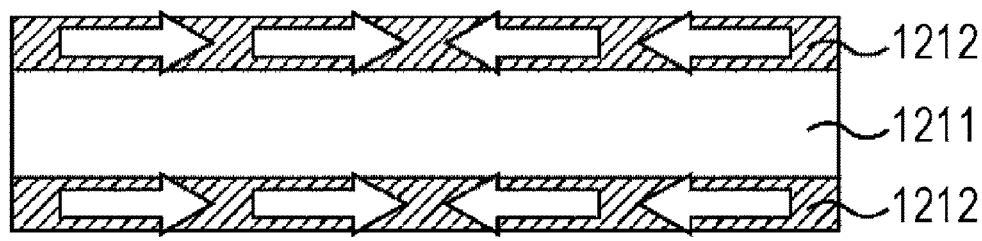
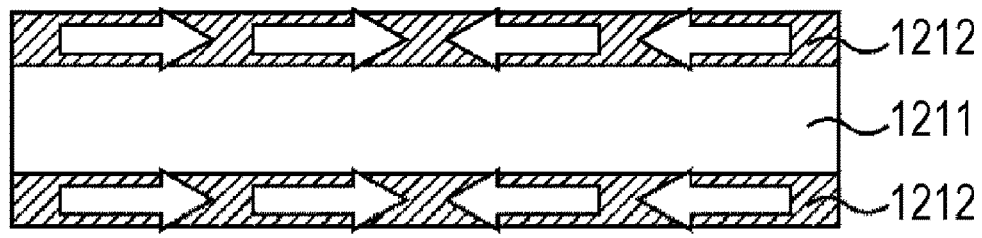

LENS ATTACHED SUBSTRATE, LAYERED LENS STRUCTURE, MANUFACTURING METHOD THEREOF, AND ELECTRONIC DEVICE

This application is a national stage application under 35 U.S.C. 371 and claims the benefit of PCT Application No. PCT/JP2016/003373 having an international filing date of 19 Jul. 2016, which designated the United States, which PCT application claimed the benefit of Japanese Priority Patent Application JP 2015-152923 filed on Jul. 31, 2015, the entire contents of which are incorporated herein by reference.

TECHNICAL FIELD

The present technology relates to a lens attached substrate, a layered lends structure, a manufacturing method thereof, and an electronic device. Particularly, the present technology relates to a lens attached substrate suitably used when a lens is formed in a substrate which may be used to manufacture an electronic device such as a semiconductor device or a flat panel display device and is laminated in the form of a substrate, a layered lends structure, a manufacturing method thereof, and an electronic device.

BACKGROUND ART

In a wafer level lens process in which a plurality of lenses is disposed on a wafer substrate in the planar direction, it is difficult to obtain the shape accuracy and/or the position accuracy when the lenses are formed. Particularly, a high level of accuracy may be needed in a process of laminating the wafer substrates so as to manufacture a layered lens structure. Thus, it may difficult to mass produce three or more layers that are laminated with such a high level of accuracy.

Various technologies have been proposed for wafer level lens production. For example, PTL 1 discloses a method of laminating a wafer substrate by directly using a lens material as an adhesive when the lens material is charged (loaded) into a through-hole formed in a substrate so as to form a lens.

CITATION LIST

Patent Literature

PTL 1: JP 2009-279790 A

SUMMARY OF INVENTION

Technical Problem

Incidentally, in the layered lens structure, a void portion (space) is formed between the lenses of the adjacent layers. There is also a concern that the wafer substrate bonding process is disturbed due to the air resistance inside the void portion. Further, since the air inside the void portion may cause thermal expansion or form dew inside the void portion after the bonding process, there is a concern that the quality of the substrate may be degraded.

The present technology is made in view of such circumstances, and it is desirable to reduce an influence of air inside a void portion between lenses of adjacent layers of a layered lens structure.

Solution to Problem

A lens substrate according to a first aspect of the present technique has a configuration that includes a through-hole with a lens portion formed at an inner side of the through-hole. The lens substrate further includes an air groove formed in a surface of the lens substrate, wherein the air groove is configured to direct air away from the through-hole during a manufacturing process.

A method of manufacturing a lens substrate according to a second aspect of the present technique includes forming a first through-hole in a first substrate, forming a first lens portion at an inner side of the first through-hole, and forming an air groove in a surface of the first substrate. The method further includes forming a second through-hole in a second substrate, forming a second lens portion at an inner side of the second through-hole, and bonding the first and second substrates together, wherein the air groove is configured to direct air accumulated between the first lens portion of the first through-hole and the second lens portion of the second through-hole away from the first and second through-holes when the first and second substrates are bonded together.

An electronic apparatus according to a third aspect of the present technique includes a camera module including a stacked lens structure. The stacked lens structure generally includes a plurality of stacked lens substrates, wherein two or more lens substrates of the plurality of stacked lens substrates include a through-hole formed in each of the two or more lens substrates, each through-hole including a lens portion formed at an inner side therein, and an air groove formed in a surface of each of the two or more lens substrates, wherein the air groove is configured to direct air away from the through-hole during a manufacturing process. The camera module further includes an optical sensor formed on a sensor substrate, wherein the sensor substrate and the stacked lens structure are stacked.

Advantageous Effects of Invention

According to the first or second aspect of the present technology, it is possible to reduce an influence of air inside a void portion between adjacent lenses of a layered lens structure.

The present disclosure is not limited to the advantage described herein and any advantage described in the present disclosure may be used.

BRIEF DESCRIPTION OF DRAWINGS

FIGS. 1A-B are diagrams illustrating a first embodiment of a camera module that uses a layered lens structure according to an embodiment of the present technology.

FIGS. 20A-C are diagrams illustrating the lens attached substrate manufacturing method.

FIGS. 31A-B are diagrams illustrating a state where substrate-like lens attached substrates are bonded to each other.

FIG. 40A-C are diagrams illustrating a lens array substrate manufacturing method of FIG. 39.

FIG. 42A-C are diagrams illustrating a method of manufacturing the lens array substrate of FIG. 41.

FIGS. 46A-C are diagrams illustrating the action of resin formed as a lens.

FIG. 47A-C are diagrams illustrating the action of resin formed as a lens.

FIGS. 48A-C are schematic diagrams illustrating a lens array substrate as Comparative Structure Example 6.

DESCRIPTION OF EMBODIMENTS

Figure 2:
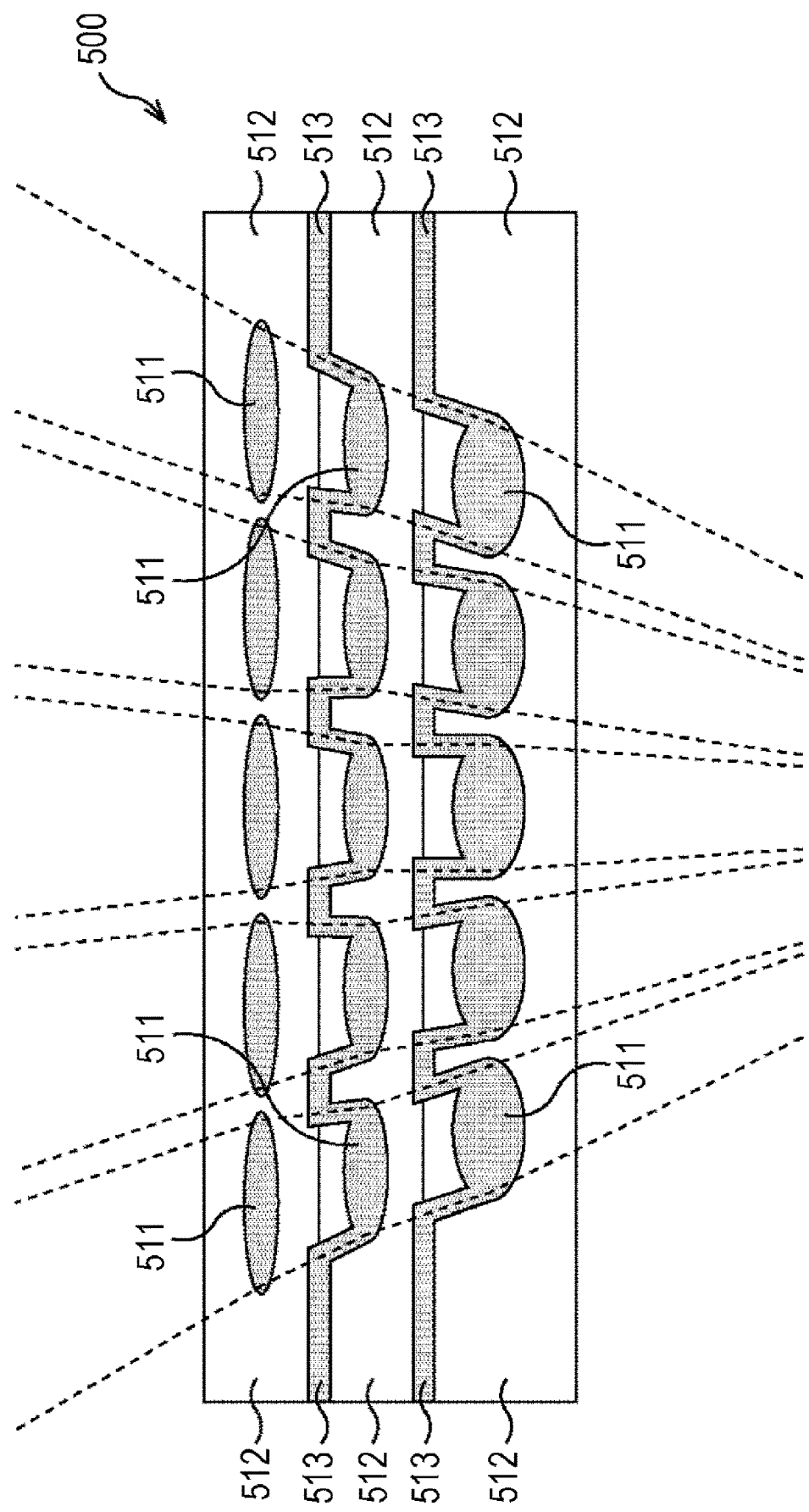
FIG. 2 is a cross-sectional structure diagram of a layered lens structure disclosed in PTL 1.

Hereinafter, modes for carrying out the present technology (hereinafter, referred to as embodiments) will be described. Further, a description will be made according to the following sequence.

1. First Embodiment of Camera Module
2. Second Embodiment of Camera Module
3. Third Embodiment of Camera Module
4. Fourth Embodiment of Camera Module
5. Fifth Embodiment of Camera Module
6. Detailed Configuration of Camera Module of Fourth Embodiment
7. Sixth Embodiment of Camera Module
8. Seventh Embodiment of Camera Module
9. Detailed Configuration of Lens Attached Substrate
10. Lens Attached Substrate Manufacturing Method
11. Bonding of Lens Attached Substrates
12. Eighth and Ninth Embodiments of Camera Module
13. Tenth Embodiment of Camera Module
14. Eleventh Embodiment of Camera Module
15. Effect of Present Structure compared with Other Structure
16. Various Modified Examples
17. Application Example to Electronic Device
18. Usage Example of Image Sensor 1. First Embodiment of Camera Module FIGS. 1A and 1B are diagrams illustrating a first embodiment of a camera module that uses a layered lens structure according to an embodiment of the present technology.

FIG. 1A is a schematic diagram illustrating the configuration of a camera module 1A as a first embodiment of a camera module 1. FIG. 1B is a schematic cross-sectional view of the camera module 1A.

The camera module 1A includes a layered lens structure 11 and a light receiving element 12. The layered lens structure 11 includes twenty five optical units 13 in total in which five optical units are provided in each of the lengthwise (column) and widthwise (row) directions. The optical unit 13 includes a plurality of lenses 21 in one optical axis direction. The camera module 1A, for example, is a compound-eye camera module with the optical units 13.

As illustrated in FIG. 1B, the optical axes of the plurality of optical units 13 of the camera module 1A are disposed so as to be widened toward the outside of the module and hence an image can be captured in a wide angle.

In FIG. 1B, the layered lens structure 11 is obtained by laminating three layers of the lenses 21. Although three layers are shown for purposes of simplifying the drawings, it is contemplated that more or less layers of lenses 21 may be laminated.

The camera module 1A of FIGS. 1A and 1B is able to produce one wide-angle image by matching a plurality of images captured by the plurality of optical units 13. Since the plurality of images match, high accuracy is demanded in the formation and the arrangement of the optical units 13 capturing the images. Further, since the wideangle-side optical unit 13 has a small light incident angle toward the lens 21, high accuracy is demanded even in the positional relation and the arrangement of the lenses 21 in the optical unit 13.

FIG. 2 is a cross-sectional structure diagram of a layered lens structure that uses a fixing technology using resin of PTL 1.

In a layered lens structure 500 illustrated in FIG. 2, resin 513 is used to fix substrates 512 each including lenses 511. The resin 513 is energy curable resin such as UV curable resin.

Before the substrates 512 are bonded to each other, a layer of the resin 513 is formed on the entire surface of each substrate 512. Subsequently, the substrates 512 are bonded to each other and the resin 513 is cured therebetween. Accordingly, the substrates 512 bonded to each other are fixed.

However, the resin 513 contracts when the resin 513 is cured. In the case of the structure illustrated in FIG. 2, since the resin 513 is cured after the layer of the resin 513 is formed on the entire surface of each substrate 512, the displacement amount of the resin 513 increases.

Further, even when the layered lens structure 500 formed by bonding the substrates 512 to each other is divided and imaging elements are combined with each other so as to form a camera module, the layered lens structure 500 provided in the camera module has a configuration in which the resin 513 exists entirely between the substrates 512 including the lenses 511 as illustrated in FIG. 2. For this reason, when the camera module is mounted in a camera casing and is used for an intended purpose, there is a concern that the resin between the substrates of the layered lens structure 500 may be thermally expanded in accordance with an increase in temperature due to the heating of the apparatus.

Figure 3:
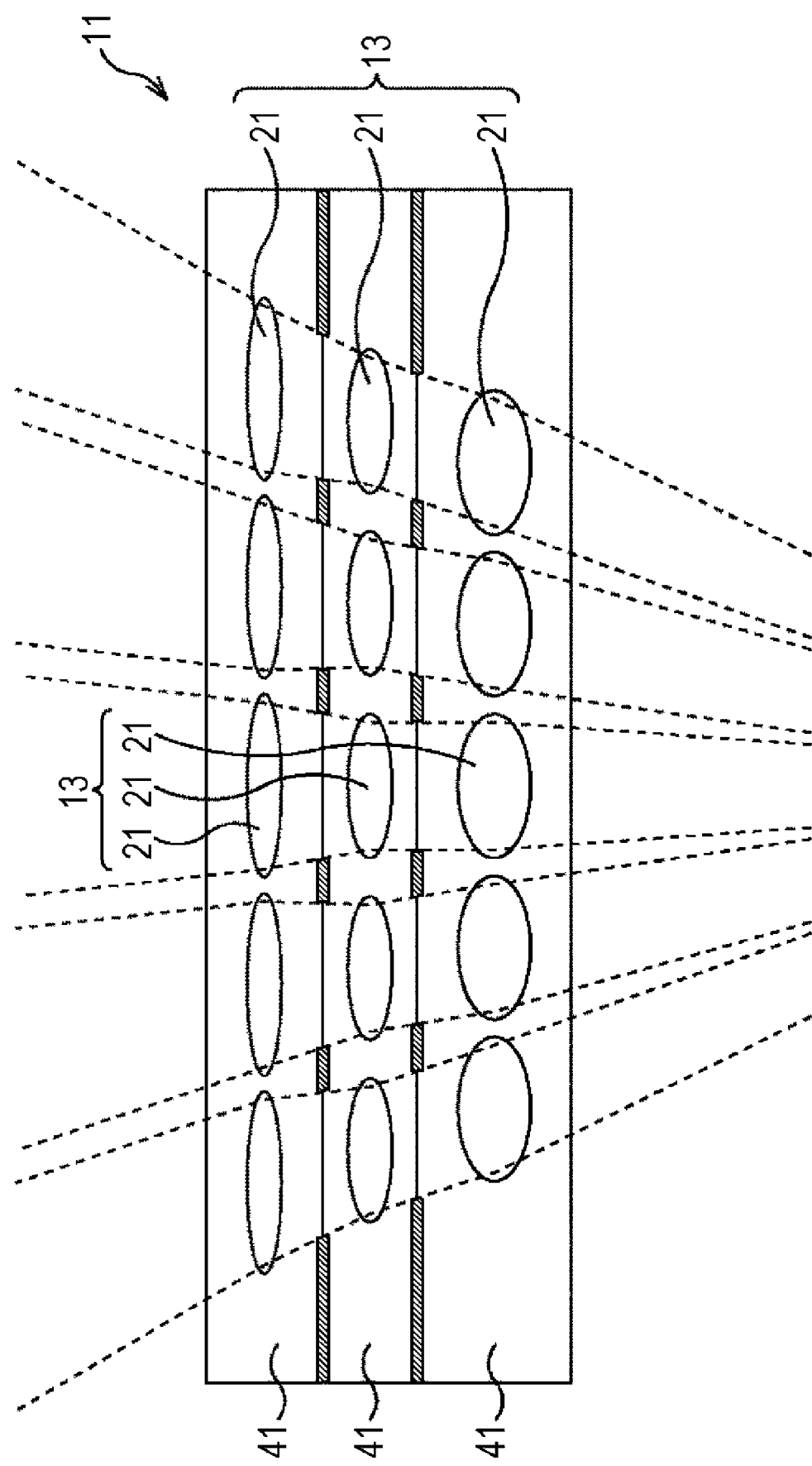
FIG. 3 is a cross-sectional structure diagram of the layered lens structure of the camera module of FIG. 1.

FIG. 3 is a cross-sectional structure diagram only illustrating the layered lens structure 11 of the camera module 1A of FIGS. 1A and 1B.

The layered lens structure 11 of the camera module 1A is also formed by laminating the lens attached substrates 41 each including the lenses 21.

In the layered lens structure 11 of the camera module 1A, the lens attached substrates 41 each including the lenses 21 are fixed to each other in a manner completely different from the layered lens structure 500 of FIG. 2 or the other related art.

Figure 4:
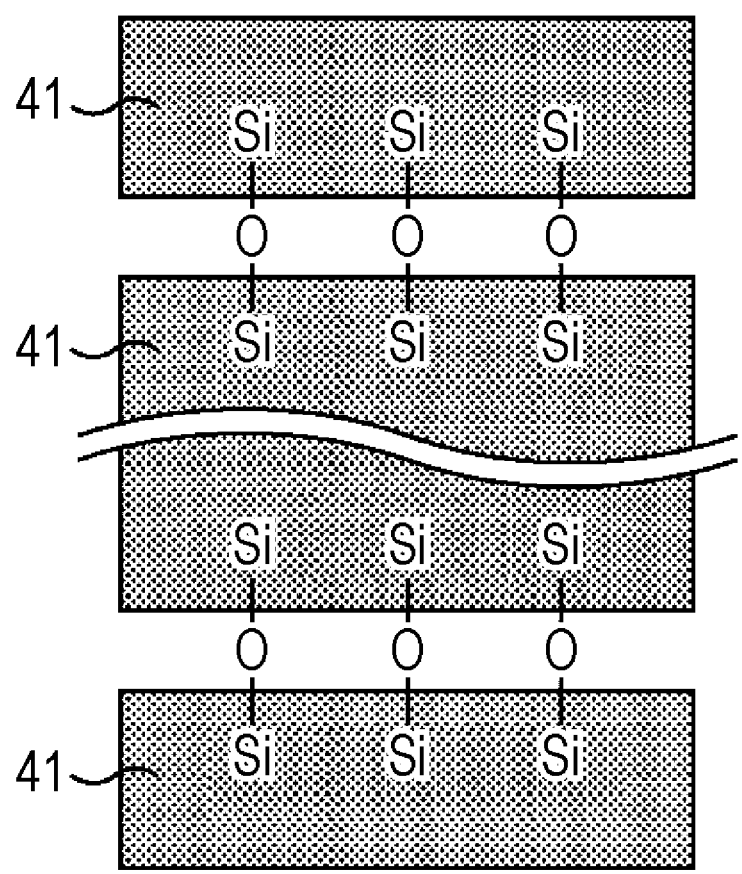
FIG. 4 is a diagram illustrating a state where lens attached substrates are directly bonded to each other.

That is, two lens attached substrates 41 to be laminated are directly bonded to each other by covalent binding between a surface layer of oxides or nitrides formed on one substrate surface and a surface layer of oxides or nitrides formed on the other substrate surface. As a detailed example, as illustrated in FIG. 4, a silicon oxide film or a silicon nitride film as a surface layer is formed on each surface of two lens attached substrates 41 to be laminated, a hydroxyl group is bound thereto, and hence two lens attached substrates 41 are bonded to each other. Then, a dehydration condensation occurs with an increase in temperature. As a result, silicon-oxygen covalent binding is formed between the surface layers of two lens attached substrates 41. Accordingly, two lens attached substrates 41 are directly bonded to each other. As a result of the condensation, the elements contained in two surface layers may directly cause covalent binding.

In the specification, the direct bonding method indicates a method of fixing two lens attached substrates 41 to each other through an inorganic layer disposed between two lens attached substrates 41, a method of fixing two lens attached substrates 41 to each other by the chemical bonding of inorganic layers respectively disposed on the surfaces of two lens attached substrates 41, a method of fixing two lens attached substrates 41 to each other by forming bonding by a dehydration condensation between inorganic layers respectively disposed on the surfaces of two lens attached substrates 41, a method of fixing two lens attached substrates 41 to each other by forming covalent binding through oxygen or covalent binding of elements contained in inorganic layers between inorganic layers respectively disposed on the surfaces of two lens attached substrates 41, or a method of fixing two lens attached substrates 41 to each other by forming silicon-oxygen covalent binding or silicon-silicon covalent binding between silicon oxide layers or silicon nitride layers respectively disposed on the surfaces of two lens attached substrates 41.

To perform the bonding and dehydration condensation in accordance with an increase in temperature, in an embodiment, a substrate used to manufacture a semiconductor device or a flat display device is used, a lens is formed in the form of a substrate, a dehydration condensation occurs in accordance with an increase in temperature due to the bonding in the form of the substrate, and hence bonding is performed according to covalent binding in the form of the substrate. A structure in which the inorganic layers formed on the surfaces of two lens attached substrates 41 are bonded to each other by covalent binding has an effect and/or an advantage of suppressing the deformation caused by the curing contraction of the resin 513 across the entire substrate or the deformation caused by the thermal expansion of the resin 513 during actual use, which is a concern when the technology described in FIG. 2 and disclosed in PTL 1 is used.

Figure 5:
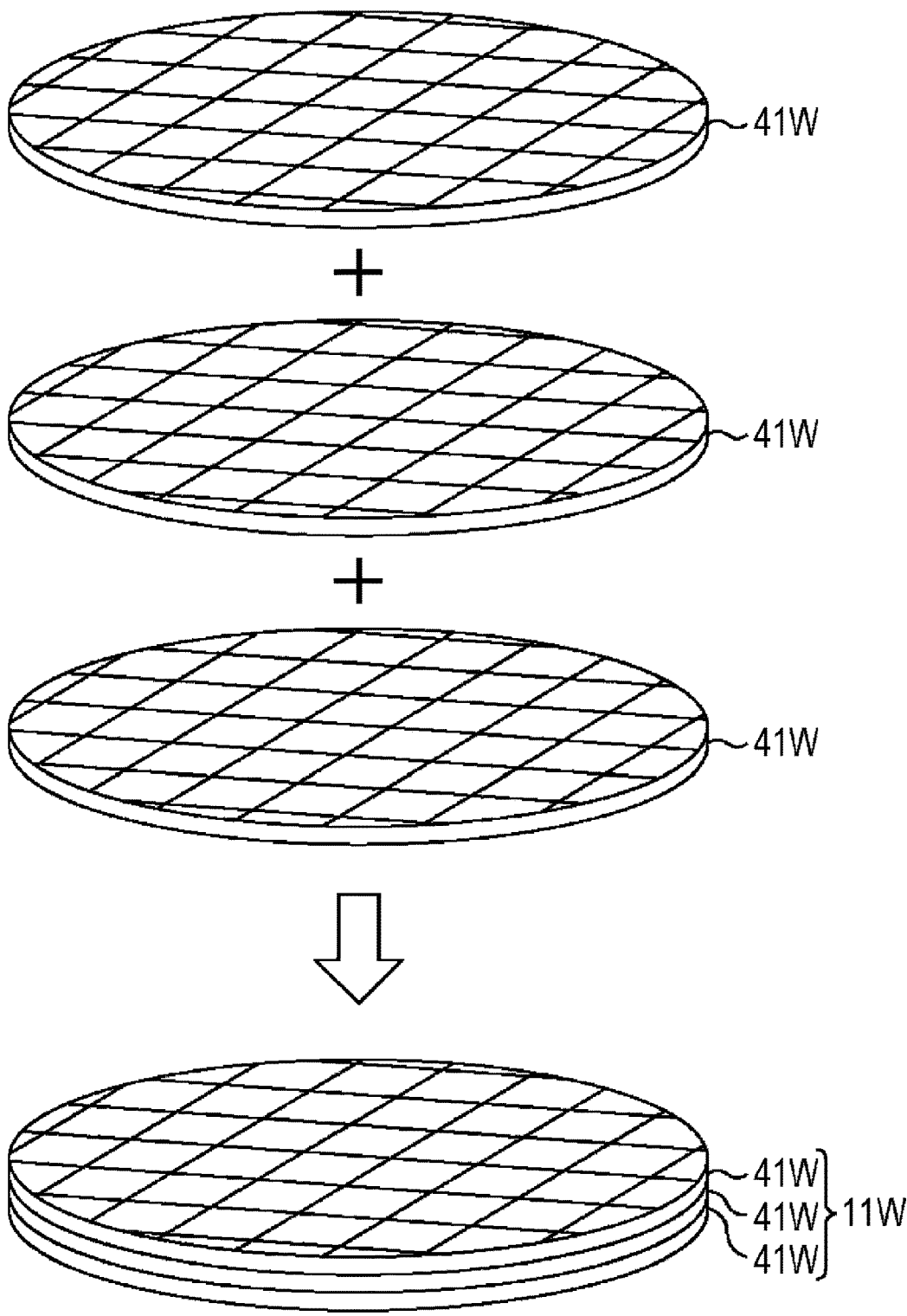
FIG. 5 is a diagram illustrating a step of forming the camera module of FIG. 1.
Figure 6:
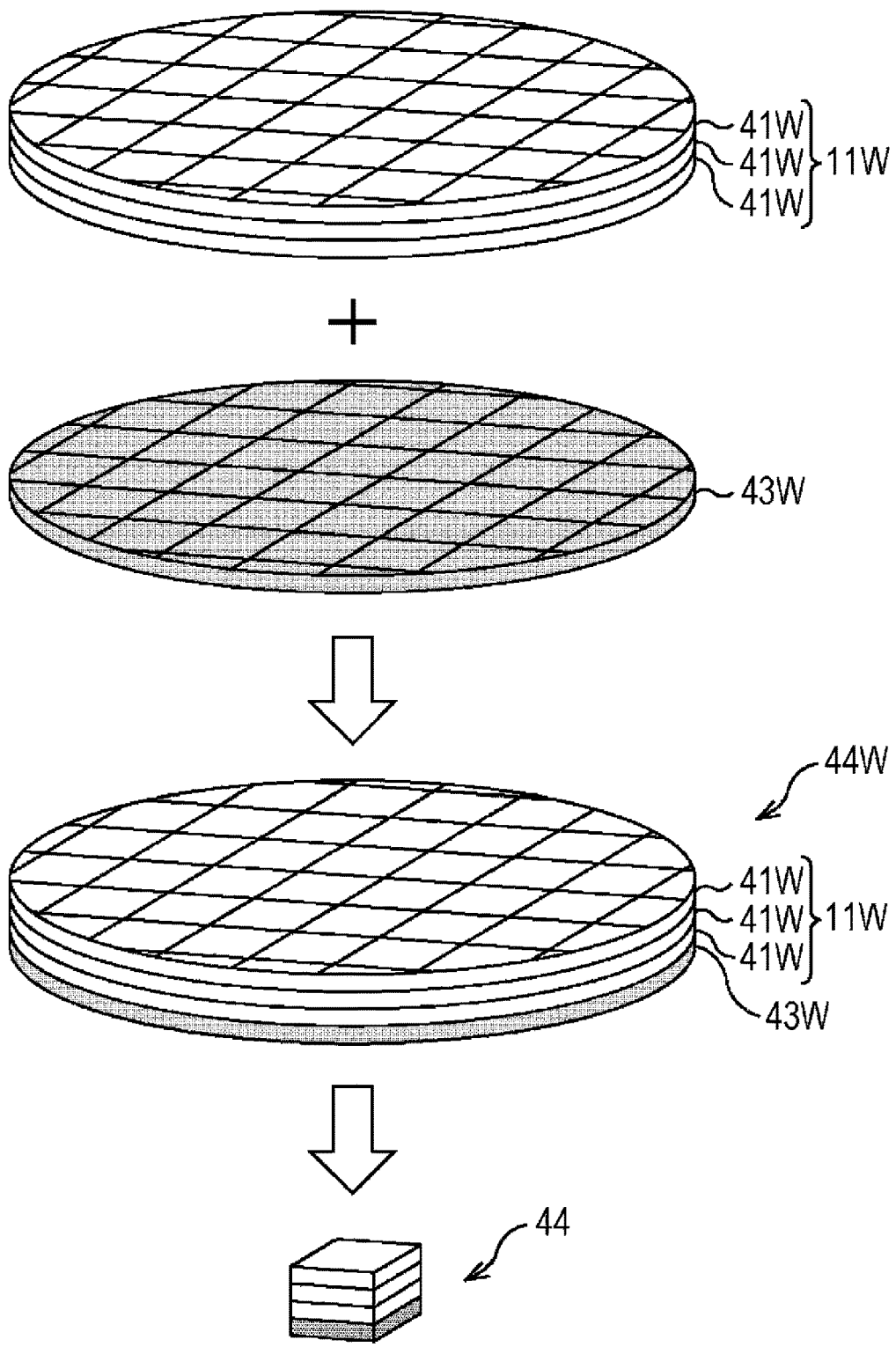
FIG. 6 is a diagram illustrating a state of forming the camera module of FIG. 1.

FIGS. 5 and 6 are diagrams illustrating a step of forming the camera module 1A of FIGS. 1A and 1B obtained by the combination of the layered lens structure 11 and the light receiving element 12.

First, as illustrated in FIG. 5, a plurality of lens attached substrates 41W having the lenses 21 (not illustrated) formed in the planar direction is prepared and laminated. Accordingly, it is possible to obtain a substrate-like layered lens structure 11W in which the substrate-like lens attached substrates 41W are laminated.

Next, as illustrated in FIG. 6, a substrate-like sensor substrate 43W having the light receiving elements 12 formed in the planar direction is prepared while being manufactured separately from the substrate-like layered lens structure 11W illustrated in FIG. 5.

Then, a substrate-like camera module 44W is obtained in a manner such that an external terminal is brought into contact with each module of a substrate obtained by laminating and bonding the substrate-like sensor substrate 43W and the substrate-like layered lens structure 11W to each other.

Finally, the substrate-like camera module 44W is divided into the unit of a module or a chip. The divided camera module 44 is enclosed in a separately prepared casing (not illustrated), thereby obtaining the final camera module 44.

In addition, in the specification and the drawings, for example, a component denoted by the reference numeral with "W" as in the lens attached substrate 41W indicates a state where the lens attached substrate is prepared in the form of a substrate (a wafer) and a component denoted by the reference numeral without "W" as in the lens attached substrate 41 indicates a state where the lens attached substrate is divided into the unit of a module or a chip. In addition, the same applies to the sensor substrate 43W, the camera module 44W, and the like.

Figure 7:
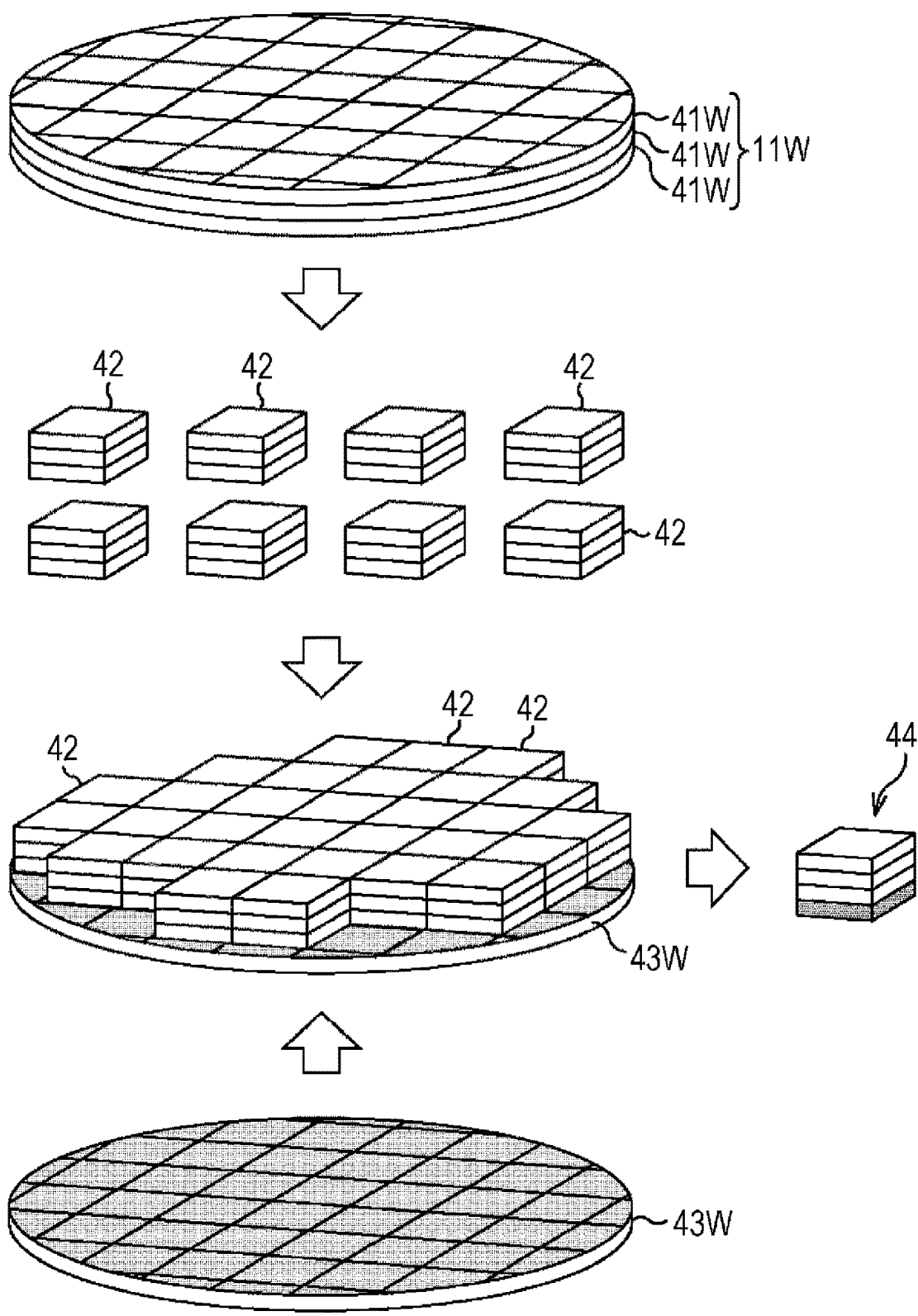
FIG. 7 is a diagram illustrating a different step of forming the camera module of FIG. 1.

FIG. 7 is a diagram illustrating a different step of forming the camera module 1A of FIGS. 1A and 1B obtained by the combination of the layered lens structure 11 and the light receiving element 12.

First, the substrate-like layered lens structure 11W obtained by laminating the substrate-like lens attached substrates 41W is manufactured similarly to the above-described steps.

Next, the substrate-like layered lens structure 11W is divided.

Further, the substrate-like sensor substrate 43W is prepared while being manufactured separately from the substrate-like layered lens structure 11W.

Then, one divided layered lens structure 11 is mounted on each light receiving element 12 of the substrate-like sensor substrate 43W.

Finally, the substrate-like sensor substrate 43W having the divided layered lens structures 11 mounted thereon is divided into the unit of a module or a chip. The divided sensor substrate 43 having the layered lens structure 11 mounted thereon is enclosed in a separately prepared casing (not illustrated) and is brought into contact with an external terminal, thereby obtaining the final camera module 44.

In addition, as an example of a different step of forming the camera module 1A of FIGS. 1A and 1B obtained by combining the layered lens structure 11 and the light receiving element 12, the divided camera module 44 can be obtained in a manner such that the substrate-like sensor substrate 43W illustrated in FIG. 7 is divided and each of the divided layered lens structures 11 is mounted on each light receiving element 12 obtained as a result of the division.

FIGS. 8A to 8H are diagrams illustrating the configuration of the lens attached substrate 41 of the camera module 1A.

Figure 8:
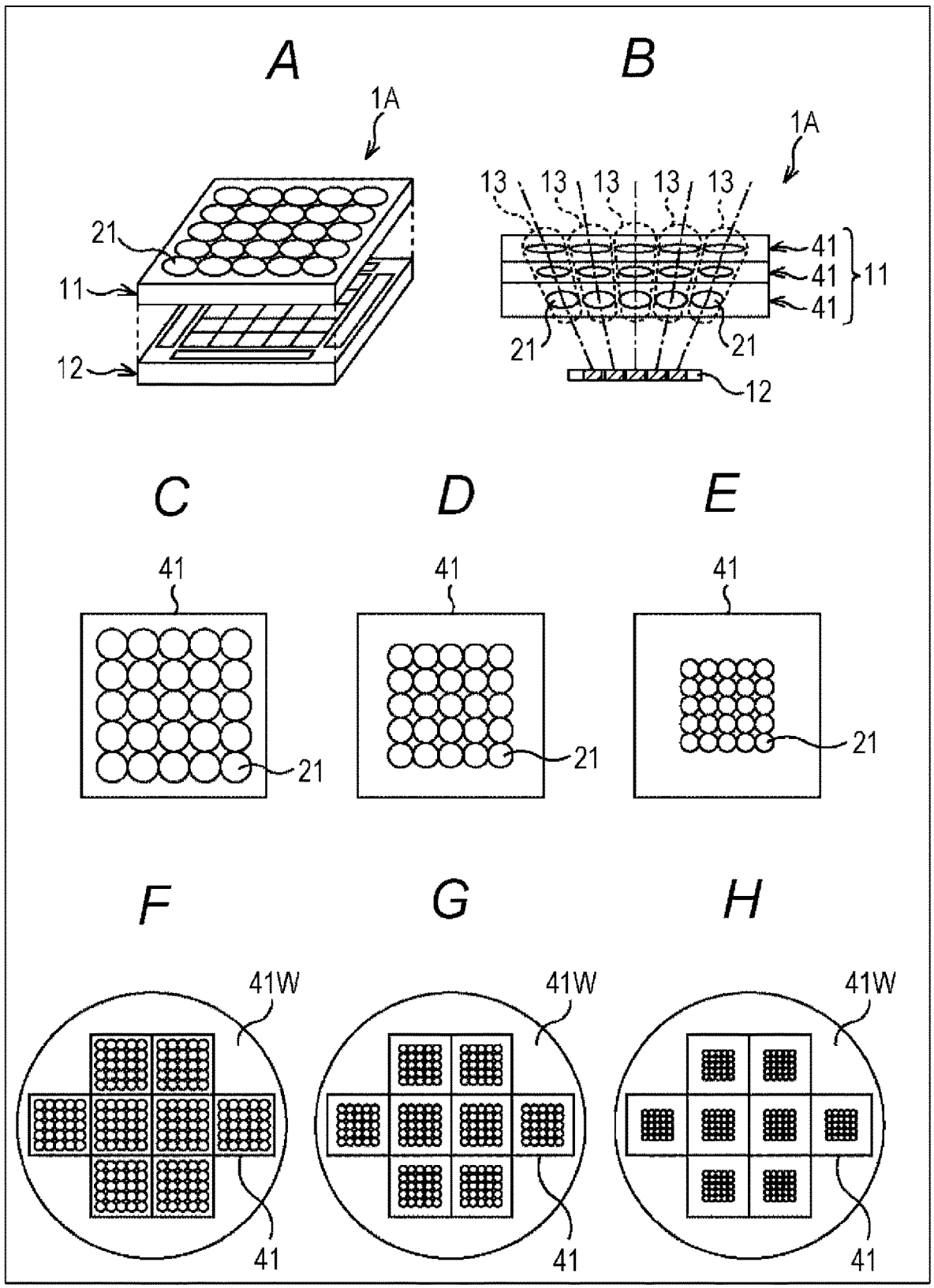
FIGS. 8A-H are diagrams illustrating the configuration of the lens attached substrate.

FIG. 8A is a schematic diagram illustrating the configuration of the camera module 1A similar to that of FIG. 1A.

FIG. 8B is a schematic cross-sectional view of the camera module 1A similar to that of FIG. 1B.

As illustrated in FIG. 8B, the camera module 1A is a compound-eye camera module for example which includes the plurality of optical units 13 each having one optical axis and formed by the combination of the plurality of lenses 21. The layered lens structure 11 includes twenty five optical units 13 in total so that five optical units are disposed in each of the lengthwise (column) and widthwise (row) directions.

In the camera module 1A, the optical axes of the plurality of optical units 13 are disposed so as to be widened toward the outside of the module. Accordingly, an image can be captured in a wide angle. In FIG. 8B, the layered lens structure 11 has a structure in which the lens attached substrate 41 is laminated as three layers. Although three layers are shown for purposes of simplifying the drawings, it is contemplated that more or less layers may be included.

FIGS. 8C to 8E are diagrams illustrating the planar shapes of three layers of the lens attached substrates 41 constituting the layered lens structure 11.

FIG. 8C is a top view of the uppermost lens attached substrate 41 among three layers, FIG. 8D is a top view of the lens attached substrate 41 of the middle layer, and FIG. 8E is a top view of the lowermost lens attached substrate 41. Since the camera module 1 is the wide-angle compound-eye camera module, the diameter of the lens 21 increases and the pitch between the lenses increases as it goes toward the upper layer.

FIGS. 8F to 8H are top views of the substrate-like lens attached substrates 41W used to obtain the lens attached substrates 41 illustrated in FIGS. 8C to 8E.

The lens attached substrate 41W illustrated in FIG. 8F indicates a substrate state corresponding to the lens attached substrate 41 of FIG. 8C, the lens attached substrate 41W illustrated in FIG. 8G indicates a substrate state corresponding to the lens attached substrate 41 of FIG. 8D, and the lens attached substrate 41W illustrated in FIG. 8H indicates a substrate state corresponding to the lens attached substrate 41 of FIG. 8E.

The substrate-like lens attached substrates 41W illustrated in FIGS. 8F to 8H have a configuration in which eight camera modules 1A illustrated in FIG. 8A are obtained in each substrate.

In the lens attached substrates 41W of FIGS. 8F to 8H, the pitch between the lenses inside the lens attached substrate 41 as the unit of the module is different in the upper lens attached substrate 41W and the lower lens attached substrate 41W. Meanwhile, in the lens attached substrates 41W, the arrangement pitch of the lens attached substrate 41 as the unit of the module is uniform from the upper lens attached substrate 41W to the lower lens attached substrate 41W.

2. Second Embodiment of Camera Module

FIGS. 9A to 9H are diagrams illustrating a second embodiment of a camera module that uses a layered lens structure according to an embodiment of the present technology.

FIG. 9A is a schematic diagram illustrating the appearance of a camera module 1B as the second embodiment of the camera module 1. FIG. 9B is a schematic cross-sectional view of the camera module 1B.

The camera module 1B includes two optical units 13. Two optical units 13 have a configuration in which a diaphragm plate 51 is provided at the uppermost layer of the layered lens structure 11. The diaphragm plate 51 is provided with an opening portion 52.

The camera module 1B includes two optical units 13, but the optical parameters of two optical units 13 are different from each other. That is, the camera module 1B includes two kinds of optical units 13 having different optical performances. Two kinds of optical units 13 can include, for example, the optical unit 13 which has a short focal distance for capturing an image in a near distance and the optical unit 13 which has a long focal distance for capturing an image in a far distance.

In the camera module 1B, since the optical parameters of two optical units 13 are different from each other, for example, the number of the lenses 21 of two optical units 13 is different as illustrated in FIG. 9B. Further, the diameter, the thickness, the surface shape, the volume, or the distance between the adjacent lenses may be different in the lenses 21 at the same layers of the layered lens structures 11 of two optical units 13. For this reason, as for the planar shape of the lens 21 of the camera module 1B, for example, as illustrated in FIG. 9C, two optical units 13 may have the same diameter of the lens 21. As illustrated in FIG. 9D, the lenses 21 may have different shapes. As illustrated in FIG. 9E, a void 21X may be formed so that the lens 21 is not provided at one side.

FIGS. 9F to 9H are top views of the substrate-like lens attached substrates 41W used to obtain the lens attached substrates 41 illustrated in FIGS. 9C to 9E.

The lens attached substrate 41W illustrated in FIG. 9F indicates a substrate state corresponding to the lens attached substrate 41 of FIG. 9C, the lens attached substrate 41W illustrated in FIG. 9G indicates a substrate state corresponding to the lens attached substrate 41 of FIG. 9D, and the lens attached substrate 41W illustrated in FIG. 9H indicates a substrate state corresponding to the lens attached substrate 41 of FIG. 9E.

The substrate-like lens attached substrates 41W illustrated in FIGS. 9F to 9H have a configuration in which sixteen camera modules 1B illustrated in FIG. 9A are obtained in each substrate.

As illustrated in FIGS. 9F to 9H, a lens having the same shape may be formed on the entire surface of the substrate-like lens attached substrate 41W, a lens having a different shape may be formed thereon, or a lens may be formed or may not be formed thereon in order to form the camera module 1B.

3. Third Embodiment of Camera Module

FIGS. 10A to 10F are diagrams illustrating a third embodiment of a camera module that uses a layered lens structure according to an embodiment of the present technology.

Figure 10:
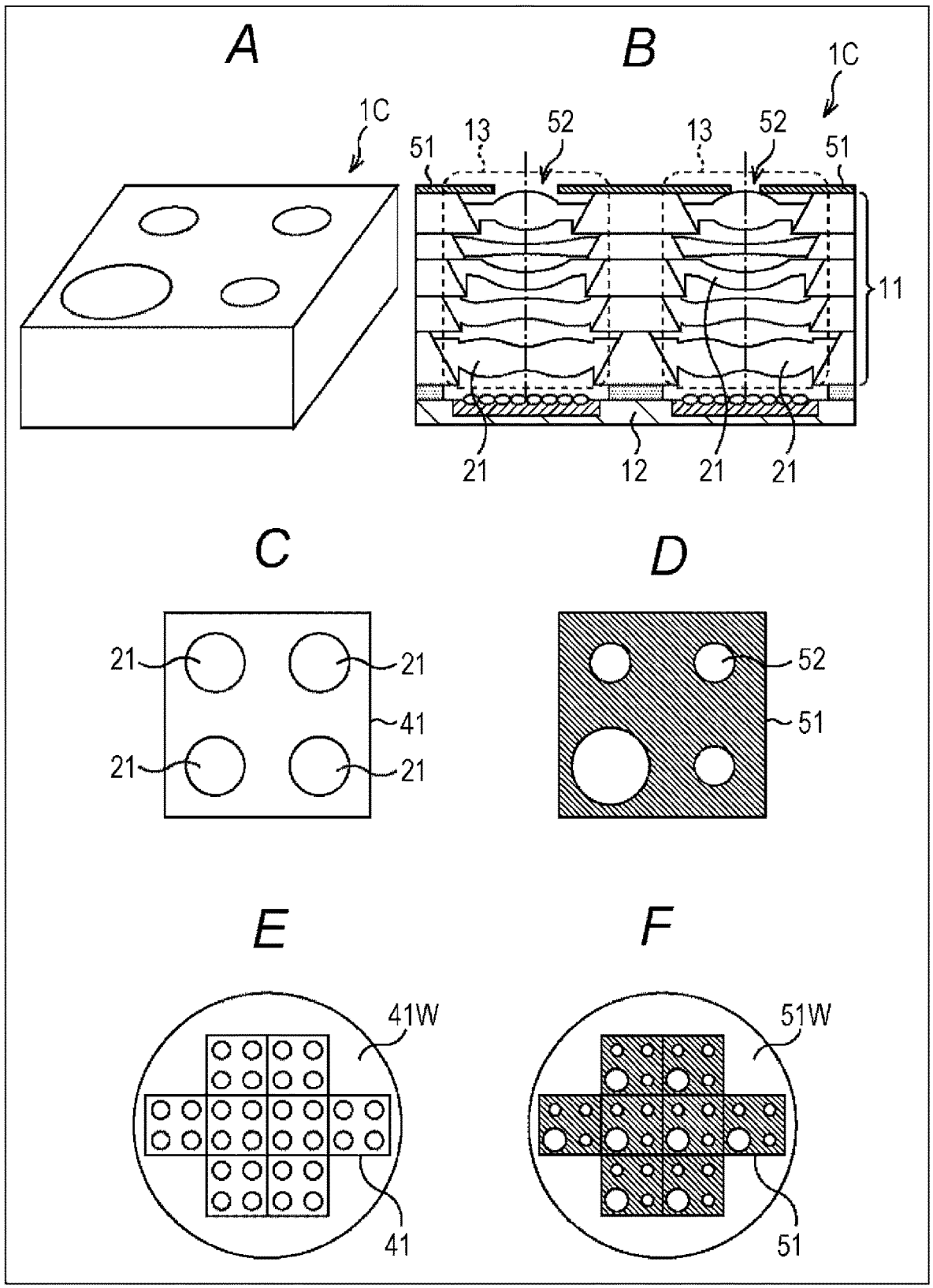
FIGS. 10A-F are diagrams illustrating a third embodiment of a camera module that uses a layered lens structure according to an embodiment of the present technology.

FIG. 10A is a schematic diagram illustrating the appearance of a camera module 1C as the third embodiment of the camera module 1. FIG. 10B is a schematic cross-sectional view of the camera module 1C.

The camera module 1C includes four optical units 13 in total in which two optical units are provided in each of the lengthwise (column) and widthwise (row) directions of the light incident surface. Four optical units 13 are formed so that the lens 21 has the same shape.

Four optical units 13 are formed so that the diaphragm plate 51 is provided at the uppermost layer of the layered lens structure 11, but the size of the opening portion 52 of the diaphragm plate 51 is different in four optical units 13. Accordingly, the camera module 1C can realize, for example, the camera module 1C as below. That is, for example, an anti-crime monitoring camera can increase an aperture stop only in a pixel for capturing a monochrome image in the nighttime having low illumination in the camera module 1C that uses the light receiving element 12 including a light receiving pixel used to monitor a color image in the daytime and receiving three kinds of RGB light by the use of three kinds of RGB color filters and including a light receiving pixel used to monitor a monochrome image in the nighttime without using the RGB color filters. For this reason, for example, the lens 21 of each camera module 1C has a planar shape in which the diameters of the lenses 21 of four optical units 13 are equal to one another as illustrated in FIG. 10C. Further, the size of the opening portion 52 of the diaphragm plate 51 is different in accordance with the optical unit 13 as illustrated in FIG. 10D.

FIG. 10E is a top view of the substrate-like lens attached substrate 41W used to obtain the lens attached substrate 41 illustrated in FIG. 10C. FIG. 10F is a top view illustrating a diaphragm plate 51W provided in the form of a substrate in order to obtain the diaphragm plate 51 illustrated in FIG. 10D.

The substrate-like lens attached substrate 41W of FIG. 10E and the substrate-like diaphragm plate 51W of FIG. 10F have a configuration in which eight camera modules 1C illustrated in FIG. 10A are obtained in each substrate.

As illustrated in FIG. 10F, in the diaphragm plate 51W provided in the form of a substrate, the opening portion 52 having a different size can be set in each optical unit 13 of the camera module 1C in order to form the camera module 1C.

4. Fourth Embodiment of Camera Module

FIGS. 11A to 11D re diagrams illustrating a fourth embodiment of a camera module that uses a layered lens structure according to an embodiment of the present technology.

Figure 11:
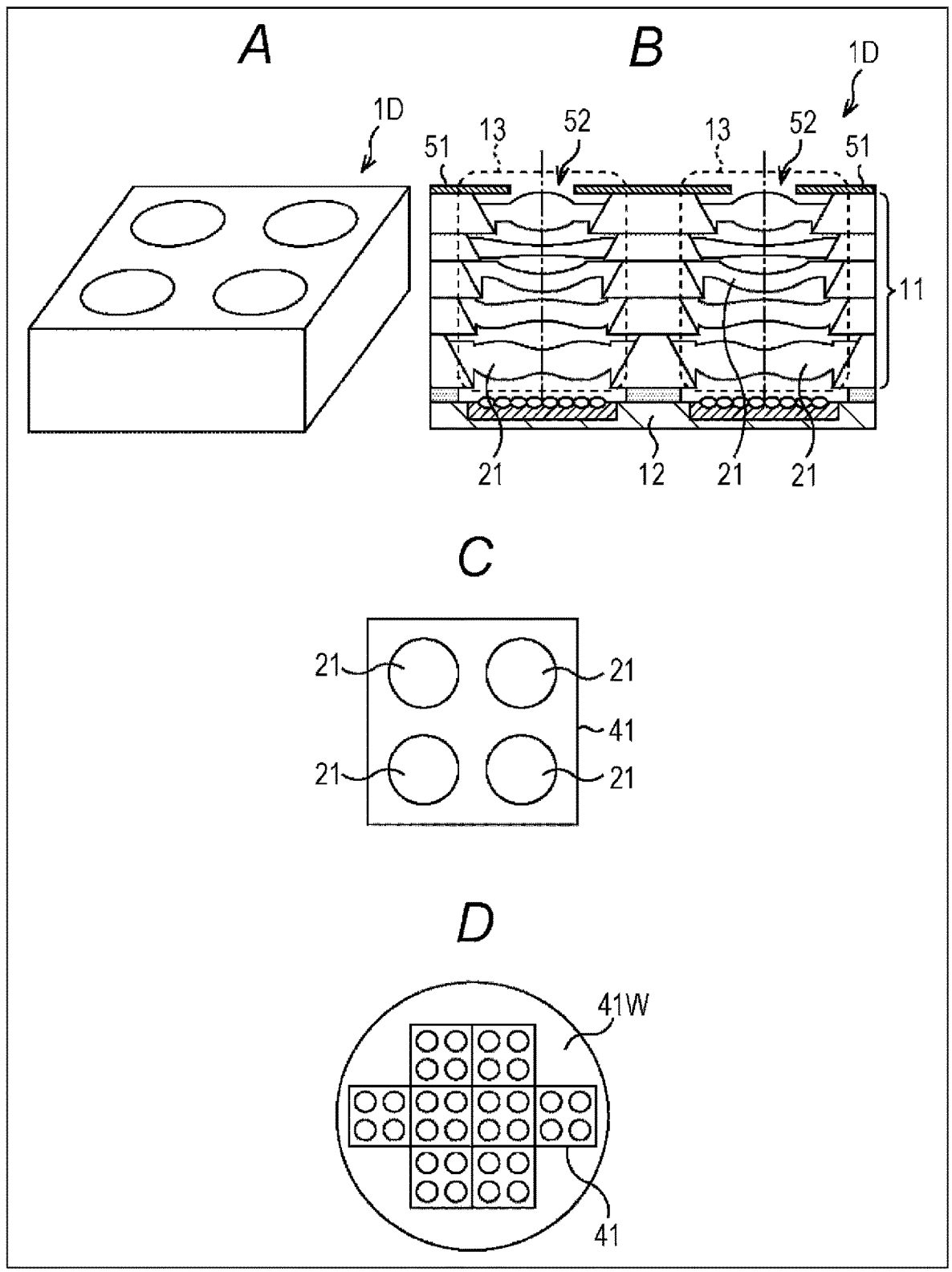
FIGS. 11A-D are diagrams illustrating a fourth embodiment of a camera module that uses a layered lens structure according to an embodiment of the present technology.

FIG. 11A is a schematic diagram illustrating the appearance of a camera module 1D as the fourth embodiment of the camera module 1. FIG. 11B is a schematic cross-sectional view of the camera module 1D.

The camera module 1D includes four optical units 13 in total in which two optical units are provided in the lengthwise (column) and widthwise (row) directions of the light incident surface similarly to the camera module 1C. Four optical units 13 are formed so as to have the same shape of the lens 21 and the same size of the opening portion 52 of the diaphragm plate 51.

In the camera module 1D, the optical axes of two optical units 13 provided in each of the lengthwise (column) and widthwise (row) directions on the light incident surface extend in the same direction. The one-dotted chain line illustrated in FIG. 11B indicates each of the optical axes of the optical units 13. Since the camera module 1D with such a configuration uses a super-resolution technology, the camera module 1D is suitably used to capture a high-resolution image compared with the case where an image is captured by one optical unit 13.

In the camera module 1D, since an image is captured by the plurality of light receiving elements 12 disposed at different positions while the optical axes of each of the lengthwise (column) and widthwise (row) directions are aligned in the same direction or an image is captured by the light receiving pixel in a different area within one light receiving element 12, it is possible to obtain a plurality of images which may be different from one another while the optical axes are aligned in the same direction. Thus, it is possible to obtain a high-resolution image by combining the image data according to places of the plurality of different images. For this reason, it is desirable to form the planar shape of the lens 21 of one camera module 1D so that four optical units 13 are similar to one another as illustrated in FIG. 11C.

FIG. 11D is a top view of the substrate-like lens attached substrate 41W used to obtain the lens attached substrate 41 illustrated in FIG. 11C. The substrate-like lens attached substrate 41W has a configuration in which eight camera modules 1D illustrated in FIG. 11A are obtained in each substrate.

As illustrated in FIG. 11D, in the substrate-like lens attached substrate 41W, the camera module 1D includes the plurality of lenses 21 in order to form the camera module 1D and a plurality of lens groups for one module is disposed on the substrate at the same pitch.

5. Fifth Embodiment of Camera Module

FIGS. 12A to 12D are diagrams illustrating a fifth embodiment of a camera module that uses a layered lens structure according to an embodiment of the present technology.

Figure 12:
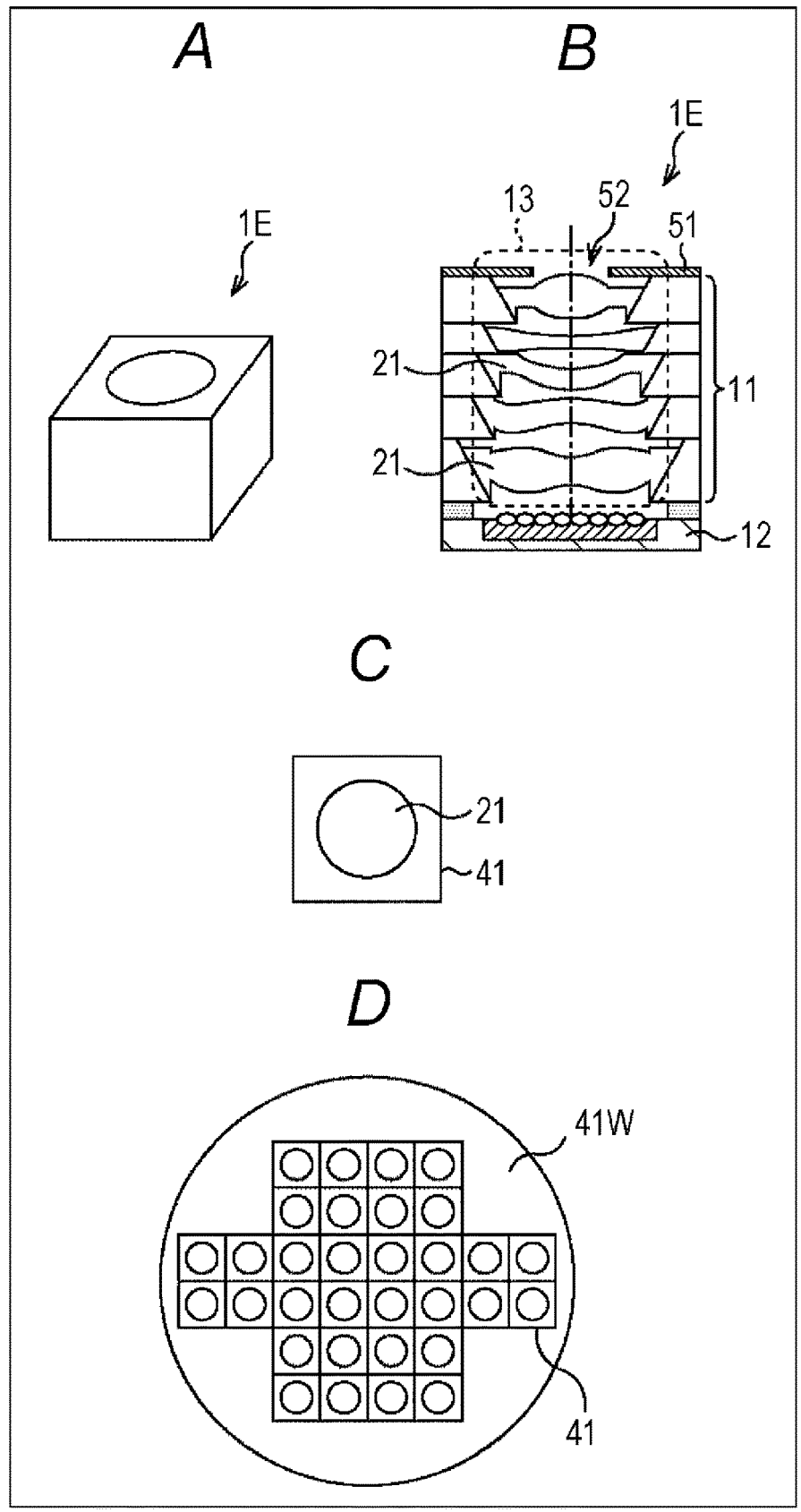
FIG. 12A-D are diagrams illustrating a fifth embodiment of a camera module that uses a layered lens structure according to an embodiment of the present technology.

FIG. 12A is a schematic diagram illustrating the appearance of a camera module 1E as the fifth embodiment of the camera module 1. FIG. 12B is a schematic cross-sectional view of the camera module 1E.

The camera module 1E is a single-eye camera module for example in which the optical unit 13 having one optical axis is provided in the camera module 1E.

FIG. 12C is a top view of the lens attached substrate 41 showing the planar shape of the lens 21 of the camera module 1E. The camera module 1E includes one optical unit 13.

FIG. 12D is a top view of the substrate-like lens attached substrate 41W used to obtain the lens attached substrate 41 illustrated in FIG. 12C. The substrate-like lens attached substrate 41W has a configuration in which thirty two camera modules 1E illustrated in FIG. 12A are obtained in each substrate.

As illustrated in FIG. 12D, in the substrate-like lens attached substrate 41W, the plurality of lenses 21 for the camera module 1E is disposed on the substrate at the same pitch.

6. Detailed Configuration of Camera Module of Fourth Embodiment

Next, the detailed configuration of the camera module 1D according to the fourth embodiment illustrated in FIGS. 11A to 11D will be described with reference to FIG. 13.

Figure 13:
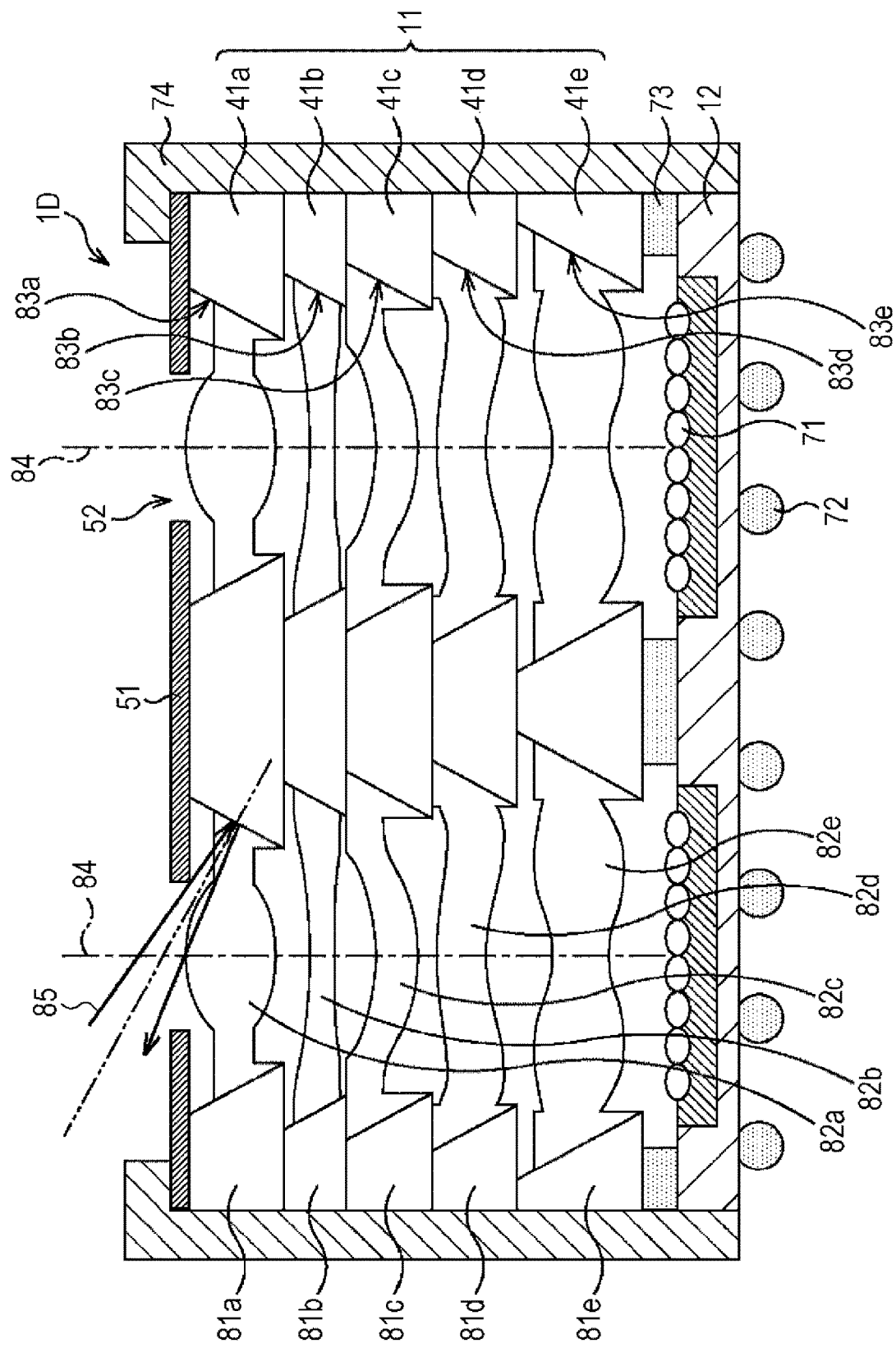
FIG. 13 is a diagram illustrating the detailed configuration of the camera module according to the fourth embodiment.

FIG. 13 is a cross-sectional view of the camera module 1D illustrated in FIG. 11B.

The camera module 1D includes the layered lens structure 11 obtained by laminating the plurality of lens attached substrates 41a to 41e and the light receiving element 12. The layered lens structure 11 includes the plurality of optical units 13. A one-dotted chain line 84 indicates the optical axis of each of the optical units 13. The light receiving element 12 is disposed at the lower side of the layered lens structure 11. In the camera module 1D, light which is incident to the camera module 1D from the upside is transmitted through the layered lens structure 11 and is received by the light receiving element 12 disposed at the lower side of the layered lens structure 11.

The layered lens structure 11 includes five lens attached substrates 41a to 41e provided in a lamination state. If there is no need to particularly distinguish five lens attached substrates 41a to 41e, these lens attached substrates will be simply described as the lens attached substrate 41.

Each through-hole 83 of the lens attached substrates 41 constituting the layered lens structure 11 is formed in a so-called downward narrowed shape in which an opening width decreases as it goes downward (toward the light receiving element 12).

The diaphragm plate 51 is disposed on the layered lens structure 11. The diaphragm plate 51 includes, for example, a layer formed of a material having a light absorbing property or a light shielding property. The diaphragm plate 51 is provided with the opening portion 52.

The light receiving element 12 is configured as, for example, a front surface irradiation type or a rear surface irradiation type complementary metal oxide semiconductor (CMOS) image sensor. An on-chip lens 71 is formed on the upper surface of the light receiving element 12 near the layered lens structure 11 and an external terminal 72 used to input and output a signal is formed on the lower surface of the light receiving element 12.

The layered lens structure 11, the light receiving element 12, the diaphragm plate 51, and the like are received in a lens barrel 74.

A structure material 73 is disposed on the light receiving element 12. The layered lens structure 11 and the light receiving element 12 are fixed to each other through the structure material 73. The structure material 73 is formed of, for example, an epoxy resin.

In the embodiment, the layered lens structure 11 includes five lens attached substrates 41a to 41e provided in a lamination (or layered) state, but the number of the laminated lens attached substrates 41 is not particularly limited as long as two or more lens attached substrates are laminated.

Each of the lens attached substrates 41 constituting the layered lens structure 11 has a configuration in which a lens resin portion 82 is added to a carrier substrate 81. The carrier substrate 81 includes the through-hole 83 and the lens resin portion 82 is formed inside the through-hole 83. The lens resin portion 82 indicates a portion integrated by the material forming the lens 21 together with a portion which includes the lens 21 and extends to the carrier substrate 81 so as to carry the lens 21.

In addition, when there is a need to distinguish the carrier substrate 81, the lens resin portion 82, or the through-hole 83 of each of the lens attached substrates 41a to 41e, a description will be made on the assumption that carrier substrates 81a to 81e, lens resin portions 82a to 82e, and through-holes 83a to 83e respectively correspond to the lens attached substrates 41a to 41e as illustrated in FIG. 13.

<Detailed Description of Lens Resin Portion>

Next, the shape of the lens resin portion 82 will be described by exemplifying the lens resin portion 82a of the lens attached substrate 41a.

Figure 14:
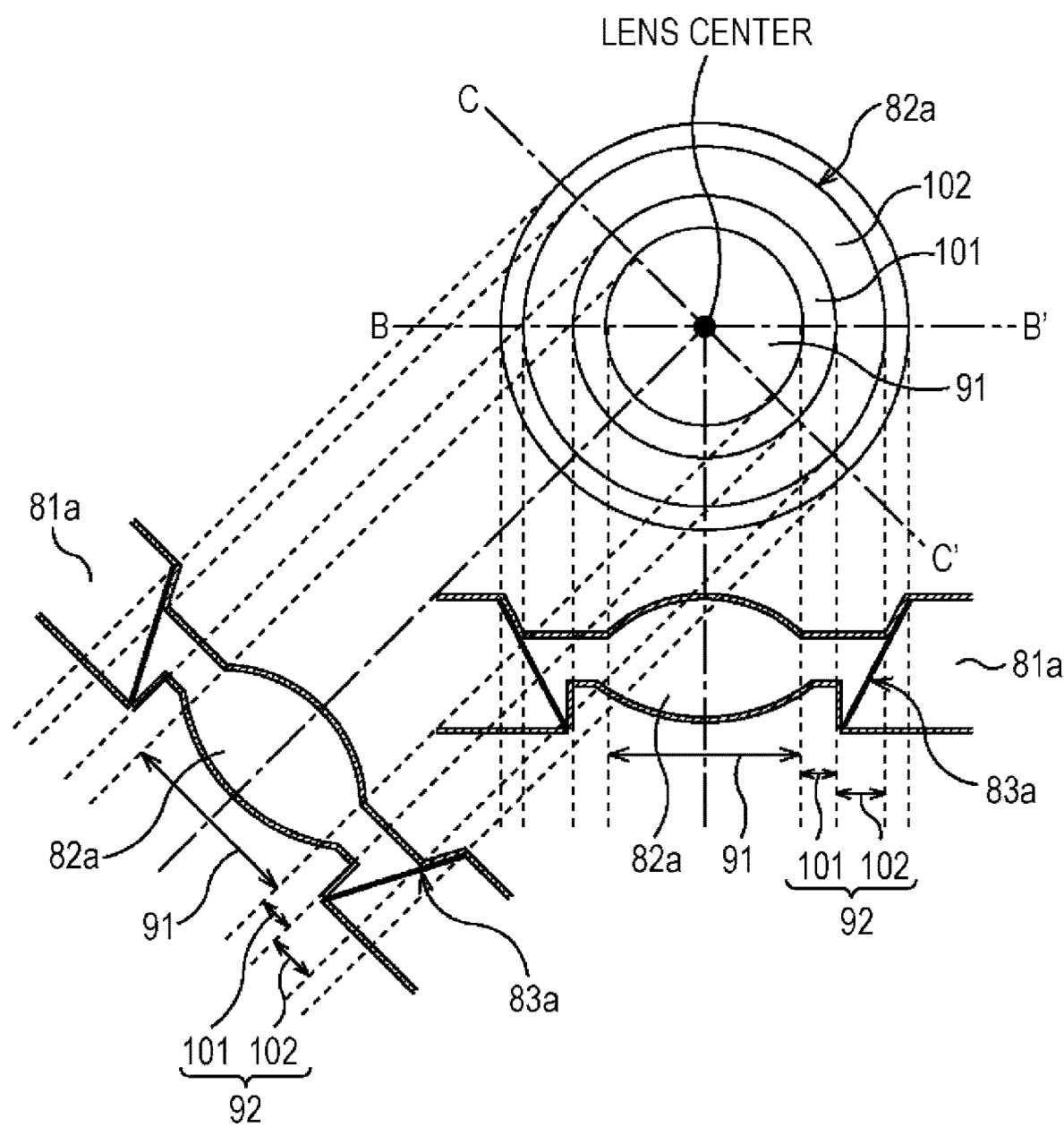
FIG. 14 illustrates a top view and cross-sectional views of a carrier substrate and a lens resin portion.

FIG. 14 illustrates a top view and cross-sectional views of the carrier substrate 81a and the lens resin portion 82a constituting the lens attached substrate 41a.

The cross-sectional views of the carrier substrate 81a and the lens resin portion 82a illustrated in FIG. 14 correspond to the cross-sectional views taken along the lines B-B' and C-C' of the top view.

The lens resin portion 82a is a portion which is integrated by the material forming the lens 21 and includes a lens portion 91 and a carrying portion 92. In the description above, the lens 21 corresponds to the entire lens portion 91 or the entire lens resin portion 82a.

The lens portion 91 is a portion which serves as a lens. In other words, the lens portion is a "portion which collects or scatters light by deflecting light", a "portion including a non-spherical curved surface such as a convex surface or a concave surface", or a "portion in which a plurality of polygonal shapes used as lenses in terms of Fresnel screen or diffraction grating is sequentially disposed".

The carrying portion 92 is a portion which extends from the lens portion 91 to the carrier substrate 81a so as to carry the lens portion 91. The carrying portion 92 includes an arm portion 101 and a leg portion 102 and is located at the outer periphery of the lens portion 91.

The arm portion 101 is a portion which is disposed at the outside of the lens portion 91 so as to contact the lens portion 91 and extends outward with a uniform film thickness from the lens portion 91. The leg portion 102 is a portion not included in the arm portion 101 in the carrying portion 92 and includes a portion contacting the side wall of the through-hole 83a. It is desirable that the film thickness of the resin of the leg portion 102 be thicker than that of the arm portion 101.

The through-hole 83a of the carrier substrate 81a has a circular planar shape and the cross-sectional shape thereof is naturally the same regardless of the diametrical direction. Even in the shape of the lens resin portion 82a as the shape determined by the shapes of the upper die and the lower die during the lens forming process, the cross-sectional shape is the same regardless of the diametrical direction.

Figure 15:
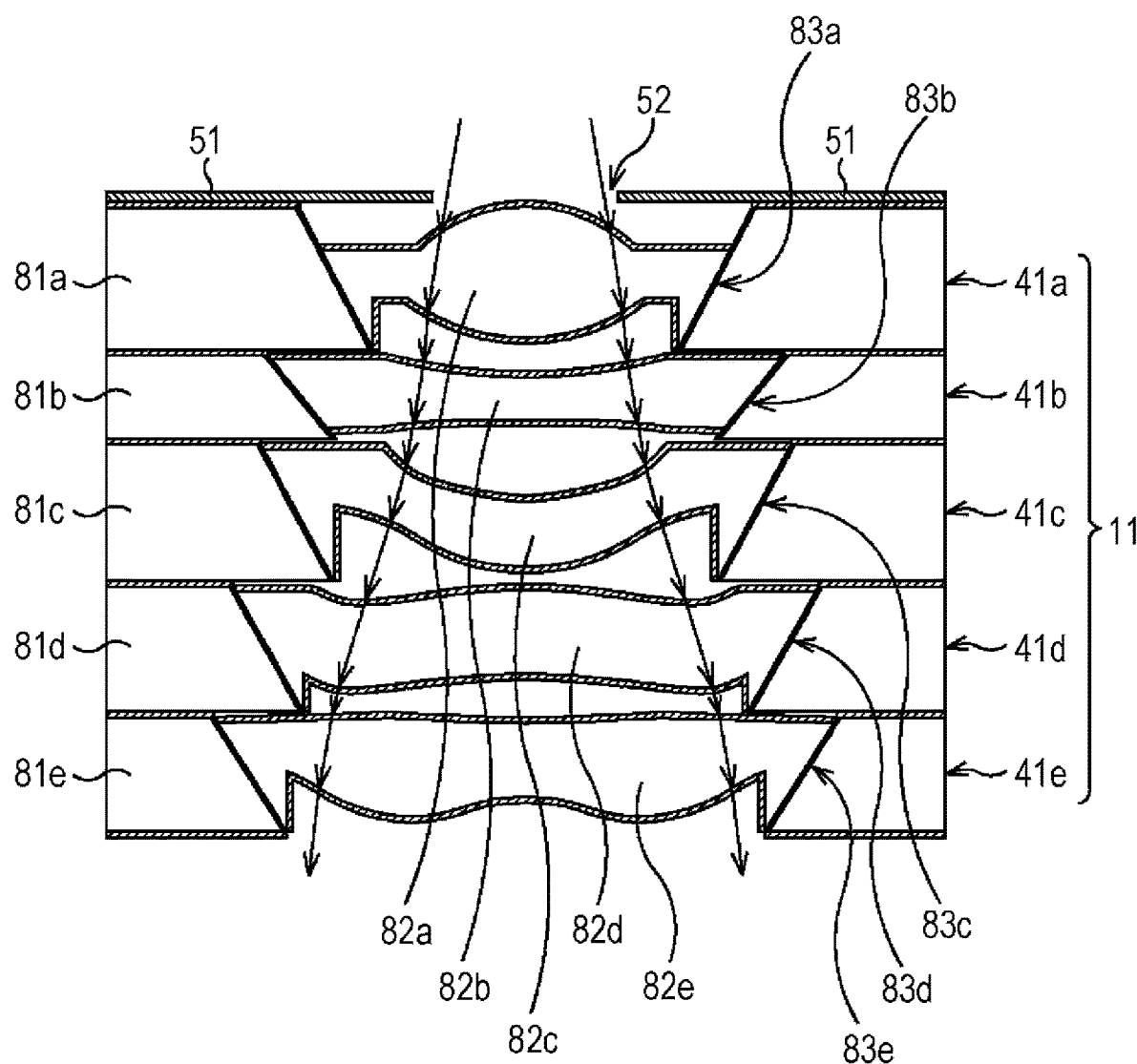
FIG. 15 is a cross-sectional view illustrating a layered lens structure and a diaphragm plate.

FIG. 15 is a cross-sectional view illustrating the layered lens structure 11 and the diaphragm plate 51 as a part of the camera module 1D of FIG. 13.

In the camera module 1D, light which is incident to the module is narrowed by the diaphragm plate 51, is widened inside the layered lens structure 11, and is incident to the light receiving element 12 (which is not illustrated in FIG. 15) disposed at the lower side of the layered lens structure 11. That is, according to the overall configuration of the layered lens structure 11, the light which is incident to the module travels so as to be substantially widened downward from the opening portion 52 of the diaphragm plate 51. For this reason, as an example of the size of the lens resin portion 82 of the layered lens structure 11, in the layered lens structure 11 of FIG. 15, the lens resin portion 82a provided in the lens attached substrate 41a disposed directly below the diaphragm plate 51 is the smallest and the lens resin portion 82e provided in the lens attached substrate 41e disposed on the lowermost layer of the layered lens structure 11 is the largest.

If the thickness of the lens resin portion 82 of the lens attached substrate 41 is uniform, it is difficult to manufacture a large lens compared with a small lens. This is because of, for example, a reason in which the lens is easily deformed by a load applied to the lens when the lens is manufactured and the strength of the large lens is not easily maintained. For this reason, it is desirable that a large lens be thicker than a small lens. For this reason, in the layered lens structure 11 of FIG. 15, the thickness of the lens resin portion 82 is such that the lens resin portion 82e provided in the lens attached substrate 41e disposed on the lowermost layer is the thickest.

The layered lens structure 11 of FIG. 15 has at least one of the following characteristics in order to improve the degree of freedom in the design of the lens.

(1) The thickness of the carrier substrate 81 is different in at least the plurality of lens attached substrates 41 constituting the layered lens structure 11. For example, the thickness of the carrier substrate 81 is large in the lower lens attached substrate 41.

(2) The opening width of the through-hole 83 of the lens attached substrate 41 is different in at least the plurality of lens attached substrates 41 constituting the layered lens structure 11. For example, the opening width of the through-hole 83 is large in the lower lens attached substrate 41.

(3) The diameter of the lens portion 91 provided in the lens attached substrate 41 is different in at least the plurality of lens attached substrates 41 constituting the layered lens structure 11. For example, the diameter of the lens portion 91 is large in the lens portion 91 of the lower lens attached substrate 41.

(4) The thickness of the lens portion 91 provided in the lens attached substrate 41 is different in at least the plurality of lens attached substrates 41 constituting the layered lens structure 11. For example, the thickness of the lens portion 91 is large in the lens portion 91 of the lower lens attached substrate 41.

(5) The distance between the lenses provided in the lens attached substrate 41 is different in at least the plurality of lens attached substrates 41 constituting the layered lens structure 11.

(6) The volume of the lens resin portion 82 provided in the lens attached substrate 41 is different in at least the plurality of lens attached substrates 41 constituting the layered lens structure 11. For example, the volume of the lens resin portion 82 is large in the lens resin portion 82 of the lower lens attached substrate 41.

(7) The material of the lens resin portion 82 provided in the lens attached substrate 41 is different in at least the plurality of lens attached substrates 41 constituting the layered lens structure 11.

Generally, the light which is incident to the camera module includes vertical incident light and entering incident light. Most of the entering incident light contacts the diaphragm plate 51 so that the light is absorbed or is reflected toward the outside of the camera module 1D. There is a possibility that the entering incident light which is not narrowed by the diaphragm plate 51 may be reflected while contacting the side wall of the through-hole 83 according to the incident angle.

The traveling direction of the reflected light of the entering incident light is determined by the incident angle of the entering incident light 85 and the angle of the side wall of the through-hole 83 illustrated in FIG. 13. In the case of a so-called downward widened shape in which the opening width of the through-hole 83 increases from the light incident side toward the light receiving element 12, when the entering incident light 85 having a specific incident angle and not narrowed by the diaphragm plate 51 contacts the side wall of the through-hole 83, the light is reflected in the direction of the light receiving element 12 and the light may become stray light or extraneous noise.

However, in the layered lens structure 11 illustrated in FIG. 13, as illustrated in FIG. 15, the through-hole 83 has a so-called downward narrowed shape in which the opening width decreases downward (toward the light receiving element 12). In the case of this shape, the entering incident light 85 contacting the side wall of the through-hole 83 is reflected in the upward direction, that is, the incident direction instead of the downward direction, that is, the direction of the light receiving element 12. Accordingly, it is possible to obtain an operation or effect of suppressing the occurrence of stray light or extraneous noise.

It is desirable that a light absorbing material be disposed on the side wall of the through-hole 83 of the lens attached substrate 41 in order to reduce the amount of the light reflected while contacting the side wall.

As an example, if light (for example, visible light) having a wavelength to be received when the camera module 1D is used as the camera is set as first light and light (for example, UV light) having a wavelength different from the first light is set as second light, a layer of a material having a light absorbing property with respect to the first light (visible light) may be formed on the side wall of the through-hole 83 in a manner such that a material obtained by dispersing carbon particles as a material of absorbing the first light (visible light) in the resin cured by the second light (UV light) is applied or sprayed onto the surface of the carrier substrate 81, only the resin of the side wall of the through-hole 83 is cured by the irradiation with the second light (UV light), and the resin of the other area is removed.

The layered lens structure 11 illustrated in FIG. 15 is an example of a structure in which the diaphragm plate 51 is disposed on the uppermost substrate of the plurality of laminated lens attached substrates 41. The diaphragm plate 51 may be disposed while being inserted into any one of the intermediate lens attached substrates 41 instead of the uppermost substrate of the plurality of laminated lens attached substrates 41.

As another example, a layer of a material having a light absorbing property may be formed on the surface of the lens attached substrate 41 so as to serve as a diaphragm instead of the plate-like diaphragm plate 51 formed separately from the lens attached substrate 41. For example, the diaphragm may be formed on the surface of the lens attached substrate 41 in a manner such that a material obtained by dispersing carbon particles as a material of absorbing the first light (visible light) in the resin cured by the second light (UV light) is applied or sprayed onto the surface of the lens attached substrate 41, the resin of an area except for a desired light transmissive area so as to serve as a diaphragm is irradiated with the second light (UV light) to cure the resin so as to remain, and the resin of a non-cured area, that is, a desired light transmissive area so as to serve as a diaphragm is removed.

In addition, the lens attached substrate 41 having the diaphragm formed on the surface thereof may be the lens attached substrate 41 disposed on the uppermost layer of the layered lens structure 11 or the lens attached substrate 41 as the inner layer of the layered lens structures 11.

The layered lens structure 11 illustrated in FIG. 15 has a structure in which the lens attached substrates 41 are laminated.

As another embodiment, the layered lens structure 11 may include the plurality of lens attached substrates 41 and at least one carrier substrate 81 without the lens resin portion 82. In this structure, the carrier substrate 81 without the lens resin portion 82 may be disposed on the lowermost layer or the uppermost layer of the layered lens structure 11 or may be disposed as the inner layer of the layered lens structure 11. For example, this structure has an operation or effect in which the distance among the plurality of lenses of the layered lens structure 11 or the distance between the lowermost lens resin portion 82 of the layered lens structure 11 and the light receiving element 12 disposed at the lower side of the layered lens structure 11 can be arbitrarily set.

Alternatively, this structure has an operation or effect in which the opening width of the carrier substrate 81 without the lens resin portion 82 can be appropriately set and a light absorbing material can be disposed in an area excluding the opening portion so as to serve as a diaphragm plate.

7. Sixth Embodiment of Camera Module

Figure 16:
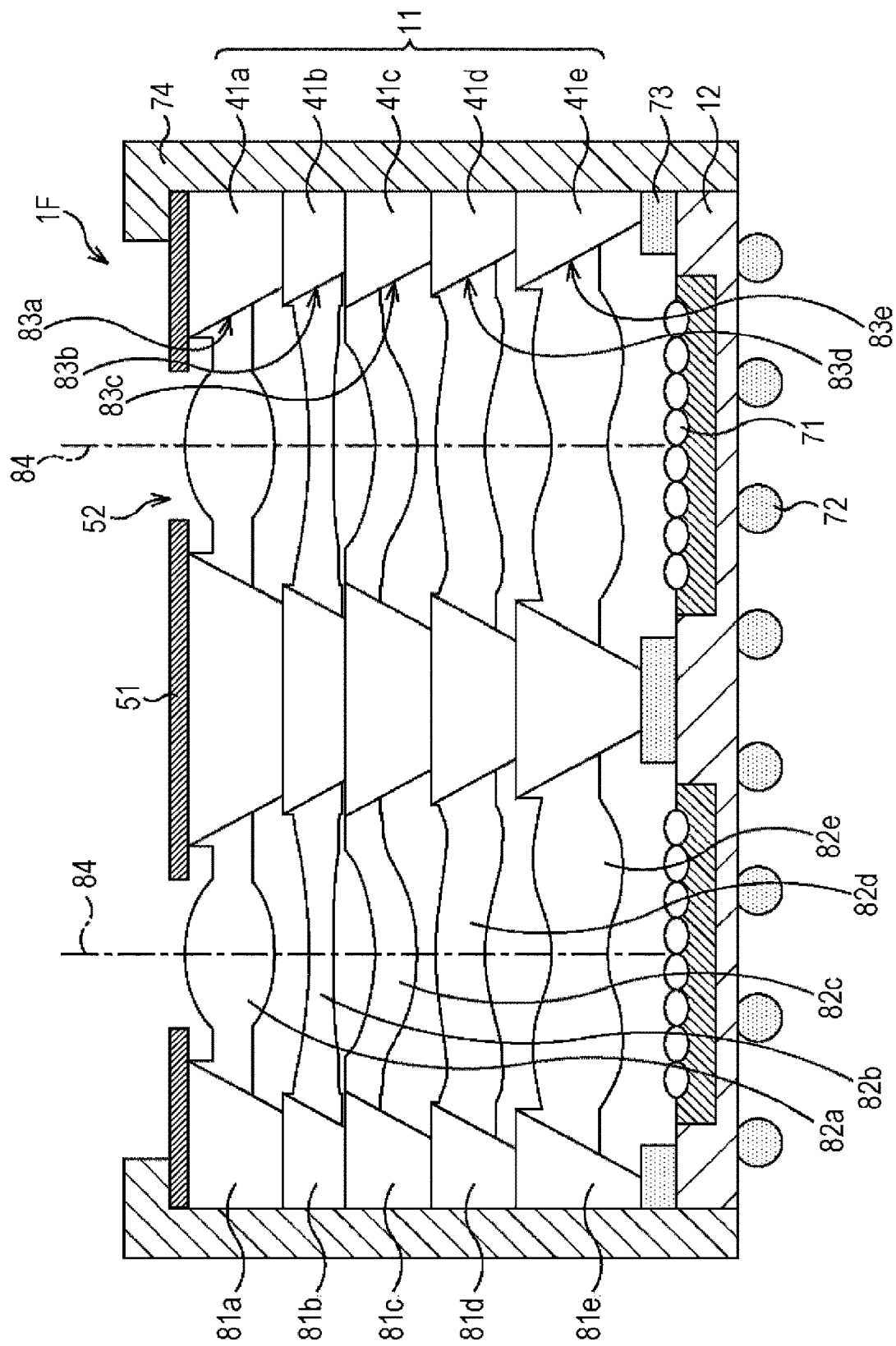
FIG. 16 is a diagram illustrating a sixth embodiment of a camera module that uses a layered lens structure according to an embodiment of the present technology.

FIG. 16 is a diagram illustrating a sixth embodiment of a camera module that uses a layered lens structure according to an embodiment of the present technology.

In FIG. 16, the same reference numeral will be given to the component corresponding to the fourth embodiment illustrated in FIG. 13 and the differences from the camera module 1D of FIG. 13 will be described.

Even in a camera module 1F illustrated in FIG. 16, the incident light after being narrowed by the diaphragm plate 51 is widened inside the layered lens structure 11 and is incident to the light receiving element 12 disposed at the lower side of the layered lens structure 11 similarly to the camera module 1D illustrated in FIG. 13. That is, according to the overall configuration of the layered lens structure 11, the light travels while being widened in a downward widened shape in the downward direction from the opening portion 52 of the diaphragm plate 51.

The camera module 1F of FIG. 16 is different from the camera module 1D illustrated in FIG. 13 in that the cross-sectional shape of the through-hole 83 of each of the lens attached substrates 41 constituting the layered lens structure 11 has a so-called downward widened shape in which the opening width increases downward (toward the light receiving element 12).

Since the layered lens structure 11 of the camera module 1F has a structure in which the incident light travels while being widened in a downward widened shape in the downward direction from the opening portion 52 of the diaphragm plate 51, for example, the carrier substrate 81 rarely disturbs the optical path in the downward widened shape in which the opening width of the through-hole 83 is widened downward compared with the downward narrowed shape in which the opening width of the through-hole 83 is narrowed downward. Accordingly, there is an effect that the degree of freedom in the design of the lens is high.

Further, in the case of the downward narrowed shape in which the opening width of the through-hole 83 decreases downward, the cross-sectional area of the lens resin portion 82 including the carrying portion 92 in the substrate plane direction has a specific size in order to allow the transmission of the light incident to the lens 21 at the lower surface of the lens resin portion 82 and the cross-sectional area increases from the lower surface of the lens resin portion 82 toward the upper surface thereof.

On the contrary, in the case of the downward widened shape in which the opening width of the through-hole 83 increases downward, the cross-sectional area of the lower surface of the lens resin portion 82 is substantially similar to that of the downward narrowed shape, but the cross-sectional area decreases from the lower surface of the lens resin portion 82 toward the upper surface thereof.

Accordingly, the structure in which the opening width of the through-hole 83 increases downward has an operation or effect in which the size of the lens resin portion 82 including the carrying portion 92 can be suppressed to be small. Accordingly, there is an operation or effect in which the above-described difficulty in the lens forming process for a large lens can be reduced.

8. Seventh Embodiment of Camera Module

Figure 17:
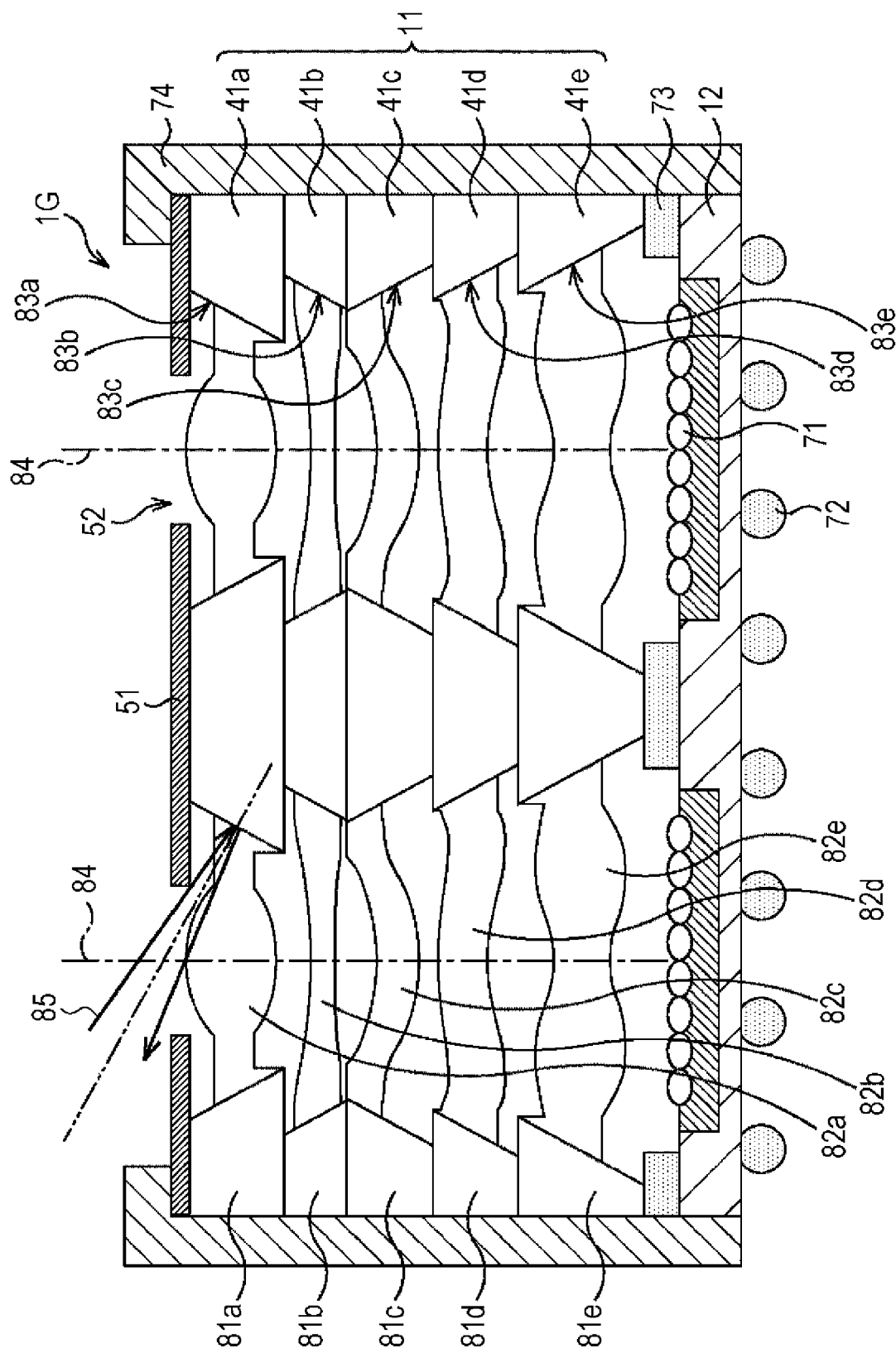
FIG. 17 is a diagram illustrating a seventh embodiment of a camera module that uses a layered lens structure according to an embodiment of the present technology.

FIG. 17 is a diagram illustrating a seventh embodiment of a camera module that uses a layered lens structure according to an embodiment of the present technology.

Even in FIG. 17, the same reference numeral will be given to the component corresponding to FIG. 13 and the differences from the camera module 1D of FIG. 13 will be described.

In a camera module 1G of FIG. 17, the shapes of the lens resin portion 82 and the through-hole 83 of each of the lens attached substrates 41 constituting the layered lens structure 11 are also different from those of the camera module 1D illustrated in FIG. 13.

The layered lens structure 11 of the camera module 1G includes both the lens attached substrate 41 with the through-hole 83 having a so-called downward narrowed shape in which the opening width thereof decreases downward (toward the light receiving element 12) and the lens attached substrate 41 with the through-hole 83 having a so-called downward widened shape in which the opening width thereof increases upward.

In the lens attached substrate 41 of which the through-hole 83 is formed in a so-called downward narrowed shape of which the opening width decreases downward, the entering incident light 85 contacting the side wall of the through-hole 83 is reflected in the upward direction, that is, the light incident direction as described above. Accordingly, there is an operation or effect in which the occurrence of stray light or extraneous noise is suppressed.

Here, in the layered lens structure 11 of FIG. 17, the lens attached substrates 41 including the through-hole 83 having a so-called downward narrowed shape of which the opening width decreases downward and particularly disposed at the upper side (the light incident side) are used among the plurality of lens attached substrates 41 constituting the layered lens structure 11.

As described above, in the lens attached substrate 41 of which the through-hole 83 is formed in a so-called downward widened shape in which the opening width increases downward, the carrier substrate 81 provided in the lens attached substrate 41 rarely disturbs the optical path. Accordingly, there is an operation or effect in which the degree of freedom in the design of the lens is improved or the size of the lens resin portion 82 including the carrying portion 92 provided in the lens attached substrate 41 is suppressed to be small.

In the layered lens structure 11 of FIG. 17, since the light travels downward from the diaphragm while being widened in a downward widened shape, the lens resin portions 82 provided in the lower lens attached substrates 41 are large among the plurality of lens attached substrates 41 constituting the layered lens structure 11. When the through-hole 83 having a downward widened shape is used in the large lens resin portion 82, there is a significant effect in which the size of the lens resin portion 82 is suppressed.

Here, in the layered lens structure 11 of FIG. 17, particularly the lower lens attached substrates among the plurality of lens attached substrates 41 constituting the layered lens structure 11 are formed as the lens attached substrate 41 with the through-hole 83 having a so-called downward widened shape in which the opening width increases downward.

9. Detailed Configuration of Lens Attached Substrate

Next, the detailed configuration of the lens attached substrate 41 will be described.

Figure 18:
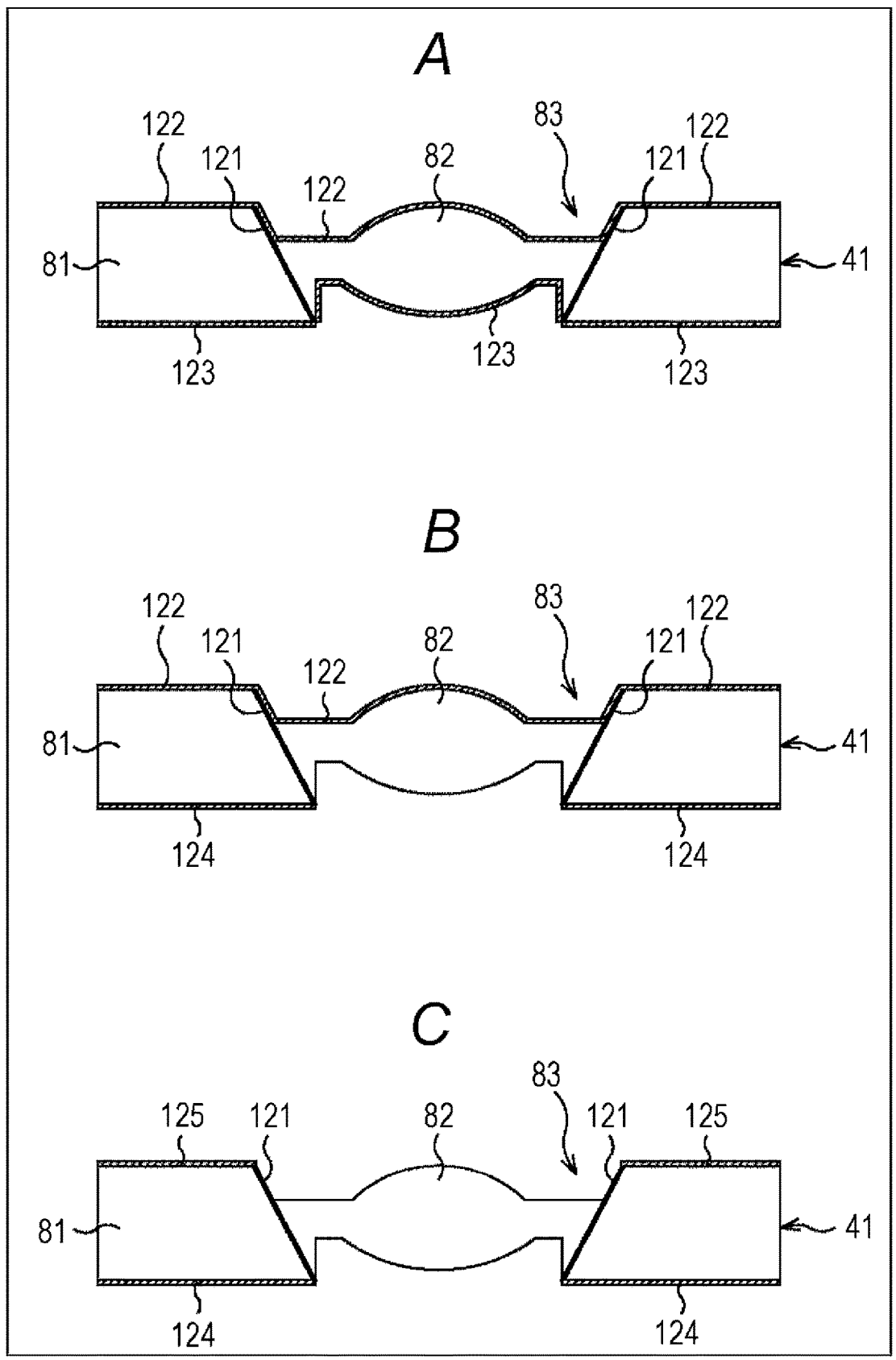
FIGS. 18A-C are cross-sectional views illustrating the detailed configuration of the lens attached substrate.
Figure 19:
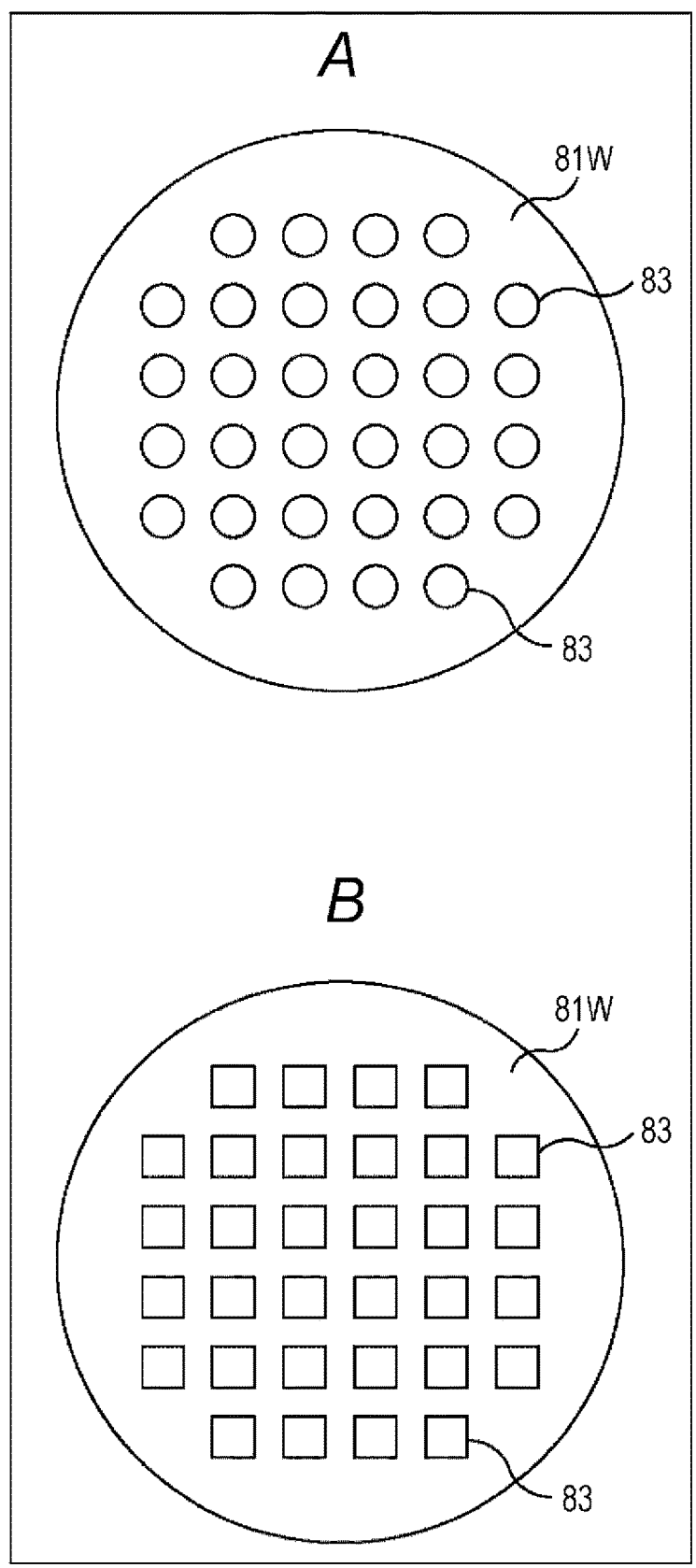
FIG. 19A-B are diagrams illustrating a lens attached substrate manufacturing method.
Figure 21:
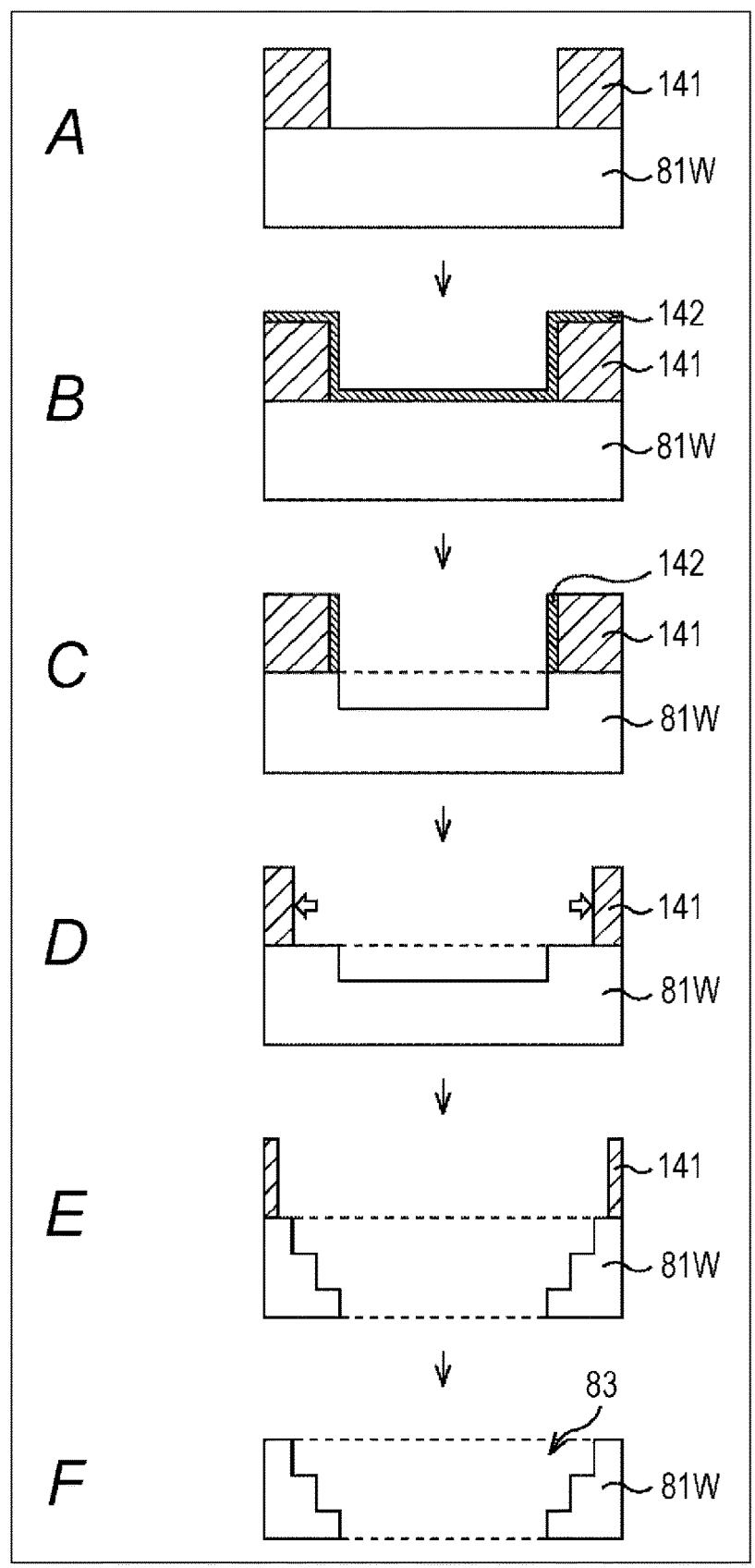
FIGS. 21A-F are diagrams illustrating the lens attached substrate manufacturing method.
Figure 22:
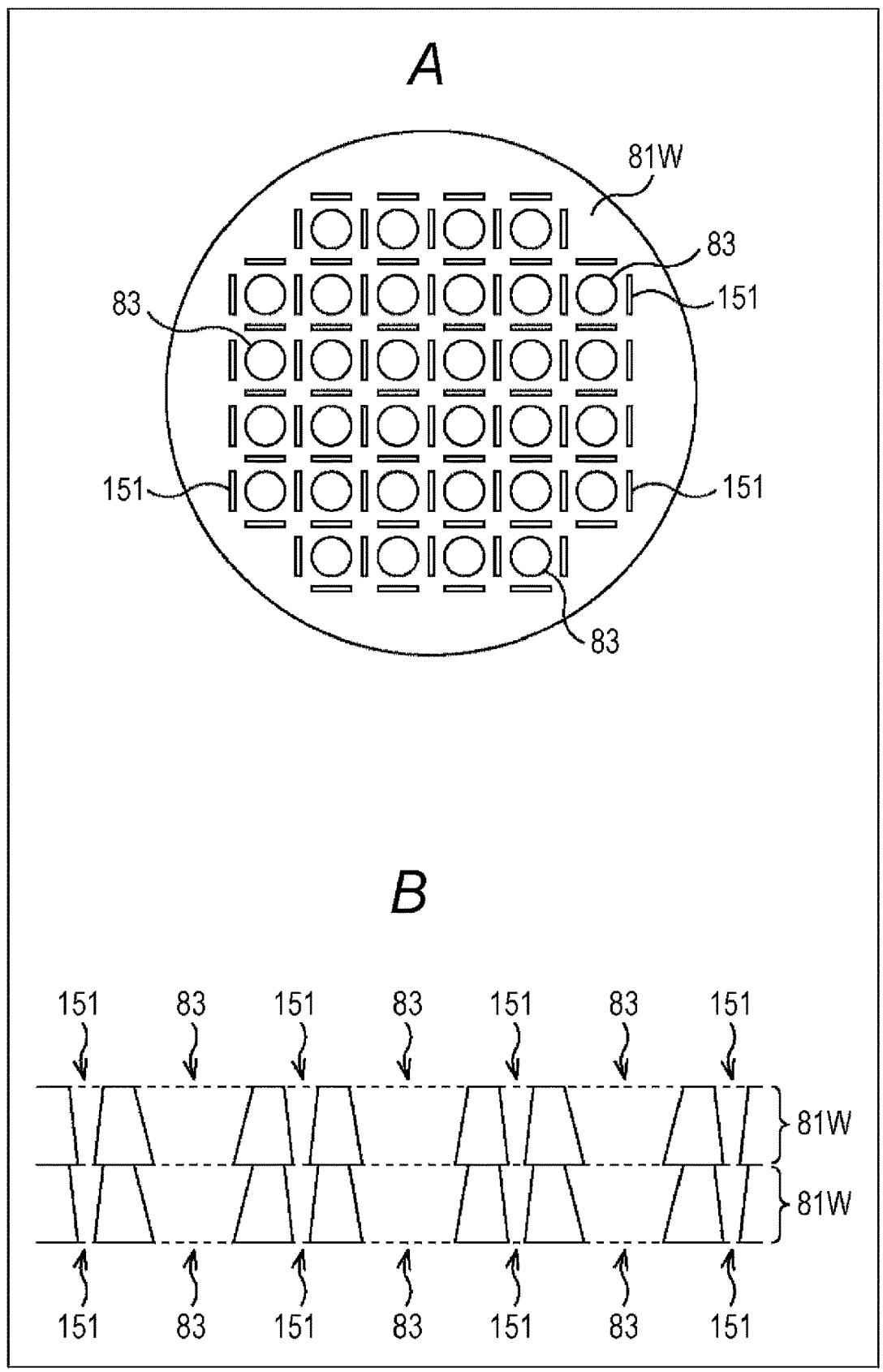
FIG. 22A-B are diagrams illustrating the lens attached substrate manufacturing method.
Figure 23:
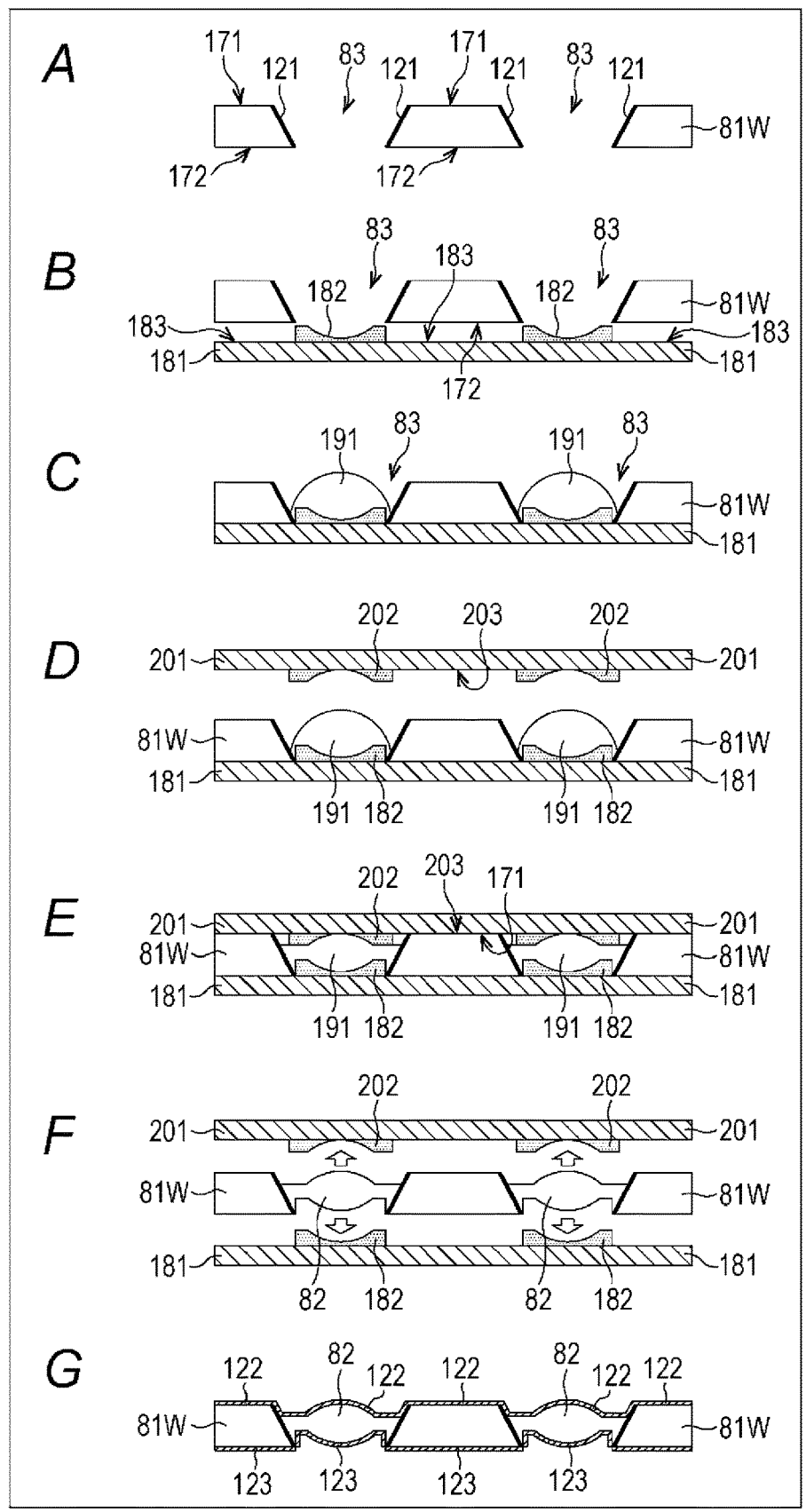
FIGS. 23A-G are diagrams illustrating the lens attached substrate manufacturing method.

FIGS. 18A to 18C are cross-sectional views illustrating the detailed configuration of the lens attached substrate 41.

In addition, the uppermost lens attached substrate 41a of five lens attached substrates 41a to 41e is illustrated in FIGS. 18A to 18C, but the other lens attached substrates 41 are also formed in this way.

As the configuration of the lens attached substrate 41, any one of the configurations of FIGS. 18A to 18C can be employed.

In the lens attached substrate 41 illustrated in FIG. 18A, the lens resin portion 82 is formed in the through-hole 83 provided in the carrier substrate 81 so as to block the through-hole 83 when viewed from the upper surface. As described above by referring to FIG. 14, the lens resin portion 82 includes the center lens portion 91 (not illustrated) and the peripheral carrying portion 92 (not illustrated).

The side wall of the through-hole 83 of the lens attached substrate 41 is provided with a film 121 which has a light absorbing property or a light shielding property in order to prevent the ghost or flare caused by the reflection of the light. The film 121 will be conveniently referred to as the light shielding film 121.

An upper surface layer 122 including oxides or nitrides or other insulation materials is formed on the upper surfaces of the carrier substrate 81 and the lens resin portion 82, and a lower surface layer 123 including oxides or nitrides or other insulation materials is formed on the lower surfaces of the carrier substrate 81 and the lens resin portion 82.

As an example, the upper surface layer 122 is formed as a reflection preventing film in which a plurality of low refractive index films and a plurality of high refractive index films are alternately laminated. For example, the reflection preventing film can be formed so that the low refractive index films and the high refractive index films are alternately laminated as four layers in total. The low refractive index film is formed as, for example, an oxide film of SiOx ($1 \leq x \leq 2$), SiOC, SiOF, or the like and the high refractive index film is formed as, for example, a metallic oxide film of TiO, TaO, $Nb_2 O_5$, or the like.

In addition, the upper surface layer 122 may be designed to obtain a desired reflection preventing performance by using, for example, an optical simulation. Then, the materials of the low refractive index film and the high refractive index film, the film thickness, the number of laminated films, and the like are not particularly limited. In the embodiment, the outermost surface of the upper surface layer 122 is formed as the low refractive index film. Here, the film thickness is, for example, 20 to 1000 nm, the density is, for example, 2.2 to 2.5 g/cm$^3$, and the flatness is, for example, about 1 nm or less. In this way, the root mean square surface roughness Rq (RMS) is set. Further, although it will be described later in detail, the upper surface layer 122 is formed as a bonding film to be bonded to the other lens attached substrate 41.

As an example, the upper surface layer 122 is the reflection preventing film in which a plurality of low refractive index films and a plurality of high refractive index films are alternately laminated. Among these, an inorganic reflection preventing film is desirable. As another example, the upper surface layer 122 may be a single layer film including oxides or nitrides or other insulation materials. Among these, an inorganic film is desirable.

As an example, the lower surface layer 123 may be a reflection preventing film in which a plurality of low refractive index films and a plurality of high refractive index films are alternately laminated. Among these, an inorganic reflection preventing film is desirable. As another example, the lower surface layer 123 may be a single layer film including oxides or nitrides or other insulation materials. Among these, an inorganic film is desirable.

In the lens attached substrates 41 illustrated in FIGS. 18B and 18C, the differences from the lens attached substrate 41 illustrated in FIG. 18A will be described.

In the lens attached substrate 41 illustrated in FIG. 18B, the film formed on the lower surfaces of the carrier substrate 81 and the lens resin portion 82 is different from that of the lens attached substrate 41 illustrated in FIG. 18A.

In the lens attached substrate 41 of FIG. 18B, a lower surface layer 124 including oxides or nitrides or other insulation materials is formed on the lower surface of the carrier substrate 81 and the lower surface layer 124 is not formed on the lower surface of the lens resin portion 82. The lower surface layer 124 and the upper surface layer 122 may be formed of the same material or a different material.

Such a structure can be formed by, for example, a manufacturing method in which the lower surface layer 124 is formed on the lower surface of the carrier substrate 81 before the formation of the lens resin portion 82 and then the lens resin portion 82 is formed. Alternatively, such a structure can be formed in a manner such that the lens resin portion 82 is formed and a film forming the lower surface layer 124 is laminated on the lower surface of the carrier substrate 81 by, for example, PVD while a mask is formed on the lens resin portion 82 and a mask is not formed on the carrier substrate 81.

In the lens attached substrate 41 of FIG. 18C, the upper surface layer 125 including oxides or nitrides or other insulation materials is formed on the upper surface of the carrier substrate 81 and the upper surface layer 125 is not formed on the upper surface of the lens resin portion 82.

Similarly, even in the lower surface of the lens attached substrate 41, the lower surface layer 124 including oxides or nitrides or other insulation materials is formed on the lower surface of the carrier substrate 81 and the lower surface layer 124 is not formed on the lower surface of the lens resin portion 82.

Such a structure can be formed by, for example, a manufacturing method in which the upper surface layer 125 and the lower surface layer 124 are formed on the carrier substrate 81 before the formation of the lens resin portion 82 and then the lens resin portion 82 is formed. Alternatively, such a structure can be formed in a manner such that the lens resin portion 82 is formed and a film forming the upper surface layer 125 and the lower surface layer 124 is laminated on the surface of the carrier substrate 81 by, for example, PVD while a mask is formed on the lens resin portion 82 and a mask is not formed on the carrier substrate 81. The lower surface layer 124 and the upper surface layer 125 may be formed of the same material or a different material.

The lens attached substrate 41 can have the above-described configuration.

10. Lens Attached Substrate Manufacturing Method

Next, a method of manufacturing the lens attached substrate 41 will be described with reference to FIGS. 19A and 19B to 29.

First, a substrate-like carrier substrate 81W provided with the plurality of through-holes 83 is prepared. As the carrier substrate 81W, for example, a silicon substrate used in a general semiconductor device can be used. The carrier substrate 81W is formed in, for example, a circular shape illustrated in FIG. 19A and the diameter thereof is set to, for example, 200 mm or 300 mm. The carrier substrate 81W may be, for example, a glass substrate, a resinous substrate, or a metallic substrate instead of a silicon substrate.

Further, in the embodiment, the planar shape of the through-hole 83 is a circular shape as illustrated in FIG. 19A, but as illustrated in FIG. 19B, the planar shape of the through-hole 83 may be, for example, a polygonal shape such as a square shape.

The opening width of the through-hole 83 can be set to, for example, about 100 μm to about 20 mm. In this case, for example, about one hundred to five million through-holes can be disposed in the carrier substrate 81W.

In the specification, the size of the through-hole 83 in the planar direction of the lens attached substrate 41 will be referred to as the opening width. Unless otherwise specified, the opening width indicates the length of one side when the planar shape of the through-hole 83 is a square shape and indicates the diameter when the planar shape of the through-hole 83 is a circular shape.

As illustrated in FIGS. 20A to 20C, in the through-hole 83, the second opening width 132 of the second surface facing the first surface is smaller than the first opening width 131 of the first surface of the carrier substrate 81W.

As an example of the three-dimensional shape of the through-hole 83 in which the second opening width 132 is smaller than the first opening width 131, the through-hole 83 may be formed in a truncated conical shape or a polygonal truncated pyramid shape as illustrated in FIG. 20A. The cross-sectional shape of the side wall of the through-hole 83 may be linear as illustrated in FIG. 20A or may be curved as illustrated in FIG. 20B. Alternatively, as illustrated in FIG. 20C, a step may be formed.

In the through-hole 83 having a shape in which the second opening width 132 is smaller than the first opening width 131, when the lens resin portion 82 is formed in a manner such that resin is supplied into the through-hole 83 and the resin is pressed by a mold member in the directions respectively facing the first and second surfaces, the resin formed as the lens resin portion 82 receives a force from two facing mold members so as to be pressed toward the side wall of the through-hole 83. Accordingly, there is an effect in which the adhesion strength between the carrier substrate and the resin formed as the lens resin portion 82 increases.

In addition, as another embodiment of the through-hole 83, the first opening width 131 and the second opening width 132 may have the same shape. That is, the cross-sectional shape of the side wall of the through-hole 83 may be perpendicular.

<Through-Hole Forming Method Using Wet Etching>

The through-hole 83 of the carrier substrate 81W can be formed by etching the carrier substrate 81W according to wet etching. Specifically, an etching mask for preventing the etching of the non-opening area of the carrier substrate 81W is formed on the surface of the carrier substrate 81W before the etching of the carrier substrate 81W. As the material of the etching mask, for example, an insulation film such as a silicon oxide film or a silicon nitride film is used. The etching mask is formed in a manner such that a layer of an etching mask material is formed on the surface of the carrier substrate 81W and a pattern as the planar shape of the through-hole 83 is opened in the layer. The through-hole 83 is formed in the carrier substrate 81W by etching the carrier substrate 81W after the etching mask is formed.

For example, when single crystal silicon having a substrate surface orientation of (100) is used as the carrier substrate 81W, anisotropic crystalline wet etching using an alkaline solution of KOH can be used to form the through-hole 83.

When anisotropic crystalline wet etching using an alkaline solution of KOH is performed on the carrier substrate 81W of single crystal silicon having a substrate surface orientation of (100), etching is performed so that a surface (111) appears on the opening side wall. As a result, even when the planar shape of the opening portion of the etching mask is formed as a circular shape or a square shape, it is possible to obtain the through-hole 83 of which the planar shape is a square shape, the opening width of the through-hole 83 is small in the second opening width 132 compared with the first opening width 131, and the three-dimensional shape of the through-hole 83 is a truncated pyramid shape or a shape similar thereto. The angle of the side wall of the through-hole 83 formed in a truncated pyramid shape is about 55° with respect to the substrate plane.

As the etching for forming the through-hole, wet etching using a chemical liquid capable of etching silicon in an arbitrary shape regardless of the limitation of the crystalline orientation and disclosed in WO 2011/010739 A may be used as another example. As the chemical liquid, for example, a chemical liquid obtained by adding at least one of polyoxyethylene alkyl phenyl ether, polyoxyalkylene alkyl ether, and polyethylene glycol as a surface active agent to a tetramethyl ammonium hydroxide (TMAH) solution or a chemical liquid obtained by adding isopropyl alcohol to a KOH solution may be used.

When etching is performed on the carrier substrate 81W of single crystal silicon having a substrate surface orientation of (100) by using the above-described chemical liquid in order to form the through-hole 83, it is possible to obtain the through-hole 83 of which the planar shape is a circular shape, the second opening width 132 is smaller than the first opening width 131, and the three-dimensional shape is formed in a truncated conical shape or a shape similar thereto in a case where the planar shape of the opening portion of the etching mask is a circular shape.

When the planar shape of the opening portion of the etching mask is a square shape, it is possible to obtain the through-hole 83 of which the planar shape is a square shape, the opening width is small in the second opening width 132 compared with the first opening width 131, and the three-dimensional shape is formed in a truncated pyramid shape or a shape similar thereto. The angle of the side wall of the through-hole 83 having the truncated conical shape or the truncated pyramid shape is about 45° with respect to the substrate plane.

<Through-Hole Forming Method Using Dry Etching>

Further, dry etching can be used to form the through-hole 83 instead of the above-described wet etching.

Referring to FIGS. 21A to 21F, a method of forming the through-hole 83 by dry etching will be described.

As illustrated in FIG. 21A, an etching mask 141 is formed on one surface of the carrier substrate 81W. The etching mask 141 has a mask pattern in which a portion forming the through-hole 83 is opened.

Next, as illustrated in FIG. 21B, a protection film 142 is formed so as to protect the side wall of the etching mask 141 and then as illustrated in FIG. 21C, the carrier substrate 81W is etched by a predetermined depth through dry etching. Although the protection film 142 on the surfaces of the carrier substrate 81W and the etching mask 141 is removed by dry etching step, the protection film 142 of the side surface of the etching mask 141 remains and hence the side wall of the etching mask 141 is protected. After the etching, as illustrated in FIG. 21D, the protection film 142 of the side wall is removed and hence the etching mask 141 is retracted in a direction in which the opening pattern size increases.

Then, the protection film forming step, the dry etching step, and the etching mask retracting step illustrated in FIGS. 21B to 21D are repeated again plural times. Accordingly, as illustrated in FIG. 21E, the carrier substrate 81W is etched so as to have a periodical step shape (an unevenness shape).

Finally, when the etching mask 141 is removed, as illustrated in FIG. 21F, the through-hole 83 having a stepped side wall is formed in the carrier substrate 81W. The width (the width of each step) of the through-hole 83 in the stepped planar direction is set to, for example, about 400 nm to 1 μm.

When the through-hole 83 is formed by dry etching as described above, the protection film forming step, the dry etching step, and the etching mask retracting step are repeatedly performed.

Since the side wall of the through-hole 83 is formed in a periodical step shape (an unevenness shape), the reflection of the incident light can be suppressed. Further, if the side wall of the through-hole 83 is formed in an unevenness shape having a random size, a void (a gap) is formed in the adhesive layer between the side wall and the lens formed inside the through-hole 83. Thus, there is a case in which the adhesiveness with respect to the lens is degraded due to the void. However, according to the above-described forming method, since the side wall of the through-hole 83 is formed in a periodical unevenness shape, the adhesiveness is improved and hence a change in optical characteristic due to the displacement of the lens can be suppressed.

As an example of the materials used in the steps, for example, the carrier substrate 81W is formed as single crystal silicon, the etching mask 141 is formed as photo resist, and the protection film 142 is formed as fluorocarbon polymer formed by using gas plasma of $C_4F_8$ or $CHF_3$. Here, the etching process can be performed by plasma etching using a gas including F such as $SF_6/O_2$, $C_4F_8/SF_6$ and the mask retracting step can be performed by plasma etching including $0_2$ such as an $O_2$ gas and $CF_4/O_2$.

Alternatively, the carrier substrate 81W may be formed as single crystal silicon, the etching mask 141 may be formed as $SiO_2$, the etching may be performed by plasma including $Cl_2$, the protection film 142 may be formed as an oxide film obtained by oxidizing an etching target material using $O_2$ plasma, the etching process may be performed by plasma including a gas of $Cl_2$, and the etching mask retracting step may be performed by plasma etching using a gas including F such as $CF_4/O_2$.

As described above, the plurality of through-holes 83 can be simultaneously formed in the carrier substrate 81W by wet etching or dry etching, but a penetration groove 151 may be formed in an area without the through-hole 83 in the carrier substrate 81W as illustrated in FIG. 22A.

FIG. 22A is a top view of the carrier substrate 81W provided with the penetration groove 151 in addition to the through-hole 83.

For example, as illustrated in FIG. 22A, the penetration groove 151 is disposed in a part between the through-holes 83 in the row direction and the column direction so as to avoid the plurality of through-holes 83 disposed in a matrix shape.

Further, the penetration groove 151 of the carrier substrate 81W can be disposed at the same position in the lens attached substrates 41 constituting the layered lens structure 11. In this case, in a state where the plurality of carrier substrates 81W is laminated as the layered lens structure 11, a structure is formed in which the penetration grooves 151 of the plurality of carrier substrates 81W penetrate the plurality of carrier substrates 81W as illustrated in the cross-sectional view of FIG. 22B.

The penetration groove 151 of the carrier substrate 81W as a part of the lens attached substrate 41 can have an operation or effect in which the deformation of the lens attached substrate 41 caused by the stress is relieved, for example, when a stress deforming the lens attached substrate 41 is applied from the outside of the lens attached substrate 41.

Alternatively, the penetration groove 151 can have an operation or effect in which the deformation of the lens attached substrate 41 caused by the stress is relieved, for example, when a stress deforming the lens attached substrate 41 is generated from the inside of the lens attached substrate 41.

<Lens Attached Substrate Manufacturing Method>

Next, a method of manufacturing the substrate-like lens attached substrate 41W will be described with reference to FIGS. 23A to 23G.

First, as illustrated in FIG. 23A, the carrier substrate 81W provided with the plurality of through-holes 83 is prepared. The light shielding film 121 is formed on the side wall of the through-hole 83. In FIGS. 23A to 23G, only two through-holes 83 are illustrated due to the limited area of the drawing paper. However, in fact, the plurality of through-holes 83 is formed in the planar direction of the carrier substrate 81W as illustrated in FIGS. 19A and 19B. Further, an alignment mark (not illustrated) for matching the positions is formed in an area near the outer periphery of the carrier substrate 81W.

An upper front surface flat portion 171 and a lower rear surface flat portion 172 of the carrier substrate 81W are formed as flat surfaces which are flattened as the plasma bonding performed in the subsequent step can be performed. The thickness of the carrier substrate 81W is used as a spacer for determining the distance between the lenses when the lens attached substrate 41 is divided so as to overlap the other lens attached substrate 41.

It is desirable to use a low-thermal-expansion base material of which a thermal expansion coefficient is 10 ppm/° C. or less as the carrier substrate 81W.

Next, as illustrated in FIG. 23B, the carrier substrate 81W is disposed on a lower die 181 in which a plurality of concave optical transfer surfaces 182 is disposed at the same interval. More specifically, the rear surface flat portion 172 of the carrier substrate 81W overlaps the flat surface 183 of the lower die 181 so that the concave optical transfer surface 182 is located at the inside of the through-hole 83 of the carrier substrate 81W. The optical transfer surface 182 of the lower die 181 is formed so as to correspond to the through-hole 83 of the carrier substrate 81W as one to one and the positions of the carrier substrate 81W and the lower die 181 in the planar direction are adjusted so that the corresponding center points of the optical transfer surface 182 and the through-hole 83 match each other in the optical axis direction. The lower die 181 is formed as a hard mold member and is formed of, for example, metal, silicon, quartz, or glass.

Next, as illustrated in FIG. 23C, an energy curable resin 191 is charged (loaded) at the inside of the lower die 181 and the through-hole 83 of the carrier substrate 81W overlapping each other. The lens resin portion 82 is formed by the energy curable resin 191. For that reason, it is desirable to defoam the energy curable resin 191 in advance so that bubbles are not included therein. As the defoaming process, a vacuum defoaming process or a defoaming process using a centrifugal force is desirable. Further, it is desirable to perform the vacuum defoaming process after the charging process. When the defoaming process is performed, the lens resin portion 82 can be molded without holding bubbles.

Next, as illustrated in FIG. 23D, an upper die 201 is disposed on the lower die 181 and the carrier substrate 81W overlapping each other. The plurality of concave optical transfer surfaces 202 is disposed on the upper die 201 at the same interval. Then, similarly to the case where the lower die 181 is disposed, the center points of the through-hole 83 and the optical transfer surface 202 are positioned so as to match each other with high accuracy in the optical axis direction and then the upper die 201 is disposed.

In the height direction as the lengthwise (column) direction on the drawing paper, the position of the upper die 201 is fixed so that a gap between the upper die 201 and the lower die 181 becomes a predetermined distance by a control device controlling a gap between the upper die 201 and the lower die 181. At this time, a space interposed between the optical transfer surface 202 of the upper die 201 and the optical transfer surface 182 of the lower die 181 is equal to the thickness of the lens resin portion 82 (the lens 21) calculated by the optical design.

Alternatively, as illustrated in FIG. 23E, the flat surface 203 of the upper die 201 and the front surface flat portion 171 of the carrier substrate 81W may overlap each other similarly to the case where the lower die 181 is disposed. In this case, a distance between the upper die 201 and the lower die 181 is equal in value to the thickness of the carrier substrate 81W and hence both dies can be positioned with high accuracy in the planar direction and the height direction.

When a gap between the upper die 201 and the lower die 181 is controlled at a predetermined distance, the amount of the energy curable resin 191 charged (loaded) dropwise into the through-hole 83 of the carrier substrate 81W is controlled so that the resin does not flow out of the through-hole 83 of the carrier substrate 81W, and the space surrounded by the upper die 201, and the lower die 181 disposed on the upper and lower sides of the carrier substrate 81W by the step of FIG. 23C. Accordingly, it is possible to decrease the manufacturing cost without meaninglessly using the energy curable resin 191.

Subsequently, the energy curable resin 191 is cured in the state illustrated in FIG. 23E. For example, the energy curable resin 191 is cured in a manner such that heat or UV light is applied thereto as energy and the resin is left for a predetermined time. When the upper die 201 is pressed downward or the alignment thereof is performed in the curing state, the deformation caused by the shrinkage of the energy curable resin 191 can be suppressed to the minimum.

Thermoplastic resin may be used instead of the energy curable resin 191. In that case, when the temperature of each of the upper die 201 and the lower die 181 increases in the state illustrated in FIG. 23E, the energy curable resin 191 is molded in a lens shape and is cooled so as to be cured.

Next, as illustrated in FIG. 23F, the control device controlling the positions of the upper die 201 and the lower die 181 moves the upper die 201 upward and moves the lower die 181 downward so that the upper die 201 and the lower die 181 are separated from the carrier substrate 81W. When the upper die 201 and the lower die 181 are separated from the carrier substrate 81W, the lens resin portion 82 including the lens 21 is formed at the inside of the through-hole 83 of the carrier substrate 81W.

In addition, the surfaces of the upper die 201 and the lower die 181 contacting the carrier substrate 81W may be coated with a fluorine or silicon mold releasing agent. In this way, the carrier substrate 81W can be easily separated from the upper die 201 and the lower die 181. Further, various coatings including fluorine containing diamond like carbon (DLC) may be performed as a method of easily separating the dies from the contact surface with respect to the carrier substrate 81W.

Next, as illustrated in FIG. 23G, the upper surface layer 122 is formed on the front surfaces of the carrier substrate 81W and the lens resin portion 82 and the lower surface layer 123 is formed on the rear surfaces of the carrier substrate 81W and the lens resin portion 82. The front surface flat portion 171 and the rear surface flat portion 172 of the carrier substrate 81W may be flattened by performing chemical mechanical polishing (CMP) if necessary before and after the formation of the upper surface layer 122 and the lower surface layer 123.

As described above, the lens attached substrate 41 can be manufactured by forming the lens resin portion 82 in a manner such that the energy curable resin 191 is press-molded (imprinted) against the through-hole 83 formed in the carrier substrate 81W by the use of the upper die 201 and the lower die 181.

The shapes of the optical transfer surface 182 and the optical transfer surface 202 are not limited to the above-described concave shape and are appropriately determined in response to the shape of the lens resin portion 82. As illustrated in FIG. 15, the lens attached substrates 41a to 41e can have various lens shapes derived by the optical design. For example, various shapes may include a biconvex shape, a biconcave shape, a plane convex shape, a plane concave shape, a convex meniscus shape, a concave meniscus shape, and a high-order non-spherical shape.

Further, the optical transfer surface 182 and the optical transfer surface 202 can be formed in a shape in which the formed lens shape has a moth eye structure.

According to the above-described manufacturing method, since a change in distance in the lens resin portions 82 due to the cured shrinkage of the energy curable resin 191 in the planar direction can be broken by the interposed carrier substrate 81W, it is possible to control the accuracy in the distance between the lenses with high accuracy. Further, there is an effect in which the weak energy curable resin 191 is reinforced by the strong carrier substrate 81W. Accordingly, there is an effect in which a lens array substrate having a plurality of easily handled lenses can be provided and the curved state of the lens array substrate can be suppressed.

<Example of Polygonal Through-Hole>

As illustrated in FIG. 19B, the planar shape of the through-hole 83 may be, for example, a polygonal shape such as a square shape.

Figure 24:
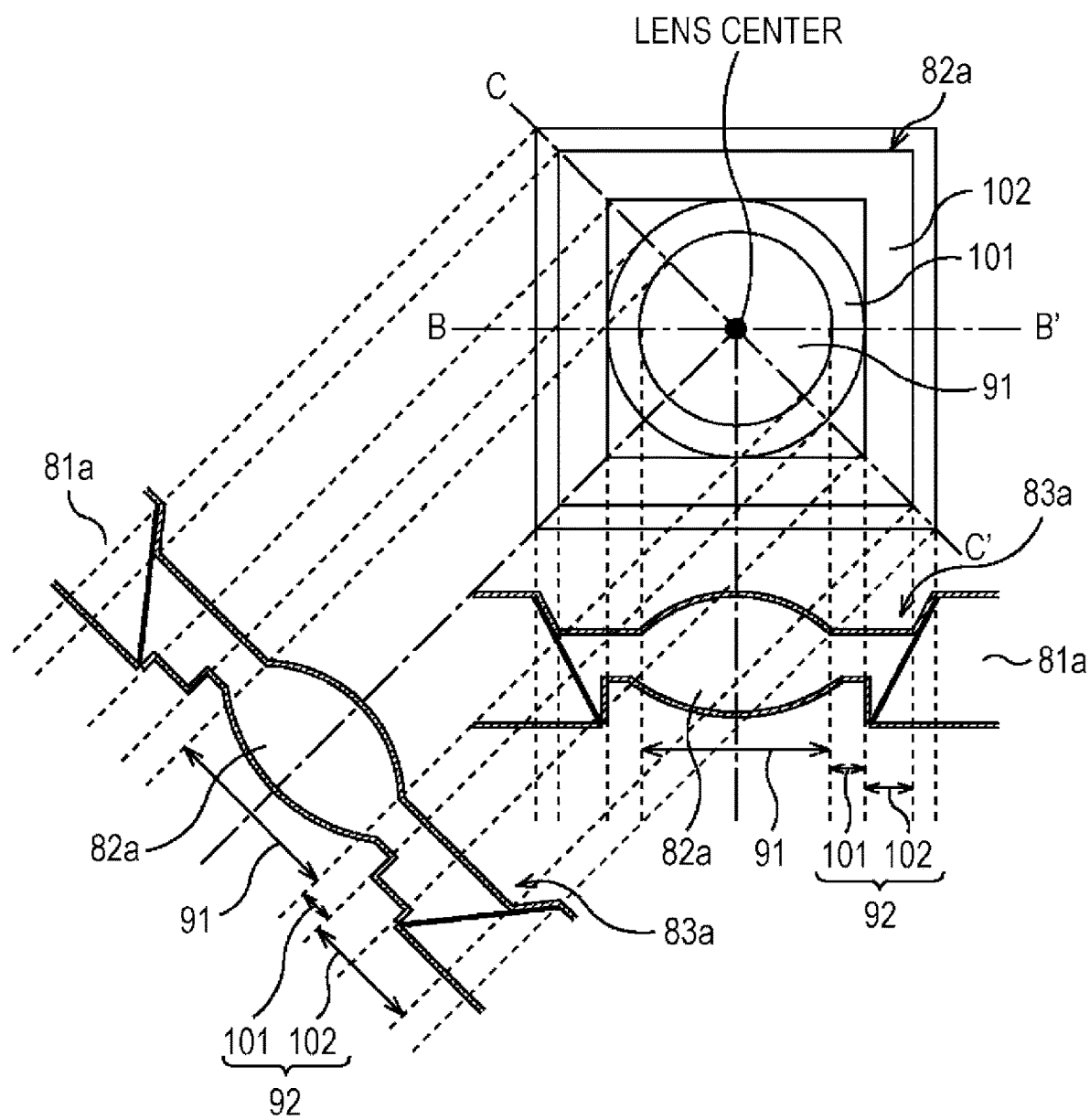
FIG. 24 is a diagram illustrating the lens attached substrate manufacturing method.

FIG. 24 illustrates a top view and cross-sectional views of the carrier substrate 81a and the lens resin portion 82a of the lens attached substrate 41a when the planar shape of the through-hole 83 is a square shape.

The cross-sectional views of the lens attached substrate 41a of FIG. 24 indicate the cross-sectional views taken along the lines B-B' and C-C' of the top view.

As understood from comparison between the cross-sectional view taken along the line B-B' and the cross-sectional view taken along the line C-C', when the through-hole 83a has a square shape, a distance from the center point of the through-hole 83a to the upper outer edge of the through-hole 83a and a distance from the center point of the through-hole 83a to the lower outer edge of the through-hole 83a are different in the side direction and the diagonal direction of the square through-hole 83a and are large in the diagonal direction. For this reason, when the lens portion 91 is formed in a circular shape in the case of the square planar shape of the through-hole 83a, a distance from the outer periphery of the lens portion 91 to the side wall of the through-hole 83a, that is, the length of the carrying portion 92 needs to be a different length in the side direction and the diagonal direction of the square shape.

Here, the lens resin portion 82a illustrated in FIG. 24 has the following structure.

(1) The length of the arm portion 101 disposed in the outer periphery of the lens portion 91 is the same in the side direction and the diagonal direction of the square.

(2) The length of the leg portion 102 disposed at the outside of the arm portion 101 and extending to the side wall of the through-hole 83a is set so that the length of the leg portion 102 in the diagonal direction of the square is longer than the length of the leg portion 102 in the side direction of the square.

As illustrated in FIG. 24, the leg portion 102 does not directly contact the lens portion 91 and the arm portion 101 directly contacts the lens portion 91.

The lens resin portion 82a of FIG. 24 can have an operation or effect in which the entire lens portion 91 is uniformly supported by a constant force while the length and the thickness of the arm portion 101 directly contacting the lens portion 91 are the same in the entire outer periphery of the lens portion 91.

In addition, since the entire lens portion 91 is uniformly supported by a constant force, it is possible to obtain an operation or effect in which a biased stress is suppressed from being non-uniformly applied to a specific part of the lens portion 91 in a manner such that a stress is uniformly transmitted to the entire lens portion 91, for example, when the stress is applied from the carrier substrate 81a surrounding the through-hole 83a to the entire outer periphery of the through-hole 83a.

Figure 25:
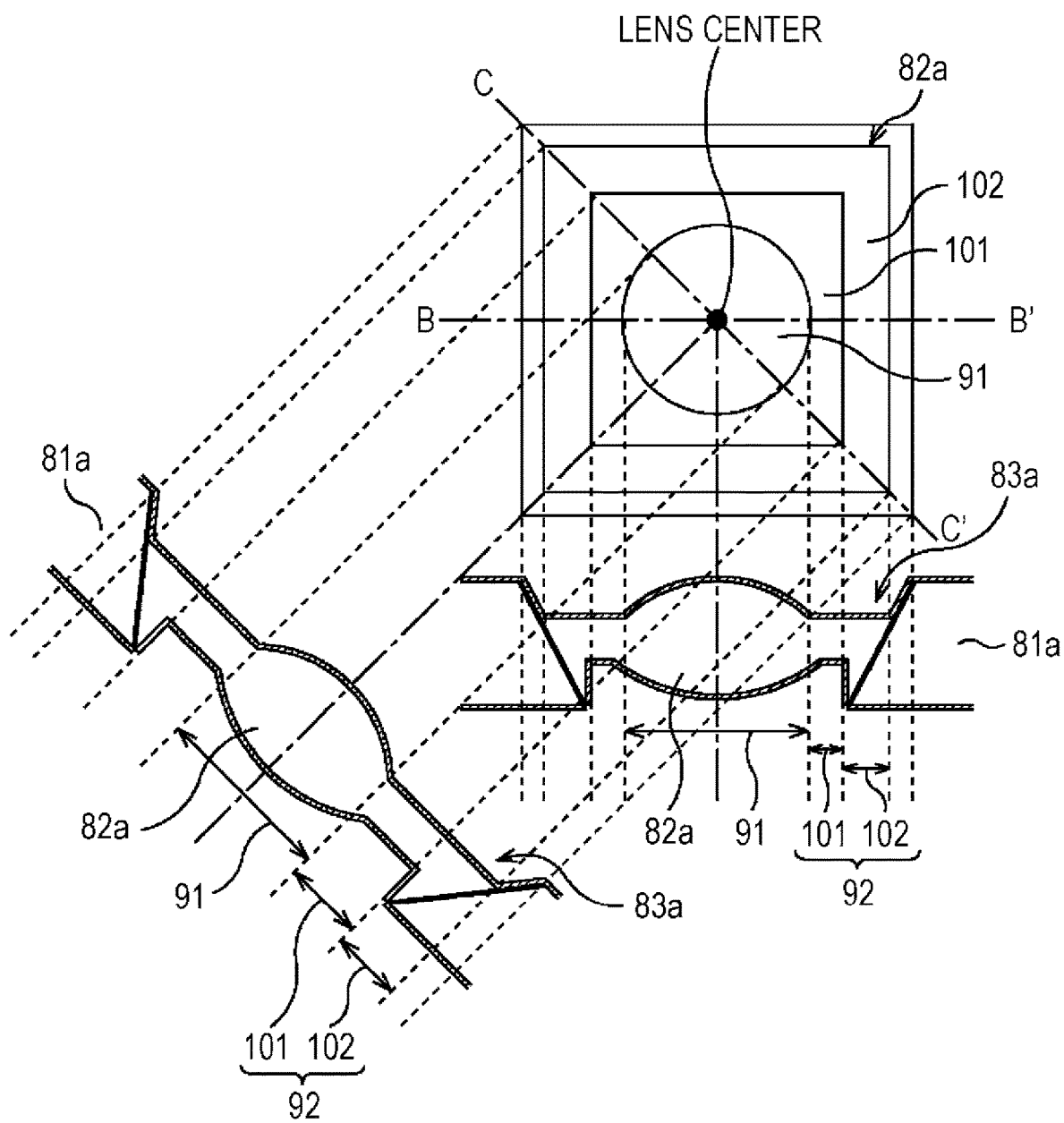
FIG. 25 is a diagram illustrating the lens attached substrate manufacturing method.

FIG. 25 illustrates a top view and cross-sectional views of the carrier substrate 81a and the lens resin portion 82a of the lens attached substrate 41a as the other example of the through-hole 83 having a square planar shape.

The cross-sectional views of the lens attached substrate 41a of FIG. 25 indicate the cross-sectional views taken along the lines B-B' and C-C' of the top view.

Even in FIG. 25, a distance from the center point of the through-hole 83a to the upper outer edge of the through-hole 83a and a distance from the center point of the through-hole 83a to the lower outer edge of the through-hole 83a are different in the side direction and the diagonal direction of the square through-hole 83a and are large in the diagonal direction similarly to FIGS. 22A and 22B. For this reason, when the lens portion 91 is formed in a circular shape in the case of the square planar shape of the through-hole 83a, a distance from the outer periphery of the lens portion 91 to the side wall of the through-hole 83a, that is, the length of the carrying portion 92 needs to be a different length in the side direction and the diagonal direction of the square.

Here, the lens resin portion 82a illustrated in FIG. 25 has the following structure.

(1) The length of the leg portion 102 disposed in the outer periphery of the lens portion 91 is set to be constant along four sides of the square through-hole 83a.

(2) In order to realize the structure of (1), the length of the arm portion 101 is set so that the length of the arm portion in the diagonal direction is longer than the length of the arm portion of the side direction of the square.

As illustrated in FIG. 25, the film thickness of the resin of the leg portion 102 is thicker than that of the arm portion 101. For this reason, the volume per unit area of the lens attached substrate 41a in the planar direction is large in the leg portion 102 compared with the arm portion 101.

In the embodiment of FIG. 25, since the volume of the leg portion 102 is set to be small as much as possible and is set to be constant along four sides of the square through-hole 83a, it is possible to obtain an operation or effect in which when the resin is deformed so as to be swollen, a change in volume due to the deformation is suppressed as much as possible and the change in volume does not occur non-uniformly in the entire outer periphery of the lens portion 91 as much as possible, for example.

Figure 26:
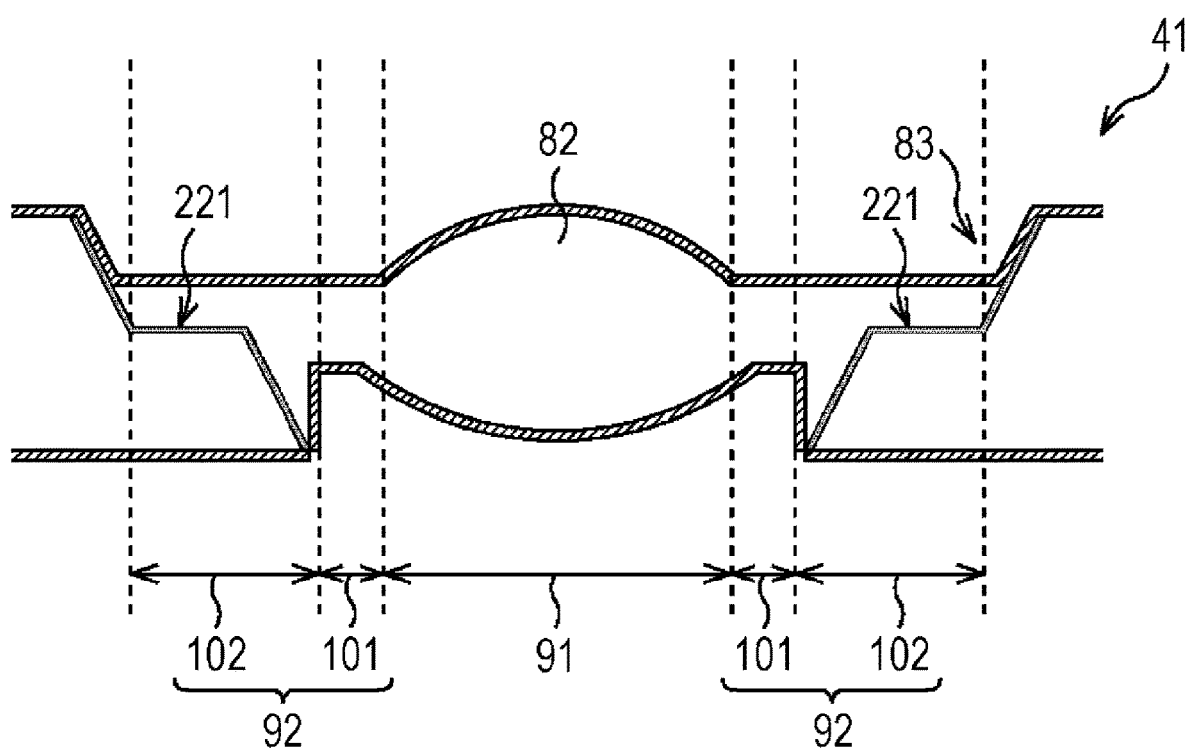
FIG. 26 is a diagram illustrating the lens attached substrate manufacturing method.
Figure 27:
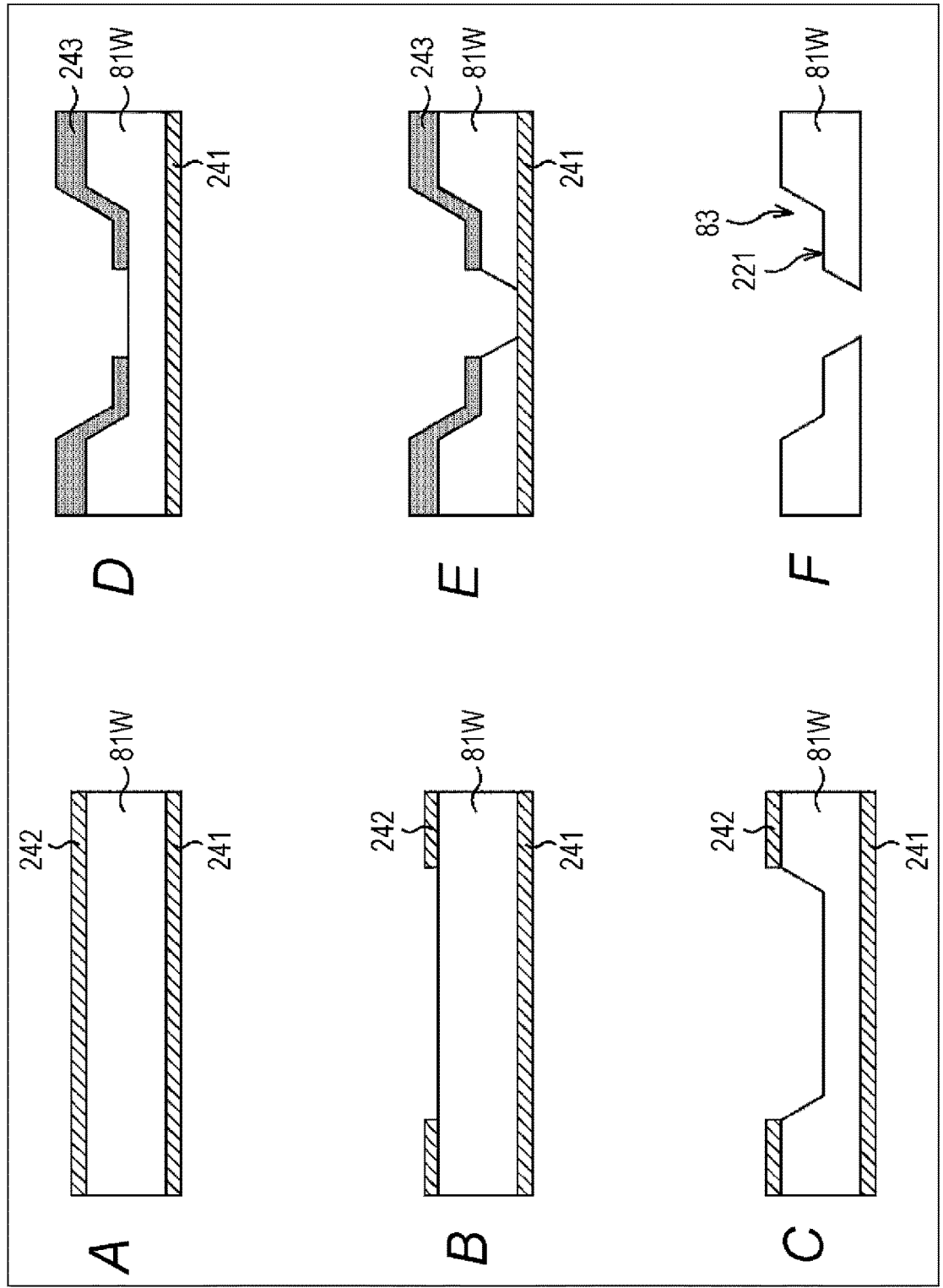
FIG. 27A-F are diagram illustrating the lens attached substrate manufacturing method.

FIG. 26 is a cross-sectional view illustrating another embodiment of the lens resin portion 82 and the through-hole 83 of the lens attached substrate 41.

Each of the lens resin portion 82 and the through-hole 83 illustrated in FIG. 26 has the following structure.

(1) The side wall of the through-hole 83 is formed in a step shape with a step portion 221.

(2) The leg portion 102 of the carrying portion 92 of the lens resin portion 82 is disposed above the side wall of the through-hole 83 and extends in the planar direction of the lens attached substrate 41 on the step portion 221 provided in the through-hole 83.

Referring to FIGS. 27A to 27F, a method of forming the stepped through-hole 83 illustrated in FIG. 26 will be described.

First, as illustrated in FIG. 27A, an etching stop film 241 which has a resistance for the wet etching used to open the through-hole is formed on one surface of the carrier substrate 81W. The etching stop film 241 can be formed as, for example, a silicon nitride film.

Next, a hard mask 242 which has a resistance for the wet etching used to open the through-hole is formed on the other surface of the carrier substrate 81W. The hard mask 242 can be also formed as, for example, a silicon nitride film.

Next, as illustrated in FIG. 27B, a predetermined area of the hard mask 242 is opened for the first etching. In the first etching, a portion as the upper stage of the step portion 221 of the through-hole 83 is etched. For this reason, the opening portion of the hard mask 242 for the first etching becomes an area corresponding to the opening of the upper substrate surface of the lens attached substrate 41 of FIG. 26.

Next, as illustrated in FIG. 27C, the carrier substrate 81W is etched by a predetermined depth in response to the opening portion of the hard mask 242 by the wet etching.

Next, as illustrated in FIG. 27D, a hard mask 243 is also formed on the surface of the etched carrier substrate 81W and the hard mask 243 is opened so as to correspond to the lower portion of the step portion 221 of the through-hole 83. The second hard mask 243 can be also formed as, for example, a silicon nitride film.

Next, as illustrated in FIG. 27E, the carrier substrate 81W is etched to a portion reaching the etching stop film 241 in response to the opening portion of the hard mask 243 by the wet etching.

Finally, as illustrated in FIG. 27F, the hard mask 243 of the upper surface of the carrier substrate 81W and the etching stop film 241 of the lower surface thereof are removed.

As described above, when the etching for the carrier substrate 81W used to form the through-hole is performed separately two times by the wet etching, the stepped through-hole 83 illustrated in FIG. 26 is obtained.

Figure 28:
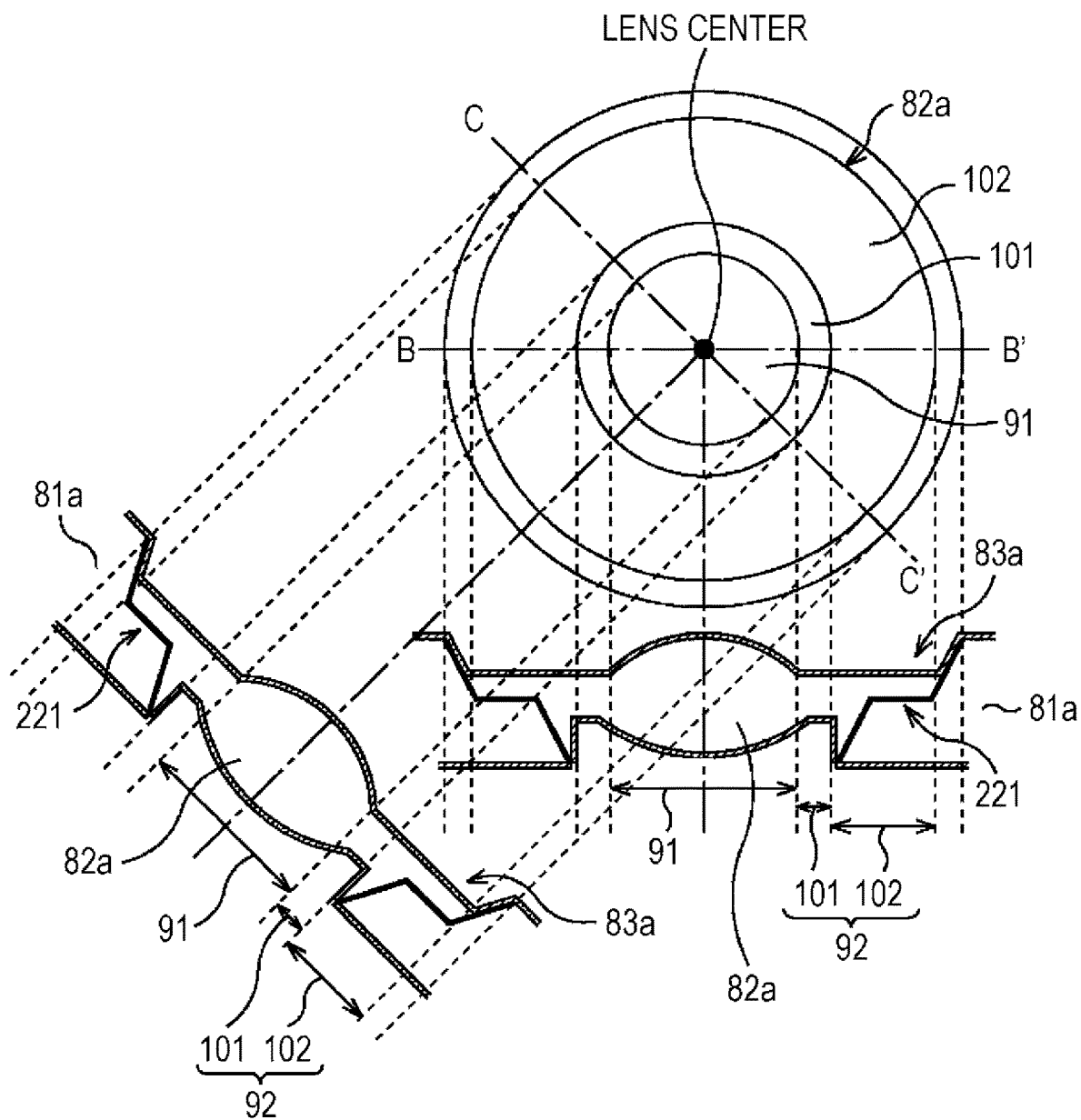
FIG. 28 is a diagram illustrating the lens attached substrate manufacturing method.

FIG. 28 illustrates a top view and cross-sectional views of the carrier substrate 81a and the lens resin portion 82a of the lens attached substrate 41a in a state where the through-hole 83a includes the step portion 221 and the through-hole 83a has a circular planar shape.

The cross-sectional views of the lens attached substrate 41a of FIG. 28 indicate the cross-sectional views taken along the lines B-B' and C-C' of the top view.

When the through-hole 83a has a circular planar shape, the cross-sectional shape of the through-hole 83a is naturally the same regardless of the diametrical direction. In addition, the cross-sectional shapes of the outer edge of the lens resin portion 82a, the arm portion 101, and the leg portion 102 are the same regardless of the diametrical direction.

The through-hole 83a having a step shape of FIG. 28 has an operation or effect in which a contact area between the leg portion 102 of the carrying portion 92 of the lens resin portion 82 and the side wall of the through-hole 83a can be increased compared with the through-hole 83a of FIG. 14 that does not include the step portion 221 inside the through-hole 83a. Accordingly, there is an operation or effect in which the adhesion strength between the lens resin portion 82 and the side wall of the through-hole 83a, that is, the adhesion strength between the lens resin portion 82a and the carrier substrate 81W is increased.

Figure 29:
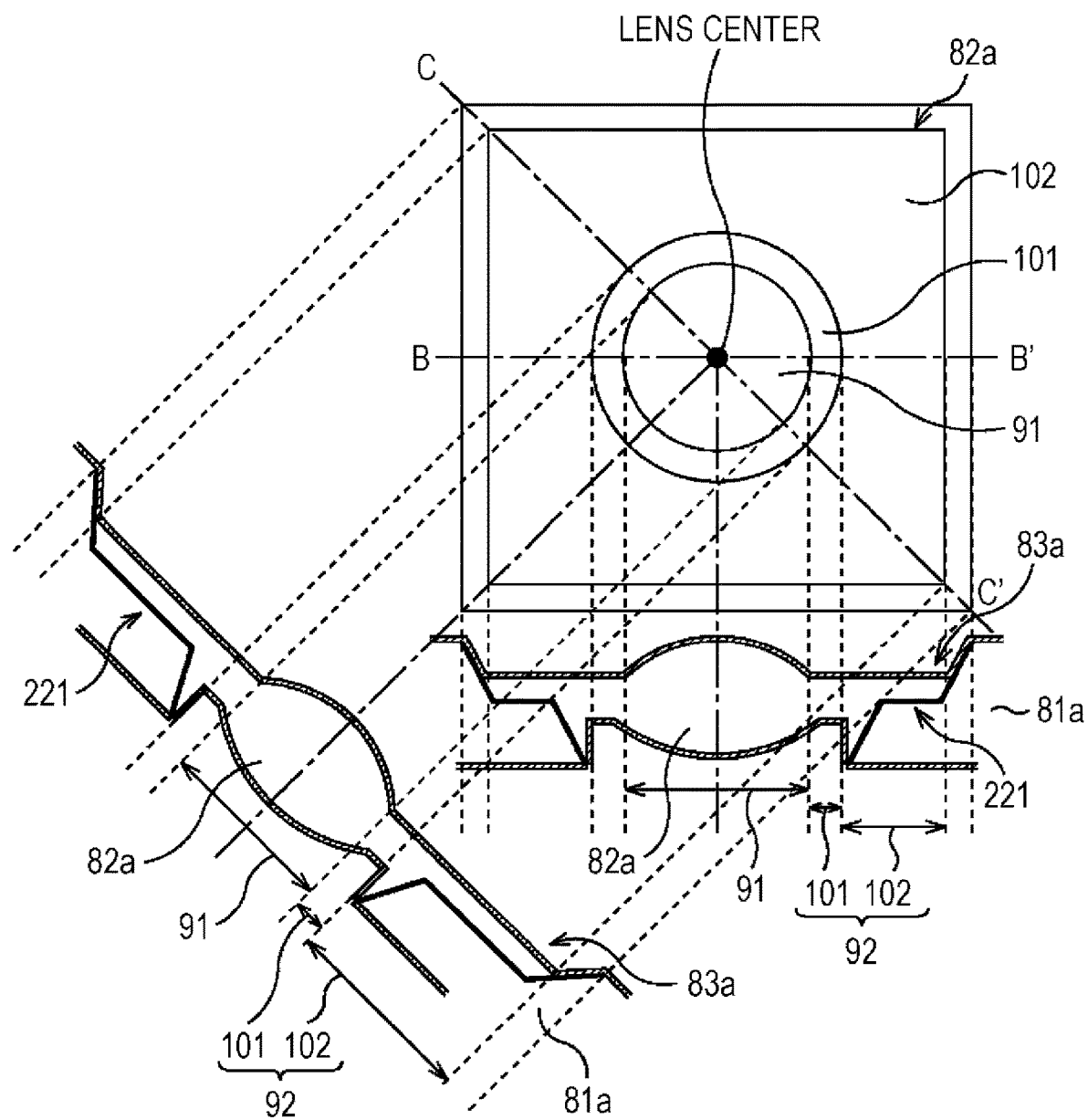
FIG. 29 is a diagram illustrating the lens attached substrate manufacturing method.

FIG. 29 illustrates a top view and cross-sectional views of the carrier substrate 81a and the lens resin portion 82a of the lens attached substrate 41a in a state where the through-hole 83a includes the step portion 221 and the through-hole 83a has a square planar shape.

The cross-sectional views of the lens attached substrate 41a of FIG. 29 indicate the cross-sectional views take along the lines B-B' and C-C' of the top view.

Each of the lens resin portion 82 and the through-hole 83 illustrated in FIG. 29 has the following structure.

(1) The length of the arm portion 101 disposed in the outer periphery of the lens portion 91 is the same in the side direction and the diagonal direction of the square.

(2) The length of the leg portion 102 disposed at the outside of the arm portion 101 and extending to the side wall of the through-hole 83a is set so that the length of the leg portion 102 in the diagonal direction of the square is longer than the length of the leg portion 102 in the side direction of the square.

As illustrated in FIG. 29, the leg portion 102 does not directly contact the lens portion 91 and the arm portion 101 directly contacts the lens portion 91.

The lens resin portion 82a of FIG. 29 can have an operation or effect in which the entire lens portion 91 is uniformly supported by a constant force while the length and the thickness of the arm portion 101 directly contacting the lens portion 91 are the same in the entire outer periphery of the lens portion 91 similarly to the lens resin portion 82a of FIG. 24.

In addition, since the entire lens portion 91 is uniformly supported by a constant force, it is possible to obtain an operation or effect in which a biased stress is suppressed from being non-uniformly applied to a specific part of the lens portion 91 in a manner such that a stress is uniformly transmitted to the entire lens portion 91, for example, when the stress is applied from the carrier substrate 81a surrounding the through-hole 83a to the entire outer periphery of the through-hole 83a.

In addition, the structure of the through-hole 83a of FIG. 29 has an operation or effect in which a contact area between the leg portion 102 of the carrying portion 92 of the lens resin portion 82a and the side wall of the through-hole 83a can be increased compared with the through-hole 83a of FIG. 24 or the like that does not include the step portion 221 inside the through-hole 83a. Accordingly, there is an operation or effect in which the adhesion strength between the lens resin portion 82a and the side wall of the through-hole 83a, that is, the adhesion strength between the lens resin portion 82a and the carrier substrate 81a increases.

<11. Direct Bonding Between Lens Attached Substrates>

Next, the direct bonding between the substrate-like lens attached substrates 41W provided with the plurality of lens attached substrates 41 will be described.

Figure 30:
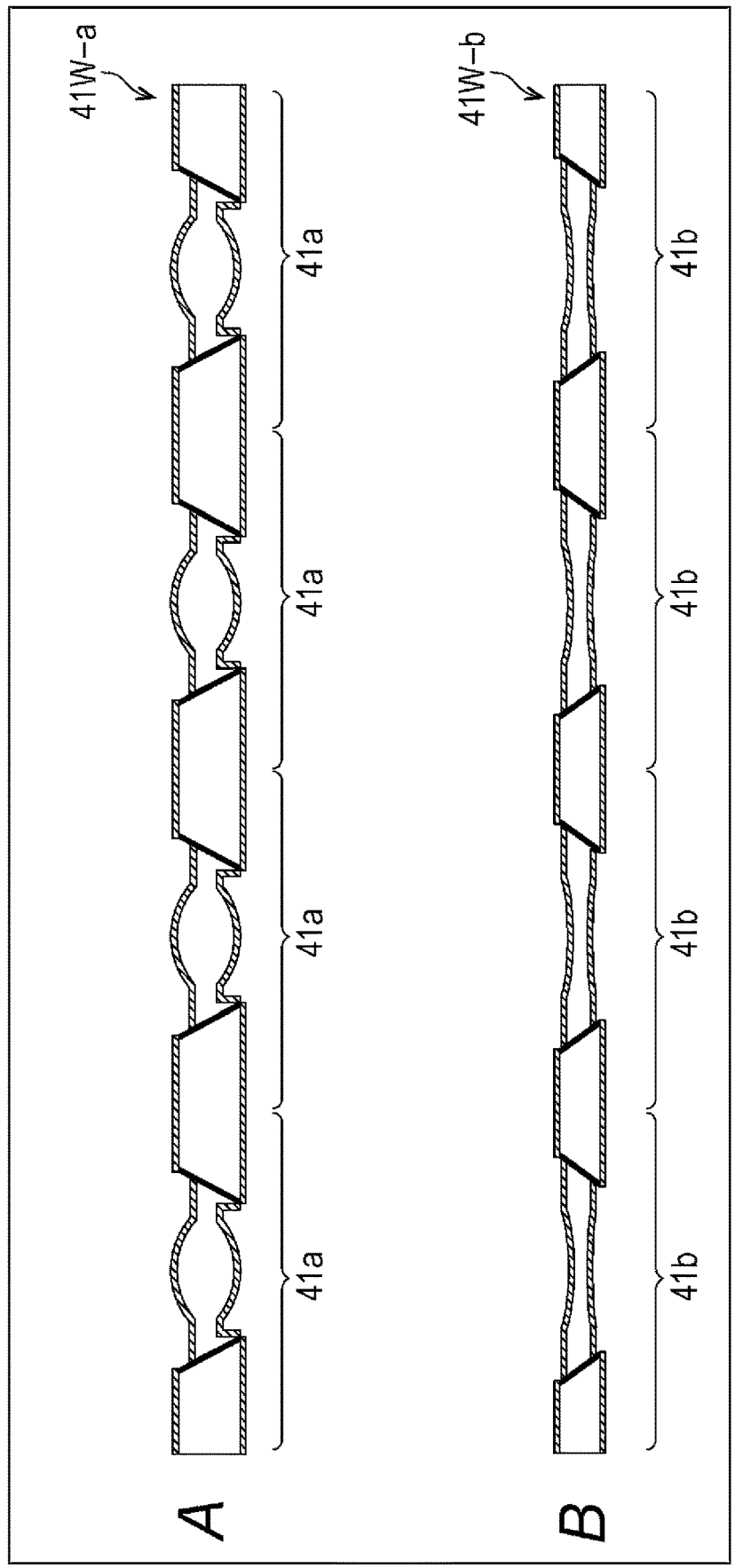
FIGS. 30A-B are diagrams illustrating a state where substrate-like lens attached substrates are bonded to each other.

In the description below, as illustrated in FIGS. 30A and 30B, the substrate-like lens attached substrate 41W provided with the plurality of lens attached substrates 41a will be referred to as a lens attached substrate 41W-a and the substrate-like lens attached substrate 41W provided with the plurality of lens attached substrates 41b will be referred to as a lens attached substrate 41W-b. The same also applies to the other lens attached substrates 41c to 41e.

Referring to FIGS. 31A and 31B, a method of directly bonding the substrate-like lens attached substrate 41W-a and the substrate-like lens attached substrate 41W-b to each other will be described.

In addition, in FIGS. 31A and 31B, a portion of the lens attached substrate 41W-b corresponding to the portion of the lens attached substrate 41W-a will be described by giving the same reference numeral as the lens attached substrate 41W-a thereto.

The upper surface layer 122 or 125 is formed on the upper surfaces of the lens attached substrate 41W-a and the lens attached substrate 41W-b. The lower surface layer 123 or 124 is formed on the lower surfaces of the lens attached substrate 41W-a and the lens attached substrate 41W-b. Then, as illustrated in FIG. 31A, a plasma activation process is performed on the entire lower surface including the rear surface flat portion 172 of the lens attached substrate 41W-a and the entire upper surface including the front surface flat portion 171 of the lens attached substrate 41W-b as the bonding surfaces of the lens attached substrates 41W-a and 41W-b. A gas used in the plasma activation process may be $O_2$, $N_2$, He, Ar, or $H_2$ as long as the plasma process can be performed. Here, when a gas having the same element as the upper surface layer 122 and the lower surface layer 123 is used as the gas used in the plasma activation process, a change in quality of the films of the upper surface layer 122 and the lower surface layer 123 can be desirably suppressed.

Then, as illustrated in FIG. 31B, the rear surface flat portion 172 of the lens attached substrate 41W-a is bonded to the front surface flat portion 171 of the lens attached substrate 41W-b while the surfaces are activated.

By the bonding process between the lens attached substrates, hydrogen binding occurs between the hydrogen of the OH group of the surface of the lower surface layer 123 or 124 of the lens attached substrate 41W-a and the hydrogen of the OH group of the surface of the upper surface layer 122 or 125 of the lens attached substrate 41W-b. Accordingly, the lens attached substrate 41W-a and the lens attached substrate 41W-b are fixed. A process of bonding the lens attached substrates to each other can be performed under the atmospheric pressure.

An annealing process is performed on the lens attached substrate 41W-a and the lens attached substrate 41W-b subjected to the bonding process. Accordingly, the dehydration condensation occurs in the binding state of the hydrogen of the OH group and covalent binding is formed through oxygen between the lower surface layer 123 or 124 of the lens attached substrate 41W-a and the upper surface layer 122 or 125 of the lens attached substrate 41W-b. Alternatively, covalent binding occurs between the element included in the lower surface layer 123 or 124 of the lens attached substrate 41W-a and the element included in the upper surface layer 122 or 125 of the lens attached substrate 41W-b. Due to the binding, two lens attached substrates are strongly fixed to each other. In this way, the covalent binding is formed between the lower surface layer 123 or 124 of the upper lens attached substrate 41W and the upper surface layer 122 or 125 of the lower lens attached substrate 41W so that two lens attached substrates 41W are fixed to each other. In the present specification, this will be referred to as the direct bonding. In the method of fixing the plurality of lens attached substrates in the entire substrates by the resin disclosed in PTL 1, there is a concern that the resin may be curably shrunk or thermally expanded and hence the lens may be deformed. On the contrary, since the direct bonding of the present technology does not use the resin when the plurality of lens attached substrates 41W is fixed, there is an operation or effect in which the plurality of lens attached substrates 41W can be fixed without causing curable shrinkage or thermal expansion.

The annealing process can be also performed in the atmospheric pressure. The annealing process can be performed at the temperature equal to or higher than 100° C., 150° C., or 200° C. due to the dehydration condensation. Meanwhile, the annealing process can be performed at a temperature equal to or lower than 400° C., 350° C., or 300° C. from the viewpoint of protecting the energy curable resin 191 forming the lens resin portion 82 from heat or suppressing the degassing from the energy curable resin 191.

When the lens attached substrate 41W-a and the lens attached substrate 41W-b bonded to each other are returned to the environment of the atmospheric pressure in a state where the bonding process between the lens attached substrates 41W or the direct bonding process between the lens attached substrates 41W is performed in the condition other than the atmospheric pressure, a pressure difference occurs with respect to a space between the lens resin portion 82 and the lens resin portion 82 and the outside of the lens resin portion 82. Due to the pressure difference, a pressure is applied to the lens resin portion 82. Thus, there is a concern that the lens resin portion 82 is deformed.

When the bonding process between the lens attached substrates 41W or the direct bonding process between the lens attached substrates is performed in the condition of the atmospheric pressure, there is an operation or effect in which the deformation of the lens resin portion 82 which may be caused by the bonding performed in the condition other than the atmospheric pressure can be prevented.

Since it is possible to suppress the fluidity and the thermal expansion obtained, for example, when resin is used as an adhesive by performing the direct bonding, that is, the plasma bonding of the substrates subjected to a plasma activation process, it is possible to improve the positional accuracy when the lens attached substrate 41W-a and the lens attached substrate 41W-b are bonded to each other.

As described above, the upper surface layer 122 or the lower surface layer 123 is formed on the rear surface flat portion 172 of the lens attached substrate 41W-a and the front surface flat portion 171 of the lens attached substrate 41W-b. The upper surface layer 122 and the lower surface layer 123 can be easily directly bonded to each other due to the plasma activation process performed in advance. That is, the lower surface layer 123 formed on the rear surface flat portion 172 of the lens attached substrate 41W-a and the upper surface layer 122 formed on the front surface flat portion 171 of the lens attached substrate 41W-b are also used to improve the bonding strength.

Further, when the upper surface layer 122 or the lower surface layer 123 is formed as an oxide film, an influence of a change in quality of the film due to plasma ($O_2$) does not occur. For this reason, there is an effect in which a corrosion caused by the plasma is suppressed in the lens resin portion 82.

As described above, the substrate-like lens attached substrate 41W-a provided with the plurality of lens attached substrates 41a and the substrate-like lens attached substrate 41W-b provided with the plurality of lens attached substrates 41b are directly bonded after the surface activation process using plasma. That is, both substrates are bonded to each other by plasma bonding.

FIGS. 32A to 32F illustrate a first laminating method of laminating five lens attached substrates 41a to 41e corresponding to the layered lens structure 11 of FIG. 13 in the form of a substrate by using the method of bonding the substrate-like lens attached substrates 41W described by referring to FIGS. 31A and 31B.

Figure 32:
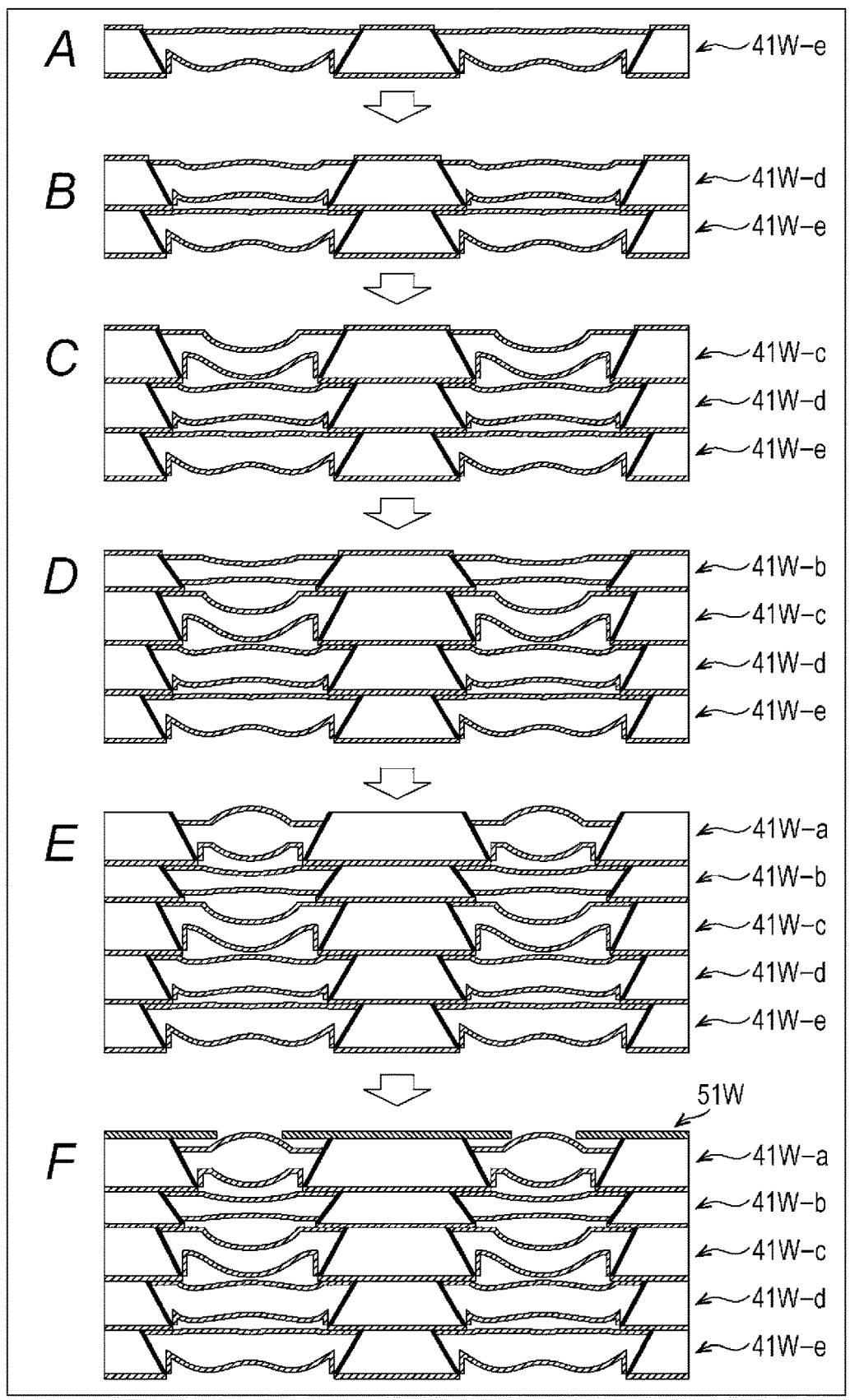
FIG. 32A-F are diagrams illustrating a first laminating method of laminating five lens attached substrates in the form of a substrate.

First, as illustrated in FIG. 32A, a substrate-like lens attached substrate 41W-e located at the lowermost layer of the layered lens structure 11 is prepared.

Next, as illustrated in FIG. 32B, a substrate-like lens attached substrate 41W-d located at the second layer position of the layered lens structure 11 from the downside is bonded onto the substrate-like lens attached substrate 41W-e.

Next, as illustrated in FIG. 32C, a substrate-like lens attached substrate 41W-c located at the third layer position of the layered lens structure 11 from the downside is bonded onto the substrate-like lens attached substrate 41W-d.

Next, as illustrated in FIG. 32D, the substrate-like lens attached substrate 41W-b located at the fourth layer position of the layered lens structure 11 from the downside is bonded onto the substrate-like lens attached substrate 41W-c.

Next, as illustrated in FIG. 32E, the substrate-like lens attached substrate 41W-a located at the fifth layer position of the layered lens structure 11 from the downside is bonded onto the substrate-like lens attached substrate 41W-b.

Finally, as illustrated in FIG. 32F, the diaphragm plate 51W located at the upper layer of the lens attached substrate 41a in the layered lens structure 11 is bonded onto the substrate-like lens attached substrate 41W-a.

As described above, it is possible to obtain the substrate-like layered lens structure 11W by sequentially laminating five lens attached substrates 41W-a to 41W-e provided in the form of a substrate in a direction from the lower lens attached substrate 41W of the layered lens structure 11 toward the upper lens attached substrate 41W thereof.

FIGS. 33A to 33F illustrate a second laminating method of laminating five lens attached substrates 41a to 41e corresponding to the layered lens structure 11 of FIG. 13 in the form of a substrate by using the method of bonding the substrate-like lens attached substrates 41W described by referring to FIGS. 31A and 31B.

Figure 33:
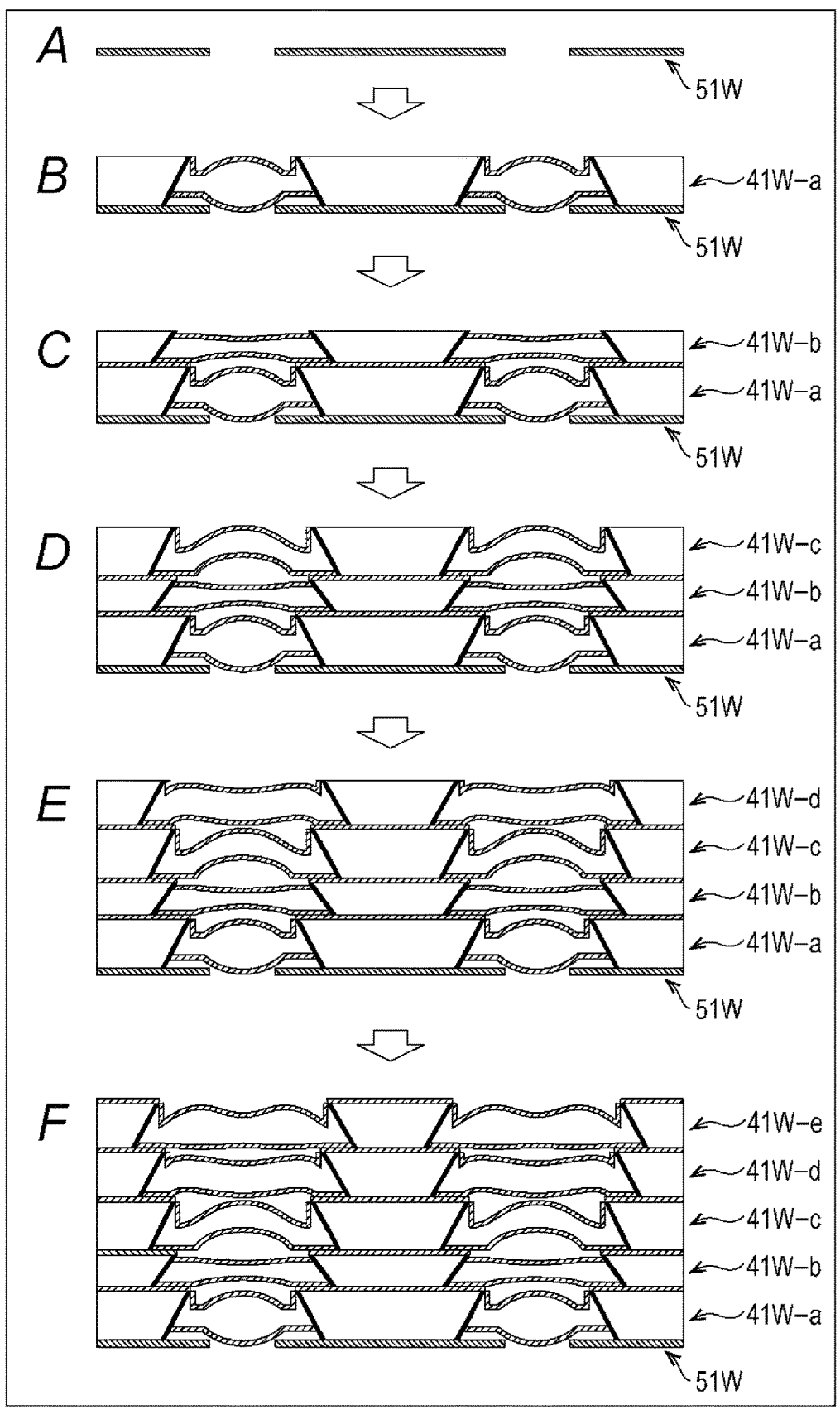
FIGS. 33A-F are diagrams illustrating a second laminating method of laminating five lens attached substrates in the form of a substrate.

First, as illustrated in FIG. 33A, the diaphragm plate 51W located at the upper layer of the lens attached substrate 41a in the layered lens structure 11 is prepared.

Next, as illustrated in FIG. 33B, the substrate-like lens attached substrate 41W-a located at the uppermost layer in the layered lens structure 11 is bonded onto the diaphragm plate 51W while being reversed upside down.

Next, as illustrated in FIG. 33C, the substrate-like lens attached substrate 41W-b located at the second layer position of the layered lens structure 11 from the upside is bonded onto the substrate-like lens attached substrate 41W-a while being reversed upside down.

Next, as illustrated in FIG. 33D, the substrate-like lens attached substrate 41W-c located at the third layer position of the layered lens structure 11 from the upside is bonded onto the substrate-like lens attached substrate 41W-b while being reversed upside down.

Next, as illustrated in FIG. 33E, the substrate-like lens attached substrate 41W-d located at the fourth layer position of the layered lens structure 11 from the upside is bonded onto the substrate-like lens attached substrate 41W-c while being reversed upside down.

Finally, as illustrated in FIG. 33F, the substrate-like lens attached substrate 41W-e located at the fifth layer position of the layered lens structure 11 from the upside is bonded onto the substrate-like lens attached substrate 41W-d while being reversed upside down.

As described above, it is possible to obtain the substrate-like layered lens structure 11W by sequentially laminating five lens attached substrates 41W-a to 41W-e provided in the form of a substrate in a direction from the upper lens attached substrate 41W of the layered lens structure 11 toward the lower lens attached substrate 41W thereof.

Since five lens attached substrates 41W-a to 41W-e laminated by the laminating method described in FIGS. 32A to 32F or 33A to 33F are divided into the unit of a module or a chip by the use of a blade or a laser, the layered lens structure 11 in which five lens attached substrates 41a to 41e are laminated is obtained.

12. Eighth and Ninth Embodiments of Camera Module

Figure 34:
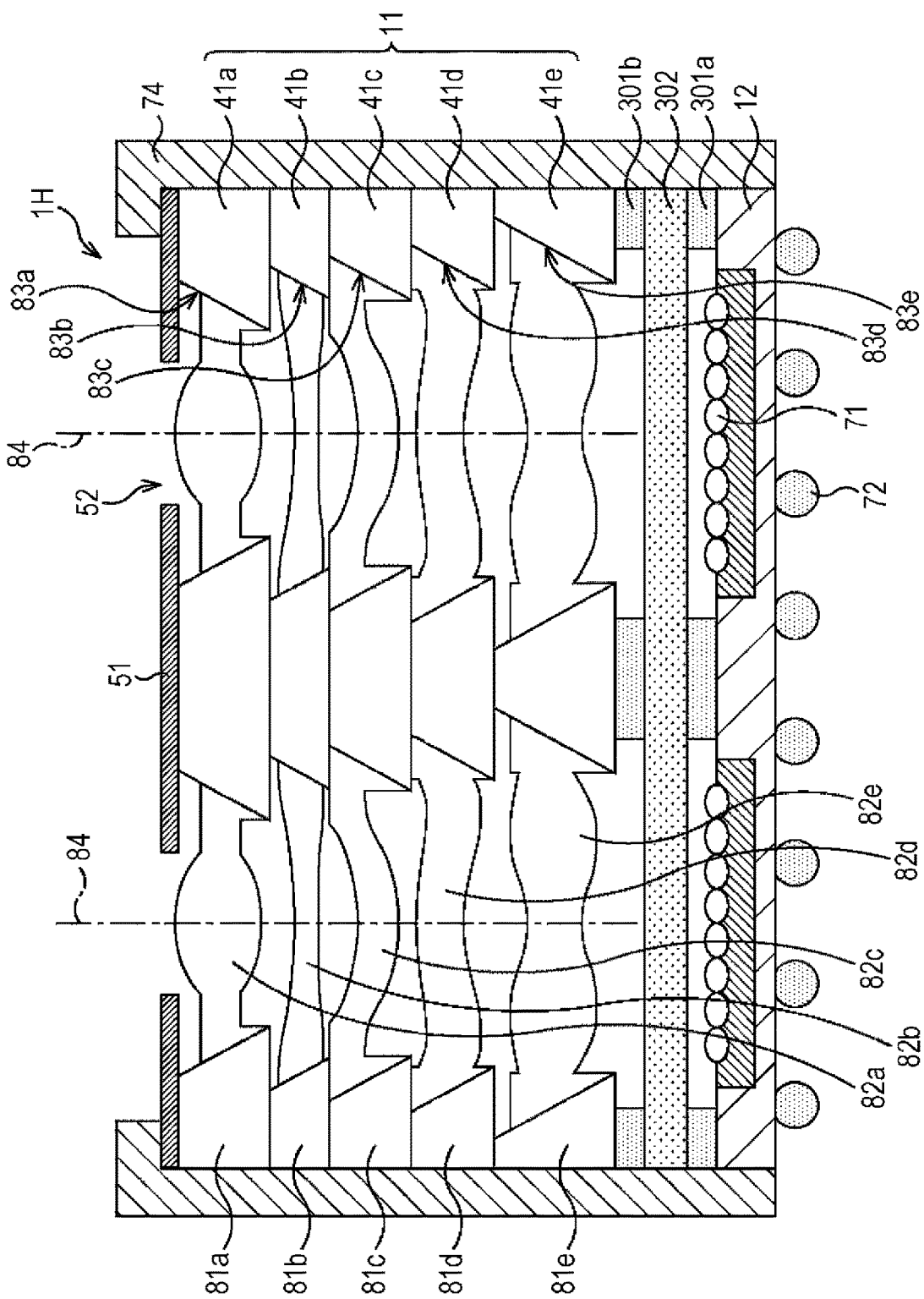
FIG. 34 is a diagram illustrating an eighth embodiment of a camera module that uses a layered lens structure according to an embodiment of the present technology.

FIG. 34 is a diagram illustrating an eighth embodiment of a camera module that uses a layered lens structure according to an embodiment of the present technology.

Figure 35:
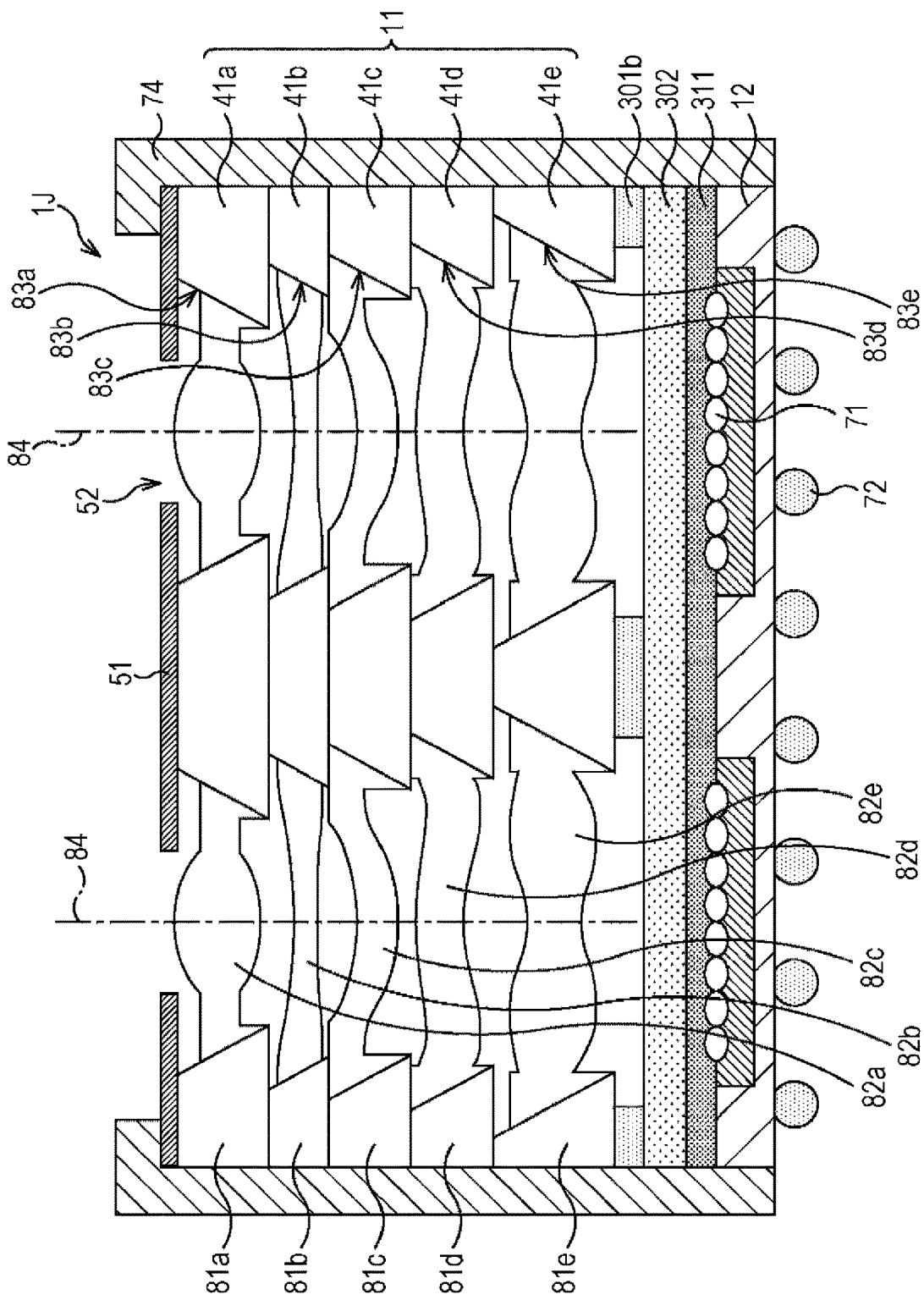
FIG. 35 is a diagram illustrating a ninth embodiment of a camera module that uses a layered lens structure according to an embodiment of the present technology.

FIG. 35 is a diagram illustrating a ninth embodiment of a camera module that uses a layered lens structure according to an embodiment of the present technology.

In the description of FIGS. 34 and 35, the differences from the camera module E illustrated in FIG. 13 will be described.

A camera module 1H of FIG. 34 and a camera module 1J of FIG. 35 have a configuration in which the portion of the structure material 73 of the camera module E illustrated in FIG. 13 is replaced by a different portion.

In the camera module 1H of FIG. 34, the portion of the structure material 73 of the camera module 1J is replaced by structure materials 301a and 301b and an optical transparent substrate 302.

Specifically, a structure material 301a is disposed in a part of the upper side of the light receiving element 12. The light receiving element 12 and the optical transparent substrate 302 are fixed through the structure material 301a. The structure material 301a is, for example, an epoxy resin.

A structure material 301b is disposed at the upper side of the optical transparent substrate 302. The optical transparent substrate 302 and the layered lens structure 11 are fixed through the structure material 301b. The structure material 301b is, for example, an epoxy resin.

On the contrary, in the camera module 1J of FIG. 35, the portion of the structure material 301a of the camera module 1H of FIG. 34 is replaced by a resin layer 311 having an optical transparent property.

The resin layer 311 is disposed at the entire upper surface of the light receiving element 12. The light receiving element 12 and the optical transparent substrate 302 are fixed through the resin layer 311. The resin layer 311 disposed at the entire upper surface of the light receiving element 12 has an operation or effect in which a stress is distributed in the entire surface of the light receiving element 12 while the stress applied from the upper side of the optical transparent substrate 302 to the optical transparent substrate 302 is not intensively applied to a part of an area of the light receiving element 12.

The structure material 301b is disposed at the upper side of the optical transparent substrate 302. The optical transparent substrate 302 and the layered lens structure 11 are fixed through the structure material 301b.

The camera module 1H of FIG. 34 and the camera module 1J of FIG. 35 include the optical transparent substrate 302 at the upper side of the light receiving element 12. The optical transparent substrate 302 has an operation or effect in which the damage of the light receiving element 12 is suppressed during, for example, the manufacturing process of the camera module 1H or 1J.

13. Tenth Embodiment of Camera Module

Figure 36:
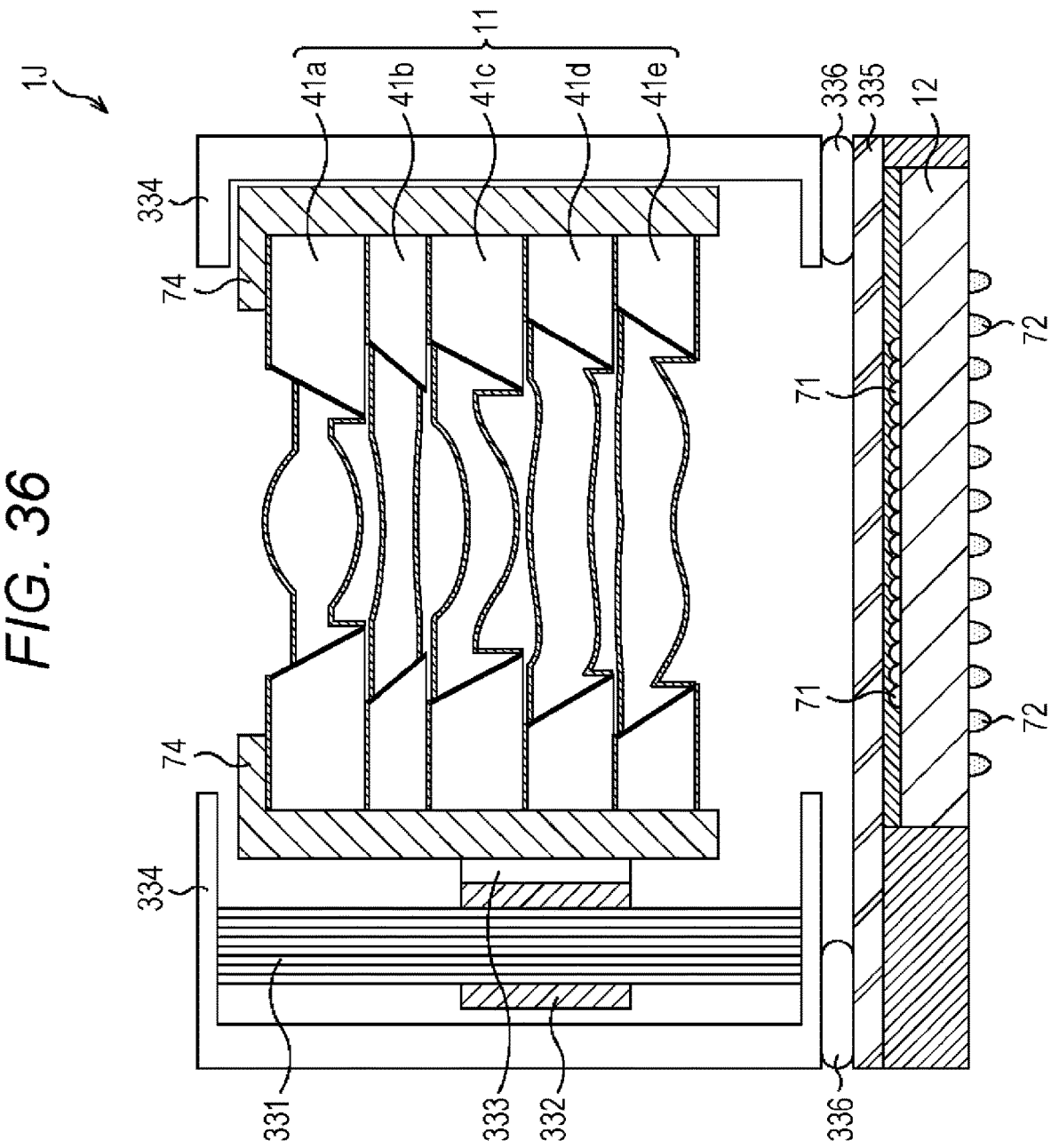
FIG. 36 is a diagram illustrating a tenth embodiment of a camera module that uses a layered lens structure according to an embodiment of the present technology.

FIG. 36 is a diagram illustrating a tenth embodiment of a camera module that uses a layered lens structure according to an embodiment of the present technology.

In the camera module 1J illustrated in FIG. 36, the layered lens structure 11 is received in a lens barrel 74. The lens barrel 74 is fixed to a moving member 332 moving along a shaft 331 by a fixed member 333. When the lens barrel 74 is moved in the axial direction of the shaft 331 by a driving motor (not illustrated), a distance from the layered lens structure 11 to the imaging surface of the light receiving element 12 is adjusted.

The lens barrel 74, the shaft 331, the moving member 332, and the fixed member 333 are received in a housing 334. A protection substrate 335 is disposed at the upper portion of the light receiving element 12 and the protection substrate 335 and the housing 334 are connected to each other by an adhesive 336.

A mechanism for moving the layered lens structure 11 has an operation or effect in which an auto focusing operation can be performed when a camera using the camera module 1J captures an image.

14. Eleventh Embodiment of Camera Module

Figure 37:
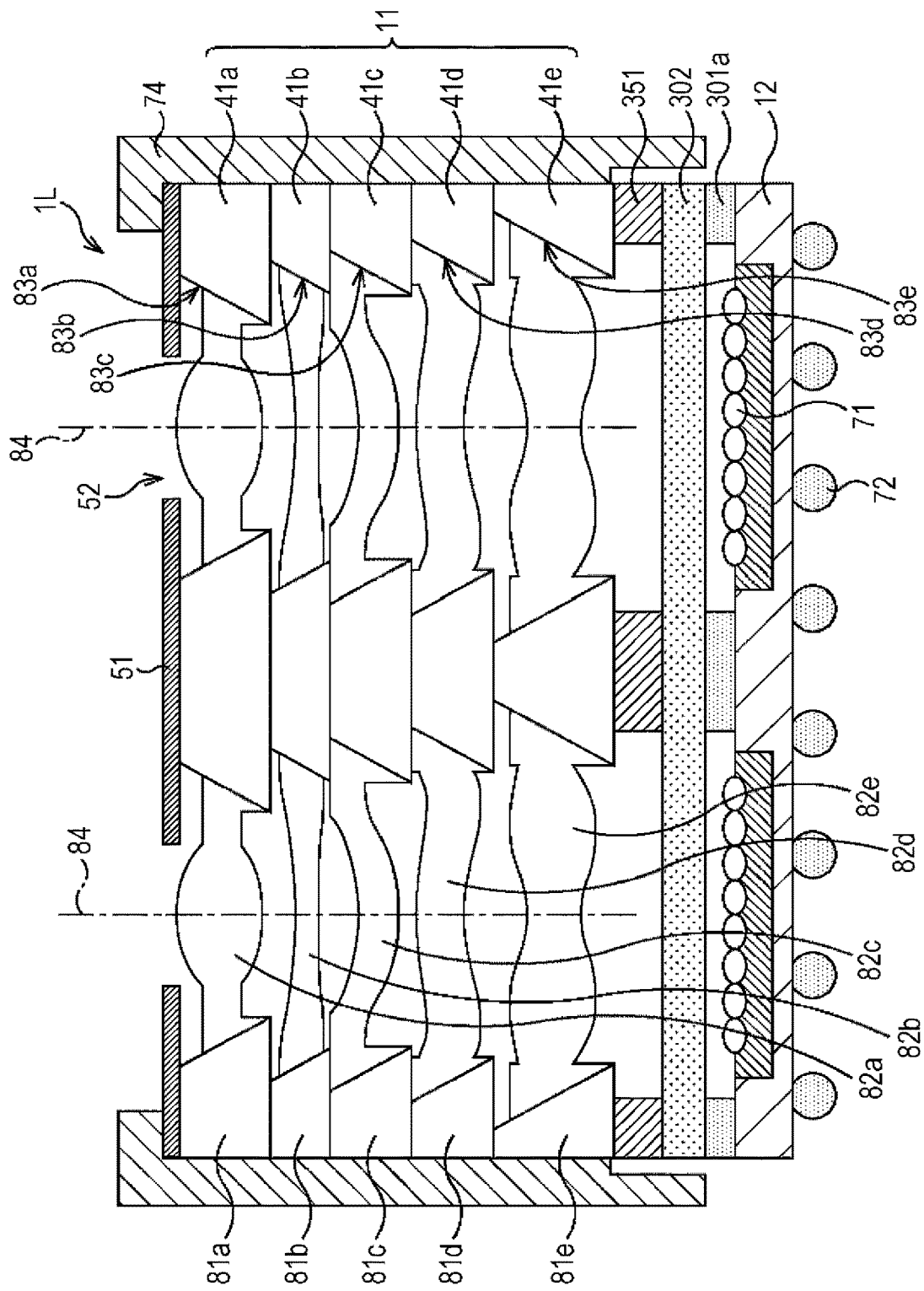
FIG. 37 is a diagram illustrating an eleventh embodiment of a camera module that uses a layered lens structure according to an embodiment of the present technology.

FIG. 37 is a diagram illustrating an eleventh embodiment of a camera module that uses a layered lens structure according to an embodiment of the present technology.

A camera module 1L of FIG. 37 is a camera module additionally including a focus adjustment mechanism configured as a piezoelectric element.

That is, in the camera module 1L, the structure material 301a is disposed in a part of the upper side of the light receiving element 12 similarly to the camera module 1H of FIG. 34. The light receiving element 12 and the optical transparent substrate 302 are fixed through the structure material 301a. The structure material 301a is, for example, an epoxy resin.

A piezoelectric element 351 is disposed at the upper side of the optical transparent substrate 302. The optical transparent substrate 302 and the layered lens structure 11 are fixed through the piezoelectric element 351.

In the camera module 1L, the layered lens structure 11 can be moved in the up and down direction in a manner such that a voltage is applied or not applied to the piezoelectric element 351 disposed at the lower side of the layered lens structure 11. The manner of moving the layered lens structure 11 is not limited to the piezoelectric element 351 and the other device of which the shape changes in accordance with whether the voltage is applied or not. For example, a MEMS device can be used.

A mechanism moving the layered lens structure 11 has an operation or effect in which the auto focusing operation can be performed when a camera using the camera module 1L captures an image.

15. Effect of Present Structure Compared with Different Structure

The layered lens structure 11 is a structure (hereinafter, referred to as the present structure) fixing the lens attached substrates 41 to each other by direct bonding. The operation and the effect of the present structure will be described based on the comparison with the other structure of the lens attached substrate provided with the lens.

Comparative Structure Example 1

Figure 38:
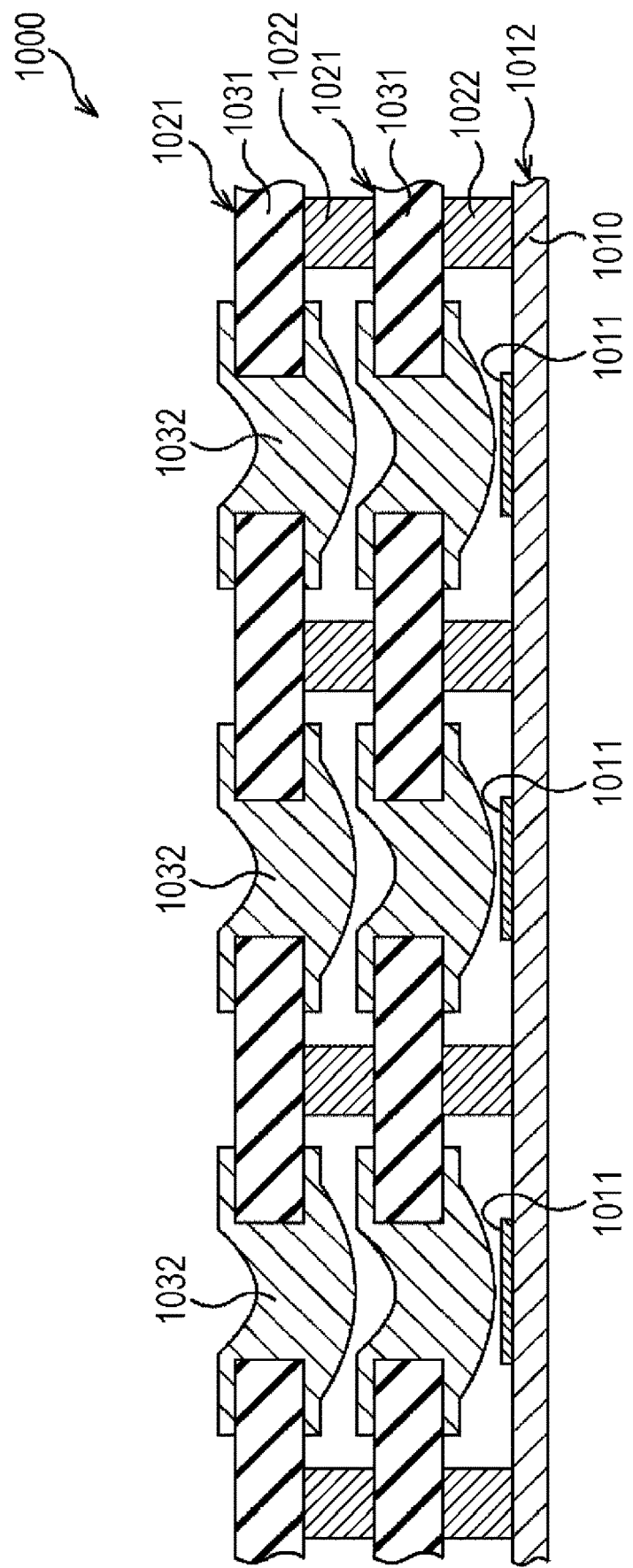
FIG. 38 is a cross-sectional view of a wafer level lamination structure as Comparative Structure Example 1.

FIG. 38 is a cross-sectional view of a wafer level lamination structure which is a first substrate structure (hereinafter, referred to as Comparative Structure Example 1) used to be compared with the present structure and is disclosed as FIG. 14B in JP 2011-138089 A (hereinafter, referred to as Comparative Literature 1).

A wafer level lamination structure 1000 illustrated in FIG. 38 has a structure in which two lens array substrates 1021 are laminated on a sensor array substrate 1012 in which a plurality of image sensors 1011 is disposed on a wafer substrate 1010 through a columnar spacer 1022. Each lens array substrate 1021 includes a lens attached substrate 1031 and a lens 1032 which is formed in a plurality of through-hole portions provided in the lens attached substrate 1031.

Comparative Structure Example 2

Figure 39:
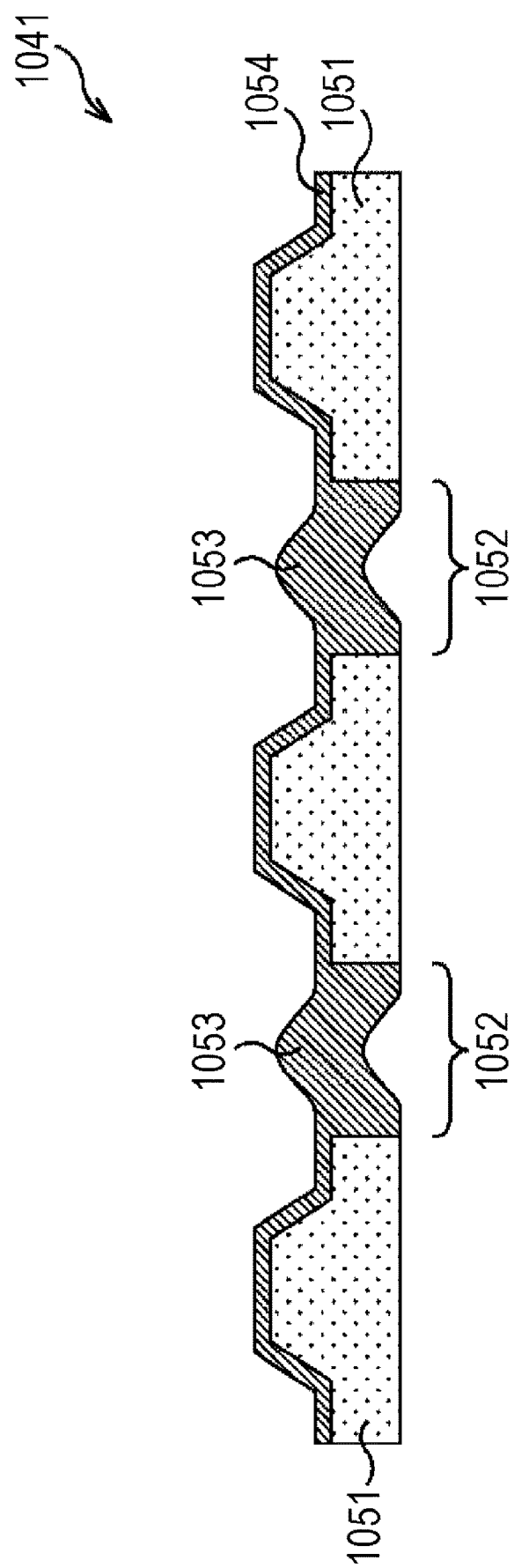
FIG. 39 is a cross-sectional view of a lens array substrate as Comparative Structure Example 2.

FIG. 39 is a cross-sectional view of a lens array substrate which is a second substrate structure (hereinafter, referred to as Comparative Structure Example 2) used to be compared with the present structure and is disclosed as FIG. 5A in JP 2009-279790 A (hereinafter, referred to as Comparative Literature 2).

In a lens array substrate 1041 illustrated in FIG. 39, a lens 1053 is provided in each of a plurality of through-holes 1052 provided in a plate-like substrate 1051. Each lens 1053 is formed of a resin (energy curable resin) 1054 and the resin 1054 is also formed on the upper surface of the substrate 1051.

Referring to FIGS. 40A to 40C, a method of manufacturing the lens array substrate 1041 of FIG. 39 will be simply described.

FIG. 40A illustrates a state where the substrate 1051 provided with the plurality of through-holes 1052 is placed on a lower die 1061. The lower die 1061 is a mold that presses the resin 1054 in a direction from the downside toward the upside in the subsequent steps.

FIG. 40B illustrates a state where the resin 1054 is applied into the plurality of through-holes 1052 and onto the upper surface of the substrate 1051, an upper die 1062 is disposed on the substrate 1051, and the resin is press-molded by the upper die 1062 and the lower die 1061. The upper die 1062 is a mold that presses the resin 1054 in a direction from the upside toward the downside. In the state illustrated in FIG. 40B, the resin 1054 is cured.

FIG. 40C illustrates a state where the upper die 1062 and the lower die 1061 are separated from the cured resin 1054 and the lens array substrate 1041 is completed.

The lens array substrate 1041 has the following characteristic points. (1) The resin 1054 formed at the position of the through-hole 1052 of the substrate 1051 is formed as the lens 1053 and the lens 1053 is formed at a plurality of positions of the substrate 1051. (2) The resin 1054 is formed as a thin layer on the entire upper surface of the substrate 1051 located among the plurality of lenses 1053.

In the case of the structure in which the lens array substrates 1041 are laminated, there is an operation or effect in which a thin layer of the resin 1054 formed on the entire upper surface of the substrate 1051 serves as an adhesive used to bond the substrates to each other.

Further, in the case of the structure in which the lens array substrates 1041 are laminated, an area for bonding the substrates can be increased compared with the wafer level lamination structure 1000 of FIG. 38 as Comparative Structure Example 1 and hence the substrates can be bonded to each other by the stronger force.

<Action of Resin of Comparative Structure Example 2>

In Comparative Literature 2 in which the lens array substrate 1041 of FIG. 39 as Comparative Structure Example 2 is disclosed, the following actions of the resin 1054 as the lens 1053 are disclosed.

In Comparative Structure Example 2, an energy curable resin is used as the resin 1054. Then, a light curable resin is used as an example of the energy curable resin. When the light curable resin is used as the energy curable resin, the resin 1054 is cured when the resin 1054 is irradiated with UV light. Due to the curing operation, the resin 1054 is cured and shrunk.

However, according to the structure of the lens array substrate 1041 of FIG. 39, since the substrate 1051 is interposed between the plurality of lenses 1053 even when the resin 1054 is cured and shrunk, a change in distance between the lenses 1053 caused by the curable shrinkage of the resin 1054 can be broken. Accordingly, the curved state of the lens array substrate 1041 provided with the plurality of lenses 1053 can be suppressed.

Comparative Structure Example 3

Figure 41:
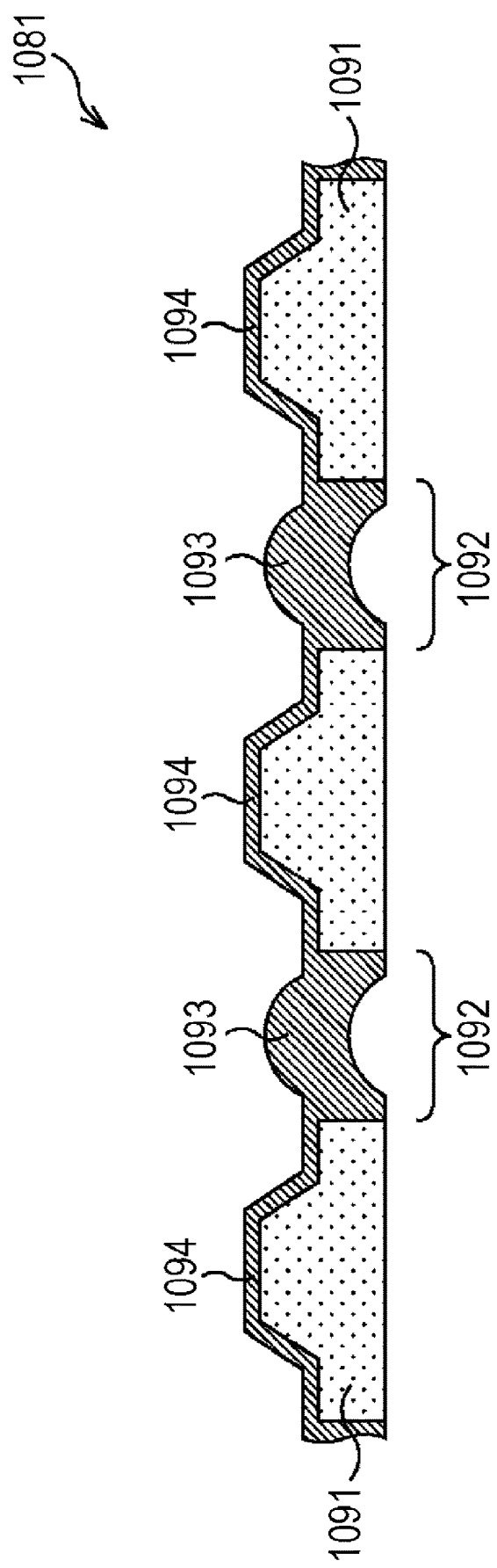
FIG. 41 is a cross-sectional view of a lens array substrate as Comparative Structure Example 3.

FIG. 41 is a cross-sectional view of a lens array substrate which is a third substrate structure (hereinafter, referred to as Comparative Structure Example 3) used to be compared with the present structure and is disclosed as FIG. 1 in JP 2010-256563 A (hereinafter, referred to as Comparative Literature 3).

In a lens array substrate 1081 illustrated in FIG. 41, a lens 1093 is provided in each of a plurality of through-holes 1092 provided in a plate-like substrate 1091. Each lens 1093 is formed of a resin (energy curable resin) 1094 and the resin 1094 is also formed on the upper surface of the substrate 1091 without the through-hole 1092.

Referring to FIGS. 42A to 42C, a method of manufacturing the lens array substrate 1081 of FIG. 41 will be simply described.

FIG. 42A illustrates a state where the substrate 1091 provided with the plurality of through-holes 1092 is placed on a lower die 1101. The lower die 1101 is a mold that presses the resin 1094 in a direction from the downside toward the upside in the subsequent steps.

FIG. 42B illustrates a state where the resin 1094 is applied into the plurality of through-holes 1092 and onto the upper surface of the substrate 1091, an upper die 1102 is disposed on the substrate 1091, and the resin is press-molded by the use of the upper die 1102 and the lower die 1101. The upper die 1102 is a mold that presses the resin 1094 in a direction from the upside toward the downside. In the state illustrated in FIG. 42B, the resin 1094 is cured.

FIG. 42C illustrates a state where the upper die 1102 and the lower die 1101 are separated from the cured resin 1094 and the lens array substrate 1081 is completed.

The lens array substrate 1081 has the following characteristic points. (1) The resin 1094 formed at the position of the through-hole 1092 of the substrate 1091 is formed as the lens 1093 and the lens 1093 is formed at a plurality of positions of the substrate 1091. (2) The resin 1094 is formed as a thin layer on the entire upper surface of the substrate 1091 located among the plurality of lenses 1093.

<Action of Resin of Comparative Structure Example 3>

In Comparative Literature 3 in which the lens array substrate 1081 of FIG. 41 as Comparative Structure Example 3 is disclosed, the following actions of the resin 1094 as the lens 1093 are disclosed.

In Comparative Structure Example 3, an energy curable resin is used as the resin 1094. Then, a light curable resin is used as an example of the energy curable resin. When the light curable resin is used as the energy curable resin, the resin 1094 is cured when the resin 1094 is irradiated with UV light. Due to the curing operation, the resin 1094 is cured and shrunk.

However, according to the structure of the lens array substrate 1081 of FIG. 41, it is possible to break a change in distance between the lenses 1093 due to the curable shrinkage of the resin 1094 since the substrate 1091 is interposed among the plurality of lenses 1093 even when the resin 1094 is cured and shrunk. Accordingly, it is possible to suppress the curved state of the lens array substrate 1081 provided with the plurality of lenses 1093.

As described above, Comparative Literature 2 and 3 disclose the curable shrinkage occurring when the light curable resin is cured. Further, the curable shrinkage occurring when the light curable resin is cured is also disclosed in, for example, JP 2013-1091 A other than Comparative Literature 2 and 3.

Further, a problem in which the resin is cured and shrunk when the resin is molded in a lens shape and the molded resin is cured is not limited to the case of the light curable resin. For example, even in the case of the thermally curable resin as a kind of the energy curable resin, a problem arises in that the resin is cured and shrunk in the cured state similarly to the light curable resin. This problem is also disclosed in, for example, Comparative Literature 1 or 3 and JP 2010-204631 A.

Comparative Structure Example 4

Figure 43:
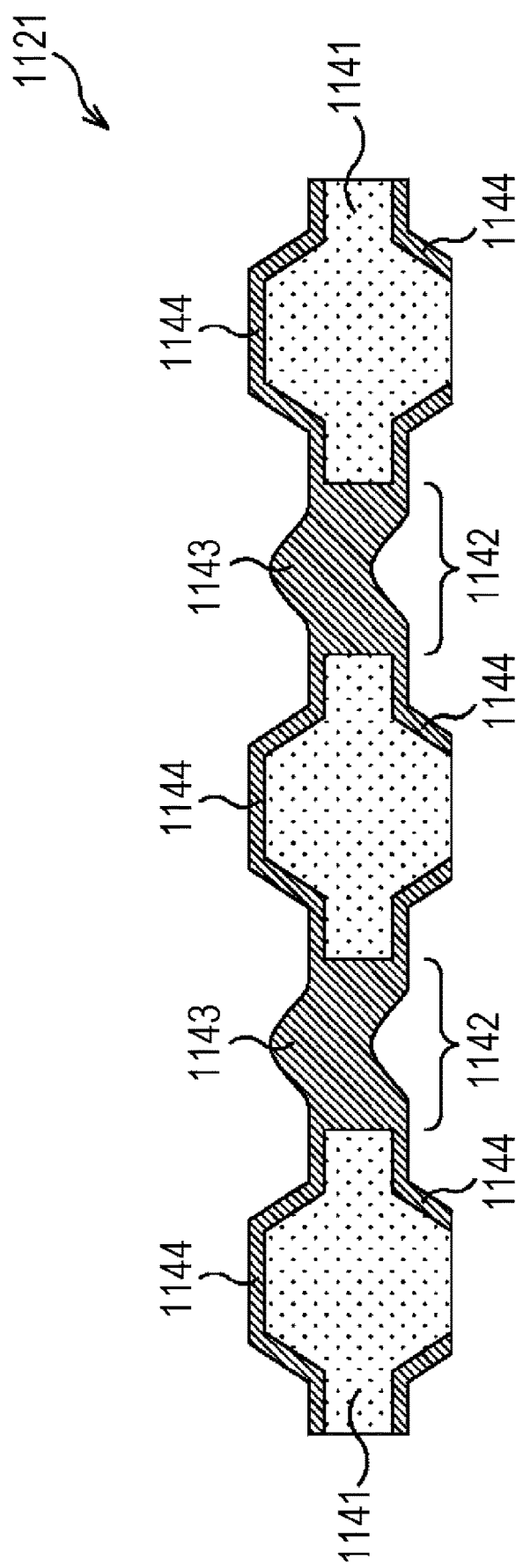
FIG. 43 is a cross-sectional view of a lens array substrate as Comparative Structure Example 4.

FIG. 43 is a cross-sectional view of a lens array substrate which is a fourth substrate structure (hereinafter, referred to as Comparative Structure Example 4) used to be compared with the present structure and is disclosed as FIG. 6 in Comparative Literature 2.

A lens array substrate 1121 of FIG. 43 is different from the lens array substrate 1041 illustrated in FIG. 39 in that the shape of the substrate 1141 other than the portion of the through-hole 1042 protrudes in both the upward and downward directions and resin 1144 is formed in a part of the lower surface of the substrate 1141. The other configuration of the lens array substrate 1121 is similar to that of the lens array substrate 1041 illustrated in FIG. 39.

Figure 44:
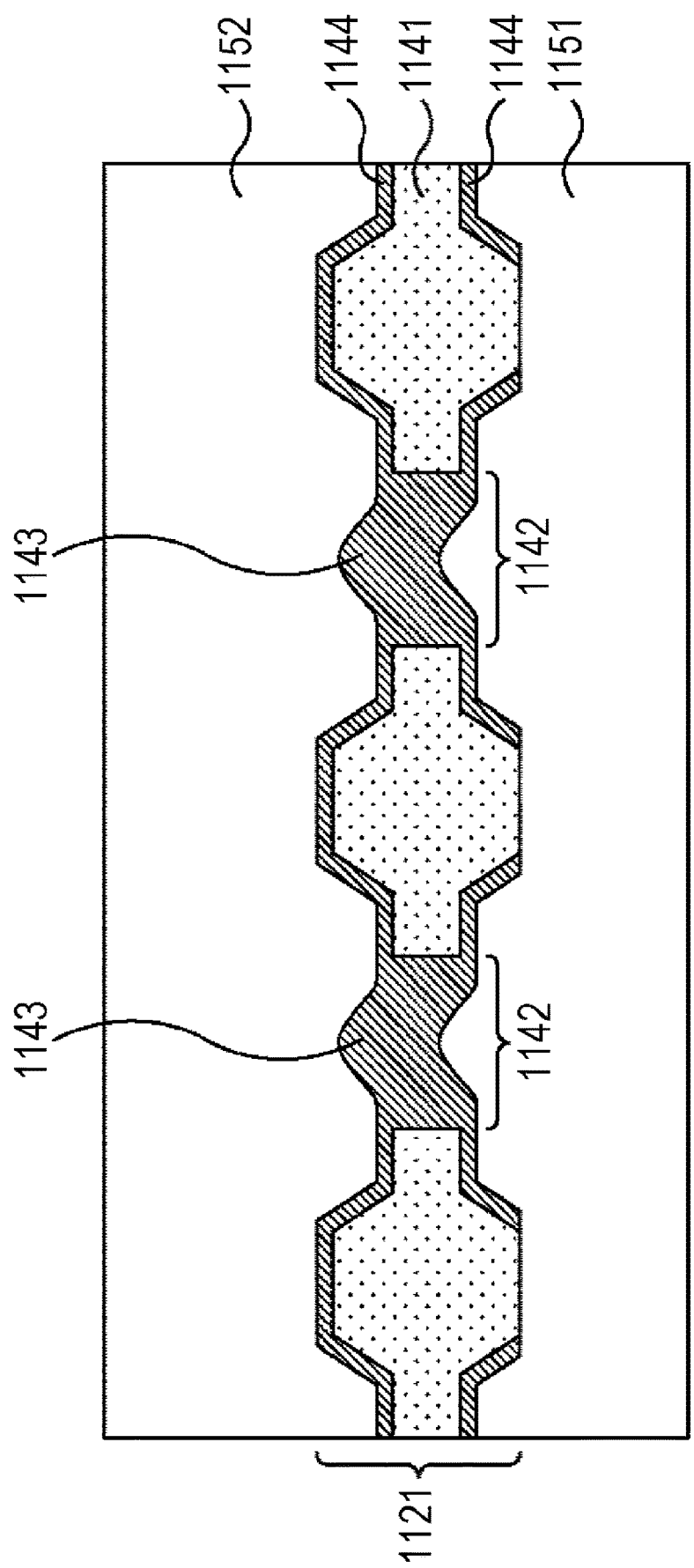
FIG. 44 is a diagram illustrating a method of manufacturing the lens array substrate of FIG. 43.

FIG. 44 is a diagram illustrating a method of manufacturing the lens array substrate 1121 of FIG. 43 and is a diagram corresponding to FIG. 40B.

FIG. 44 illustrates a state where the resin 1144 is applied into the plurality of through-holes 1142 and onto the upper surface of the substrate 1141 and is press-molded by the upper die 1152 and the lower die 1151. The resin 1144 is also injected between the lower surface of the substrate 1141 and the lower die 1151. In the state illustrated in FIG. 44, the resin 1144 is cured.

The lens array substrate 1121 has the following characteristic points. (1) The resin 1144 formed at the position of the through-hole 1142 of the substrate 1141 is formed as a lens 1143 and the lens 1143 is formed at a plurality of positions of the substrate 1141. (2) The resin 1144 is formed as a thin layer on a part of the lower surface of the substrate 1141 as well as the entire upper surface of the substrate 1141 located among the plurality of lenses 1143.

<Action of Resin of Comparative Structure Example 4>

In Comparative Literature 2 in which the lens array substrate 1121 of FIG. 43 as Comparative Structure Example 4 is disclosed, the following actions of the resin 1144 as the lens 1143 are disclosed.

Even in the lens array substrate 1121 of FIG. 43 as Comparative Structure Example 4, the light curable resin as an example of the energy curable resin is used as the resin 1144. Then, when the resin 1144 is irradiated with UV light, the resin 1144 is cured. Due to the curing operation, the resin 1144 is cured and shrunk similarly to Comparative Structure Examples 2 and 3.

However, in the lens array substrate 1121 of Comparative Structure Example 4, the resin 1144 is formed as a thin layer on a predetermined area of the lower surface of the substrate 1141 as well as the entire upper surface of the substrate 1141 located among the plurality of lenses 1143.

In this way, when the resin 1144 is formed on both upper and lower surfaces of the substrate 1141, the curved direction of the entire lens array substrate 1121 can be offset.

On the contrary, in the lens array substrate 1041 illustrated in FIG. 39 as Comparative Structure Example 2, the resin 1054 is formed as a thin layer on the entire upper surface of the substrate 1051 located among the plurality of lenses 1053, but a thin layer of the resin 1054 is not formed on the lower surface of the substrate 1051.

Thus, according to the lens array substrate 1121 of FIG. 43, it is possible to provide a lens array substrate of which the curved amount is smaller than that of the lens array substrate 1041 of FIG. 39.

Comparative Structure Example 5

Figure 9:
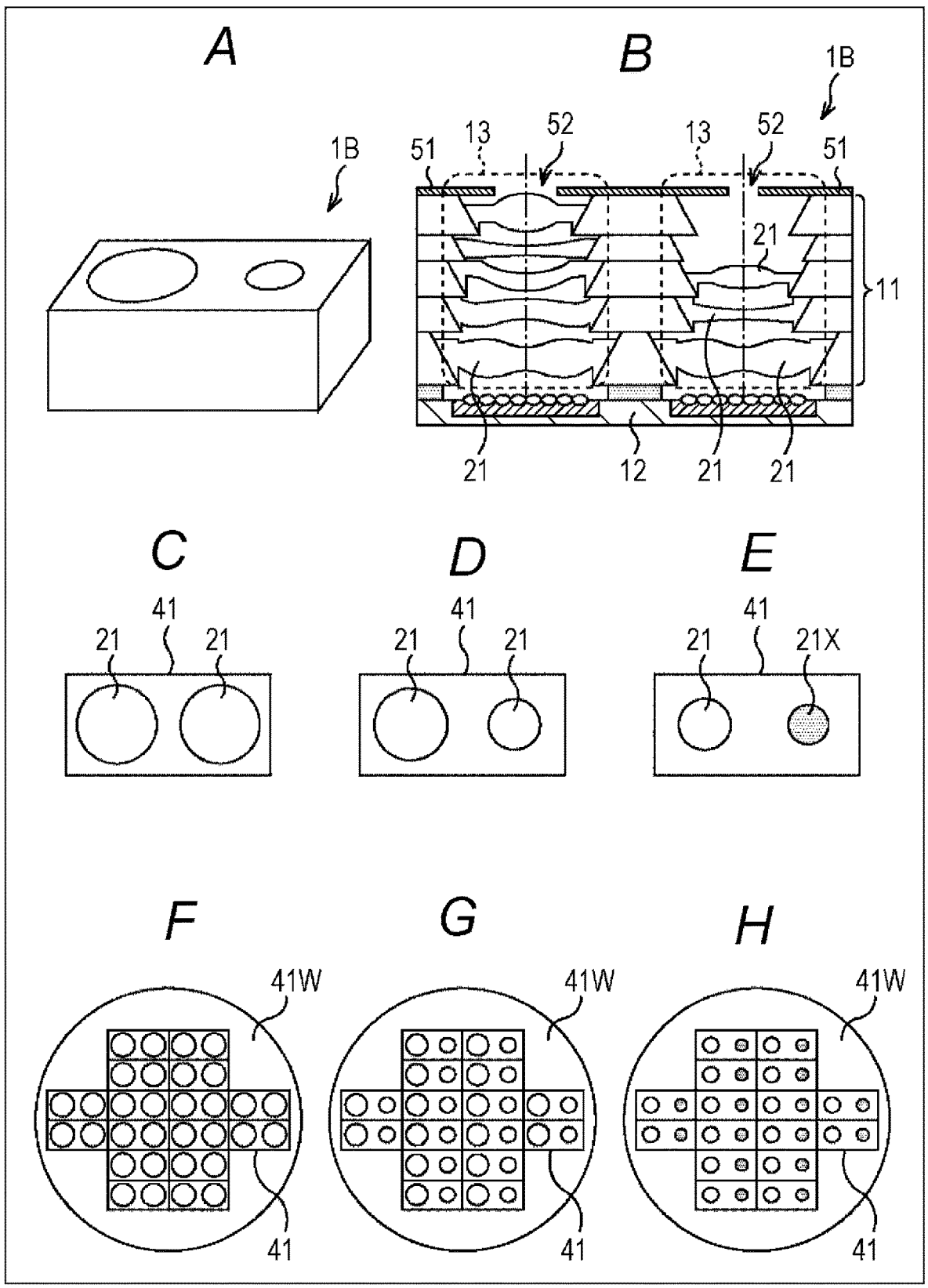
FIGS. 9A-H are diagrams illustrating a second embodiment of a camera module that uses a layered lens structure according to an embodiment of the present technology.
Figure 45:
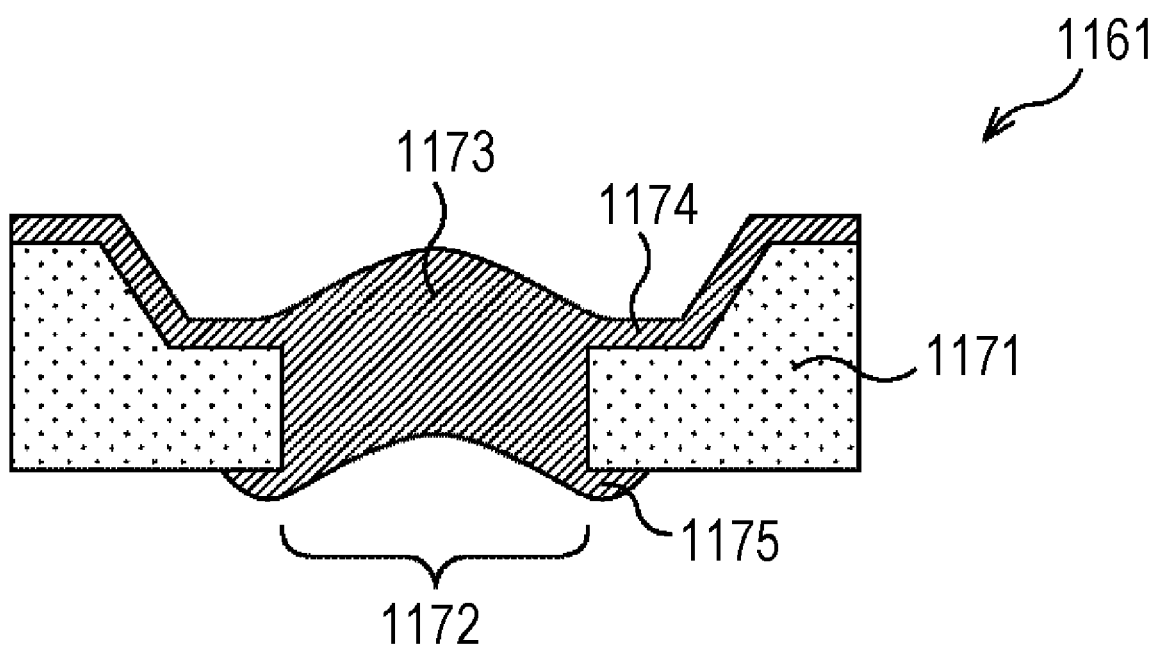
FIG. 45 is a cross-sectional view of a lens array substrate as Comparative Structure Example 5.

FIG. 45 is a cross-sectional view of a lens array substrate which is a fifth substrate structure (hereinafter, referred to as Comparative Structure Example 5) used to be compared with the present structure and is disclosed as FIG. 9 of Comparative Literature 2.

A lens array substrate 1161 of FIG. 45 is different from the lens array substrate 1041 illustrated in FIG. 39 in that the rear surface of the substrate in the vicinity of a through-hole 1172 provided in a substrate 1171 is provided with a resin visible area 1175. The other configuration of the lens array substrate 1161 is similar to that of the lens array substrate 1041 illustrated in FIG. 39.

In addition, the lens array substrate 1161 of FIG. 45 is divided.

The lens array substrate 1161 has the following characteristic points. (1) Resin 1174 formed at the position of the through-hole 1172 of the substrate 1171 is formed as a lens 1173 and the lens 1173 is formed at a plurality of positions of the substrate 1171. (2) The resin 1174 is formed as a thin layer on a part of the lower surface of the substrate 1171 as well as the entire upper surface of the substrate 1171 located among the plurality of lenses 1173.

<Action of Resin of Comparative Structure Example 5>

In Comparative Literature 2 in which the lens array substrate 1161 of FIG. 45 as Comparative Structure Example 5 is disclosed, the following actions of the resin 1174 as the lens 1173 are disclosed.

Even in the lens array substrate 1161 of FIG. 45 as Comparative Structure Example 5, the light curable resin as an example of the energy curable resin is used as the resin 1174. Then, when the resin 1174 is irradiated with UV light, the resin 1174 is cured. Due to the curing operation, the resin 1174 is cured and shrunk similarly to Comparative Structure Examples 2 and 3.

However, in the lens array substrate 1171 of Comparative Structure Example 5, the resin 1174 is formed as a thin layer (the resin visible area 1175) on a predetermined area of the lower surface of the substrate 1171 as well as the entire upper surface of the substrate 1171 located among the plurality of lenses 1173. Accordingly, it is possible to provide the lens array substrate in which the curved direction of the entire lens array substrate 1171 is offset and the curved amount is further decreased.

<Comparison of Action of Resin of Comparative Structure Examples 2 to 5>

In Comparative Structure Examples 2 to 5, the action of the resin is summarized as below.

(1) The substrate provided with the plurality of lenses is curved in the case of the structure in which the resin layer is disposed on the entire upper surface of the lens array substrate similarly to Comparative Structure Examples 2 and 3.

FIGS. 46A to 46C are diagrams schematically illustrating a structure in which a resin layer is disposed on the entire upper surface of the lens array substrate similarly to Comparative Structure Examples 2 and 3 and is a diagram illustrating the action of the resin as the lens.

As illustrated in FIGS. 46A and 46B, a curable shrinkage occurs due to the irradiation with UV light for a curing operation on the layer of a light curable resin 1212 disposed on an upper surface of a lens array substrate 1211 (where a lens and a through-hole are not illustrated). Accordingly, force in the shrinkage direction caused by the light curable resin 1212 occurs within the layer of the light curable resin 1212.

Meanwhile, the lens array substrate 1211 is not shrunk and expanded even when the substrate is irradiated with UV light. That is, a force caused by the substrate does not occur in the lens array substrate 1211. As a result, the lens array substrate 1211 is curved downward as illustrated in FIG. 46C.

(2) However, since the curved direction of the lens array substrate is offset in the case of the structure in which the resin layer is disposed on both upper and lower surfaces of the lens array substrate similarly to Comparative Structure Examples 4 and 5, the curved amount of the lens array substrate can be decreased compared with Comparative Structure Examples 2 and 3.

FIGS. 47A to 47C are diagrams schematically illustrating a structure in which a resin layer is disposed on both upper and lower surfaces of the lens array substrate similarly to Comparative Structure Examples 4 and 5 and is a diagram illustrating the action of the resin as the lens.

As illustrated in FIGS. 47A and 47B, a curable shrinkage occurs due to the irradiation with UV light for a curing operation on the layer of the light curable resin 1212 disposed on the upper surface of the lens array substrate 1211. Accordingly, force in the shrinkage direction caused by the light curable resin 1212 occurs within the layer of the light curable resin 1212 disposed on the upper surface of the lens array substrate 1211. For this reason, a force of curving the lens array substrate 1211 downward in a convex shape is exerted on the upper surface side of the lens array substrate 1211.

On the contrary, the lens array substrate 1211 is not shrunk and expanded even when the substrate is irradiated with UV light. That is, a force caused by the substrate does not occur in the lens array substrate 1211.

Meanwhile, a curable shrinkage occurs due to the irradiation with UV light for a curing operation on the layer of the light curable resin 1212 disposed on the lower surface of the lens array substrate 1211. Accordingly, force in the shrinkage direction caused by the light curable resin 1212 occurs within the layer of the light curable resin 1212 disposed on the lower surface of the lens array substrate 1211. For this reason, a force of curving the lens array substrate 1211 upward in a convex shape is exerted at the lower surface side of the lens array substrate 1211.

A force of curving the lens array substrate 1211 downward in a convex shape at the upper surface side of the lens array substrate 1211 and a force of curving the lens array substrate 1211 upward in a convex shape at the lower surface side of the lens array substrate 1211 are exerted so as to be offset.

As a result, as illustrated in FIG. 47C, the curved amount of the lens array substrate 1211 of Comparative Structure Examples 4 and 5 becomes smaller than the curved amount of Comparative Structure Examples 2 and 3 illustrated in FIG. 46C.

As described above, the lens array substrate curving force and the lens array substrate curved amount are influenced by the relative relation between (1) the direction and the degree of the force acting on the lens array substrate at the upper surface of the lens array substrate, and (2) the direction and the degree of the force acting on the lens array substrate at the lower surface of the lens array substrate.

Comparative Structure Example 6

Here, for example, as illustrated in FIG. 48A, a lens array substrate structure is considered in which the layer and the area of the light curable resin 1212 disposed at the upper surface of the lens array substrate 1211 and the layer and the area of the light curable resin 1212 disposed at the lower surface of the lens array substrate 1211 are the same. The lens array substrate structure will be referred to as a sixth substrate structure (hereinafter, referred to as Comparative Structure Example 6) used to be compared with the present structure.

In Comparative Structure Example 6, force in the shrinkage direction caused by the light curable resin 1212 is exerted in the layer of the light curable resin 1212 disposed on the upper surface of the lens array substrate 1211. A force caused by the substrate does not occur in the lens array substrate 1211. For this reason, a force of curving the lens array substrate 1211 downward in a convex shape is exerted at the upper surface side of the lens array substrate 1211.

Meanwhile, force in the shrinkage direction caused by the light curable resin 1212 occurs in the layer of the light curable resin 1212 disposed on the lower surface of the lens array substrate 1211. A force caused by the substrate does not occur in the lens array substrate 1211. For this reason, a force of curving the lens array substrate 1211 upward in a convex shape is exerted at the lower surface side of the lens array substrate 1211.

Two forces of curving the lens array substrate 1211 are exerted in a direction in which the forces can be further offset compared with the structure illustrated in FIG. 47A. As a result, the force of curving the lens array substrate 1211 and the curved amount of the lens array substrate 1211 are further decreased compared with Comparative Structure Examples 4 and 5.

Comparative Structure Example 7

Incidentally, the lens attached substrates constituting the layered lens structure assembled to the camera module actually do not have the same shape. More specifically, there is a case in which the plurality of lens attached substrates constituting the layered lens structure may have, for example, a difference in the thickness of the lens attached substrate or the size of the through-hole or a difference in the thickness, the shape, or the volume of the lens formed in the through-hole. More specifically, there is also a case in which the film thickness or the like of the light curable resin formed on the upper and lower surfaces of the lens attached substrate may be different in each lens attached substrate.

Figure 49:
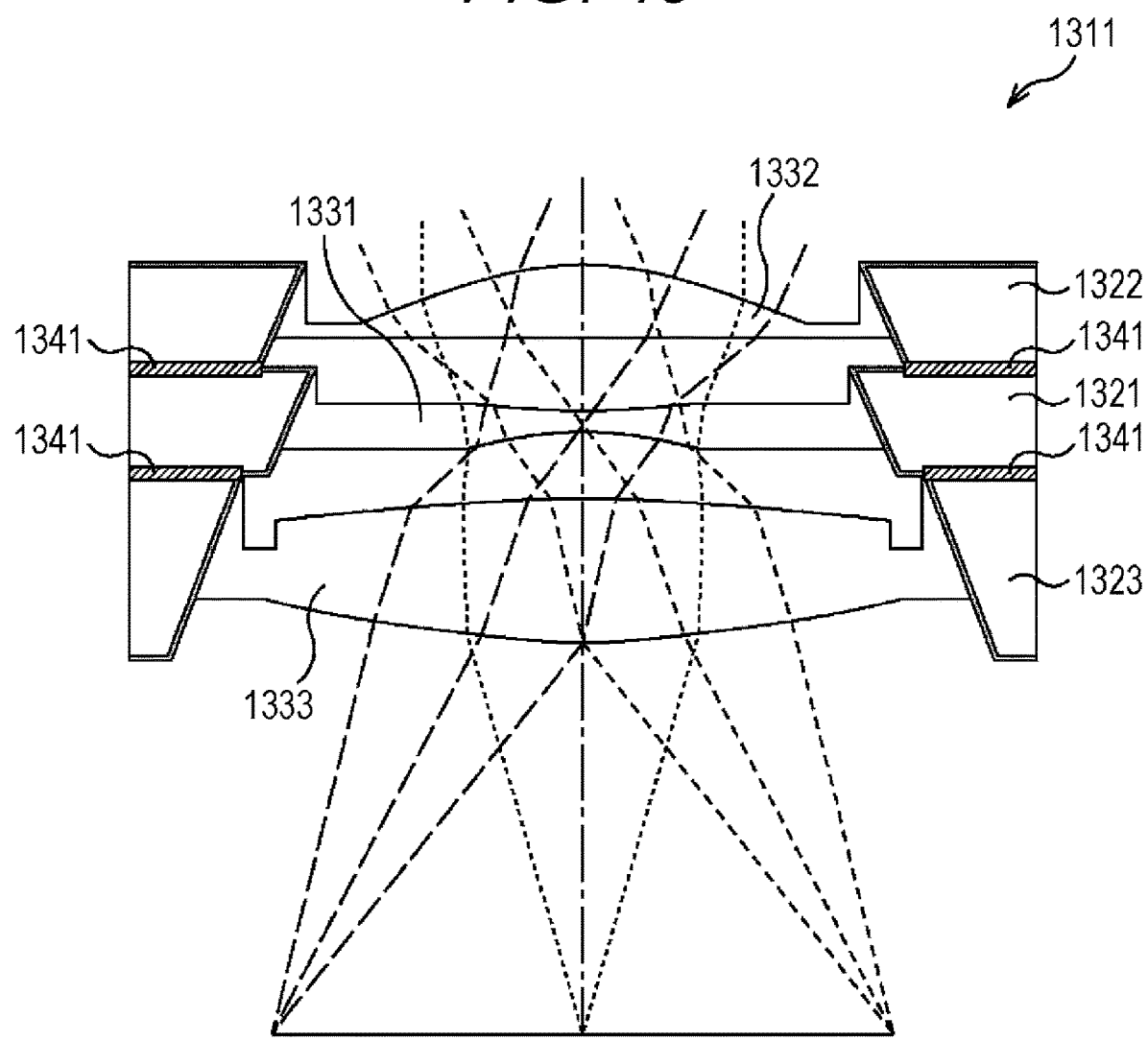
FIG. 49 is a cross-sectional view of a layered lens structure as Comparative Structure Example 7.

FIG. 49 is a cross-sectional view of a layered lens structure in which three lens attached substrates are laminated as a seventh substrate structure (hereinafter, referred to as Comparative Structure Example 7). In the layered lens structure, it is assumed that the layer and the area of the light curable resin disposed on the upper and lower surfaces of each lens attached substrate are the same similarly to Comparative Structure Example 6 illustrated in FIGS. 48A to 48C.

A layered lens structure 1311 illustrated in FIG. 49 includes three lens attached substrates 1321 to 1323.

In the description below, the middle lens attached substrate 1321 of three lens attached substrates 1321 to 1323 will be referred to as the first lens attached substrate 1321, the uppermost lens attached substrate 1322 will be referred to as the second lens attached substrate 1322, and the lowermost lens attached substrate 1323 will be referred to as the third lens attached substrate 1323.

The second lens attached substrate 1322 disposed at the uppermost layer and the third lens attached substrate 1323 disposed at the lowermost layer have a different substrate thickness and a different lens thickness.

More specifically, the thickness of the lens of the third lens attached substrate 1323 is larger than that of the second lens attached substrate 1322. Accordingly, the thickness of the substrate of the third lens attached substrate 1323 is larger than that of the second lens attached substrate 1322.

Resin 1341 is formed on the entire contact surface between the first lens attached substrate 1321 and the second lens attached substrate 1322 and the entire contact surface between the first lens attached substrate 1321 and the third lens attached substrate 1323.

The cross-sectional shape of the through-hole of each of three lens attached substrates 1321 to 1323 is a so-called downward widened shape in which the lower surface of the substrate is wider than the upper surface of the substrate.

Referring to FIGS. 50A to 50D, an effect obtained by three lens attached substrates 1321 to 1323 having different shapes will be described.

Figure 50:
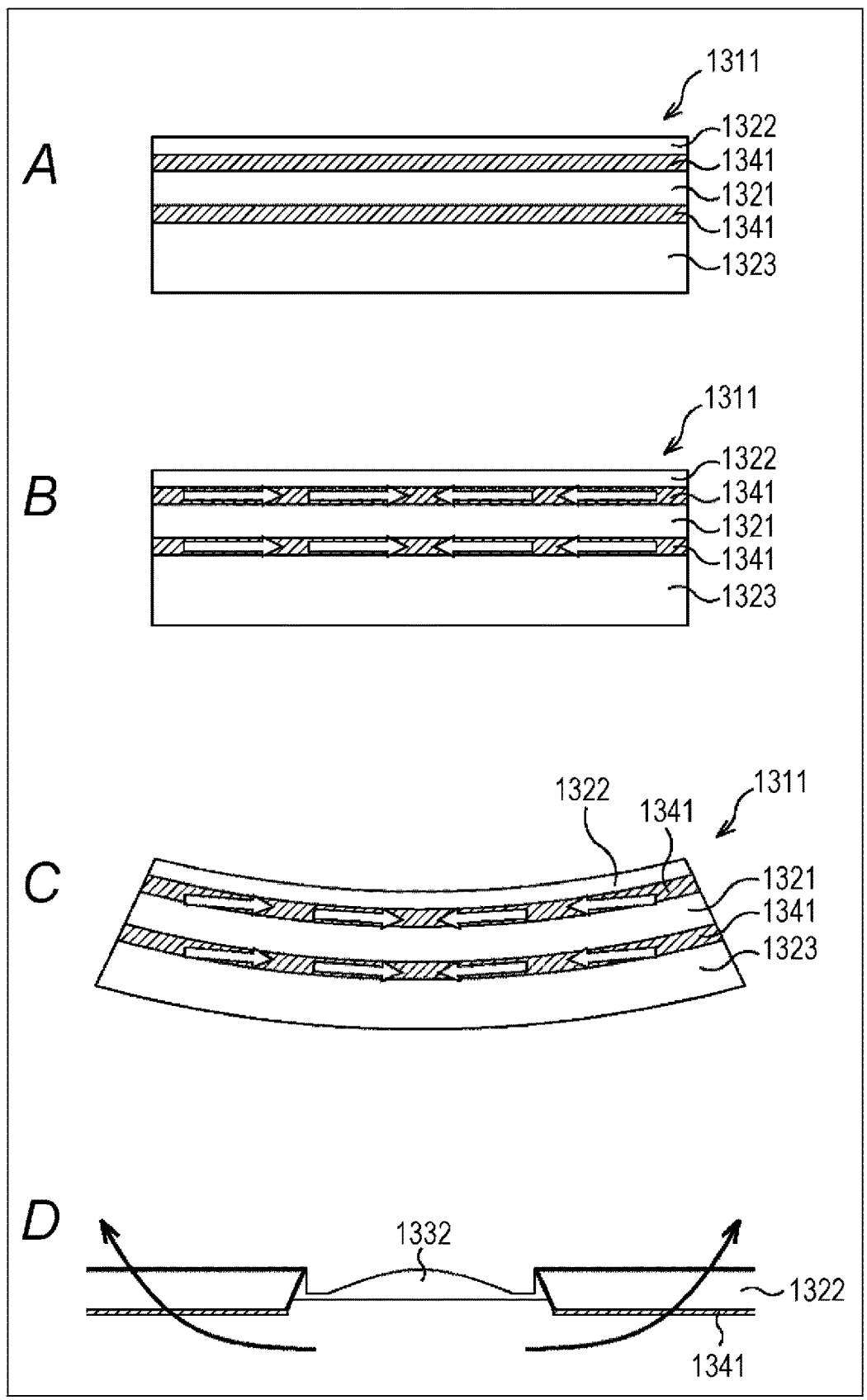
FIG. 50A-D are diagrams illustrating the action of the layered lens structure of FIG. 49.

FIGS. 50A to 50C are diagrams schematically illustrating the layered lens structure 1311 illustrated in FIG. 49.

When the second lens attached substrate 1322 and the third lens attached substrate 1323 having a different substrate thickness are disposed on the upper and lower surfaces of the first lens attached substrate 1321 as in the layered lens structure 1311, the force of curving the layered lens structure 1311 and the curved amount of the layered lens structure 1311 are changed depending on the layer of the resin 1341 existing on the entire contact surfaces of three lens attached substrates 1321 to 1323 at any position of the layered lens structure 1311 in the thickness direction.

When the layers of the resin 1341 existing throughout the entire contact surfaces of three lens attached substrates 1321 to 1323 are not symmetrical to each other with respect to the line running in the substrate plane direction through the center line of the layered lens structure 1311, that is, the center point of the layered lens structure 1311 in the thickness direction, it is difficult to completely offset the action of the force generated by the curable shrinkage of the resin 1341 disposed on the upper and lower surfaces of the first lens attached substrate 1321 as illustrated in FIG. 48C. As a result, the layered lens structure 1311 is curved in any direction.

For example, when two layers of the resin 1341 are cured and shrunk in a case where two layers of the resin 1341 of the upper and lower surfaces of the first lens attached substrate 1321 are deviated upward in relation to the center line of the layered lens structure 1311 in the thickness direction, the layered lens structure 1311 is curved downward in a convex shape as illustrated in FIG. 50C.

In addition, when the cross-sectional shape of the through-hole of the thinner substrate of the second lens attached substrate 1322 and the third lens attached substrate 1323 increases in the direction of the first lens attached substrate 1321, a concern for the loss or the damage of the lens increases.

In the example illustrated in FIG. 49, the cross-sectional shape of the through-hole of the second lens attached substrate 1322 having a smaller thickness of the second lens attached substrate 1322 and the third lens attached substrate 1323 is a downward widened shape which increases in size toward the direction of the first lens attached substrate 1321. In such a shape, when two layers of the resin 1341 of the upper and lower surfaces of the first lens attached substrate 1321 are cured and shrunk, a downward curving force in a convex shape is applied to the layered lens structure 1311 as illustrated in FIG. 50C and hence this force is applied to the second lens attached substrate 1322 as a force of separating the lens and the substrate from each other as illustrated in FIG. 50D. Due to this action, a concern for the loss or the damage of the lens 1332 of the second lens attached substrate 1322 increases.

Next, a case will be considered in which the resin is thermally expanded.

Comparative Structure Example 8

Figure 51:
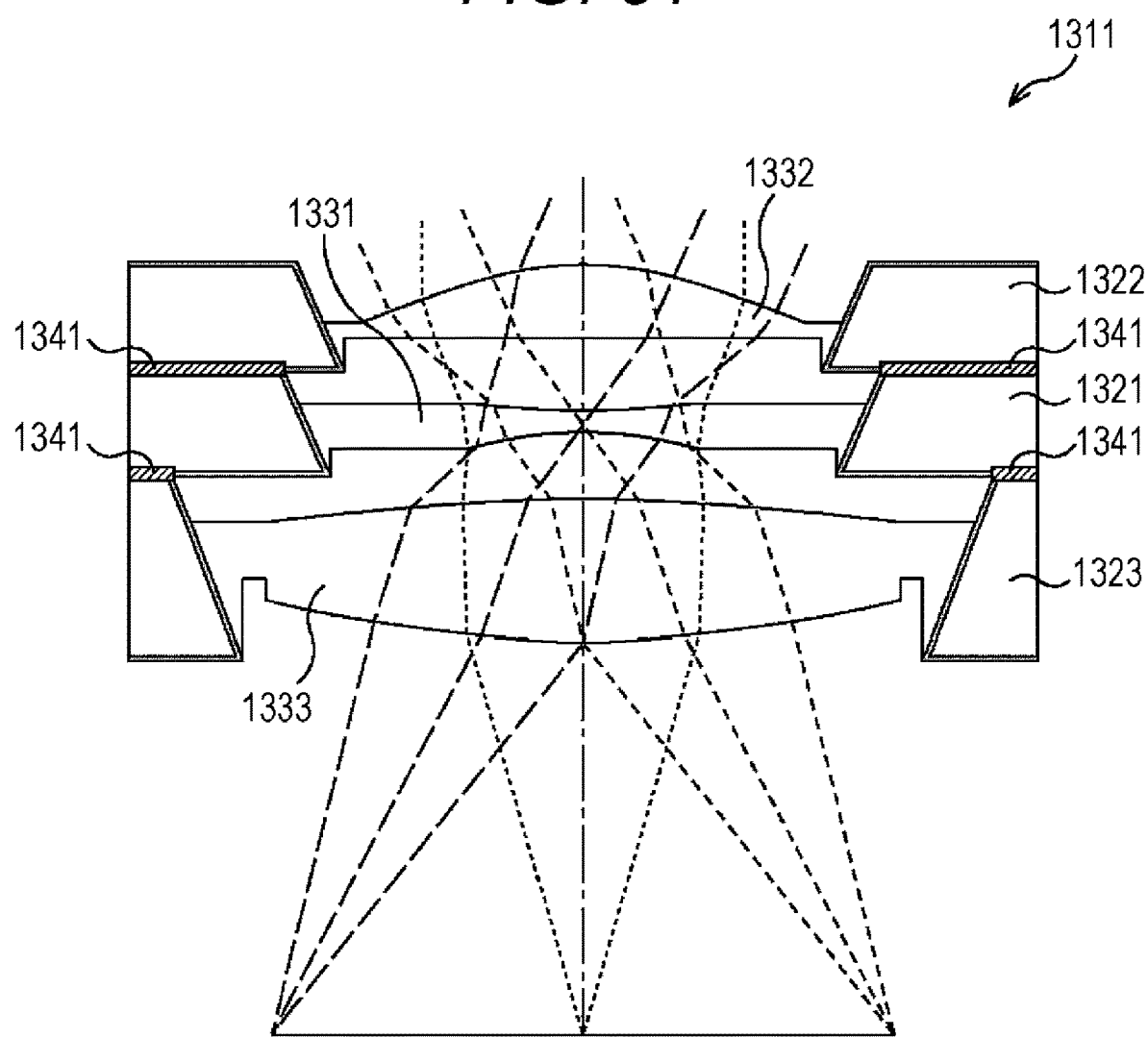
FIG. 51 is a cross-sectional view of a layered lens structure as Comparative Structure Example 8.

FIG. 51 is a cross-sectional view of a layered lens structure in which three lens attached substrates are laminated as an eighth substrate structure (hereinafter, referred to as Comparative Structure Example 8). In the layered lens structure, it is assumed that the layer and the area of the light curable resin disposed on the upper and lower surfaces of each lens attached substrate are the same similarly to Comparative Structure Example 6 illustrated in FIGS. 48A to 48C.

Comparative Structure Example 8 of FIG. 51 is different from Comparative Structure Example 7 of FIG. 49 in that the cross-sectional shape of the through-hole of each of three lens attached substrates 1321 to 1323 is a so-called downward narrowed shape in which the lower surface of the substrate is narrower than the upper surface of the substrate.

Figure 52:
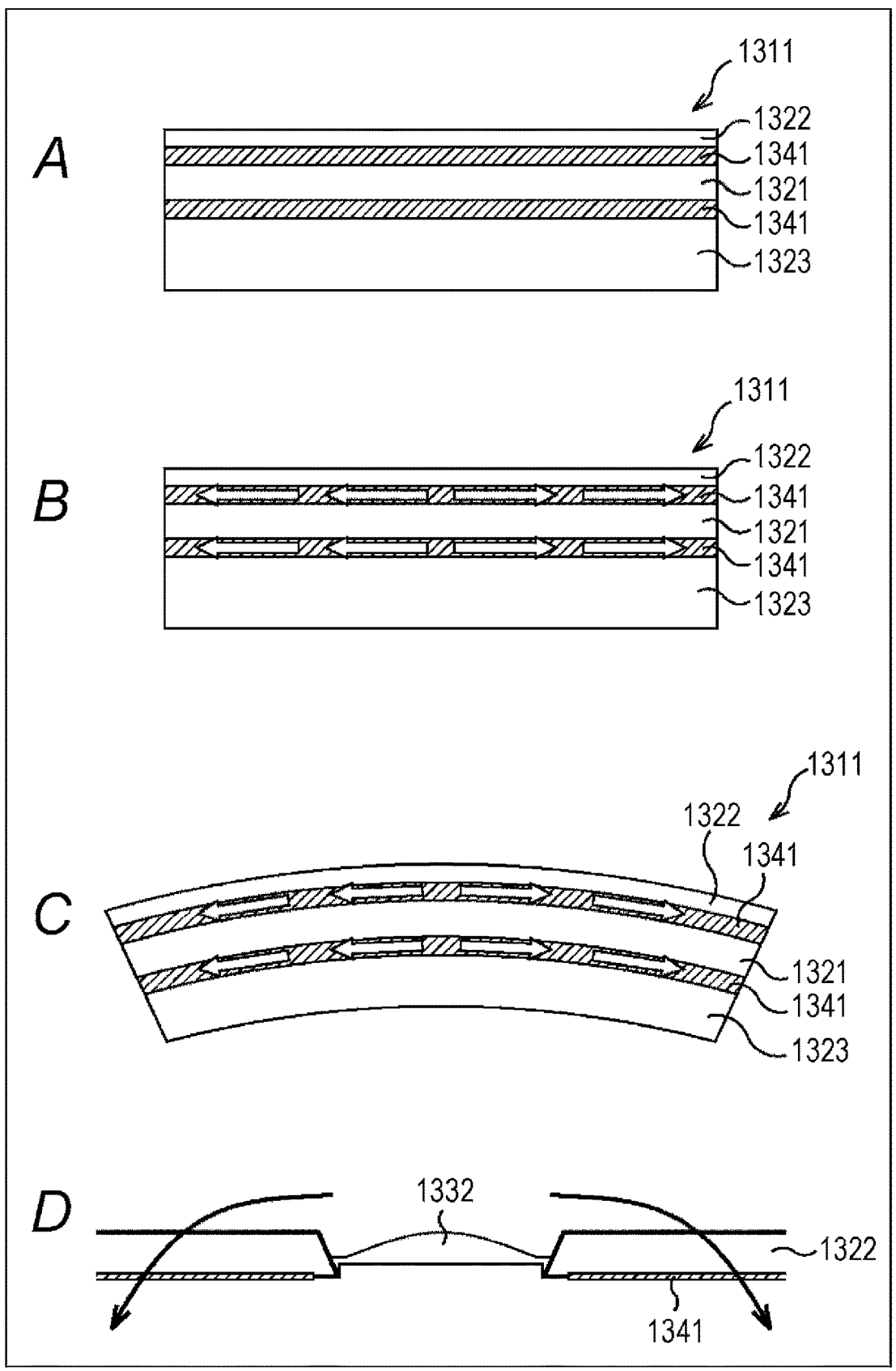
FIGS. 52A-D are diagrams illustrating the action of the layered lens structure of FIG. 51.

FIGS. 52A to 52C are diagrams schematically illustrating the layered lens structure 1311 illustrated in FIG. 51.

When a user uses the camera module for an intended purpose, the temperature inside the casing of the camera increases due to an increase in consuming power with the operation and hence the temperature of the camera module increases. Due to an increase in temperature, the resin 1341 disposed on the upper and lower surfaces of the first lens attached substrate 1321 in the layered lens structure 1311 of FIG. 51 is thermally expanded.

When the layers of the resin 1341 existing throughout the entire contact surfaces of three lens attached substrates 1321 to 1323 are not disposed so as to be symmetrical to each other with respect to the line traveling in the substrate plane direction while passing through the center line of the layered lens structure 1311, that is, the center point of the layered lens structure 1311 in the thickness direction even when the area and the thickness of the resin 1341 disposed on the upper and lower surfaces of the first lens attached substrate 1321 are the same as in FIG. 48A, it is difficult to completely offset the action of the force generated by the thermal expansion of the resin 1341 disposed on the upper and lower surfaces of the first lens attached substrate 1321 as illustrated in FIG. 48C. As a result, the layered lens structure 1311 is curved in any direction.

For example, when two layers of the resin 1341 are thermally expanded in a case where two layers of the resin 1341 of the upper and lower surfaces of the first lens attached substrate 1321 are disposed so as to be deviated upward with respect to the center line of the layered lens structure 1311 in the thickness direction, the layered lens structure 1311 is curved upward in a convex shape as illustrated in FIG. 52C.

In addition, in the example illustrated in FIG. 51, the cross-sectional shape of the through-hole of the second lens attached substrate 1322 having a smaller thickness of the second lens attached substrate 1322 and the third lens attached substrate 1323 is a downward narrowed shape which decreases in size toward the direction of the first lens attached substrate 1321. In such a shape, when two layers of the resin 1341 of the upper and lower surfaces of the first lens attached substrate 1321 are thermally expanded, an upward curving force in a convex shape is applied to the layered lens structure 1311 and this force is applied to the second lens attached substrate 1322 in a direction so as to separate the lens and the substrate from each other as illustrated in FIG. 52D. Due to this action, a concern for the loss or the damage of the lens 1332 of the second lens attached substrate 1322 increases.

<Present Structure>

Figure 53:
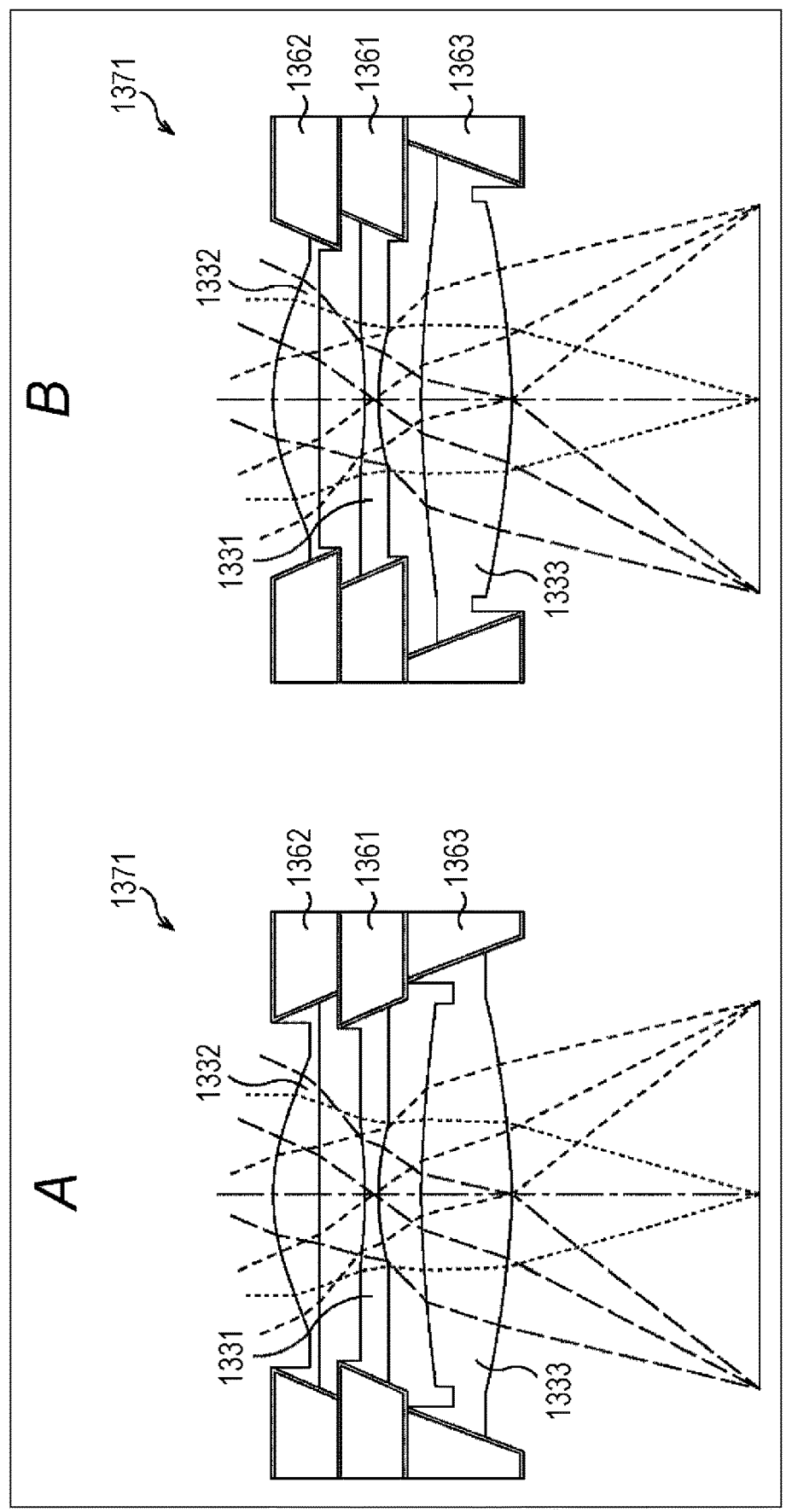
FIGS. 53A-B are cross-sectional views of a layered lens structure employing the present structure.

FIGS. 53A and 53B are diagrams illustrating a layered lens structure 1371 including three lens attached substrates 1361 to 1363 employing the present structure.

FIG. 53A illustrates a structure corresponding to the layered lens structure 1311 of FIG. 49 and illustrates a structure of which the cross-sectional shape of the through-hole is a so-called downward widened shape. Meanwhile, FIG. 53B illustrates a structure corresponding to the layered lens structure 1311 of FIG. 51 and illustrates a structure in which the cross-sectional shape of the through-hole is a so-called downward narrowed shape.

Figure 54:
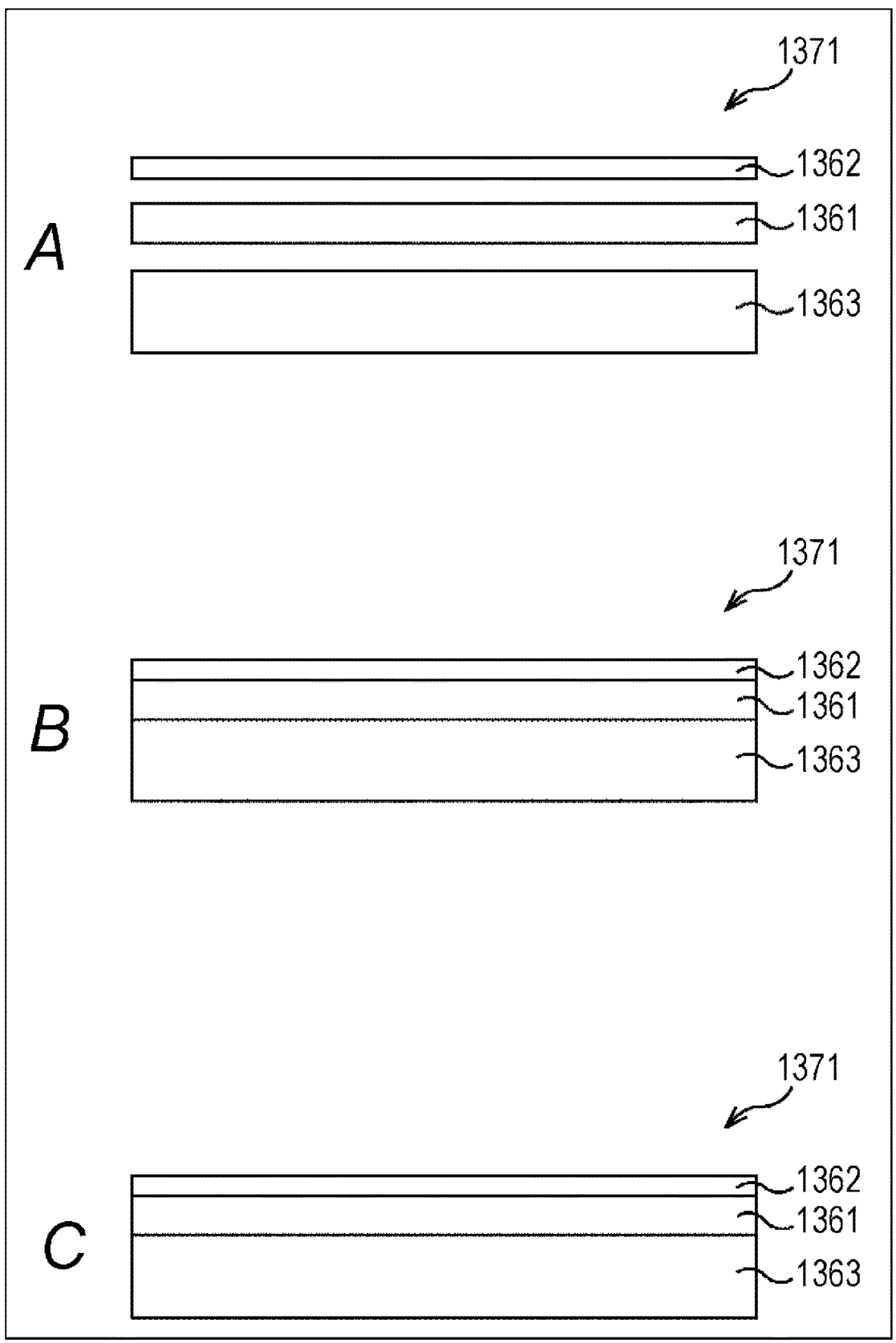
FIGS. 54A-C are schematic diagrams illustrating the layered lens structure of FIG. 53.

FIGS. 54A to 54C are schematic diagrams illustrating the layered lens structure 1371 of FIGS. 53A and 53B used to describe the effect of the present structure.

The layered lens structure 1371 has a structure in which the second lens attached substrate 1362 is disposed at the upper side of the first lens attached substrate 1361 at the middle position and the third lens attached substrate 1363 is disposed at the lower side of the first lens attached substrate 1361.

The second lens attached substrate 1362 disposed at the uppermost layer and the third lens attached substrate 1363 disposed at the lowermost layer have a different substrate thickness and a different lens thickness. More specifically, the lens thickness of the third lens attached substrate 1363 is larger than that of the second lens attached substrate 1362 and hence the substrate thickness of the third lens attached substrate 1363 is also large than that of the second lens attached substrate 1362.

In the layered lens structure 1371 of the present structure, a method of directly bonding the substrates is used as a method of fixing the lens attached substrates to each other. In other words, a plasma activation process is performed on the lens attached substrates to be fixed and two lens attached substrates to be fixed to each other are subjected to the plasma bonding. In other words, a silicon oxide film is formed on each of the surfaces of two laminated lens attached substrates, a hydroxyl group is bound thereto, and hence two lens attached substrates are bonded to each other. Then, a dehydration condensation occurs with an increase in temperature. In this way, two lens attached substrates are directly bonded to each other by silicon-oxygen covalent binding.

Thus, in the layered lens structure 1371 of the present structure, a bonding method using resin is not used as a method of fixing the lens attached substrates to each other. For this reason, the lens forming resin or the substrate bonding resin is not disposed between the lens attached substrates. Further, since the resin is not disposed on the upper or lower surface of the lens attached substrate, the resin of the upper or lower surface of the lens attached substrate is not thermally expanded or cured and shrunk.

Thus, even when the second lens attached substrate 1362 and the third lens attached substrate 1363 having a different lens thickness and a different substrate thickness are disposed on the upper and lower layers of the first lens attached substrate 1351 in the layered lens structure 1371, it is possible to prevent a problem in which the substrate is curved due to the curable shrinkage and the substrate is curved due to the thermal expansion similarly to Comparative Structure Examples 1 to 8.

That is, the present structure in which the lens attached substrates are directly bonded to each other has an operation and effect in which the substrate curved state can be largely suppressed compared with Comparative Structure Examples 1 to 8 even when the lens attached substrates having a different lens thickness and a different substrate thickness are laminated on the upper and lower sides.

16. Various Modified Examples

The other modified examples of the above-described embodiments will be described below.

<Configuration Example of Layered Lens Structure 1401>

Figure 55:
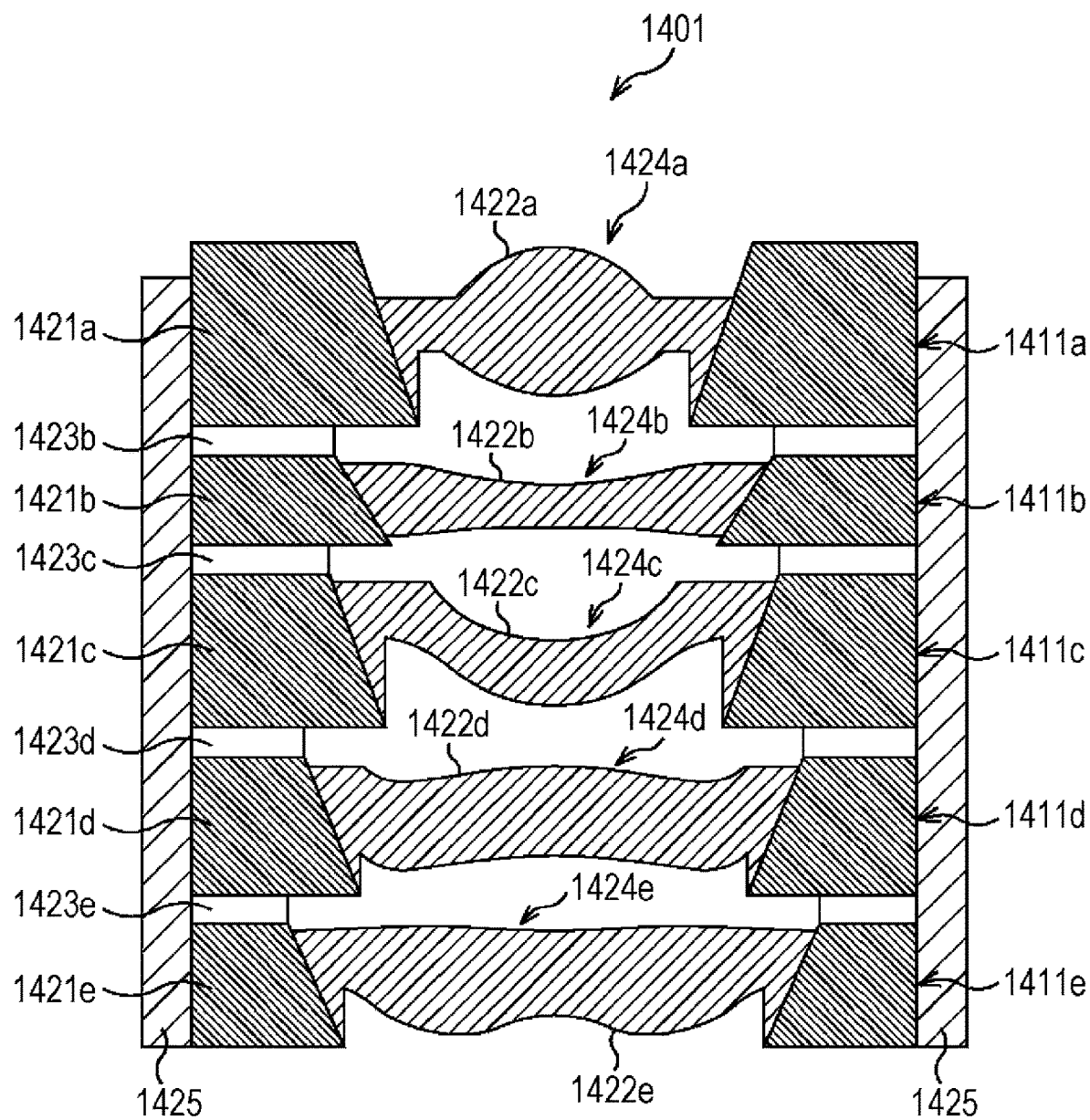
FIG. 55 is a schematic cross-sectional view of a layered lens structure according to an embodiment of the present technology.

FIG. 55 is a schematic cross-sectional view of a layered lens structure 1401. In FIG. 55, a part necessary for the description is mainly illustrated and a part not necessary for the description is appropriately omitted.

In the layered lens structure 1401, lens attached substrates 1411*a* to 1411*e* are laminated as five layers.

A lens resin portion 1422*a* is formed inside a through-hole 1424*a* of a carrier substrate 1421*a* of the lens attached substrate 1411*a*.

Figure 56:
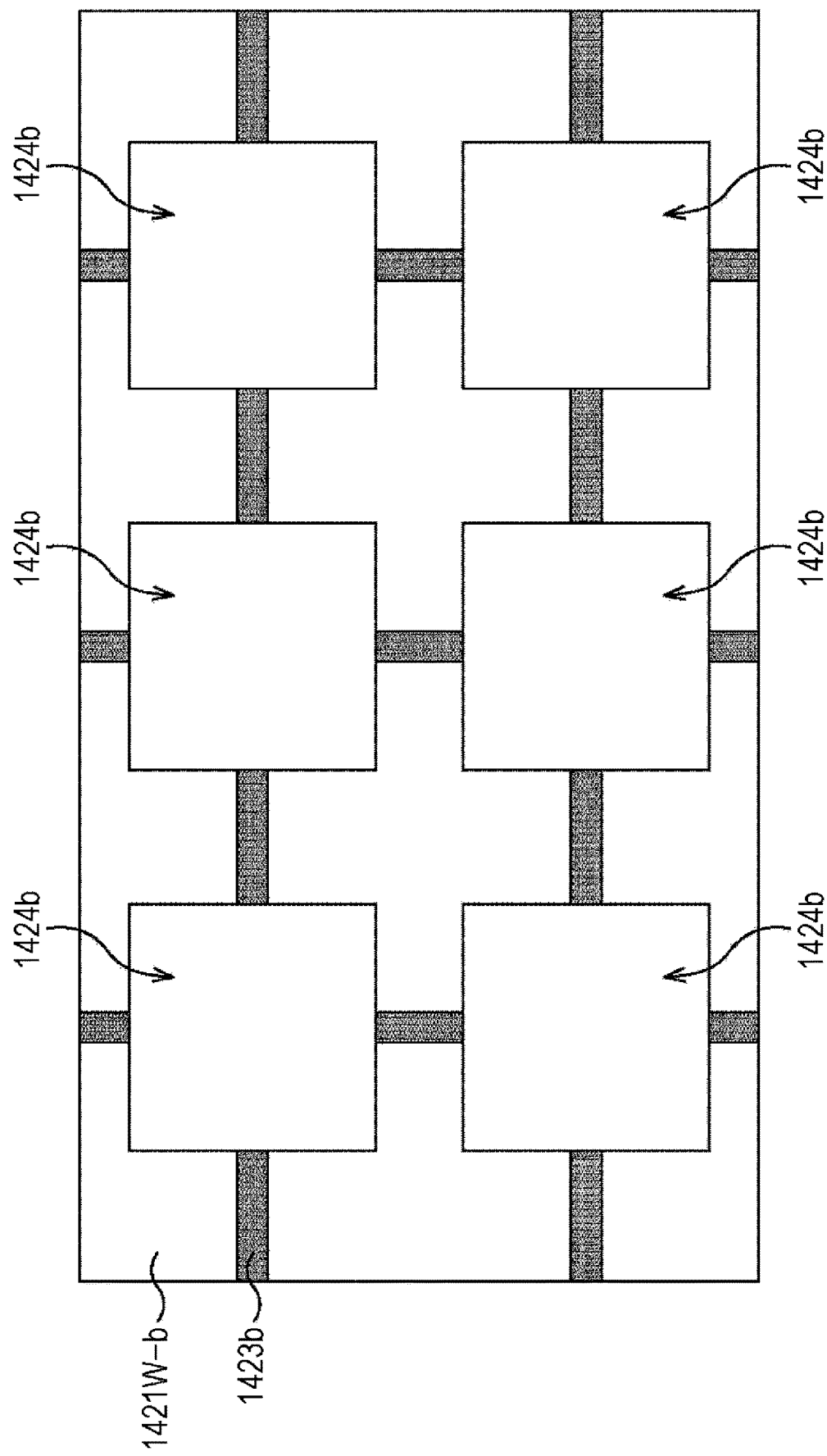
FIG. 56 is a diagram illustrating a method of manufacturing the layered lens structure of FIG. 55.

A lens resin portion 1422*b* is formed inside a through-hole 1424*b* of a carrier substrate 1421*b* of the lens attached substrate 1411*b*. Further, an air groove 1423*b* is formed in the upper surface of the carrier substrate 1421*b*. The air groove 1423*b* is formed so as to connect the adjacent through-holes 1424*b* to each other in a substrate-like lens attached substrate 1411W-b (FIG. 56 and the like).

In addition, since the lens attached substrates 1411*c* to 1411*e* also have the same configuration as the lens attached substrate 1411*b*, the description thereof will be omitted.

The side surface of the layered lens structure 1401 is coated with resin 1425. The resin 1425 is used to block the air grooves 1423*b* to 1423*e*. Here, at least an opening formed by the air grooves 1423*b* to 1423*e* in the side surface of the layered lens structure 1401 may be blocked.

Hereinafter, the lens attached substrates 1411*a* to 1411*e* will be simply referred to as the lens attached substrate 1411 when the lens attached substrates are not individually distinguished from each other. Hereinafter, the carrier substrates 1421*a* to 1421*e* will be simply referred to as the carrier substrate 1421 when the carrier substrates are not individually distinguished from each other. Hereinafter, the lens resin portions 1422*a* to 1422*e* will be simply referred to as the lens resin portion 1422 when the lens resin portions are not individually distinguished from each other. Hereinafter, the air grooves 1423*b* to 1423*e* will be simply referred to as the air groove 1423 when the air grooves are not individually distinguished from each other. Hereinafter, the through-holes 1424*a* to 1424*e* will be simply referred to as the through-hole 1424 when the through-holes are not individually distinguished from each other.

<Method of Manufacturing Layered Lens Structure 1401>

Next, a method of manufacturing the layered lens structure 1401 will be described with reference to FIGS. 56 to 68. Hereinafter, characteristic steps of the method of manufacturing the layered lens structure 1401 will be mainly described. The omitted steps are basically the same as the above-described steps.

FIG. 56 is a schematic top view illustrating a part of a substrate-like carrier substrate 1421W-b before the lens resin portion 1422*b* is formed.

As illustrated in the drawing, a plurality of through-holes 1424*b* is first formed in the carrier substrate 1421W-b so as to be arranged in parallel in a lattice shape. Further, the air groove 1423*b* is formed so as to connect the adjacent through-holes 1424*b*. The air grooves 1423*b* are arranged in a lattice shape so as to pass through the substantial center of each side of each through-hole 1424*b*. Each of the through-holes 1424*b* is connected to any one of the through-holes 1424*b* of the ends of the carrier substrate 1421W-b through the air groove 1423*b* and the other through-hole 1424*b*.

Figure 57:
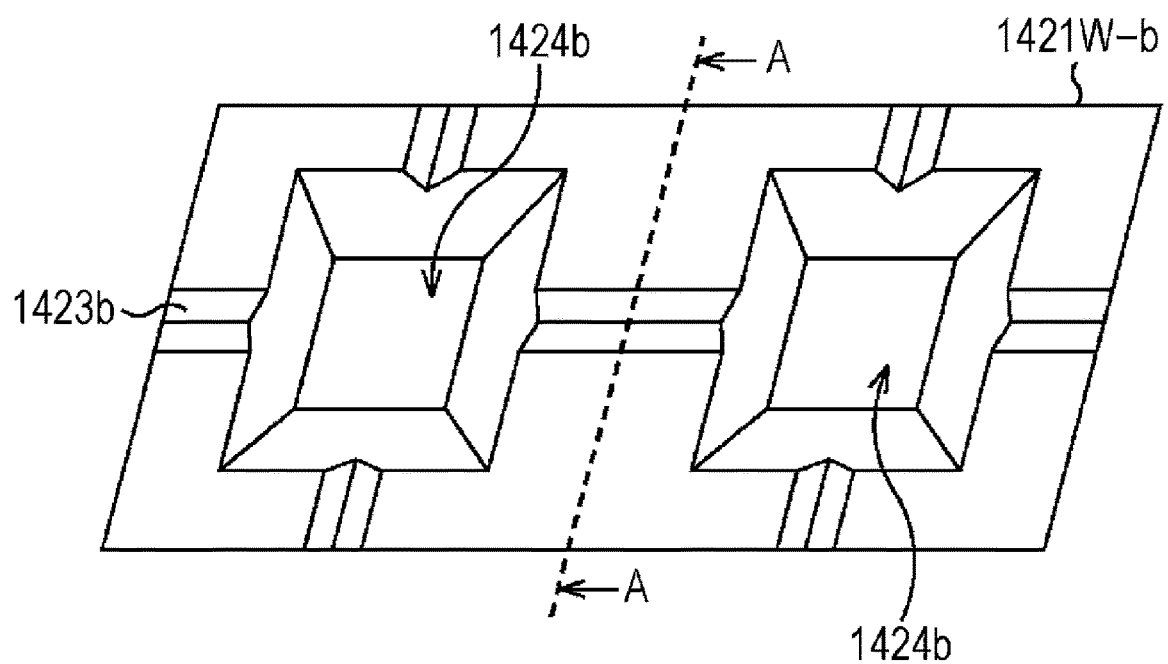
FIG. 57 is a diagram illustrating a method of manufacturing the layered lens structure of FIG. 55.
Figure 58:
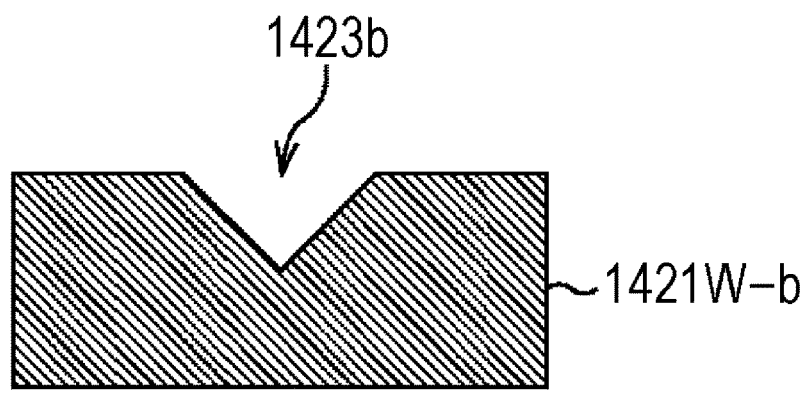
FIG. 58 is a diagram illustrating a method of manufacturing the layered lens structure of FIG. 55.
Figure 59:
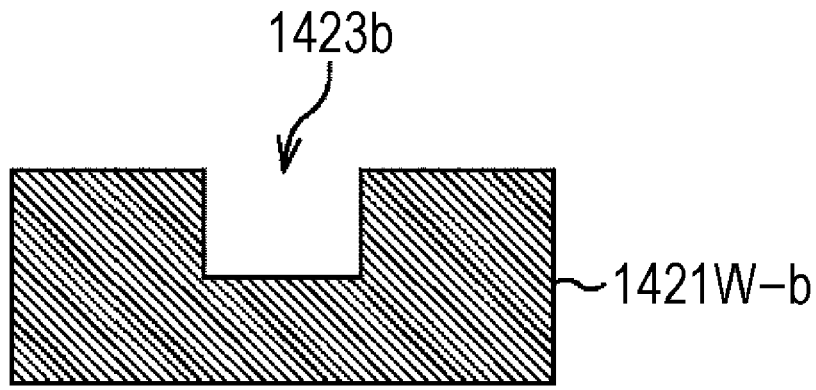
FIG. 59 is a diagram illustrating a method of manufacturing the layered lens structure of FIG. 55.

FIGS. 57 to 59 illustrate an example of the shape of the air groove 1423*b*. FIG. 57 is a partially perspective view of the carrier substrate 1421W-b. FIGS. 58 and 59 are cross-sectional views taken along the line A-A of the air groove 1423*b* of FIG. 57 and illustrate an example of the shape of the air groove 1423*b*.

In the example of FIG. 58, the cross-section of the air groove 1423*b* is formed as an isosceles triangular shape. The air groove 1423*b* is manufactured by, for example, crystalline anisotropy wet etching.

In the example of FIG. 59, the cross-section of the air groove 1423*b* is formed as a rectangular shape. The air groove 1423*b* is manufactured by, for example, dry etching.

Figure 60:
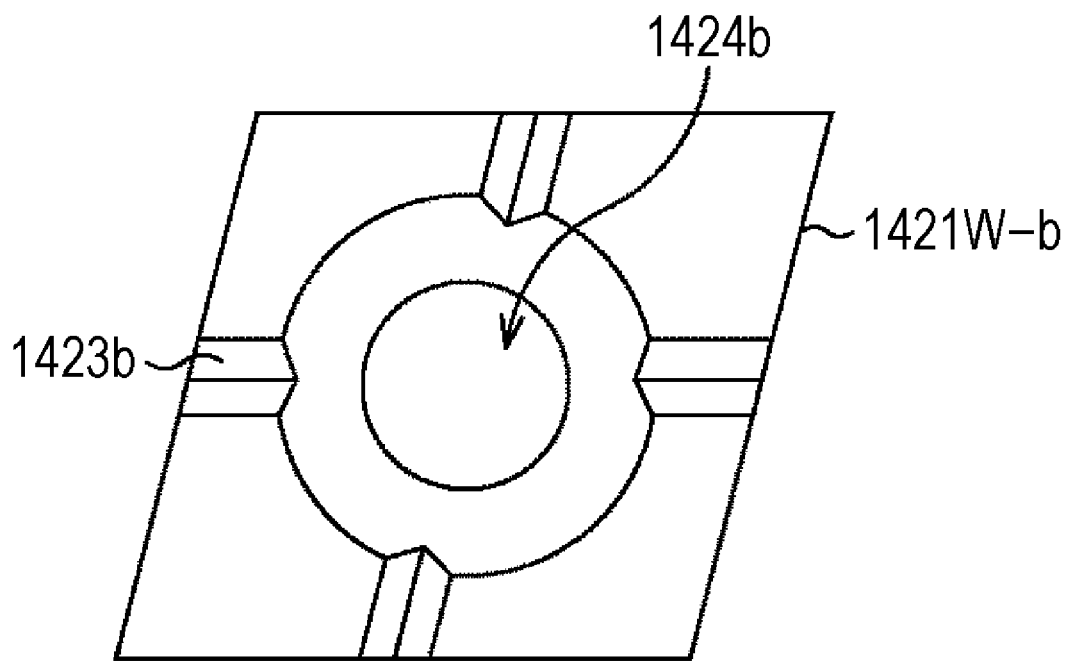
FIG. 60 is a diagram illustrating a method of manufacturing the layered lens structure of FIG. 55.

In addition, the planar shape of the through-hole 1424*a* may not be formed as a rectangular shape and may be formed as, for example, a circular shape as illustrated in FIG. 60.

Figure 61:
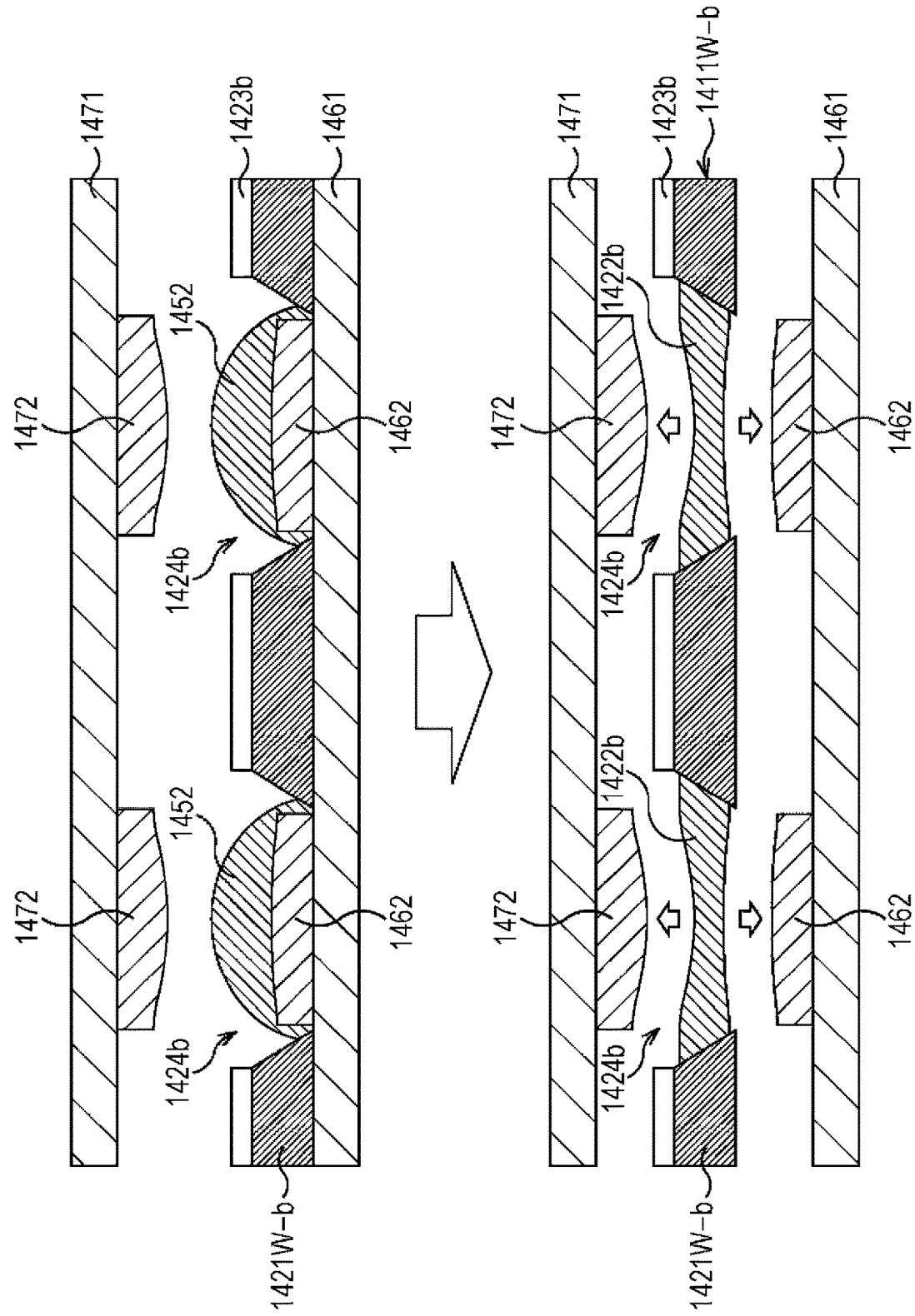
FIG. 61 is a diagram illustrating a method of manufacturing the layered lens structure of FIG. 55.

Next, as illustrated in FIG. 61, energy curable resin 1452 is charged (loaded) inside the through-hole 1424*b* of the carrier substrate 1421W-b. Then, the lens resin portion 1422*b* is formed inside each through-hole 1424*a* by a lower die 1461 in which a plurality of optical transfer surfaces 1462 is disposed at the same interval and an upper die 1471 in which a plurality of optical transfer surfaces 1472 is disposed at the same interval. Further, since a method of forming the lens resin portion 1422*b* is similar to the above-described method, the detailed description thereof will be omitted.

Here, the bottom of the air groove 1423*b* is adjusted so as to be higher than the formation position of the lens resin portion 1422*b* so that the energy curable resin 1452 does not enter the air groove 1423*b* when the lens resin portion 1422*b* is formed. Accordingly, even after the lens resin portion 1422*b* is formed, the adjacent through-holes 1424*b* are connected to each other by the air groove 1423*b*.

Further, when the lower die 1461 and the upper die 1471 are separated from the carrier substrate 1421W-b by the air groove 1423*b* after the lens resin portion 1422*b* is formed by superimposing the lower die 1461 and the upper die 1471 with respect to the carrier substrate 1421W-b, air easily enters among the lower die 1461, the upper die 1471, and the carrier substrate 1421W-b due to the existence of the air groove 1423*b*. Accordingly, the dies are easily separated.

Figure 62:
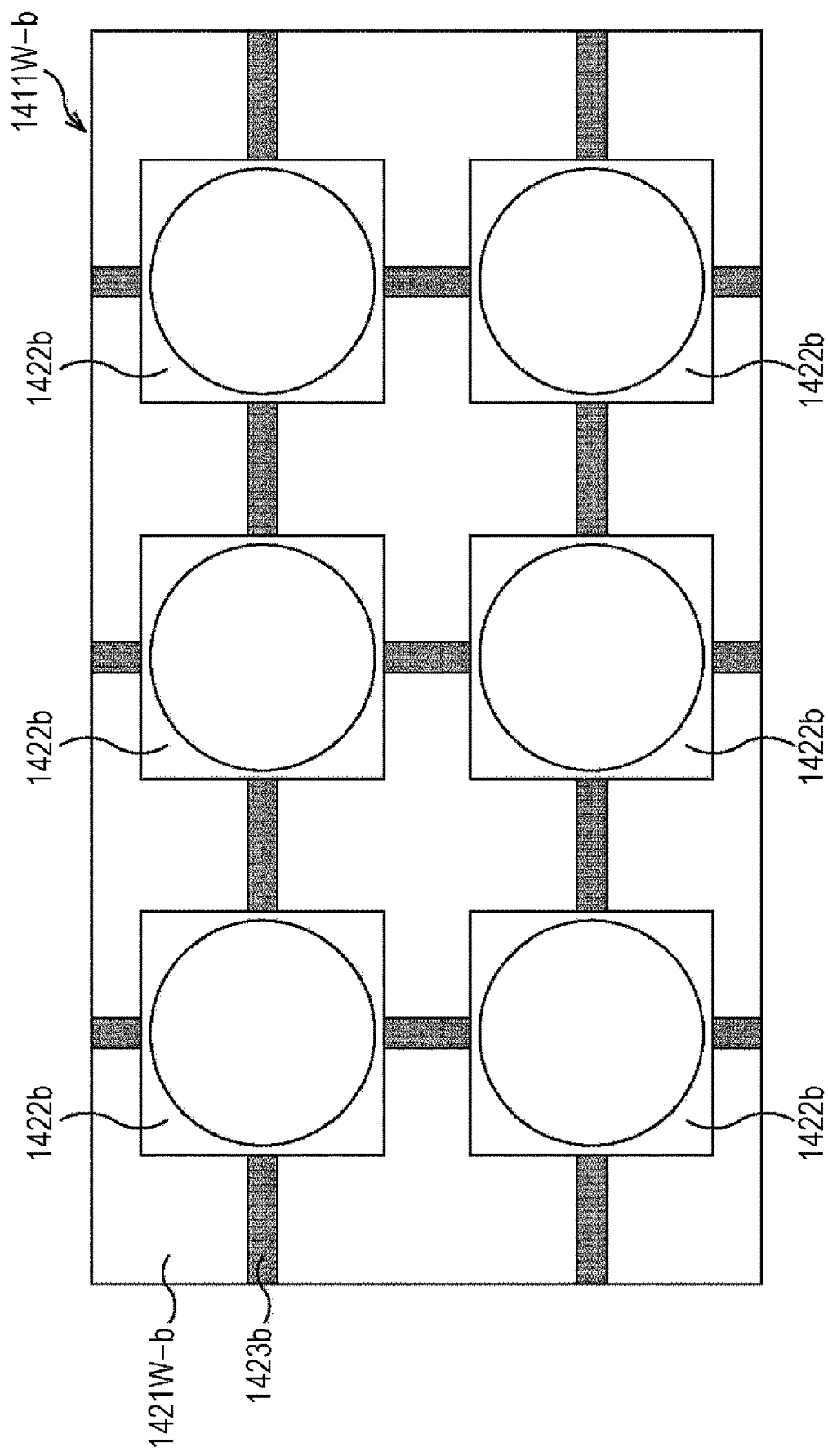
FIG. 62 is a diagram illustrating a method of manufacturing the layered lens structure of FIG. 55.

FIG. 62 is a schematic top view illustrating a part of the lens attached substrate 1411W-b after the lens resin portion 1422*b* is formed in the carrier substrate 1421W-b. In the example of the drawing, the lens resin portion 1422 is schematically illustrated as a shape in which a circle is depicted inside a square frame.

In this way, the substrate-like lens attached substrate 1411W-b is manufactured.

In addition, the through-hole 1424 and the lens resin portion 1422 are respectively formed in the carrier substrate 1421W-a and the carrier substrates 1421W-c to 1421W-e by the same steps, thereby manufacturing the substrate-like lens attached substrate 1411W-a and the substrate-like lens attached substrates 1411W-c to 1411W-e. Further, the air groove 1423 is manufactured in each of the lens attached substrates 1411W-c to 1411W-e. Meanwhile, the air groove is not manufactured in the lens attached substrate 1411W-a.

Figure 63:
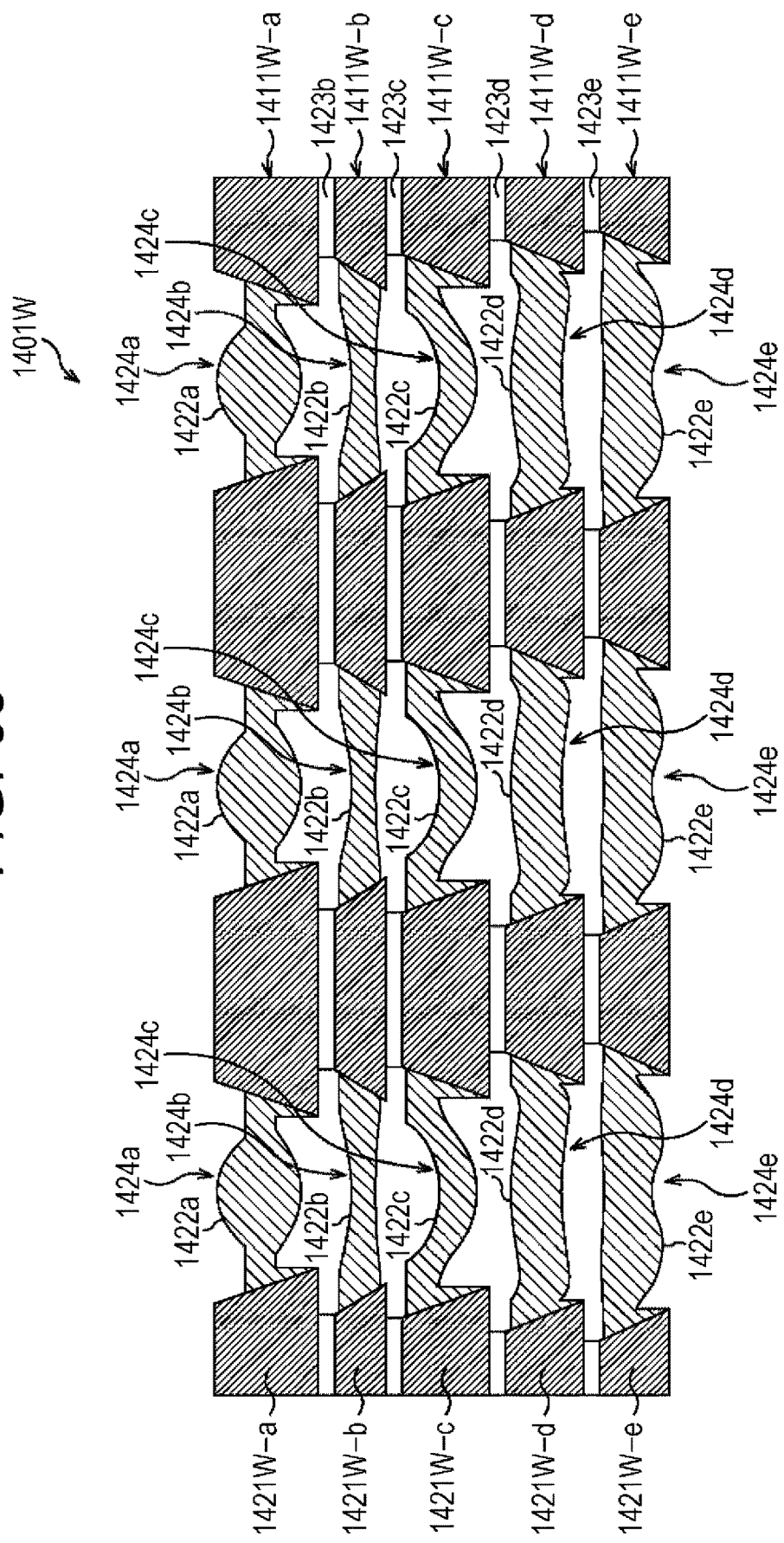
FIG. 63 is a diagram illustrating a method of manufacturing the layered lens structure of FIG. 55.

Next, as illustrated in FIG. 63, the substrate-like lens attached substrates 1411W-a to 1411W-e are directly bonded to one another by the above-described method, thereby manufacturing a substrate-like layered lens structure 1401W.

Figure 64:
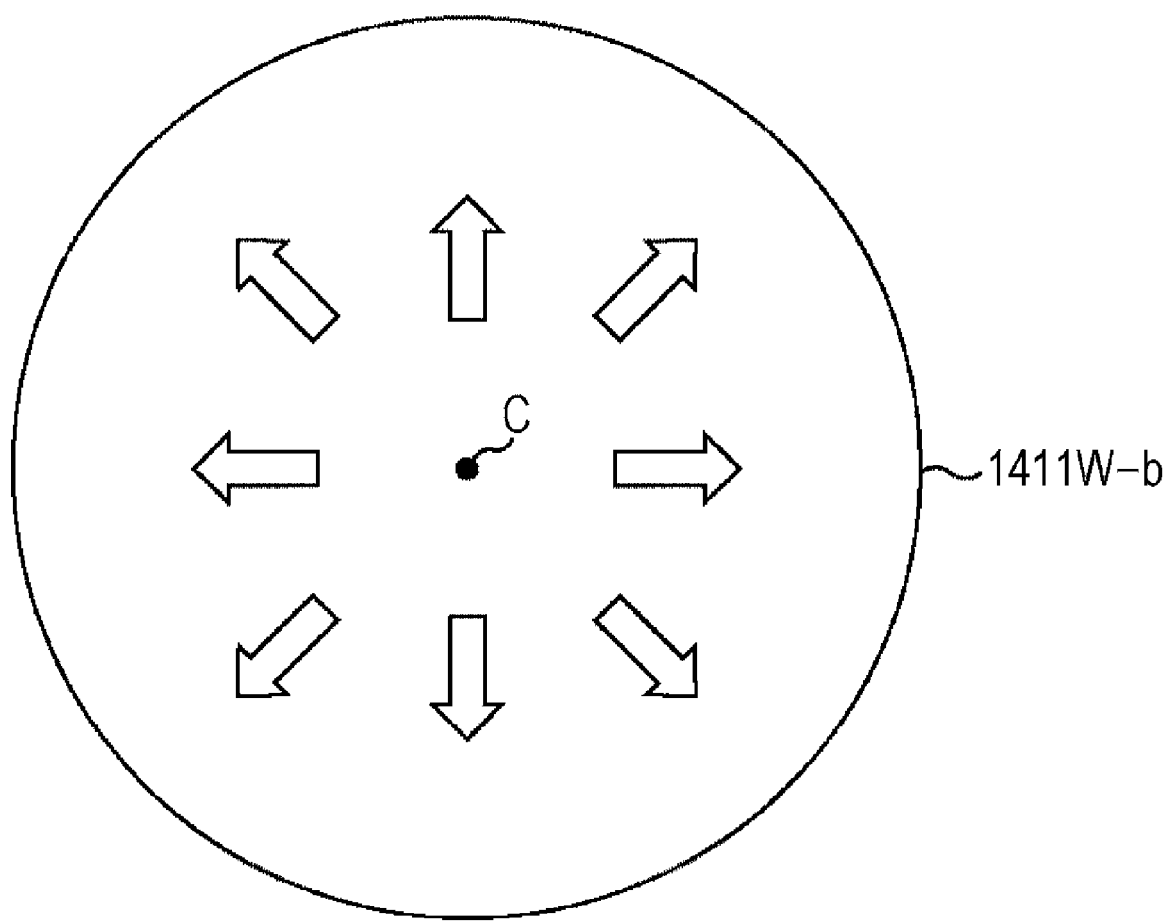
FIG. 64 is a diagram illustrating a method of manufacturing the layered lens structure of FIG. 55.

At this time, for example, when the lens attached substrate 1411W-b and the lens attached substrate 1411W-c are bonded to each other, a force is applied to the vicinity of the center C of the circular lens attached substrate 1411W-b from the upside as illustrated in FIG. 64. Accordingly, as indicated by the arrow of the drawing, the lens attached substrate 1411W-b and the lens attached substrate 1411W-c are bonded (superimposed) to each other in a direction from the center C.

Figure 65:
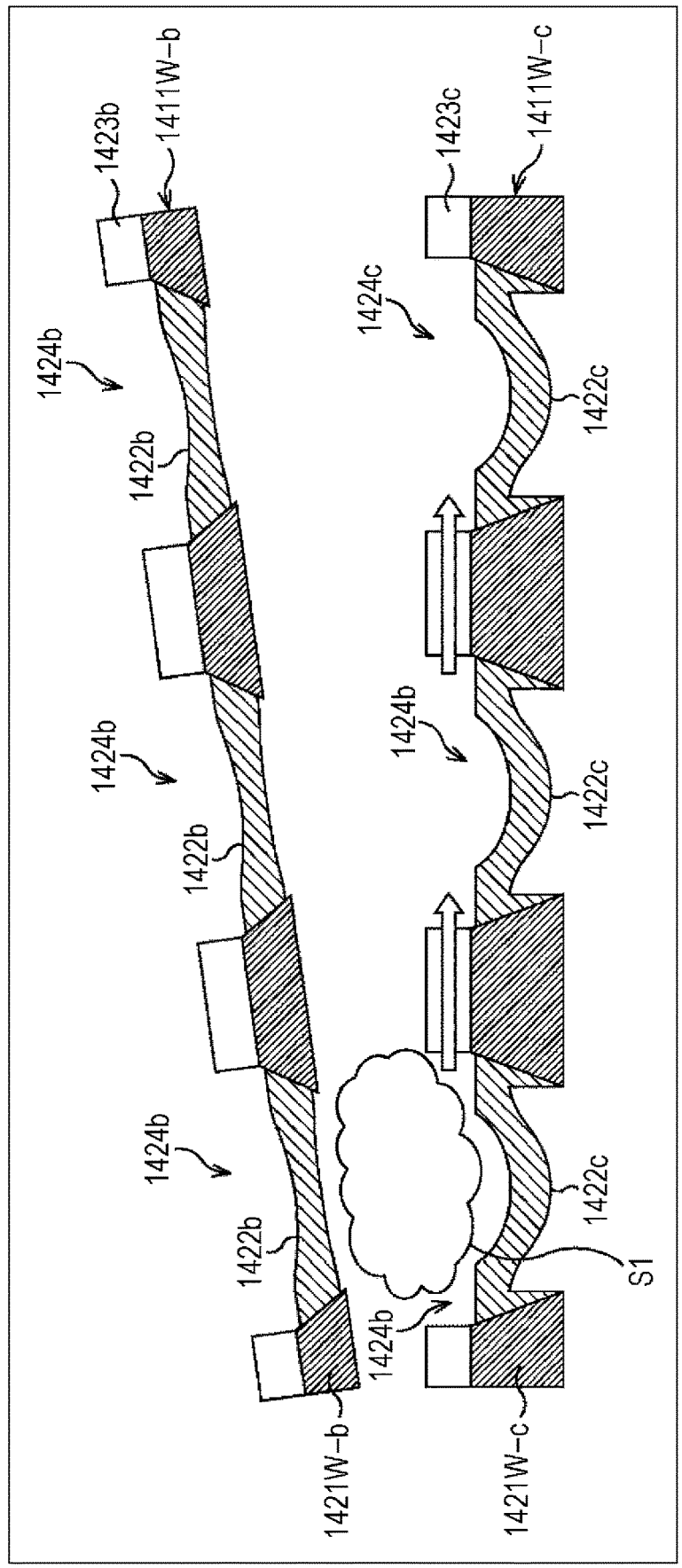
FIG. 65 is a diagram illustrating a method of manufacturing the layered lens structure of FIG. 55.

Meanwhile, for example, as illustrated in FIG. 65, when the lens attached substrate 1411W-b and the lens attached substrate 1411W-c are bonded to each other, air is accumulated in a space S1 between the lens resin portion 1422b and the lens resin portion 1422c. Due to the accumulation of air, air resistance is generated between the lens attached substrate 1411W-b and the lens attached substrate 1411W-c. As a result, there is a concern that the bonding process is degraded or a void (gap) is formed in the bonded portion between the lens attached substrate 1411W-b and the lens attached substrate 1411W-c.

However, the accumulated air passes through an air groove 1423c of the upper surface of the lens attached substrate 1411W-c and escapes in a direction indicated by the arrow of FIG. 64. Accordingly, the air resistance between the lens attached substrate 1411W-b and the lens attached substrate 1411W-c decreases and hence the bonding process is smoothly performed. Further, the generation of the void in the bonded portion between the lens attached substrate 1411W-b and the lens attached substrate 1411W-c is prevented and hence the strength of the bonded portion is improved.

In addition, even when the other lens attached substrates 1411W are bonded, the accumulated air passes through the air groove 1423 so as to escape. Accordingly, both substrates can be smoothly bonded to each other and the generation of the void in the bonded portion is prevented.

Further, when the lens attached substrates 1411W are bonded to each other and are subjected to an annealing treatment, the air inside the void portion (space) between the lens resin portions 1422 of the lens attached substrates 1411W laminated in the up and down direction is expanded and the bonded portion is removed. As a result, there is a concern that the direct bonding process is disturbed or the lens resin portion 1422 is damaged. However, even when the air inside the void portion between the lens attached substrates 1411W is expanded, the air escapes through the air groove 1423. As a result, since it is possible to prevent a problem in which the bonded portion is removed or the lens resin portion 1422 is damaged, the quality of the layered lens structure 1401 is improved.

Figure 66:
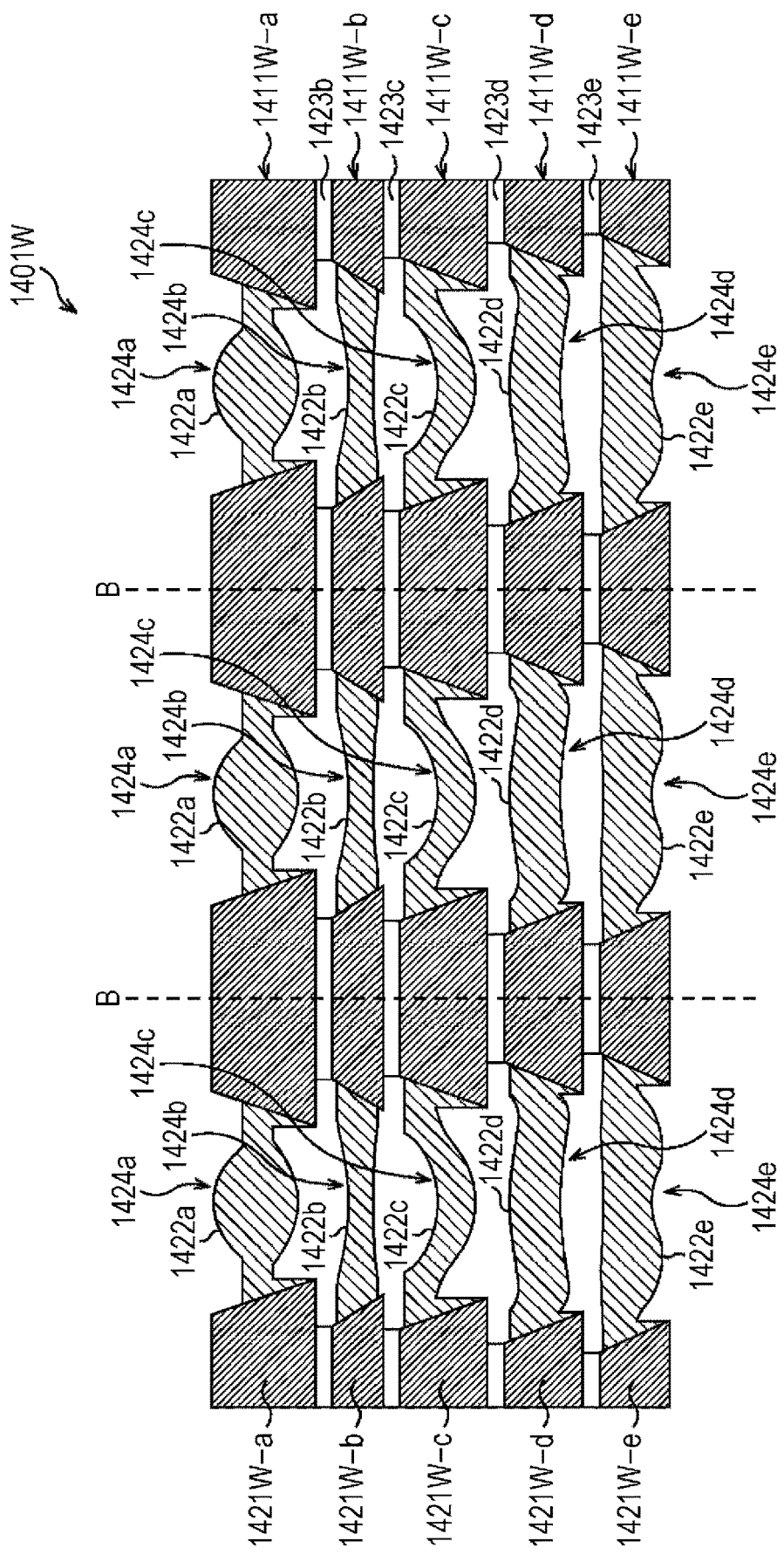
FIG. 66 is a diagram illustrating a method of manufacturing the layered lens structure of FIG. 55.

Next, as illustrated in FIG. 66, the substrate-like layered lens structure 1401W is cut along the dotted line B in the drawing by a blade or a laser so as to be divided into a single unit, thereby manufacturing a plurality of layered lens structures 1401.

Figure 67:
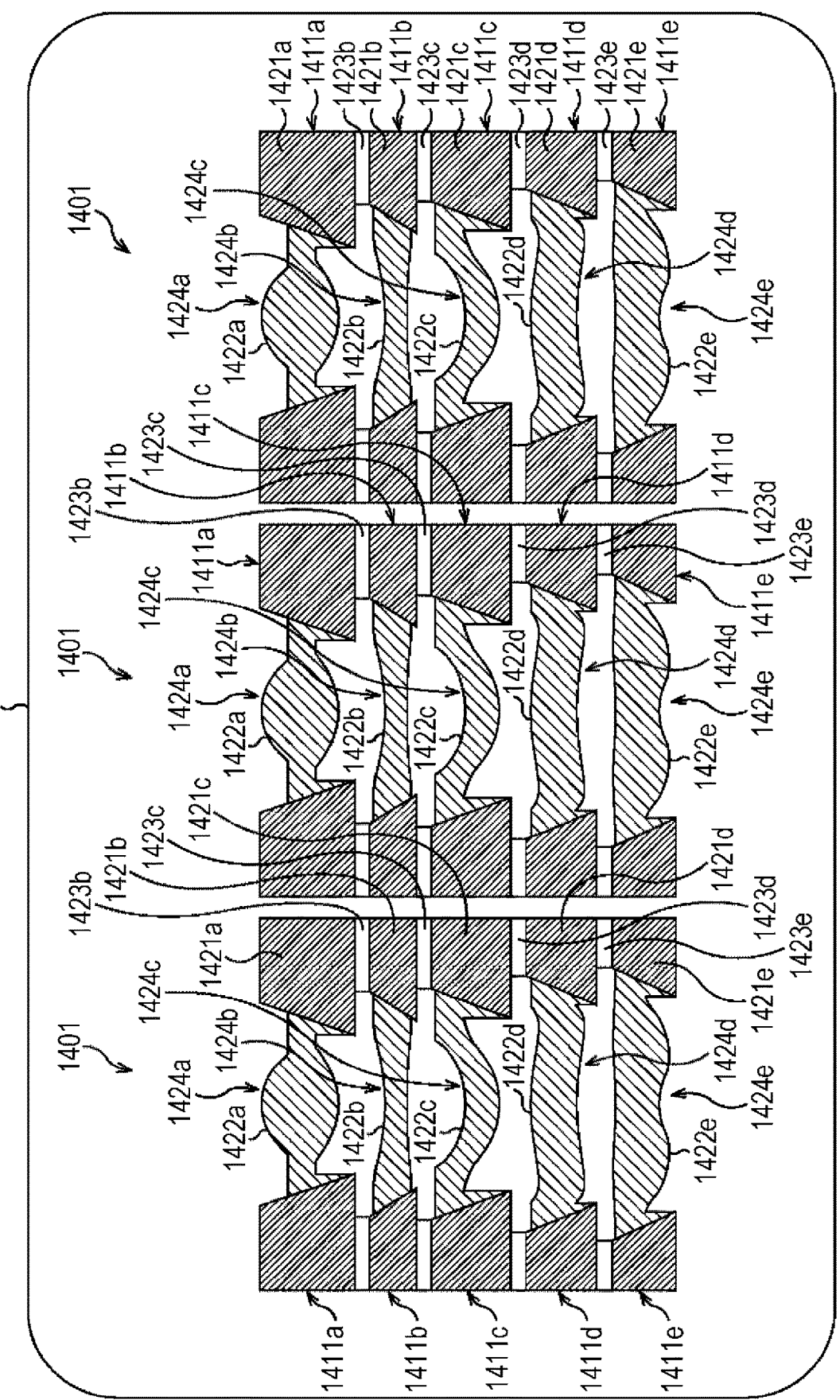
FIG. 67 is a diagram illustrating a method of manufacturing the layered lens structure of FIG. 55.

Next, as illustrated in FIG. 67, the replacement of N2 is performed. For example, after the layered lens structure 1401 is inserted into a predetermined container 1481 and the inside of the container 1481 becomes a vacuum state, a gas inside the air groove 1423 and the void portion between the lens attached substrates 1411 is suctioned. Next, the inside of the container 1481 is changed into the atmosphere of N2, and hence the inside of the air groove 1423 and the void portion between the lens attached substrates 1411 is replaced by N2.

Figure 68:
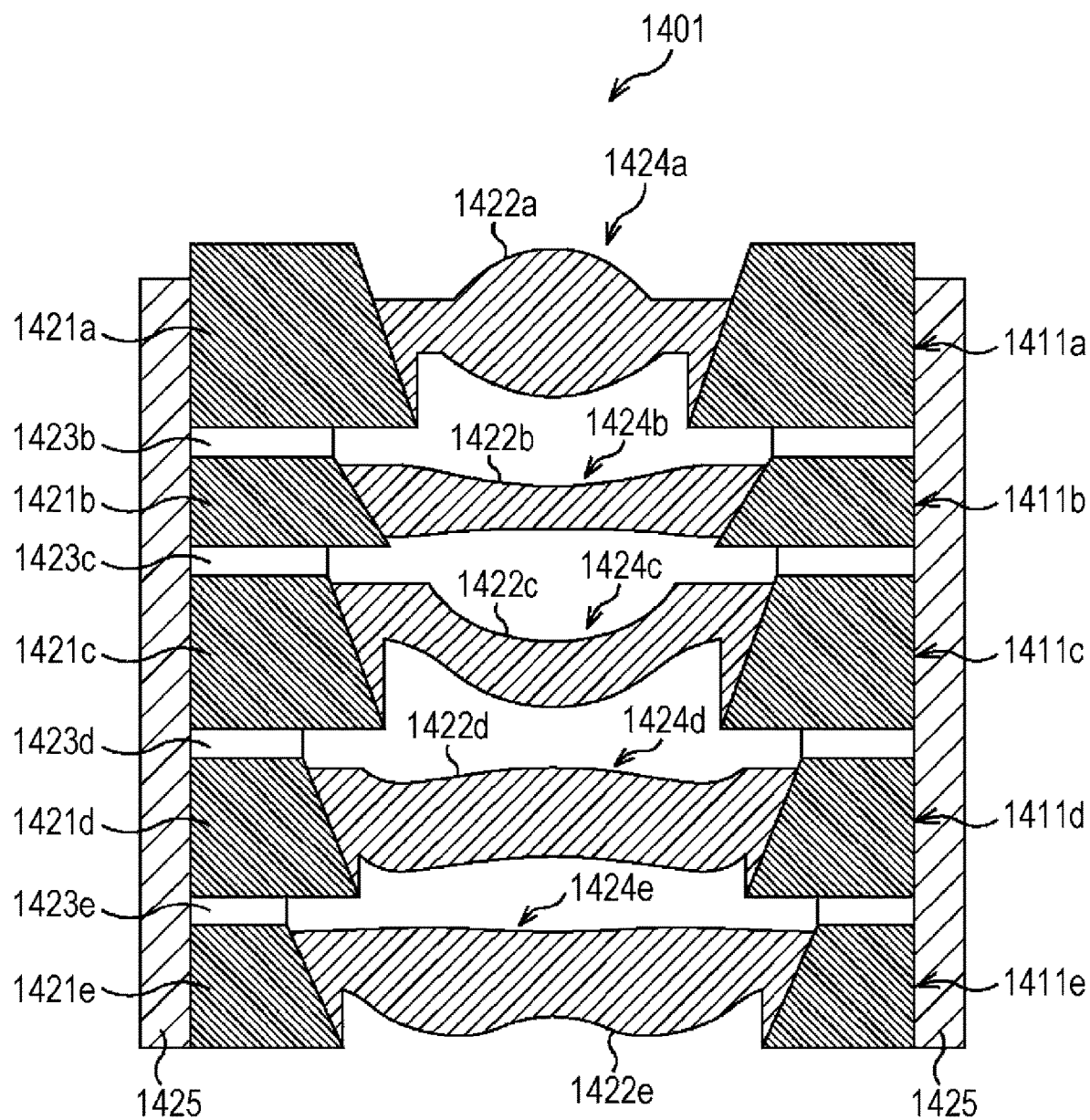
FIG. 68 is a diagram illustrating a method of manufacturing the layered lens structure of FIG. 55.

Next, as illustrated in FIG. 68, the side surface of the layered lens structure 1401 is coated with the resin 1425 so that the side surface of the layered lens structure 1401 is sealed. Further, the sealing step may be performed under the atmospheric air since the mixture of the atmosphere of the moisture is sufficiently small when the time taken until the sealing operation is completed from the replacement of N2 is short. Further, it is desirable that the resin 1425 be cured at a room temperature and have a small degassing amount.

Accordingly, an opening of the side surface of the layered lens structure 1401 formed by the air grooves 1423b to 1423e is blocked and a N2 gas is charged (loaded) into the air groove 1423 and the void portion between the lens attached substrates 1411. As a result, the air inside the void portion is thermally expanded or dew is formed in the void portion. Accordingly, it is possible to prevent a problem in which the bonded portion of the lens attached substrate 1411W is removed or the lens resin portion 1422 is damaged and hence the quality of the layered lens structure 1401 is improved.

MODIFIED EXAMPLE OF LAYERED LENS STRUCTURE 1401

Next, a modified example of the layered lens structure 1401 will be described with reference to FIGS. 69 to 79.

First Modified Example of Layered Lens Structure 1401

Figure 69:
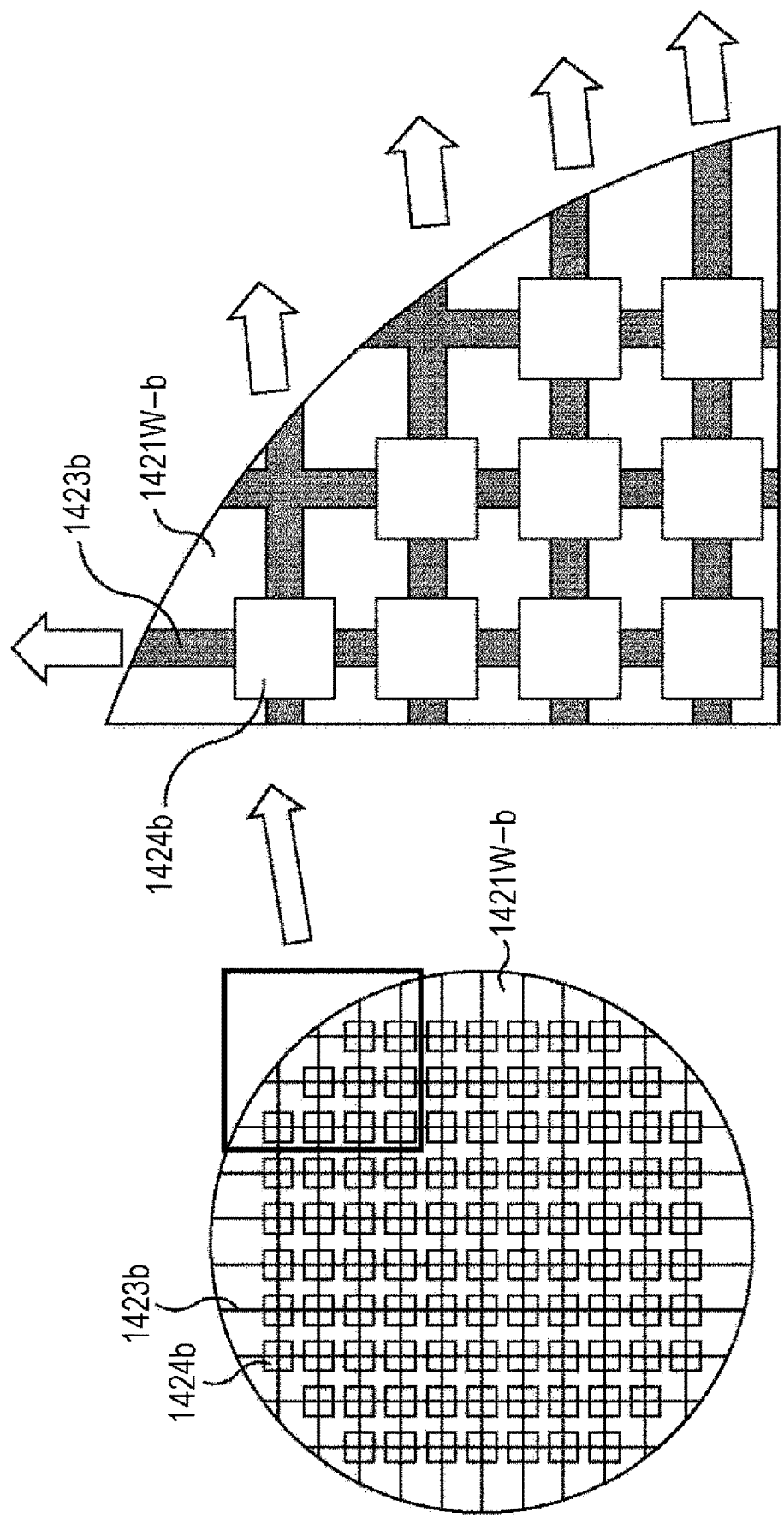
FIG. 69 is a diagram illustrating a first modified example of the layered lens structure of FIG. 55.

For example, as illustrated in FIG. 69, the air groove 1423b may be formed between the through-hole 1424b and the edge (end) of the carrier substrate 1421W-b as well as the gap of the through-hole 1424b. The same applies to the other carrier substrate 1421W.

Accordingly, the air inside the air groove 1423 and the void portion between the lens attached substrates 1411W escapes from the end of each carrier substrate 1421W and hence the air more smoothly flows. As a result, the lens attached substrates 1411W are more easily directly bonded to each other and the quality of the layered lens structure 1401 is further improved.

Second Modified Example of Layered Lens Structure 1401

Figure 70:
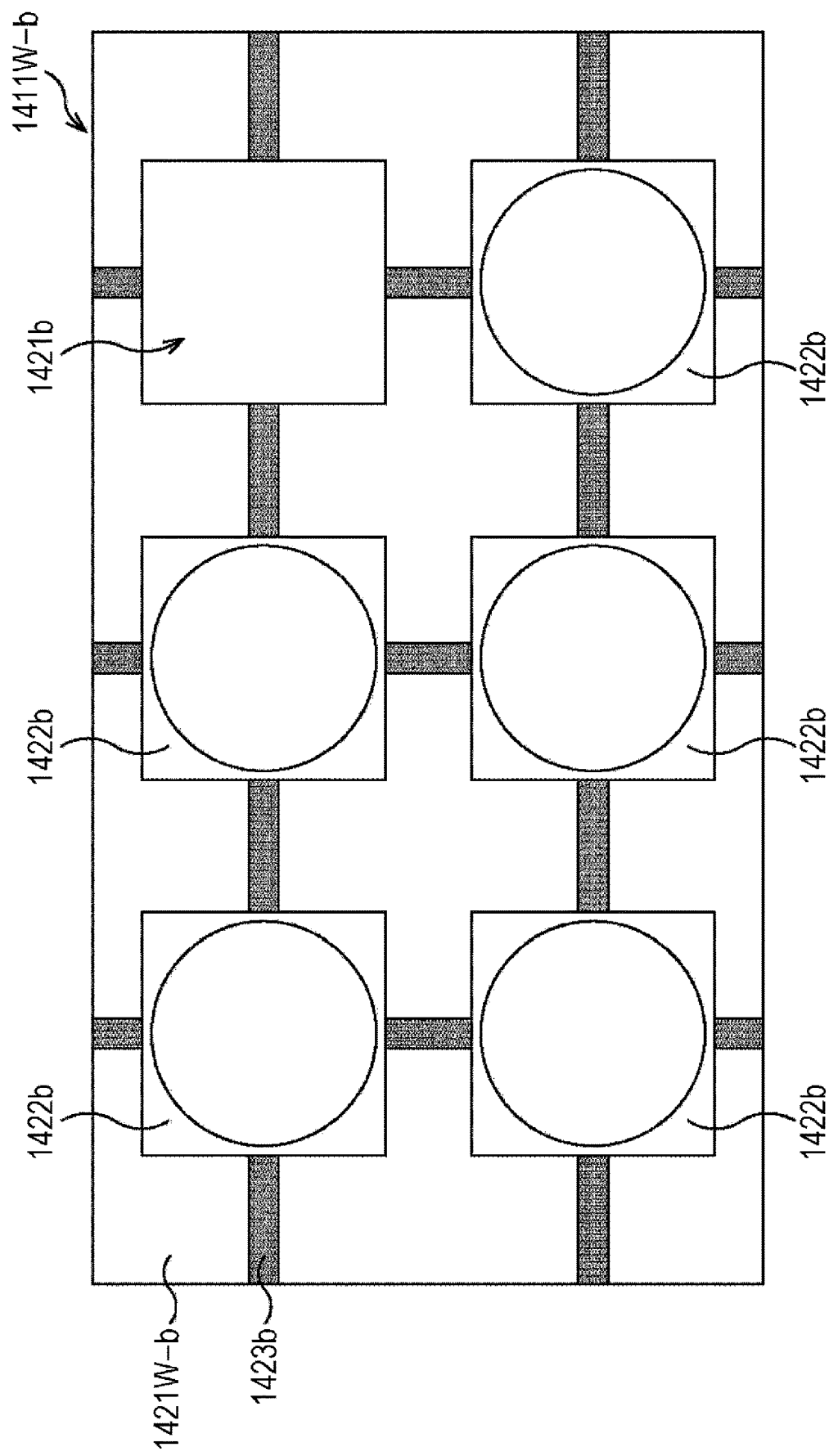
FIG. 70 is a diagram illustrating a second modified example of the layered lens structure of FIG. 55.

Further, for example, as illustrated in FIG. 70, the lens resin portion 1422b may not be formed in a part of the through-hole 1424b in the lens attached substrate 1411W-b. The same applies to the other lens attached substrate 1411W.

In addition, the position of the through-hole 1424 without the lens resin portion 1422 can be arbitrarily set, but it is desirable to set the position of the through-hole so as to match the positions of the lens attached substrates 1411W.

Figure 71:
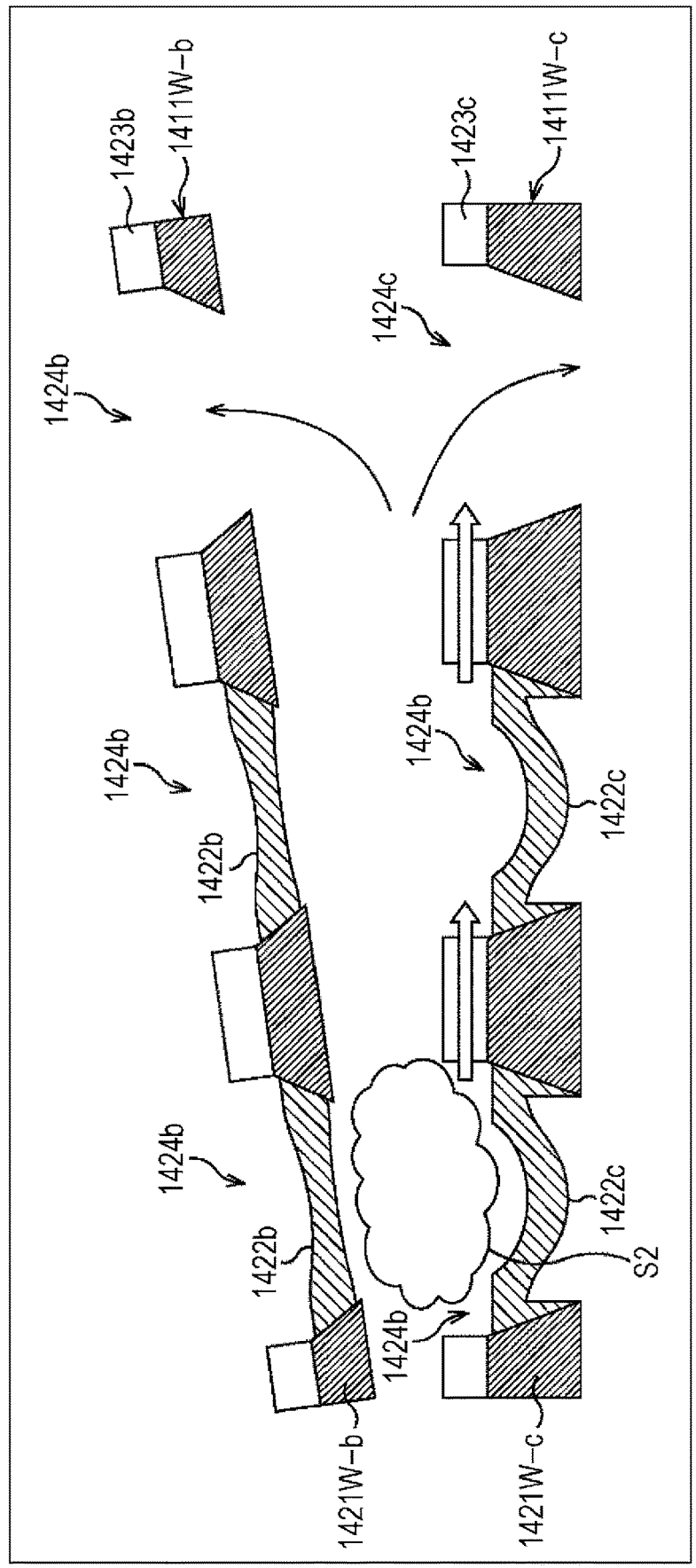
FIG. 71 is a diagram illustrating the second modified example of the layered lens structure of FIG. 55.

Accordingly, for example, as illustrated in FIG. 71, when the lens attached substrate 1411W-b and the lens attached substrate 1411W-c are bonded to each other, the air accumulated inside a space S2 between the lens resin portion 1422b and the lens resin portion 1422c passes through the air groove 1423c and escapes in a direction indicated by the arrow of the drawing. Further, the air also escapes in the up and down direction through the through-hole 1424b without the lens resin portion 1422b and the through-hole 1424c without the lens resin portion 1422c and hence the air more smoothly flows. As a result, the lens attached substrates 1411W are more easily directly bonded to each other and the quality of the layered lens structure 1401 is further improved.

Third Modified Example of Layered Lens Structure 1401

Further, the position and the direction of the air groove 1423 are not limited to the above-described example, and can be arbitrarily set.

Figure 72:
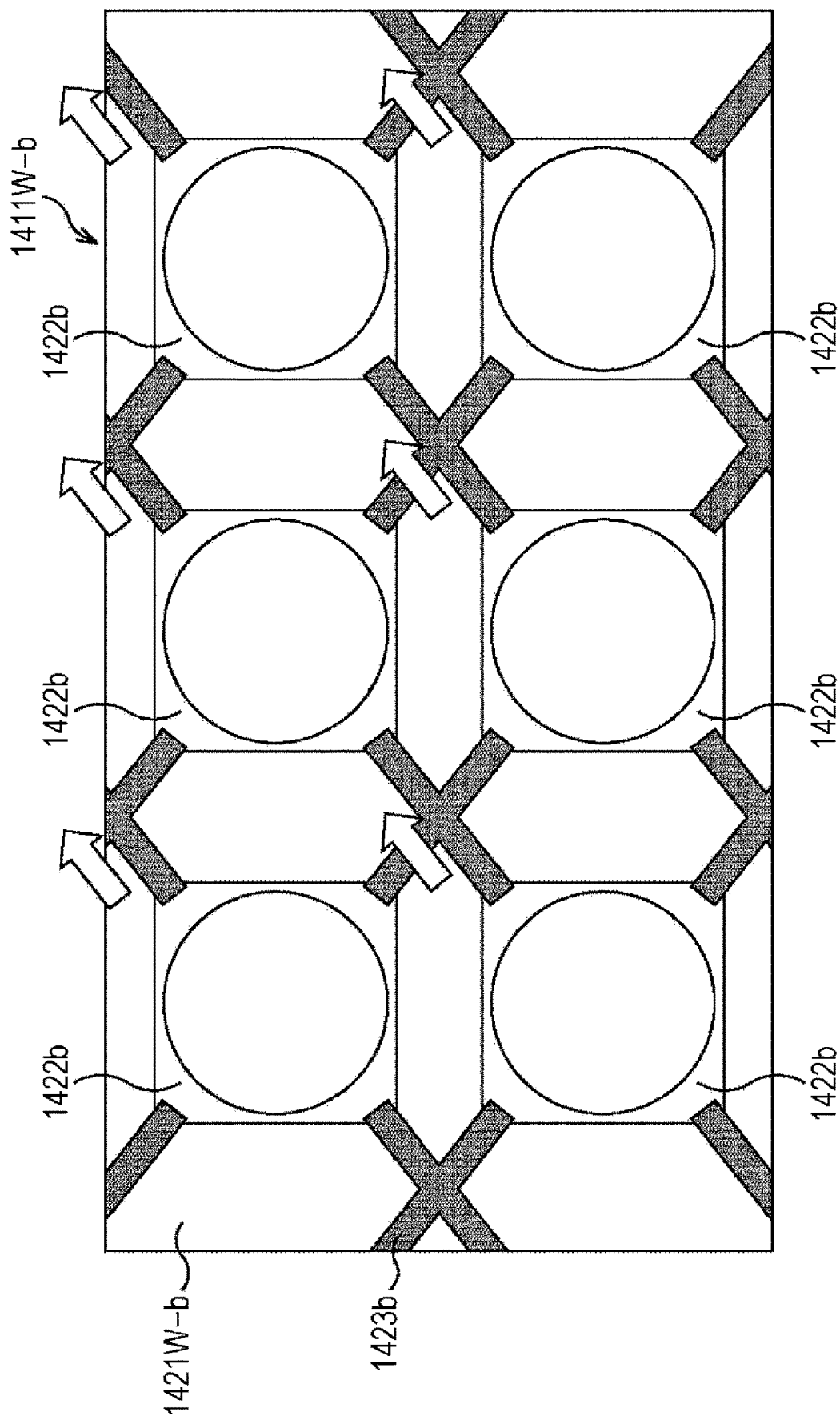
FIG. 72 is a diagram illustrating a third modified example of the layered lens structure of FIG. 55.

For example, as illustrated in FIG. 72, the air groove 1423b may be formed in a direction in which the strength of the surface of the carrier substrate 1421W-b of the lens attached substrate 1411W-b increases. In this example, the air groove 1423b is formed so as to connect the adjacent through-holes 1424b (not illustrated) provided with the lens resin portions 1422b in the oblique direction. Accordingly, degradation in the strength of the carrier substrate 1421W-b due to the air groove 1423 is prevented. The same applies to the other lens attached substrate 1411W.

Fourth Modified Example of Layered Lens Structure 1401

Further, for example, the direction of the air groove 1423 may be changed by the position of the lens attached substrate 1411. Specifically, when the lens attached substrates 1411W are bonded to each other, the air inside the void portion between the lens attached substrates 1411W easily moves in the bonding direction in the bonding process.

Figure 73:
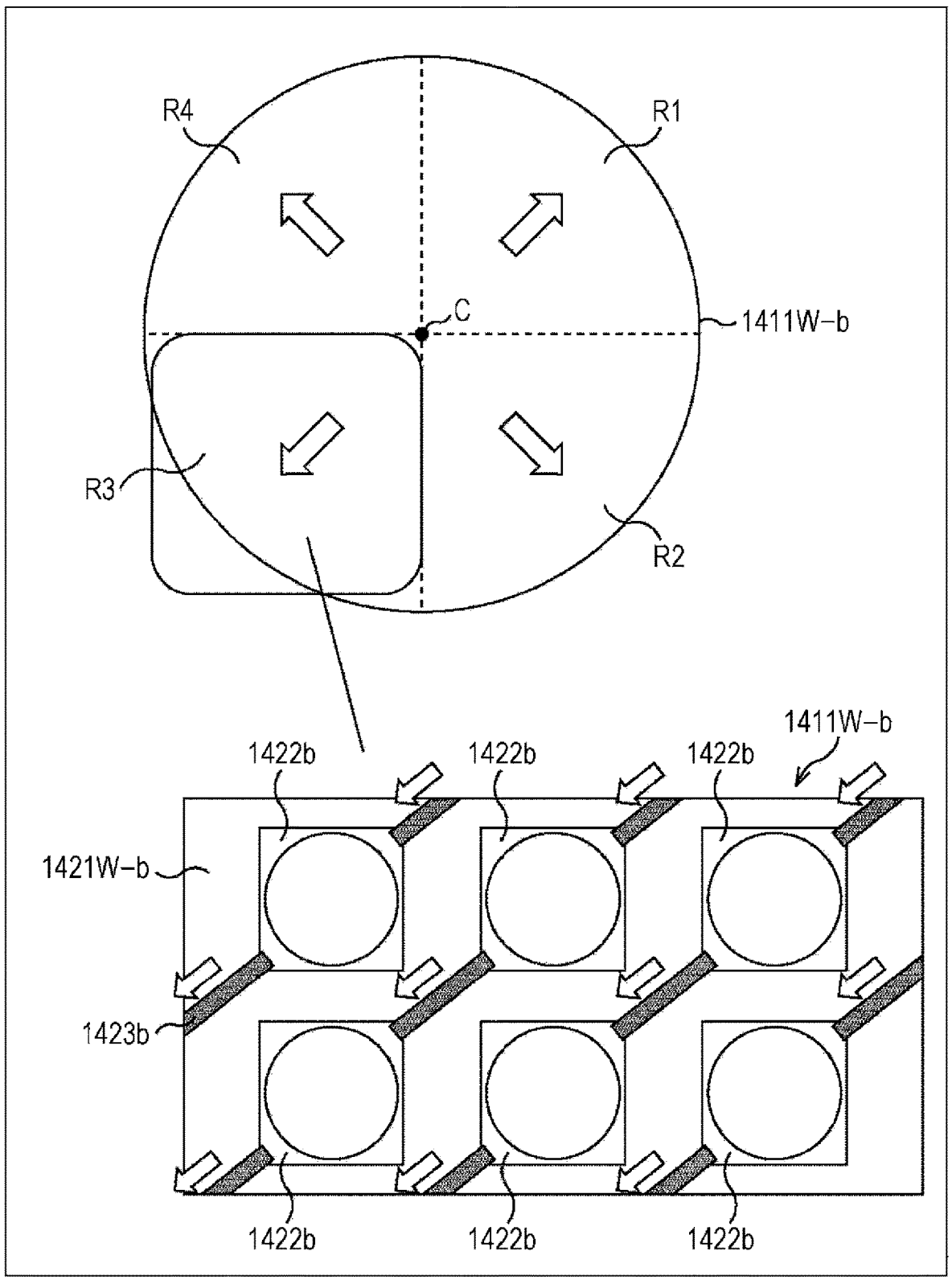
FIG. 73 is a diagram illustrating a fourth modified example of the layered lens structure of FIG. 55.

Here, for example, as illustrated in FIG. 73, the lens attached substrate 1411W-b may be divided into four regions as regions R1 to R4 based on the center C so that the direction of the air groove 1423b of each region is changed. For example, the air groove 1423b is formed in the right upward direction indicated by the arrow inside the right upper region R1 of the lens attached substrate 1411W-b of the drawing. The air groove 1423b is formed in the right downward direction indicated by the arrow inside the right lower region R2 of the lens attached substrate 1411W-b of the drawing. The air groove 1423b is formed in the left downward direction indicated by the arrow inside the left lower region R3 of the lens attached substrate 1411W-b of the drawing. The air groove 1423b is formed in the left upward direction indicated by the arrow inside the left upper region R4 of the lens attached substrate 1411W-b of the drawing.

In FIG. 73, the direction of the air groove 1423b inside the region R3 is depicted. Inside the region R3, the air groove 1423b is formed so as to connect the adjacent through-holes 1424b (not illustrated) provided with the lens resin portions 1422b in the left obliquely downward direction.

Accordingly, the air more smoothly flows. As a result, the lens attached substrates 1411W are more easily directly bonded to each other and the quality of the layered lens structure 1401 is further improved. The same applies to the other lens attached substrate 1411W.

Figure 74:
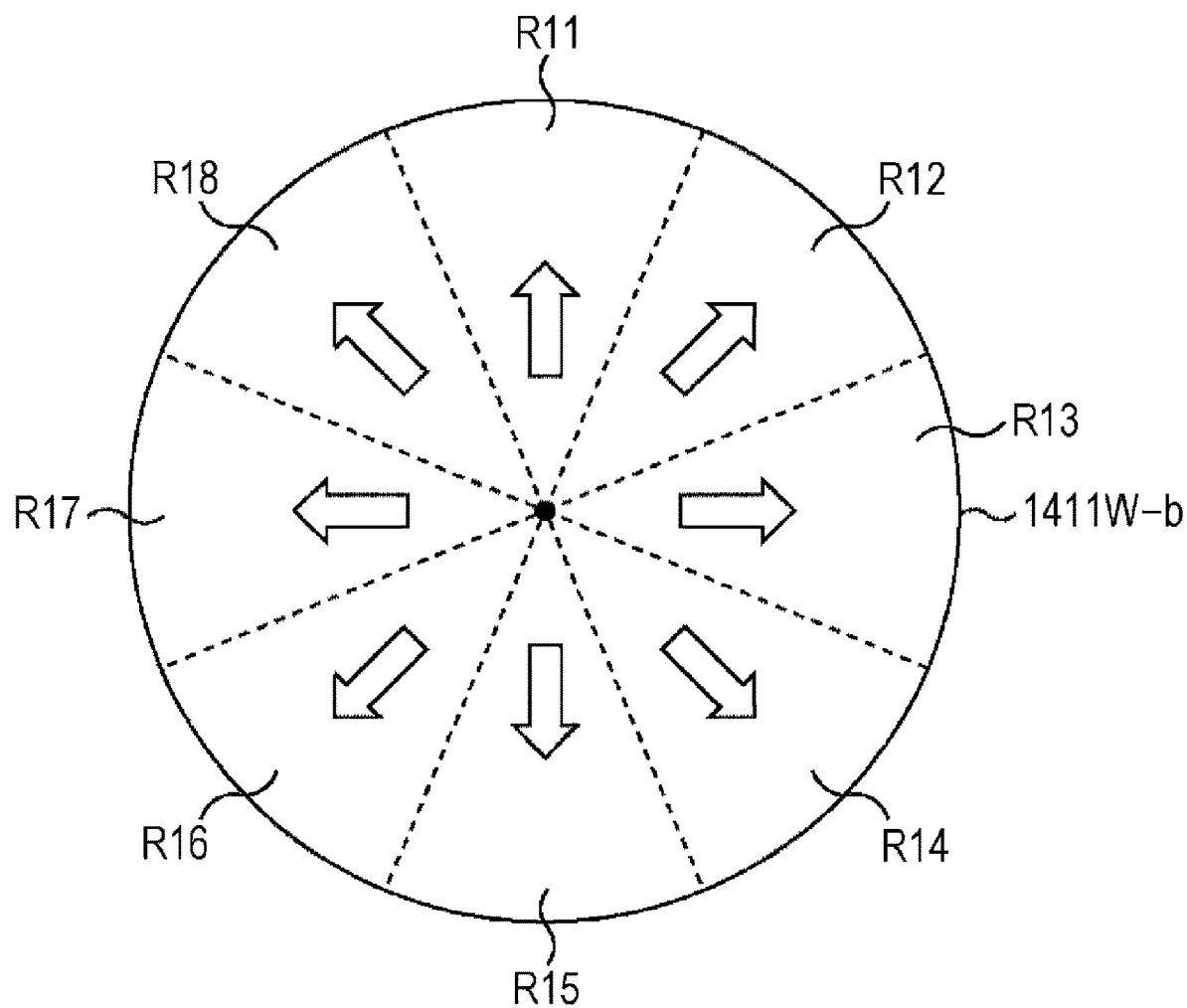
FIG. 74 is a diagram illustrating the fourth modified example of the layered lens structure of FIG. 55.

Further, for example, as illustrated in FIG. 74, the lens attached substrate 1411W-b may be divided into eight regions as regions R11 to R18 based on the center C and the direction of the air groove 1423b of each region may be changed.

For example, the air groove 1423b is formed in the upward direction indicated by the arrow inside the upper region R11 of the lens attached substrate 1411W-b of the drawing. The air groove 1423b is formed in the right upward direction indicated by the arrow inside the right upper region R12 of the lens attached substrate 1411W-b of the drawing. The air groove 1423b is formed in the right direction indicated by the arrow inside the right region R13 of the lens attached substrate 1411W-b of the drawing. The air groove 1423b is formed in the right downward direction indicated by the arrow inside the right lower region R14 of the lens attached substrate 1411W-b of the drawing. The air groove 1423b is formed in the downward direction indicated by the arrow inside the lower region R15 of the lens attached substrate 1411W-b of the drawing. The air groove 1423b is formed in the left downward direction indicated by the arrow inside the left lower region R16 of the lens attached substrate 1411W-b of the drawing. The air groove 1423b is formed in the left direction indicated by the arrow inside the left region R17 of the lens attached substrate 1411W-b of the drawing. The air groove 1423b is formed in the left upward direction indicated by the arrow inside the left upper region R18 of the lens attached substrate 1411W-b of the drawing.

Accordingly, the air more smoothly flows. As a result, the lens attached substrates 1411W are more easily directly bonded to each other and the quality of the layered lens structure 1401 is further improved. The same applies to the other lens attached substrate 1411W.

In addition, there is no need to match the positions and the directions of the air grooves 1423 between the lens attached substrates 1411W. Further, the air groove 1423 can be formed in each lens attached substrate 1411W so as to have a different position and a different direction.

Fifth Modified Example of Layered Lens Structure 1401

Figure 75:
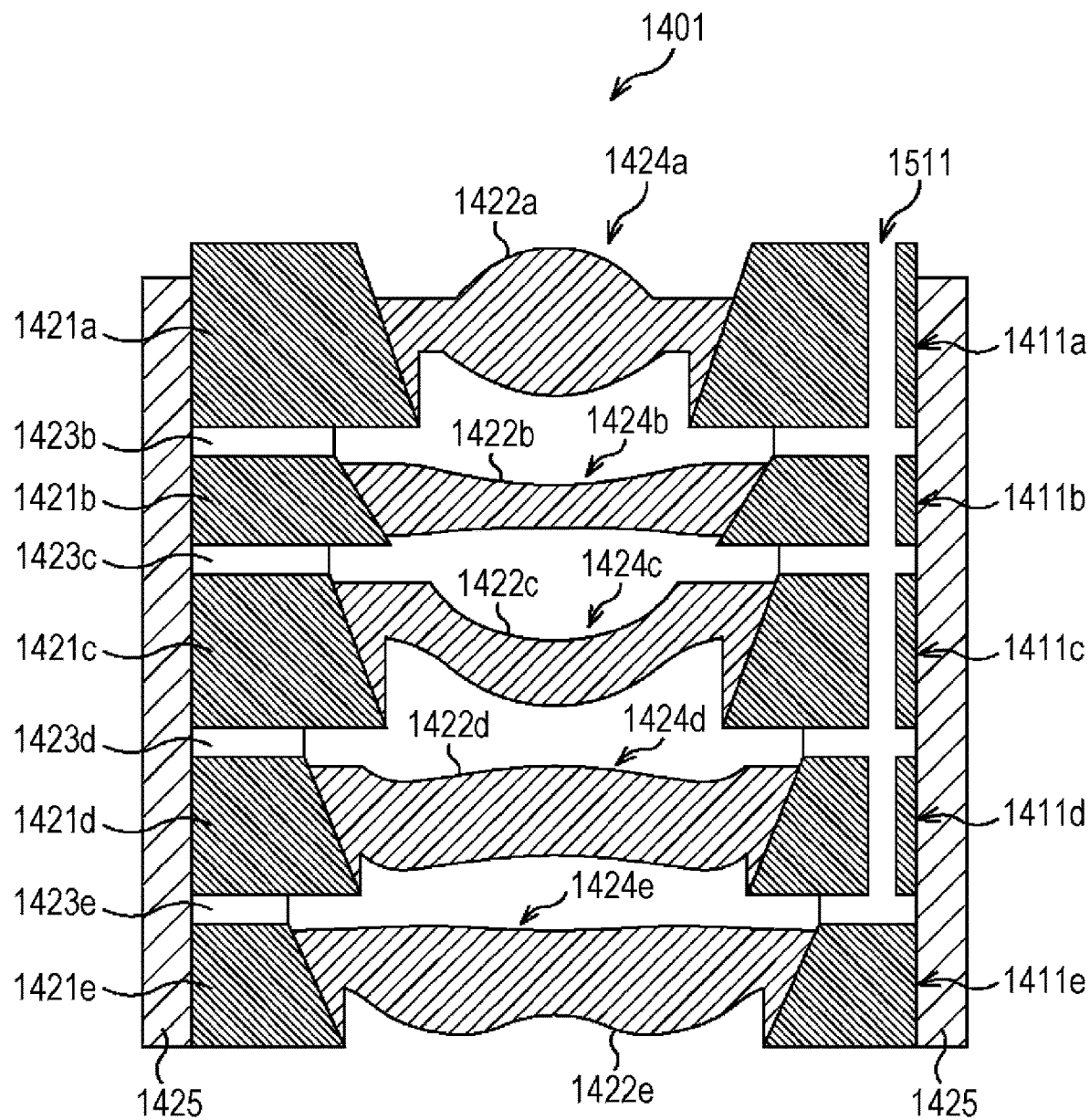
FIG. 75 is a diagram illustrating a fifth modified example of the layered lens structure of FIG. 55.

Further, for example, as illustrated in FIG. 75, a groove 1511 may be formed in the layered lens structure 1401 in the up and down direction. The groove 1511 is formed so as to be adjacent to the air groove 1423 of each lens attached substrate 1411 and is used to release the air flowing in the air groove 1423 in the upward direction.

Figure 76:
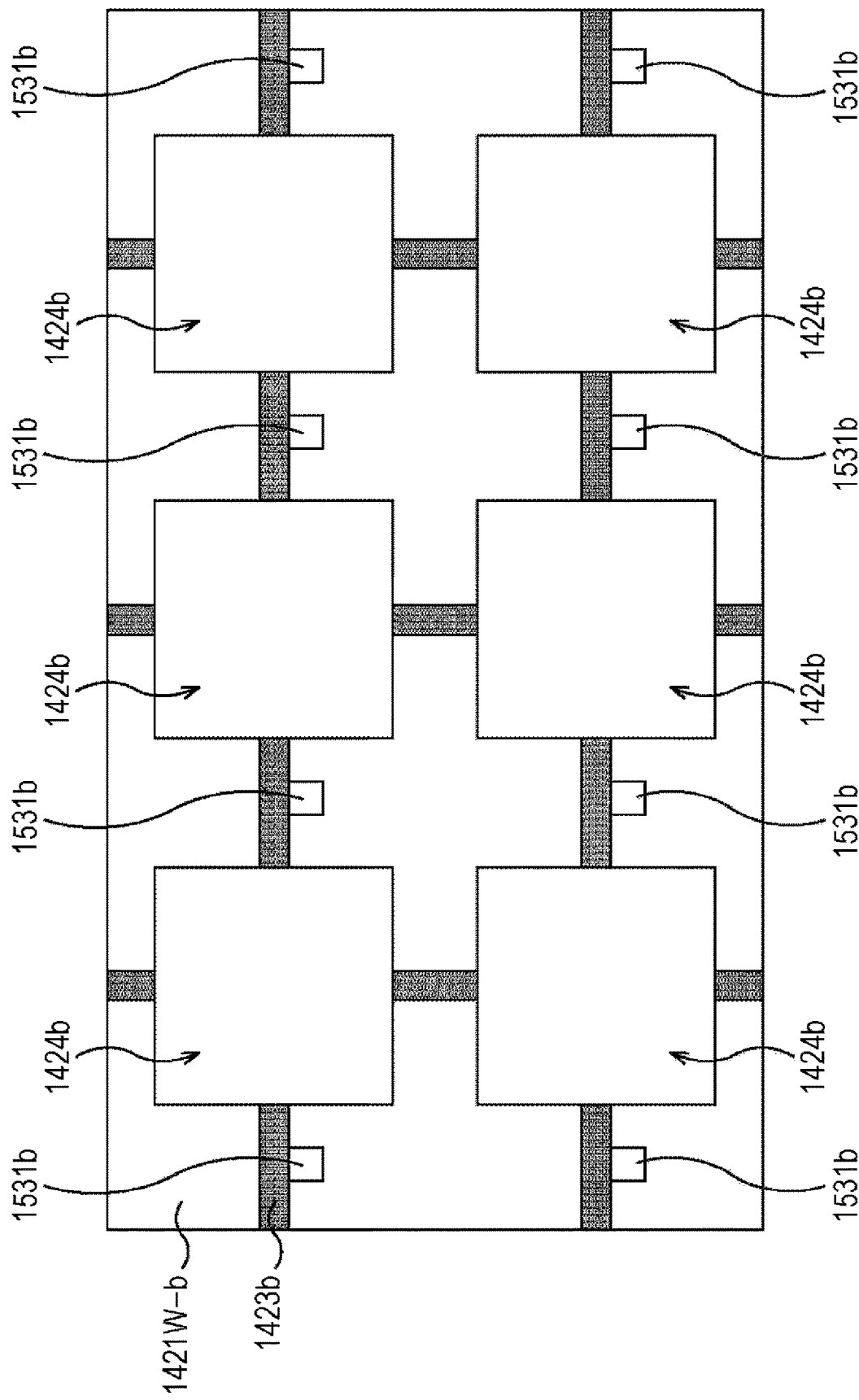
FIG. 76 is a diagram illustrating the fifth modified example of the layered lens structure of FIG. 55.

For example, as illustrated in FIG. 76, in the step of forming the through-hole 1424b and the air groove 1423b of the carrier substrate 1421W-b, a through-hole 1531b is formed so as to be adjacent to the air groove 1423 in the lateral direction of the drawing. Even in the carrier substrates 1421W-a, 1421W-c, and 1421W-d, through-holes 1531a, 1531c, and 1531d (not illustrated) are formed at the same positions as the through-hole 1531b. Then, the lens attached substrates 1411W-a to 1411W-e are bonded so as to connect the through-holes 1531a to 1531d to one another, thereby forming the groove 1511 of FIG. 75.

By the groove 1511, the air of the air groove 1423 and the void portion between the lens attached substrates 1411W escapes in the up and down direction. Accordingly, the lens attached substrates 1411W are more easily directly bonded to each other and the quality of the layered lens structure 1401 is further improved. Further, the efficiency of the replacement of N2 is improved.

In addition, the position and the number of the grooves 1511 can be arbitrarily changed under the condition in which the grooves contact the air groove 1423. Further, for example, the groove 1511 can be formed so as to penetrate the air groove 1423 in the up and down direction.

Further, the groove 1511 may be formed so as to be adjacent to the through-hole 1424.

Figure 77:
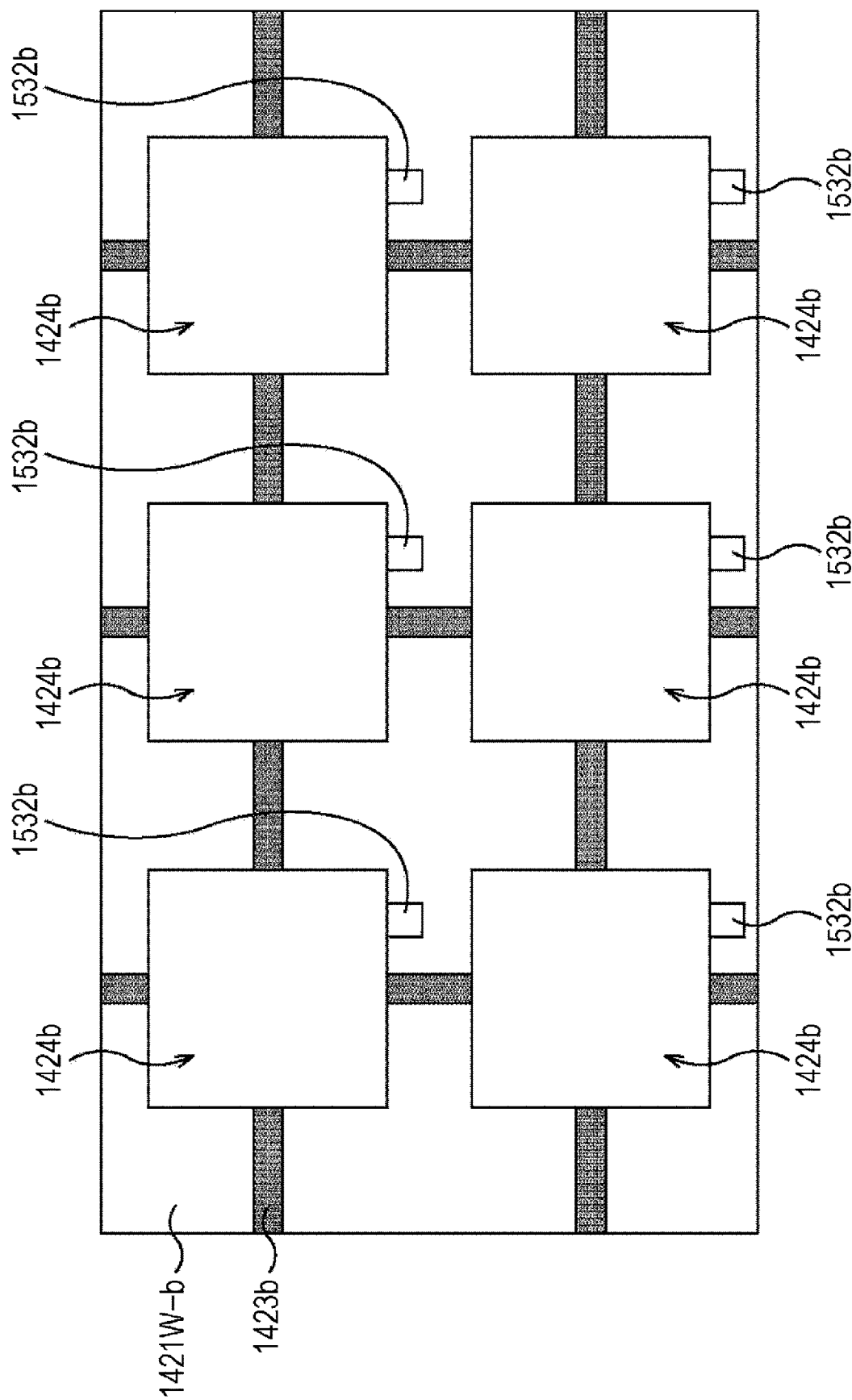
FIG. 77 is a diagram illustrating the fifth modified example of the layered lens structure of FIG. 55.

For example, as illustrated in FIG. 77, in the step of forming the through-hole 1424b and the air groove 1423b of the carrier substrate 1421W-b, a through-hole 1532b is formed at a position adjacent to each through-hole 1424b. Even in the carrier substrates 1421W-a, 1421W-c, and 1421W-d, through-holes 1532a, 1532c, and 1532d (not illustrated) are formed at the same positions as the through-hole 1531b. Then, the lens attached substrates 1411W-a to 1411W-e are bonded so as to connect the through-holes 1532a to 1532d to one another, thereby forming the groove 1511 (not illustrated) adjacent to the through-hole 1424.

Accordingly, the air of the void portion between the lens attached substrates 1411W escapes through the groove 1511 as well as the air groove 1423. Accordingly, the air more smoothly flows. As a result, the lens attached substrates 1411W are more easily directly bonded to each other and the quality of the layered lens structure 1401 is further improved. Further, the efficiency of the replacement of N2 is improved.

In addition, in the example of FIG. 75, an example has been described in which the groove 1511 penetrates the layered lens structure 1401 only in the upward direction. However, for example, the groove may be formed so as to penetrate the layered lens structure in the up and down direction or only in the downward direction.

Sixth Modified Example of Layered Lens Structure 1401

Figure 78:
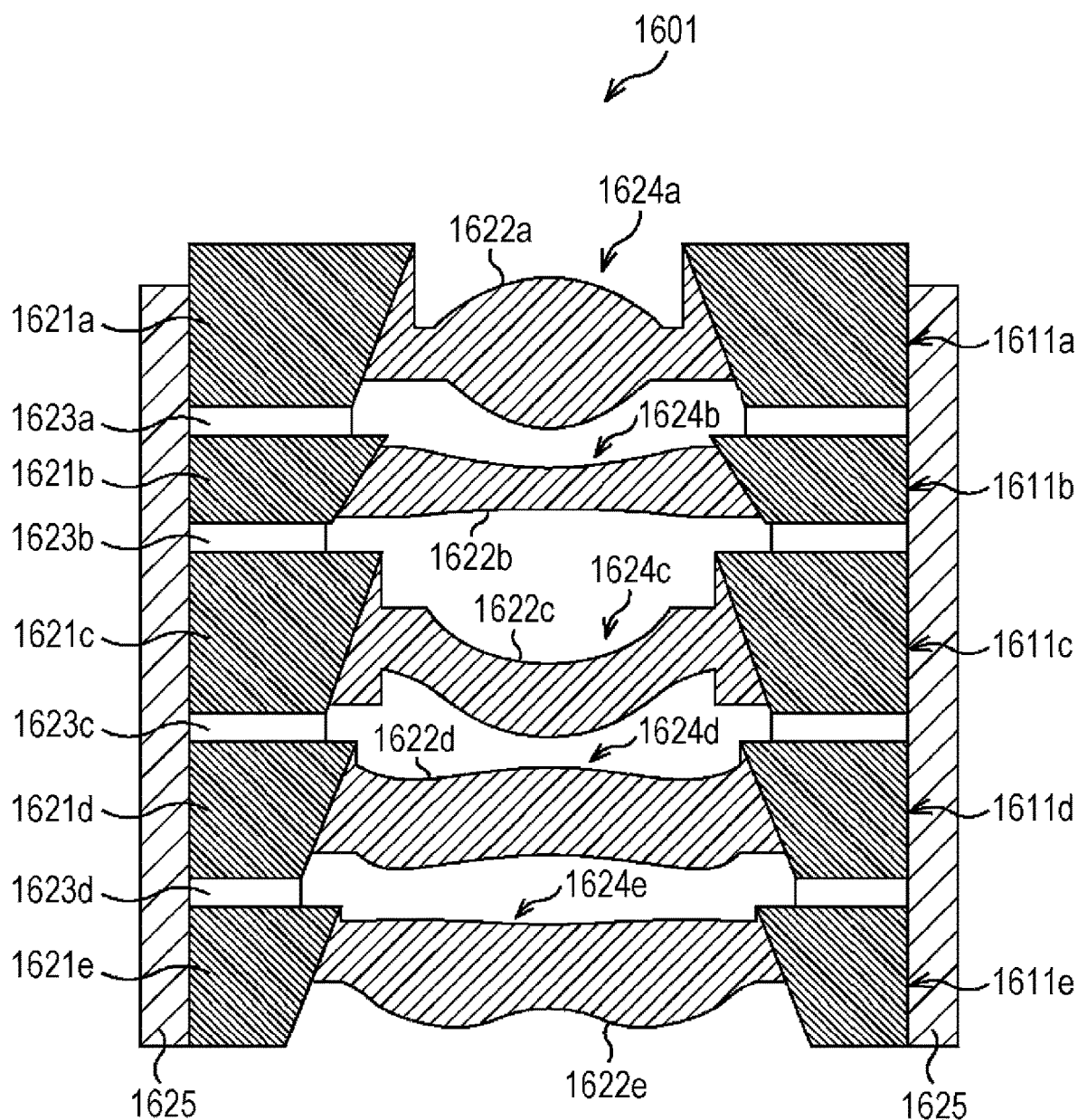
FIG. 78 is a diagram illustrating a sixth modified example of the layered lens structure of FIG. 55.

Further, for example, as illustrated in FIG. 78, in the description above, the air groove can be formed in the lower surface of each lens attached substrate (each carrier substrate) instead of the upper surface thereof.

FIG. 78 is a schematic cross-sectional view of a layered lens structure 1601. In FIG. 78, a part necessary for the description is mainly illustrated and a part not necessary for the description is appropriately omitted.

In the layered lens structure 1601, lens attached substrates 1611a to 1611e are laminated as five layers.

A lens resin portion 1622a is formed inside the through-hole 1624a of the carrier substrate 1621a of the lens attached substrate 1611a. Further, an air groove 1623a is formed in the lower surface of the carrier substrate 1621a. The air groove 1623a is formed in the substrate-like lens attached substrate 1611W-a so as to connect the adjacent through-holes 1624a to each other.

In addition, since the lens attached substrates 1611b to 1611e also have the same configuration as the lens attached substrate 1611a, the description thereof will be omitted. However, an air groove is not formed in the lens attached substrate 1611e.

The side surface of the layered lens structure 1601 is coated with resin 1625. The resin 1625 is used to block the air grooves 1623a to 1623d. Here, an opening formed by the air grooves 1423a to 1423d of the side surface of at least the layered lens structure 1601 may be blocked.

Figure 79:
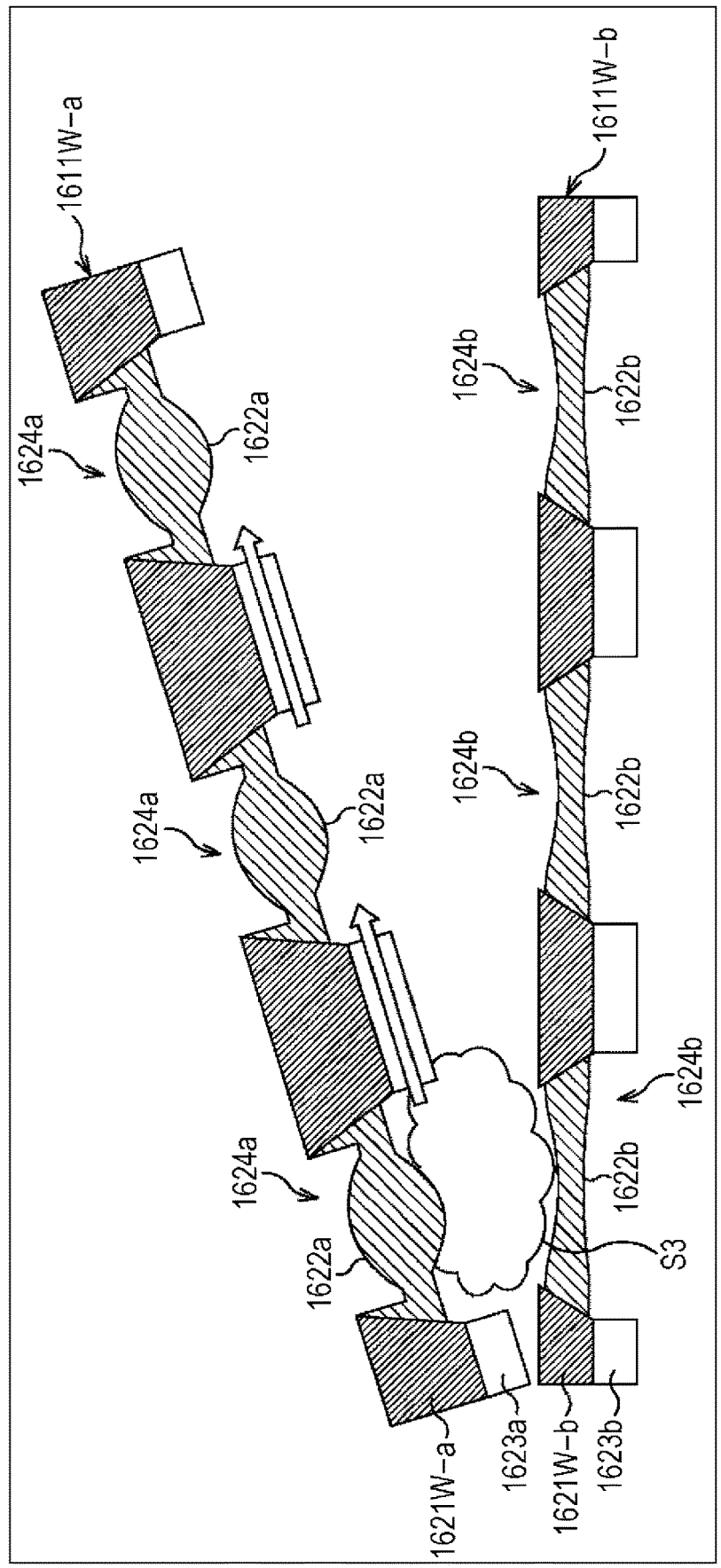
FIG. 79 is a diagram illustrating the sixth modified example of the layered lens structure of FIG. 55.

For example, when the lens attached substrate 1611W-a and the lens attached substrate 1611W-b are bonded to each other, air is accumulated in a space S3 between the lens resin portion 1622a and the lens resin portion 1622b as illustrated in FIG. 79. However, the accumulated air passes through the air groove 1623a of the lower surface of the lens attached substrate 1611W-a and escapes in a direction indicated by the arrow of FIG. 79.

Accordingly, the lens attached substrates 1611W are more easily directly bonded to each other and the quality of the layered lens structure 1601 is improved.

In addition, the air groove may be provided at both upper and lower sides of the lens attached substrate.

Further, the above-described modified examples of the layered lens structure 1401 can be combined with one another.

For example, the above-described technology can be applied to an apparatus in which a void portion is formed among a plurality of substrates when the substrates are laminated as in the void portion among the lens resin portions 1422 of the lens attached substrate 1411 of the layered lens structure 1401.

17. Application Example to Electronic Device

The camera module 1 can be used while being assembled to an electronic device using a solid state image capturing device in an image pickup unit (a photoelectric conversion unit) like an image capturing device such as a digital still camera or a video camera, a portable device having an image capturing function, or a copying machine using a solid-state image capturing device in an image reading unit.

Figure 80:
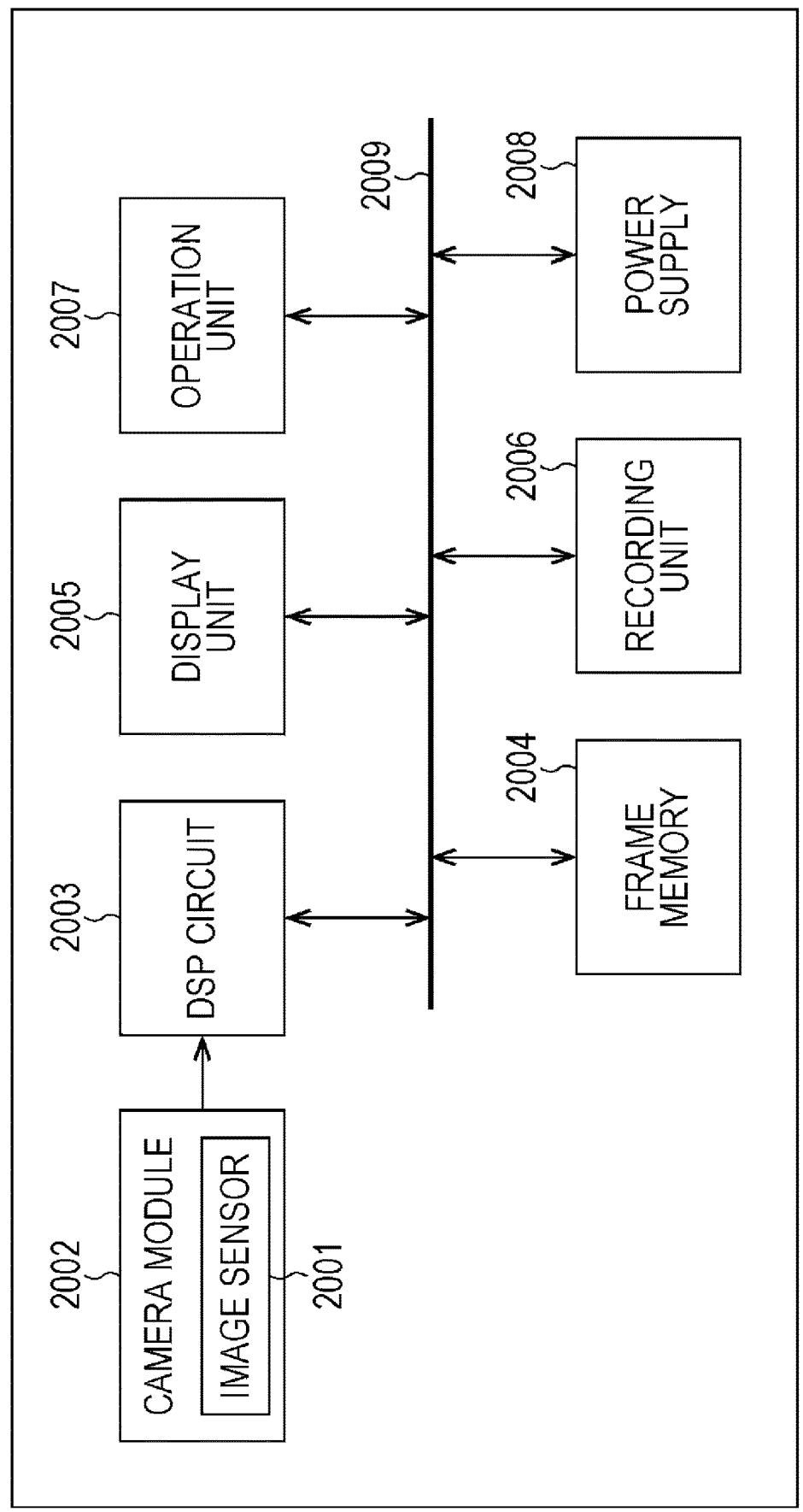
FIG. 80 is a block diagram illustrating a configuration example of an image capturing device as an electronic device according to an embodiment of the present technology.

FIG. 80 is a block diagram illustrating a configuration example of the image capturing device as an electronic device employing the present technology.

An image capturing device 2000 of FIG. 80 includes a camera module 2002 and a digital signal processor (DSP) circuit 2003 as a camera signal processing circuit. Further, the image capturing device 2000 also includes a frame memory 2004, a display unit 2005, a recording unit 2006, an operation unit 2007, and a power supply 2008. The DSP circuit 2003, the frame memory 2004, the display unit 2005, the recording unit 2006, the operation unit 2007 and the power supply 2008 are connected to one another via a bus line 2009.

An image sensor 2001 in the camera module 2002 receives incident light (image light) from a subject, converts the amount of the incident light formed on an imaging surface into an electric signal by the unit of a pixel, and outputs the result as a pixel signal. The camera module 1 is employed as the camera module 2002 and the image sensor 2001 corresponds to the light receiving element 12.

The display unit 2005 is configured as, for example, a panel type display device such as a liquid crystal panel or an organic electro luminescence (EL) panel and displays a moving image or a still image captured by the image sensor 2001. The recording unit 2006 records a moving image or a still image captured by the image sensor 2001 on a recording medium such as a hard disk or a semiconductor memory.

The operation unit 2007 issues an operation instruction for various functions of the image capturing device 2000 by the operation of the user. The power supply 2008 appropriately supplies power used for operating the DSP circuit 2003, the frame memory 2004, the display unit 2005, the recording unit 2006, and the operation unit 2007 to the supply target thereof.

As described above, when the camera module 1 equipped with the layered lens structure 11 bonded (laminated) with positioning high accuracy is used as the camera module 2002, an increase in image quality and a decrease in size can be realized. Thus, even in the image capturing device 2000 such as a video camera, a digital still camera, and a mobile camera module for a cellular phone, a decrease in size of a semiconductor package and an increase in image quality of a captured image can be obtained at the same time.

18. Usage Example of Image Sensor

The technology according to an embodiment of the present disclosure may be applied to various products. For example, the technology according to an embodiment of the present disclosure may be applied to an internal information acquisition system for a patient, which uses an endoscopic capsule.

Figure 81:
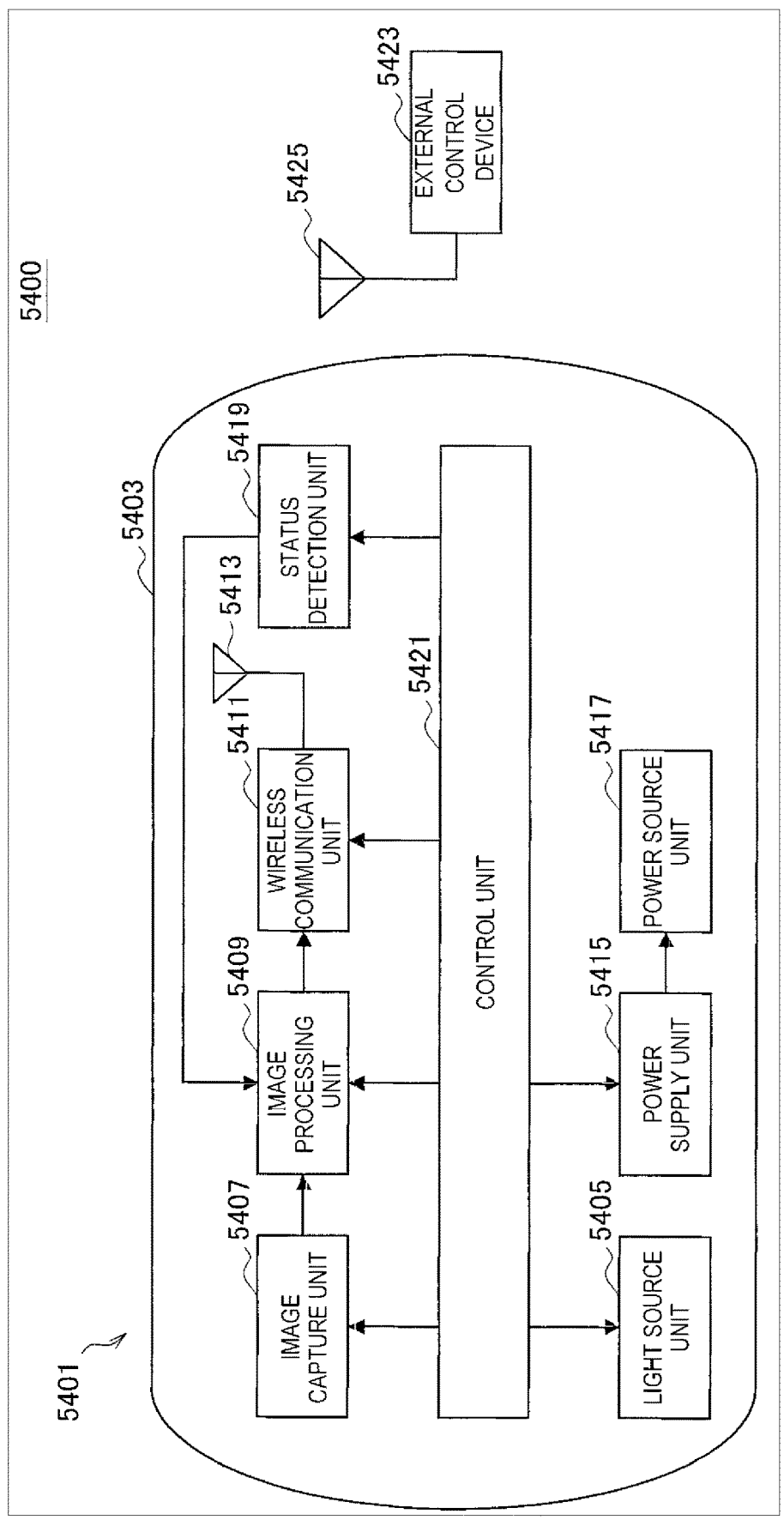
FIG. 81 is a block diagram illustrating an example of a schematic configuration of an internal information acquisition system.

FIG. 81 is a diagram illustrating an example of a schematic configuration of an internal information acquisition system 5400 to which the technology according to an embodiment of the present disclosure may be applied. Referring to FIG. 81, the internal information acquisition system 5400 includes an endoscopic capsule 5401, and an external control device 5423 that centrally controls the operation of the internal information acquisition system 5400. The endoscopic capsule 5401 is swallowed by a patient in an examination. The endoscopic capsule 5401 has an image capture function and a wireless communication function. The endoscopic capsule 5401 moves through the interior of organs such as the stomach and the intestines by peristaltic movement or the like until being excreted naturally from the patient, while also successively capturing images (hereinafter also called internal images) of the interior of the relevant organs at predetermined intervals, and successively wirelessly transmitting information about the internal images to the external control device 5423 outside the body. Based on the received information about the internal images, the external control device 5423 generates image data for displaying the internal images on a display device (not illustrated). In this way, with the internal information acquisition system 5400, images depicting the patient's internal conditions can be obtained continually from the time the endoscopic capsule 5401 is swallowed to the time the endoscopic capsule 5401 is excreted.

The configurations and functions of the endoscopic capsule 5401 and the external control device 5423 will be described in further detail. As illustrated in FIG. 81, the endoscopic capsule 5401 has the functions of a light source unit 5405, an image capture unit 5407, an image processing unit 5409, a wireless communication unit 5411, a power supply unit 5415, a power source unit 5417, a status detection unit 5419, and a control unit 5421 built in a capsule-shaped housing 5403.

The light source unit 5405 includes a light source such as a light-emitting diode (LED), for example, and irradiates the imaging field of the image capture unit 5407 with light.

The image capture unit 5407 includes an image sensor, and an optical system made up of multiple lenses provided in front of the image sensor. Reflected light (hereinafter called observation light) from the light used to irradiate a body tissue which is the object of observation is condensed by the optical system and incident on the image sensor. The image sensor receives and photoelectrically converts the observation light to thereby generate an electrical signal corresponding to the observation light, or in other words, an image signal corresponding to the observed image. The image signal generated by the image capture unit 5407 is provided to the image processing unit 5409. Note that various known image sensors such as a complementary metal-oxide-semiconductor (CMOS) image sensor or a charge-coupled device (CCD) image sensor may be used as the image sensor of the image capture unit 5407.

The image processing unit 5409 includes a processor such as a central processing unit (CPU) or a graphics processing unit (GPU), and performs various types of signal processing on the image signal generated by the image capture unit 5407. This signal processing may be a minimal level of processing (such as image data compression, frame rate conversion, data rate conversion, and/or format conversion, for example) for transmitting the image signal to the external control device 5423. Configuring the image processing unit 5409 to perform only a minimal necessary level of processing makes it possible to realize the image processing unit 5409 in a more compact form with lower power consumption, which is preferable for the endoscopic capsule 5401. However, if there is extra space or available power inside the housing 5403, additional signal processing (such as a noise removal process or other image quality-improving processes, for example) may also be performed by the image processing unit 5409. The image processing unit 5409 provides the image signal subjected to the signal processing to the wireless communication unit 5411 as raw data. Note that if information about the status (such as movement or orientation) of the endoscopic capsule 5401 is acquired by the status detection unit 5419, the image processing unit 5409 may also provide the image signal to the wireless communication unit 5411 in association with the information. This makes it possible to associate the position inside the body where an image is captured, the direction in which the image is captured and the like with the captured image.

The wireless communication unit 5411 includes a communication device capable of transmitting and receiving various types of information to and from the external control device 5423. This communication device includes, for example, an antenna 5413 and a processing circuit that performs processing such as modulation processing for transmitting and receiving signals. The wireless communication unit 5411 performs predetermined processing such as modulation processing on the image signal that was subjected to the signal processing by the image processing unit 5409, and transmits the image signal to the external control device 5423 via the antenna 5413. In addition, the wireless communication unit 5411 receives, from the external control device 5423 via the antenna 5413, a control signal related to driving control of the endoscopic capsule 5401. The wireless communication unit 5411 provides the received control signal to the control unit 5421.

The power supply unit 5415 includes, for example, an antenna coil for receiving power, a power regeneration circuit for regenerating power from a current produced in the antenna coil, and a voltage step-up circuit. In the power supply unit 5415, the principle of what is called contactless or wireless charging is used to generate power. Specifically, an external magnetic field (electromagnetic wave) of a predetermined frequency provided to the antenna coil of the power supply unit 5415 produces an induced electromotive force in the antenna coil. This electromagnetic wave may be a carrier wave transmitted from the external control device 5423 via an antenna 5425, for example. Power is regenerated from the induced electromotive force by the power regeneration circuit, and the electric potential of the power is suitably adjusted in the voltage step-up circuit, thereby generating power for power storage. The power generated by the power supply unit 5415 is stored in the power source unit 5417.

The power source unit 5417 includes a secondary battery, and stores power generated by the power supply unit 5415. FIG. 81 omits arrows or the like indicating the recipients of power from the power source unit 5417 for brevity, but power stored in the power source unit 5417 is supplied to the light source unit 5405, the image capture unit 5407, the image processing unit 5409, the wireless communication unit 5411, the status detection unit 5419, and the control unit 5421, and may be used to drive these components.

The status detection unit 5419 includes a sensor such as an acceleration sensor and/or a gyro sensor for detecting the status of the endoscopic capsule 5401. The status detection unit 5419 can acquire information about the status of the endoscopic capsule 5401 from detection results from the sensor. The status detection unit 5419 provides the acquired information about the status of the endoscopic capsule 5401 to the image processing unit 5409. As discussed earlier, in the image processing unit 5409, the information about the status of the endoscopic capsule 5401 may be associated with the image signal.

The control unit 5421 includes a processor such as a CPU, and centrally controls the operation of the endoscopic capsule 5401 by operating in accordance with a predetermined program. The control unit 5421 appropriately controls the driving of the light source unit 5405, the image capture unit 5407, the image processing unit 5409, the wireless communication unit 5411, the power supply unit 5415, the power source unit 5417, and the status detection unit 5419 in accordance with a control signal transmitted from the external control device 5423, thereby realizing the function of each component as described above.

The external control device 5423 may be a processor such as a CPU or GPU, or a device such as a microcontroller or a control board on which a processor and a storage element such as memory are mounted. The external control device 5423 includes the antenna 5425, and is capable of transmitting and receiving various types of information to and from the endoscopic capsule 5401 via the antenna 5425. Specifically, the external control device 5423 controls the operation of the endoscopic capsule 5401 by transmitting a control signal to the control unit 5421 of the endoscopic capsule 5401. For example, a light irradiation condition under which the light source unit 5405 irradiates a target of observation with light may be changed by a control signal from the external control device 5423. In addition, an image capture condition (such as the frame rate and the exposure level in the image capture unit 5407, for example) may be changed by a control signal from the external control device 5423. In addition, the content of processing in the image processing unit 5409 and a condition (such as the transmission interval and the number of images to transmit, for example) under which the wireless communication unit 5411 transmits the image signal may be changed by a control signal from the external control device 5423.

In addition, the external control device 5423 performs various types of image processing on the image signal transmitted from the endoscopic capsule 5401, and generates image data for displaying a captured internal image on a display device. For the image processing, various known signal processing, such as a development process (demosaicing process), an image quality-improving process (such as a band enhancement process, a super-resolution process, a noise reduction (NR) process, and/or a shake correction process), and/or an enlargement process (electronic zoom process), may be performed. The external control device 5423 controls the driving of a display device (not illustrated), and causes the display device to display a captured internal image on the basis of the generated image data. Alternatively, the external control device 5423 may also cause a recording device (not illustrated) to record the generated image data, or cause a printing device (not illustrated) to make a printout of the generated image data.

The above describes an example of the internal information acquisition system 5400 to which the technology according to an embodiment of the present disclosure may be applied. Among the configurations described in the foregoing, the technology according to an embodiment of the present disclosure may be applied favorably to an endoscopic capsule. Specifically, this invention is effective for downsizing an imaging device and reducing the burden on patients applying technology according to an embodiment of the present.

Figure 82:
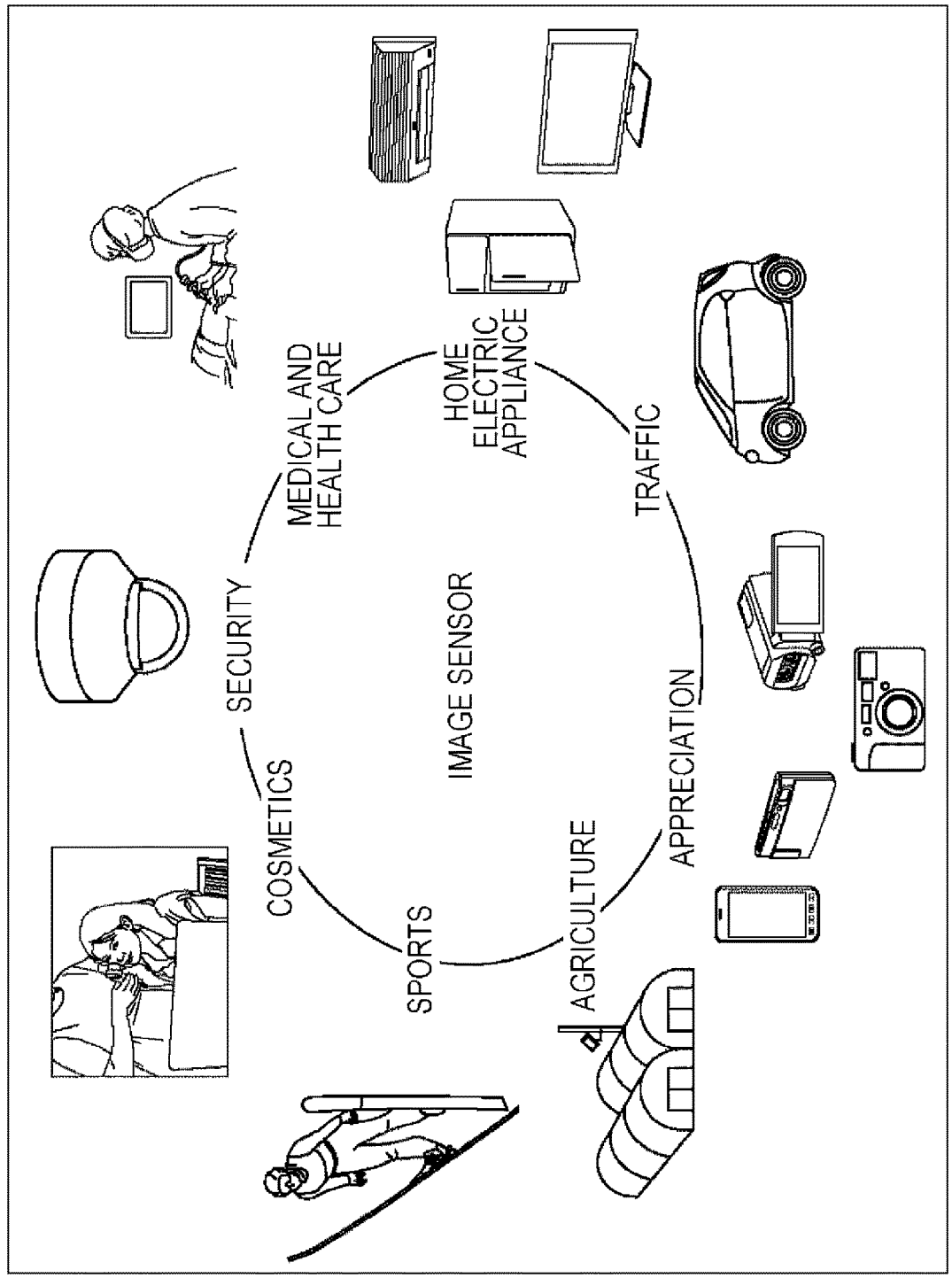
FIG. 82 is a diagram illustrating a usage example of an image sensor.

FIG. 82 is a diagram illustrating a usage example in which the camera module 1 is used as an image sensor.

An image sensor configured as the camera module 1 can be used in, for example, various cases that sense visible light, infrared light, UV light, and X-ray.

The image sensor can be applied to a device for capturing an appreciation image such as a digital camera or a portable device having a camera function.

The image sensor can be applied to a traffic monitoring device such as a vehicle installed sensor for capturing an image at a front position, a rear position, a peripheral position, or an interior position of a vehicle in order to check a safe driving mode such as an automatic stop or recognize a driver status, a monitoring camera for monitoring a traveling vehicle or a road, and a distance measuring sensor for measuring a vehicle-to-vehicle distance.

The image sensor can be applied to a device provided in a home electric appliance such as a TV, a refrigerator, and an air conditioner in order to capture the gesture of a user and perform an operation in accordance with the gesture.

The image sensor can be applied to a medical or health care device such as an endoscope or a device capturing a blood vessel by receiving infrared light.

The image sensor can be applied to a security device such as a crime prevention monitoring camera or a face verifying camera.

The image sensor can be applied to a cosmetic device such as a skin measuring unit capturing a skin or a microscope capturing a scalp.

The image sensor can be applied to a sports device such as an action camera or a wearable camera used in sports.

The image sensor can be applied to an agricultural device such as a camera for monitoring conditions of fields and crops.

The embodiment of the present technology is not limited to the above-described embodiment, and various modifications can be made without departing from the spirit of the present technology.

For example, the present technology is not limited to the application of the solid state image capturing device which detects the distribution of the incident light amount of the visible light and captures the result as an image. For example, the present technology can be applied to a solid state image capturing device which captures an input distribution of infrared light, X-ray, or particles as an image or a solid state image capturing device (a physical amount distribution detecting device) such as a finger print detecting sensor which detects other physical amount distribution of a pressure or a capacitance to capture the distribution as an image in a broad sense of meaning.

For example, a part or the entirety of the above-described embodiments can be combined.

In addition, the effect of the present specification is merely an example and is not limited. Further, an effect other than the effect of the present specification may be used.

In addition, the present technology can have the following configurations.

(1) A lens substrate comprising:
a through-hole; a lens portion formed at an inner side of the through-hole; and an air groove formed in a surface of the lens substrate, wherein the air groove is configured to direct air away from the through-hole during a manufacturing process.

(2) The lens substrate according to (1) above, further comprising: a second lens substrate bonded to the lens substrate, the second lens substrate including a second through-hole; and a second lens portion formed at an inner side of the second through-hole, wherein the air groove is configured to direct air accumulated between the lens portion of the through-hole and the second lens portion of the second through-hole away from the through-hole and the second through-hole when the substrate and the second substrate are bonded together.

(3) The lens substrate according to (2) above, further comprising a blocking material configured to block the air groove.

(4) The lens substrate according to (3) above, wherein the blocking material is resin.

(5) The lens substrate according to anyone of (2) to (4) above, wherein the air groove is formed in one of an upper surface of the lens substrate or a lower surface of the lens substrate.

(6) The lens substrate according to any one of (2) to (5) above, wherein a distance between a bottom surface of the air groove and a surface of the second lens substrate is less than a distance between a surface of the lens portion and the surface of the second lens substrate.

(7) The lens substrate according to any one of (1) to (6) above, wherein a cross-sectional shape of the air groove is one of rectangular or triangular.

(8) The lens substrate according to any one of (1) to (7) above, further comprising a plurality of lens substrates, each lens substrate of the plurality of lens substrates including a through-hole with a lens portion formed therein and one or more air grooves formed between adjacent stacked lens substrates, wherein the one or more air grooves are configured to direct air accumulated between adjacent lens portions of the adjacent stacked lens substrates away from adjacent through-holes of the adjacent stacked lens substrates as the adjacent stacked lens substrates are bonded together.

(9) The lens substrate according to (8) above, further comprising a second through-hole in the lens substrate, wherein the second through-hole does not include a lens portion formed therein.

(10) The lens substrate according to (8) or (9) above, further comprising a second through-hole in the lens substrate, wherein the second through-hole is adjacent to the air groove formed in the surface of the lens substrate.

(11) The lens substrate according to (10) above, wherein the second through-hole is coupled to through-holes with lens portions disposed therein in adjacent stacked lens substrates.

(12) The lens substrate according to any one of (1) to (11) above, further comprising a plurality of air grooves formed in the surface of the lens substrate, wherein the plurality of air grooves is arranged in a lattice shape so as to pass through a substantial center of each side of the through-hole.

(13) The lens substrate according to any one of (1) to (12) above, wherein a planar shape of at least a portion of the through-hole is rectangular.

(14) The lens substrate according to any one of (1) to (13) above, further comprising a plurality of air grooves formed in the surface of the lens substrate, wherein a direction of the plurality of air grooves with respect to the through-hole varies based on a position of the through-hole in the lens substrate.

(15) The lens substrate according to any one of (1) to (14) above, wherein the air groove couples adjacent through-holes in the lens substrate during the manufacturing process.

(16) The lens substrate according to (15) above, wherein the air groove connects adjacent through-holes in the lens substrate in an oblique direction.

(17) The lens substrate according to (16) above, wherein each of the through-holes of the plurality of through-holes is connected to any one of the through-holes of the plurality of through-holes via one or more air grooves of the plurality of air grooves.

(18) The lens substrate according to any one of (15) to (17) above, further comprising: a plurality of through-holes formed in the lens substrate, each through-hole of the plurality of through-holes including a lens portion formed at an inner side thereof; and a plurality of air grooves formed on surfaces of the plurality of lens substrates such that each through-hole of the plurality of through-holes is connected to another one of the through-holes of the plurality of through-holes via at least one air groove of the plurality of air grooves.

(19) A method of manufacturing a lens substrate, the method comprising: forming a first through-hole in a first substrate; forming a first lens portion at an inner side of the first through-hole; forming an air groove in a surface of the first substrate; forming a second through-hole in a second substrate; forming a second lens portion at an inner side of the second through-hole; and bonding the first and second substrates together, wherein the air groove is configured to direct air accumulated between the first lens portion of the first through-hole and the second lens portion of the second through-hole away from the first and second through-holes when the first and second substrates are bonded together.

(20) An electronic apparatus comprising: a stacked lens structure including: a plurality of stacked lens substrates, wherein two or more lens substrates of the plurality of stacked lens substrates include: a through-hole formed in each of the two or more lens substrates, each through-hole including a lens portion formed at an inner side therein, and an air groove formed in a surface of each of the two or more lens substrates, wherein the air groove is configured to direct air away from the through-hole during a manufacturing process; and an optical sensor formed on a sensor substrate, wherein the sensor substrate and the stacked lens structure are stacked.

(21) A lens attached substrate including: a plurality of first through-holes; a lens that is disposed inside each of the first through-holes, and a groove that is formed so as to connect the first through-holes to one another.

(22) The lens attached substrate according to (21), wherein each of the first through-holes is connected to any one of the first through-holes disposed at ends of the lens attached substrate through the groove and the other first through-holes.

(23) The lens attached substrate according to (21) or (22), wherein the groove reaches the end of the lens attached substrate.

(24) The lens attached substrate according to any one of (21) to (23), wherein the groove extends in a direction in which the strength of a surface of the lens attached substrate increases.

(25) The lens attached substrate according to any one of (21) to (24), wherein the groove extends in a bonding direction when the lens attached substrate is bonded to the other lens attached substrate.

(26) The lens attached substrate according to any one of (21) to (25), wherein a second through-hole is formed so as to be connected to the groove or at least one of the first through-holes.

(27) A layered lens structure manufacturing method including: a first step of respectively forming a plurality of first through-holes in a plurality of substrates and forming a groove connecting the first through-holes; a second step of forming a lens inside each of the first through-holes of each substrate; a third step of laminating the substrates by direct bonding; and a fourth step of dividing the laminated substrates.

(28) The layered lens structure manufacturing method according to (27), wherein in the second step, the lens is not formed in a part of the first through-holes.

(29) The layered lens structure manufacturing method according to (27) or (28), wherein in the first step, a second through-hole is formed in at least a part of the substrate so as to be connected to the groove or at least one of the first through-holes.

(30) The layered lens structure manufacturing method according to any one of (27) to (29), further including: a fifth step of sealing an opening formed by the groove of a side surface of the divided layered lens structure by resin.

(31) A layered lens structure manufactured by a process including a first step of respectively forming a plurality of through-holes in a plurality of substrates and forming a groove connecting the through-holes, a second step of forming a lens inside each of the through-holes of each substrate, a third step of laminating the substrates by direct bonding, and a fourth step of dividing the laminated substrates.

(32) An electronic device including a layered lens structure manufactured by a process including a first step of respectively forming a plurality of through-holes in a plurality of substrates and forming a groove connecting the through-holes, a second step of forming a lens inside each of the through-holes of each substrate, a third step of laminating the substrates by direct bonding, and a fourth step of dividing the laminated substrates.

REFERENCE SIGNS LIST

1 Camera module
11 Layered lens structure
12 Light receiving element
13 Optical unit
21 lens
41 (41a to 41e) Lens attached substrate
43 Sensor substrate
51 Diaphragm plate
52 Opening portion
81 Carrier substrate
82 Lens resin portion
83 Through-hole
121 Light shielding film
122 Upper surface layer
123 Lower surface layer
141 Etching mask
142 Protection film
1401 Layered lens structure
1421a to 1421e Carrier substrate
1422a to 1422e Lens resin portion
1423a to 1423e Air groove
1424a to 1424e Through-hole
1425 Resin
1511 Groove
1531b, 1532b Through-hole
1601 Layered lens structure
1621a to 1621e Carrier substrate
1622a to 1622e Lens resin portion
1623a to 1623e Air groove
1624a to 1624e Through-hole
1625 Resin
2000 Image capturing device
2001 Image sensor
2002 Camera module

What is claimed is:

1. A lens substrate comprising:
a through-hole;
a lens portion formed at an inner side of the through-hole; and
a plurality of air grooves formed in a surface of the lens substrate, wherein the plurality of air grooves are arranged in a lattice shape so as to pass through a substantial center of each side of the through-hole and configured to direct air away from the through-hole during a manufacturing process.

2. The lens substrate according to claim 1, further comprising:
a second lens substrate bonded to the lens substrate, the second lens substrate including a second through-hole; and
a second lens portion formed at an inner side of the second through-hole, wherein the plurality of air grooves are configured to direct air accumulated between the lens portion of the through-hole and the second lens portion of the second through-hole away from the through-hole and the second through-hole when the substrate and the second substrate are bonded together.

3. The lens substrate according to claim 2, further comprising a blocking material configured to block the plurality of air grooves.

4. The lens substrate according to claim 3, wherein the blocking material is resin.

5. The lens substrate according to claim 2, wherein the plurality of air grooves are formed in one of an upper surface of the lens substrate or a lower surface of the lens substrate.

6. The lens substrate according to claim 2, wherein a distance between a bottom surface of the plurality of air grooves and a surface of the second lens substrate is less than a distance between a surface of the lens portion and the surface of the second lens substrate.

7. The lens substrate according to claim 2, wherein a cross-sectional shape of the plurality of air grooves are one of rectangular or triangular.

8. The lens substrate according to claim 1, further comprising:
a plurality of lens substrates, each lens substrate of the plurality of lens substrates including a through-hole with a lens portion formed therein; and
one or more air grooves formed between adjacent stacked lens substrates, wherein the one or more air grooves are configured to direct air accumulated between adjacent lens portions of the adjacent stacked lens substrates away from adjacent through-holes of the adjacent stacked lens substrates as the adjacent stacked lens substrates are bonded together.

9. The lens substrate according to claim 8, further comprising a second through-hole in the lens substrate, wherein the second through-hole does not include a lens portion formed therein.

10. The lens substrate according to claim 8, further comprising a second through-hole in the lens substrate, wherein the second through-hole is adjacent to the plurality of air grooves formed in the surface of the lens substrate.

11. The lens substrate according to claim 10, wherein the second through-hole is coupled to through-holes with lens portions disposed therein in the adjacent stacked lens substrates.

12. The lens substrate according to claim 8, further comprising:
a plurality of through-holes formed in the plurality of lens substrates, each through-hole of the plurality of through-holes including a lens portion formed at an inner side thereof; and
a plurality of air grooves formed on surfaces of the plurality of lens substrates such that each through-hole of the plurality of through-holes is connected to another one of the through-holes of the plurality of through-holes via at least one air groove of the plurality of air grooves.

13. The lens substrate according to claim 1, wherein a planar shape of at least a portion of the through-hole is rectangular.

14. The lens substrate according to claim 1, wherein the plurality of air grooves couples adjacent through-holes in the lens substrate during the manufacturing process.

15. A lens substrate comprising;
a through-hole;
a lens portion formed at an inner side of the through-hole; and
a plurality of air grooves formed in the surface of the lens substrate, wherein a direction of the plurality of air grooves with respect to the through-hole varies based on a position of the through-hole in the lens substrate.

16. A lens substrate comprising:
a plurality of through-holes;
a lens portion formed at an inner side of the through-hole; and
a plurality of air grooves formed in a surface of the lens substrate, wherein the plurality of air grooves connects adjacent through-holes in the lens substrate in an oblique direction and are configured to direct air away from the adjacent through-holes during a manufacturing process.

17. The lens substrate according to claim 16, wherein each of the through-holes of the plurality of through-holes is connected to any one of the through-holes of the plurality of through-holes via one or more air grooves of the plurality of air grooves.

18. An electronic apparatus comprising:
a camera module including a stacked lens structure, the stacked lens structure including:
a plurality of stacked lens substrates, wherein two or more lens substrates of the plurality of stacked lens substrates include:
a through-hole formed in each of the two or more lens substrates, each through-hole including a lens portion formed at an inner side therein, and
a plurality of air grooves, an air groove formed in a surface of each of the two or more lens substrates, the plurality of air grooves arranged in a lattice shape so as to pass through a substantial center of each of the through-holes and configured to direct air away from each of the through-holes during a manufacturing process; and
an optical sensor formed on a sensor substrate, wherein the sensor substrate and the stacked lens structure are stacked.

* * * * *